(12) United States Patent
Komornicki et al.

(10) Patent No.: US 7,312,802 B2
(45) Date of Patent: Dec. 25, 2007

(54) COORDINATE DESIGN AND INFORMATION SYSTEM

(75) Inventors: Wojciech Komornicki, Roseville, MN (US); Richard M. Harrison, St. Louis Park, MN (US)

(73) Assignee: SiteComp, Inc, Minneapolis, MN (US)

( * ) Notice: Subject to any disclaimer, the term of this patent is extended or adjusted under 35 U.S.C. 154(b) by 173 days.

(21) Appl. No.: 10/191,723

(22) Filed: Jul. 8, 2002

(65) Prior Publication Data

US 2004/0004611 A1  Jan. 8, 2004

(51) Int. Cl.
  G09G 5/00   (2006.01)
  G06F 17/00  (2006.01)
  G06T 1/00   (2006.01)
  G06T 17/00  (2006.01)

(52) U.S. Cl. ............. 345/619; 345/418; 345/420; 715/961; 715/964

(58) Field of Classification Search ........ 345/440–443, 345/419, 619, 700, 712, 961, 964, 428, 427, 345/861, 630, 760, 644, 418, 420, 423; 715/700, 715/712, 961, 964; 707/1
See application file for complete search history.

(56) References Cited

U.S. PATENT DOCUMENTS

| | | | | |
|---|---|---|---|---|
| 5,262,760 | A * | 11/1993 | Iwamura et al. | 345/861 |
| 5,745,751 | A   | 4/1998  | Nelson et al. | |
| 5,761,328 | A   | 6/1998  | Solberg et al. | |
| 5,912,674 | A * | 6/1999  | Magarshak | 345/440 |
| 6,056,556 | A * | 5/2000  | Braun et al. | 345/644 |
| 2001/0024207 | A1 * | 9/2001 | Dhimitri et al. | 345/630 |
| 2002/0005866 | A1 * | 1/2002 | Gorham et al. | 345/760 |
| 2003/0011599 | A1 * | 1/2003 | Du | 345/428 |
| 2004/0032411 | A1 * | 2/2004 | Roy et al. | 345/427 |
| 2006/0265350 | A1 * | 11/2006 | Klein | 707/1 |

OTHER PUBLICATIONS

"vector data", The Dictionary of Digital Media, 1994-2000, Hansen Media Corp., www.hansenmedia.com.*
"label", infoplease, 2000-2005, www.infoplease.com/dictionary/label.*
U.S. Army Engineer Research and Development Center, "Computer-Aided Design and Drafting (CADD) and Geographic Information System (GIS): Concepts and Terminology", Nov. 1999.*
Author unknown, "Implementing the Spatial Data Standards (SDSFIE)/Facility Management Standards (FMSFIE), Release 2.00 Using AutoDesk, Inc. AutoCAD Map 2000i," pp. 1-19, The CADD/GIS Technology Center; Technical Paper, Nov. 2001.
Richard Harrison et al., "Welcome to SiteComp for Windows Powered by CDIS," pp. 1-23, Sep. 2000.
Komornicki, "Developers Believe CDIS Will Make CAD Obsolete" pp. 43-45, CE News, Feb. 2002.
Tim Smith, "LANDCADD™ in Addition to CAD vs. AutoCAD® Alone" 13 pages, LANDCADD™ Comparison Guide, publication date unknown.
Richard Harrison, et al, "Software Manual Surveying and Engineering Software Powered by CDIS Technology User Guide" pp. 1-534, Sitecomp, Inc., 2001.

* cited by examiner

*Primary Examiner*—Kee M. Tung
*Assistant Examiner*—Chante Harrison

(57) ABSTRACT

A coordinate design and information system (CDIS) combining coordinate geometry, spatial features and drafting into one package. CDIS uses an object-oriented and spatial-based approach in which all objects have a set of attributes, while space and areas are defined and tracked. The invention has such features as incremental numbering with automatic parceling, duplicating a cluster, pulling a line tangent to a curve, erasing figures by type, converting lines to polylines, computing an average radius from digitized points, wiping out triangles greater than a certain length, exploding a text file inserted as multi-line text into individual lines of text, and specifying parcel report precision.

10 Claims, 143 Drawing Sheets

```
Find Error of Closure

Starting point 0 in course 0
Starting point at North 10000.000 East 10000.000
Ending point 0 in course 136
Ending point at North 9999.959 East 10000.042   perimiter = 2914.6062
Error North 0.0409   Error East -0.0422
Error 1 in 49616.2
```

Fig. 6

```
TMP8.$$$ - Notepad
File Edit Format Help

Slope intersect data
                        --------------------
          Left                  Right
station   offset  elevation     offset  elevation
0+00:     23.87   964.95        23.85   964.95
0+07:     24.87   965.19        23.97   965.19
0+82:     23.47   967.67        25.64   967.67
1+00:     24.73   968.27        26.95   968.27
1+25:     28.42   969.10        31.06   969.10
1+50:     37.65   969.93        36.13   969.93
1+55:     39.71   970.10        37.00   970.10
1+75:     43.35   970.76        40.80   970.76
2+00:     43.60   971.59        42.75   971.59
2+23:     42.15   972.42        41.85   972.42
2+50:     40.66   973.25        39.86   973.25
2+73:     39.10   974.08        38.34   974.08
3+00:     37.73   974.91        37.27   974.91
3+25:     36.52   975.74        37.41   975.74
3+50:     35.47   976.57        37.35   976.57
3+75:     34.35   977.40        37.09   977.40
4+00:     32.79   978.23        35.82   978.23
4+25:     31.25   979.06        34.55   979.06
4+50:     30.04   979.89        33.21   979.89
4+75:     28.68   980.72        31.80   980.72
5+00:     28.68   981.55        31.80   981.55
5+25:     27.69   982.38        30.07   982.38
5+50:     26.72   983.21        29.91   983.21
5+75:     24.81   984.04        30.98   984.04
6+00:     23.71   984.87        32.70   984.87
6+25:     23.35   985.70        32.04   985.70
6+50:     25.34   986.53        31.55   986.53
6+75:     26.53   987.26        30.12   987.26
7+00:     28.78   987.77        29.66   987.77
7+07:     28.91   987.88        29.39   987.88
7+25:     28.90   988.08        28.78   988.08
7+50:     29.20   988.19        28.50   988.19
7+75:     28.92   988.08        28.96   988.08
                          27.45
```

| Station | Left offset | elevation | Right offset | elevation |
|---|---|---|---|---|
| 7+75: | 27.45 | 988.08 | 28.96 | 988.08 |
| 8+00: | 24.01 | 987.77 | 29.81 | 987.77 |
| 8+25: | 27.76 | 987.25 | 29.30 | 987.25 |
| 8+50: | 29.34 | 986.52 | 27.16 | 986.52 |
| 8+75: | 25.74 | 985.68 | 24.94 | 985.68 |
| 9+00: | 26.36 | 984.85 | 24.52 | 984.85 |
| 9+25: | 32.55 | 984.02 | 27.29 | 984.02 |
| 9+50: | 37.65 | 983.18 | 30.20 | 983.18 |
| 9+75: | 43.55 | 982.35 | 31.05 | 982.35 |
| 10+00: | 48.31 | 981.52 | 31.25 | 981.52 |
| 10+25: | 48.82 | 980.68 | 30.86 | 980.68 |
| 10+50: | 43.02 | 979.85 | 30.30 | 979.85 |
| 10+68: | 39.00 | 979.24 | 30.41 | 979.24 |
| 10+75: | 37.91 | 979.02 | 30.60 | 979.02 |
| 11+00: | 37.52 | 978.18 | 31.78 | 978.18 |
| 11+25: | 38.03 | 977.35 | 33.20 | 977.35 |
| 11+50: | 39.61 | 976.52 | 34.79 | 976.52 |
| 11+75: | 41.65 | 975.68 | 36.81 | 975.68 |
| 12+00: | 43.61 | 974.85 | 37.87 | 974.85 |
| 12+25: | 43.71 | 974.02 | 36.00 | 974.02 |
| 12+50: | 43.08 | 973.18 | 34.36 | 973.18 |
| 12+75: | 41.75 | 972.35 | 32.87 | 972.35 |
| 13+00: | 39.09 | 971.52 | 30.66 | 971.52 |
| 13+25: | 36.74 | 970.68 | 29.34 | 970.68 |
| 13+50: | 34.61 | 969.85 | 28.39 | 969.85 |
| 13+75: | 33.36 | 969.02 | 26.91 | 969.02 |
| 14+00: | 32.69 | 968.18 | 25.47 | 968.18 |
| 14+25: | 32.66 | 967.35 | 24.45 | 967.35 |
| 14+50: | 34.15 | 966.52 | 25.06 | 966.52 |
| 14+75: | 36.11 | 965.68 | 28.33 | 965.68 |
| 15+00: | 36.37 | 964.85 | 33.65 | 964.85 |
| 15+25: | 36.28 | 964.02 | 37.77 | 964.02 |
| 15+50: | 36.76 | 963.18 | 40.60 | 963.18 |
| 15+75: | 36.00 | 962.42 | 41.86 | 962.42 |
| 16+00: | 34.84 | 961.78 | 42.46 | 961.78 |
| 16+25: | 33.92 | 961.28 | 43.26 | 961.28 |
| 16+50: | 33.33 | 960.91 | 43.95 | 960.91 |

Fig.52b

```
TMP8.$$$ - Notepad
File  Edit  Format  Help

16+50:    33.33   960.91         43.95   960.91
16+75:    32.74   960.68         42.40   960.68 station   Left                   Right
          offset  elevation      offset  elevation
17+00:    31.04   960.57         39.01   960.57
17+25:    27.87   960.60         34.46   960.60
17+50:    23.67   960.77         29.81   960.77
17+75:    27.84   961.00         24.00   961.00
18+00:    32.16   961.22         28.11   961.22
18+25:    33.92   961.45         31.83   961.45
18+36:    34.52   961.55         32.98   961.55
18+50:    35.28   961.68         34.71   961.68
18+75:    35.15   961.91         35.27   961.91
19+00:    34.35   962.14         34.32   962.14
19+25:    33.98   962.37         34.41   962.37
19+31:    33.95   962.42         34.46   962.42
19+50:    34.03   962.60         34.45   962.60
19+75:    34.46   962.83         34.42   962.83
20+00:    34.83   963.06         34.39   963.06
20+25:    35.13   963.29         34.54   963.29
20+50:    35.77   963.51         34.82   963.51
20+75:    35.57   963.74         35.17   963.74
21+00:    37.00   963.97         35.44   963.97
21+25:    37.55   964.20         36.54   964.20
21+50:    37.79   964.43         37.07   964.43
21+75:    38.48   964.66         38.13   964.66
22+00:    38.28   964.89         38.11   964.89
22+25:    38.47   965.12         32.20   965.12
22+50:    44.33   965.35         28.84   965.35
22+75:    48.62   965.58         29.20   965.58
23+00:    47.75   965.80         29.72   965.80
23+25:    43.86   966.03         28.60   966.03
23+50:    37.75   966.26         26.89   966.26
23+75:    33.16   966.49         23.77   966.49
23+94:    29.50   966.67         26.15   966.67
24+00:    28.82   966.72         27.25   966.72
24+25:    26.16   966.95         31.59   966.95
24+50:    24.29   967.18         34.88   967.18
```

*Fig-52C*

```
TMP8.$$$ - Notepad
File  Edit  Format  Help

24+50:   24.29    967.18    34.88    967.18
24+75:   23.28    967.41    36.95    967.41
Station   Left                      Right
         offset  elevation  offset  elevation
25+00:   23.51    967.64    37.88    967.64
25+25:   24.88    967.87    37.75    967.87
25+28:   25.30    967.89    37.68    967.89
25+50:   29.54    968.09    37.22    968.09
25+75:   36.19    968.32    34.34    968.32
```

```
Parcel List  (Continued)

block 3 lot  6    11251 sq.ft.  ( 0.25828 acres)
block 3 lot  7    11521 sq.ft.  ( 0.26448 acres)
block 3 lot  8    11303 sq.ft.  ( 0.25948 acres)
block 3 lot  9    11778 sq.ft.  ( 0.27040 acres)
block 3 lot 10    13498 sq.ft.  ( 0.30988 acres)
block 3 lot 11    13338 sq.ft.  ( 0.30619 acres)
block 3 lot 12    13116 sq.ft.  ( 0.30109 acres)
block 3 lot 13    11999 sq.ft.  ( 0.27547 acres)
block 3 lot 14    11613 sq.ft.  ( 0.26661 acres)
block 3 lot 15    11831 sq.ft.  ( 0.27160 acres)
block 3 lot 16    11691 sq.ft.  ( 0.26838 acres)
block 3 lot 17    11258 sq.ft.  ( 0.25846 acres)
block 3 lot 18    11250 sq.ft.  ( 0.25827 acres)
block 3 lot 19    13543 sq.ft.  ( 0.31090 acres)
block 3 lot 20    13391 sq.ft.  ( 0.30742 acres)
block 3 lot 21    14350 sq.ft.  ( 0.32943 acres)
block 3 lot 22    12561 sq.ft.  ( 0.28837 acres)
block 3 lot 23    13044 sq.ft.  ( 0.29944 acres)
block 3 lot 24    12032 sq.ft.  ( 0.27622 acres)
block 3 lot 25    17385 sq.ft.  ( 0.39911 acres)
block 3 lot 26    18408 sq.ft.  ( 0.42259 acres)
block 3 lot 27    23514 sq.ft.  ( 0.53981 acres)

Total area of all parcels: 856018 sq.ft. (19.65147 acres)
```

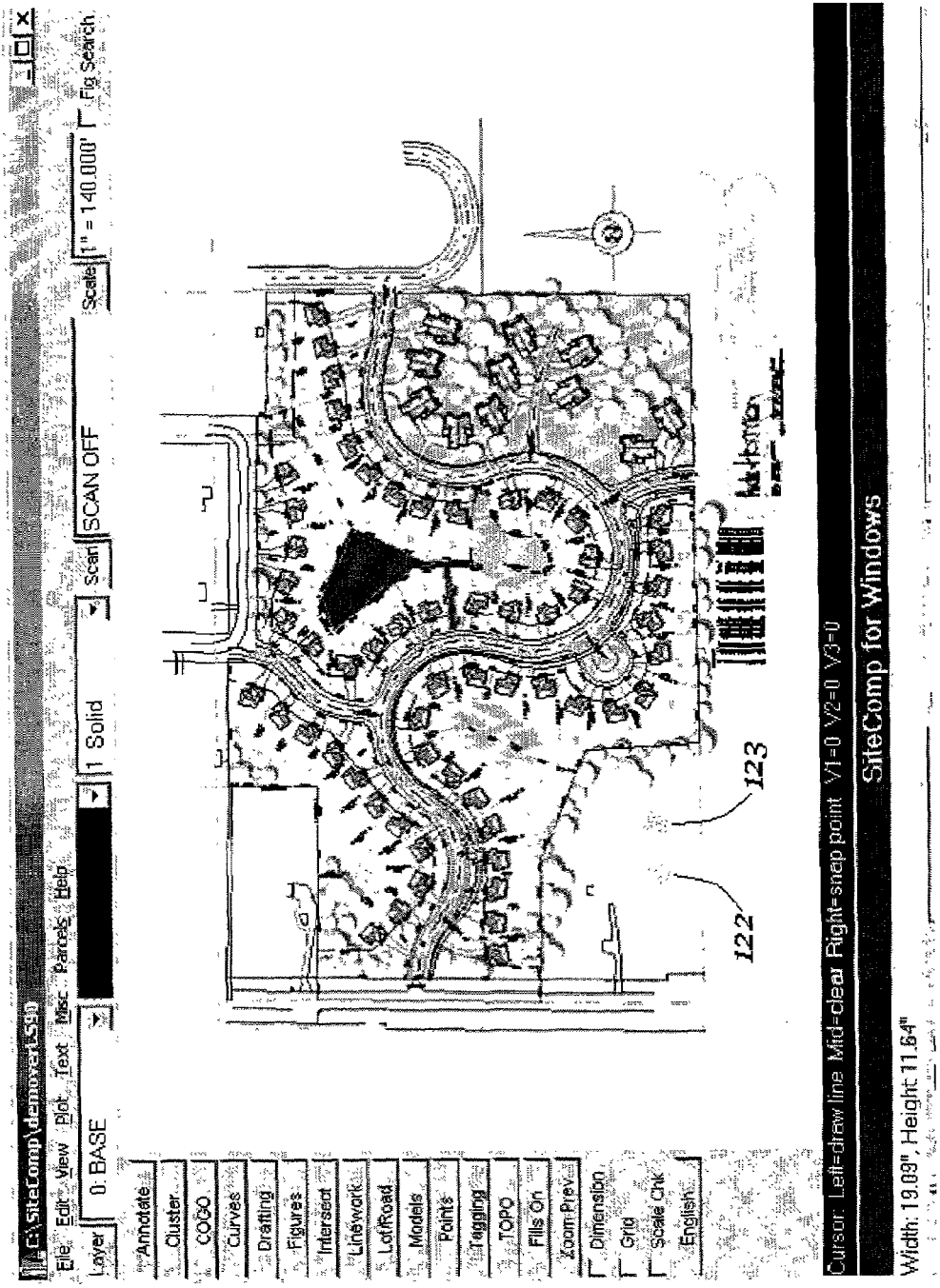

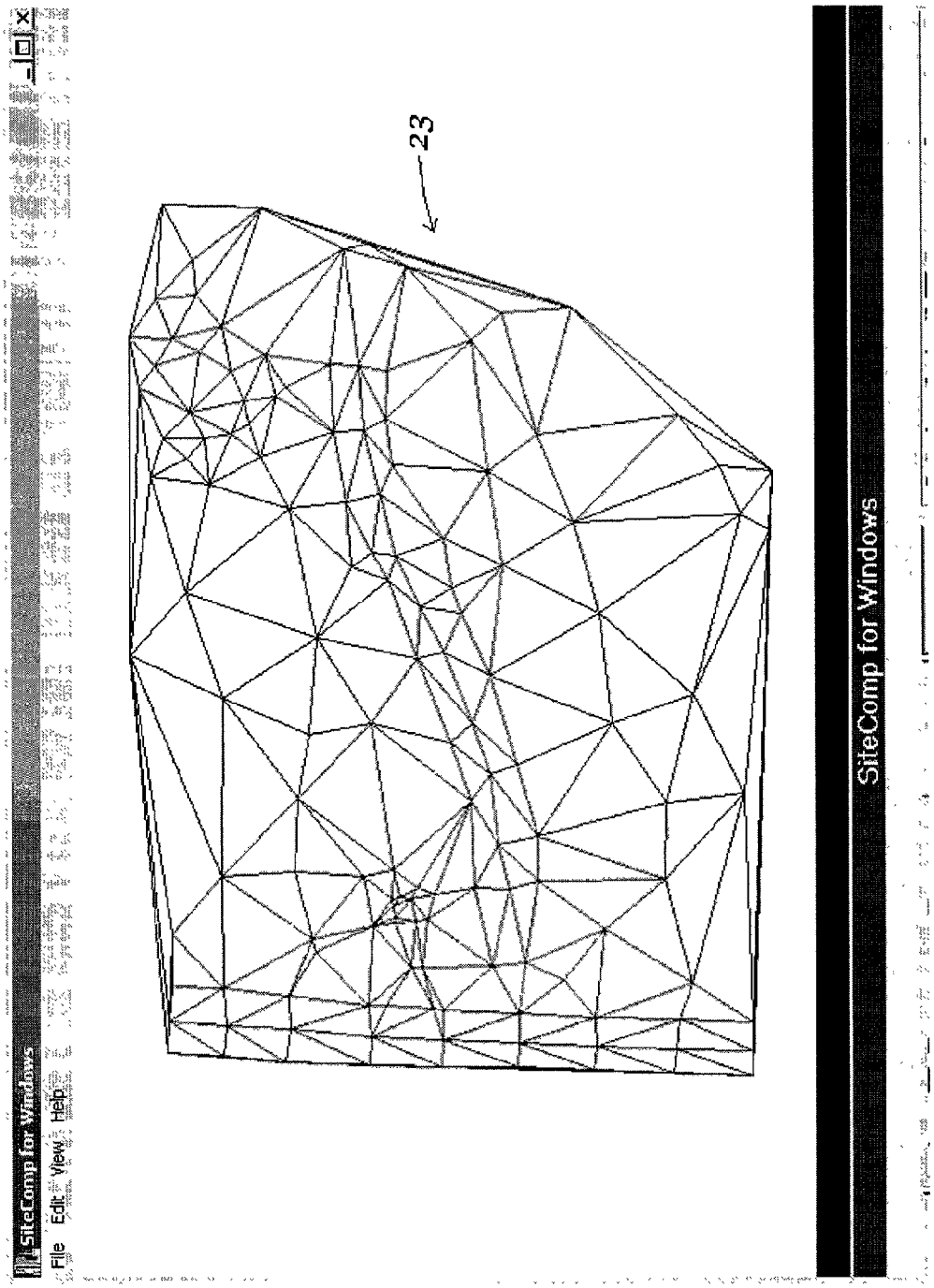

```
TMP9.$$$ - Notepad
File  Edit  Format  Help

Parcel List
                       -----------
block 1 lot  1   24961.72 sq.ft.  ( 0.57 acres)
block 1 lot  2   14834.76 sq.ft.  ( 0.34 acres)
block 1 lot  3   12629.12 sq.ft.  ( 0.29 acres)
block 1 lot  4   13751.90 sq.ft.  ( 0.32 acres)
block 1 lot  5   23601.65 sq.ft.  ( 0.54 acres)
block 1 lot  6   21427.72 sq.ft.  ( 0.49 acres)
block 1 lot  7   13250.79 sq.ft.  ( 0.30 acres)
block 1 lot  8   12506.49 sq.ft.  ( 0.29 acres)
block 1 lot  9   12026.41 sq.ft.  ( 0.28 acres)
block 1 lot 10   12160.04 sq.ft.  ( 0.28 acres)
block 1 lot 11   12263.21 sq.ft.  ( 0.28 acres)
block 1 lot 12   17983.85 sq.ft.  ( 0.41 acres)
block 1 lot 13   18117.71 sq.ft.  ( 0.42 acres)
block 1 lot 14   17598.07 sq.ft.  ( 0.40 acres)
block 1 lot 15   14840.84 sq.ft.  ( 0.34 acres)
block 1 lot 17   14600.99 sq.ft.  ( 0.34 acres)
block 1 lot 18   13160.59 sq.ft.  ( 0.30 acres)
block 1 lot 19   13690.48 sq.ft.  ( 0.31 acres)
block 1 lot 20   11407.56 sq.ft.  ( 0.26 acres)
block 1 lot 21   14447.80 sq.ft.  ( 0.33 acres)
block 2 lot  1   38591.02 sq.ft.  ( 0.89 acres)
block 2 lot  2   12541.88 sq.ft.  ( 0.29 acres)
block 2 lot  3   12426.00 sq.ft.  ( 0.29 acres)
block 2 lot  4   12695.06 sq.ft.  ( 0.29 acres)
block 2 lot  5   15559.96 sq.ft.  ( 0.36 acres)
block 2 lot  6   17442.72 sq.ft.  ( 0.40 acres)
block 2 lot  7   14762.04 sq.ft.  ( 0.34 acres)
block 2 lot  8   13922.05 sq.ft.  ( 0.32 acres)
block 2 lot  9   15577.41 sq.ft.  ( 0.36 acres)
block 2 lot 10   14844.65 sq.ft.  ( 0.34 acres)
block 3 lot  1   24851.91 sq.ft.  ( 0.57 acres)
block 3 lot  2   16202.09 sq.ft.  ( 0.37 acres)
block 3 lot  3   17167.27 sq.ft.  ( 0.39 acres)
block 3 lot  4   13317.31 sq.ft.  ( 0.31 acres)
block 3 lot  5   13162.62 sq.ft.  ( 0.30 acres)
block 3 lot  6   11250.82 sq.ft.  ( 0.26 acres)
```

COORDINATE DESIGN AND INFORMATION SYSTEM

BACKGROUND

The invention pertains to design and drafting and particularly to design and drafting as it relates to surveying, civil engineering, site planning, mapping, geographical information systems (GIS), and related fields. There are systems such as computer-aided drawing (CAD) which may be used in these fields. Background for the present invention may be found in a user guide entitled "SiteComp Software Manual" and copyrighted 2001 by SiteComp, Inc., at 8100 Wayzata Boulevard, Minneapolis, Minn. 55426.

SUMMARY OF THE INVENTION

The coordinate design and information system (CDIS) along with one or more of its new features, the invention, combines coordinate geometry, spatial features and drafting into one package. CDIS uses an object-oriented and spatial-based approach in which all objects have a set of attributes, while space and areas are defined and tracked. The invention has such features as incremental numbering with automatic parceling; for example, it allows a user of the invention to quickly access all of the lots on a site, and then automatically parcel the lots. This and other features of the invention are described below.

BRIEF DESCRIPTION OF THE DRAWING

FIG. 6 shows the error of closure in a pop-up;

FIG. 25 indicates with a star symbol that the line between points 21 and 56 was snapped to;

FIGS. 52a, 52b, 52c and 52d reveal slope intersect data;

FIGS. 72a and 72b reveal a parcel list;

FIGS. 94 through 98 indicate a way to duplicate a cluster;

FIG. 114 through 116 indicate a way to wipe out triangles greater than a certain length;

FIG. 127 through 131 indicate a way to specify parcel report precision; and

DESCRIPTION

Figure 1:
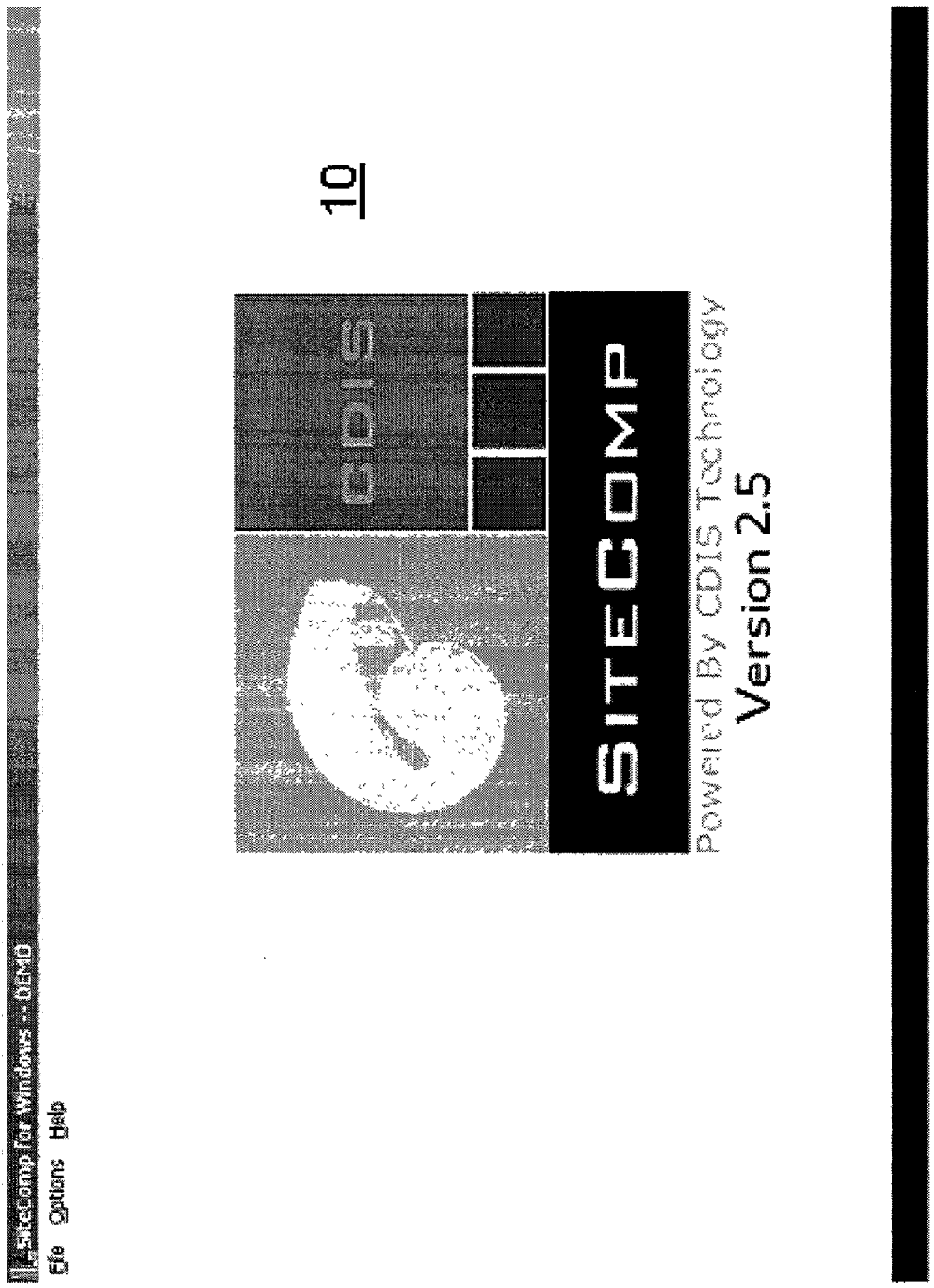
FIG. 1 is the main window of the coordinate design and information system.

FIG. 1 reveals a main menu or screen 10 of a CDIS. Other menus are discussed below. CDIS may operate within a windows operating system. A desktop PC with windows, a three button mouse, a high resolution monitor and printer may be sufficient for using CDIS. A laptop or other kind computer with helpful peripherals may be adequate.

CDIS combines functions useful for civil engineering, surveying, planning and municipal work into a single-standalone system. Coordinate geometry, drafting and GIS may be integrated. Since a drawing is effectively physical geometry, each line and arc may be based on the original coordinates and the systems automatic computations. With CDIS, object descriptions may be functionally and sequentially managed. The mental workload of point-number-based systems disappears. Time-consuming breaklines are virtually eliminated. Even contour generation is object-based. CDIS may provide the user spatial-based geometry. This feature may graphically communicate the intelligence within the drawing and provide a user of the system with nearly instantaneous information such as area type, volumes critical to job losses, open space analyses and graphic representation of site data. CDIS may be a single solution that bridges a user's project needs. It may include survey note entry, contouring, earthwork, legal description writing, road and utility design, site design and hundreds of other features. Because virtually everything of the system may be coordinate-based, very large jobs may easily fit on a disk. This should eliminate problems associated with the transfer of large related-art files. Yet CDIS may be compatible with DWG, DGN, DXF and ASCII file formats.

First, some discussion of particular features of the CDIS is presented here. CDIS relives the burden of a user having to understand the relationships between points, figures, parcels and layers by maintaining the data relationships for the user, and keeping this information in one file. For instance, a single CDIS file may contain critical information, including land surface and spatial data, and also reduce significantly both file size and the number of files needed on any single job. Since all of the data is contained in one file, data transport and sharing are faster and easier. CDIS may allow the user to start with raw surveying data and to produce intelligent survey drawings. CDIS may bring to the survey plan not the ability to draw but the ability draw with a built-in intelligence. This is the ability to draw as a by-product of the geometric analysis, and the ability to track areas as a direct result of the built-in intelligence. This significant amount of information may enable the user to present clear and thorough options to help determine the best design.

The key components of CDIS intelligence may include structures built in a hierarchical fashion applying an object-oriented approach, each object having its own attributes, a CDIS object possessing all the available knowledge within the system about itself, area tracking that redefines spatial geometry and GIS mapping, CDIS defining coordinates differently from other systems such as CAD having similar objectives, and an extensive database component giving the user the ability to query space and objects. CDIS may integrate knowledge, design and functionality to enable the user to concentrate on the total picture and the best possible design.

CDIS uses an object-oriented approach having its structures built in a hierarchical fashion. Each object, whether a line or an arc, has its own attributes and a user may query or modify these attributes at will. Objects in CDIS range from atomic entities—ones that are built from several smaller objects—to complex objects that are built from smaller objects. Simple objects may include points or labels, or the text of the drawing. Complicated objects may include entire site plans or regional maps. A simple object, however, may not look simple when viewed in a drawing. For example, a north arrow is a simple object in CDIS, not an object made up of circles and lines even though it may appear otherwise. This object, called a model, is treated much like an individual character in a word of text.

Standard objects in CDIS include points, lines, arcs, polylines, arrows, circles and labels. A rich collection of models, symbols, and complicated drawings that are treated as atomic objects are part of CDIS, and this collection can be expanded by the user as needed. Objects can be added without the need to reverse engineer, rewrite the software, or develop macros, and users are free to design their own objects and integrate them into the work. Each object in CDIS has a set of attributes. For example, a user draws a line using a particular bearing and distance. The line's length—an attribute—is the same size, whether it's reported in feet, meters or miles. This is an important consideration; the size is a quantity independent of the units used to describe it. For instance, a line with a length of 883.30 feet could also be reported as 269.23 meters, but the length is still the same. The color of the line as well as its pattern (line type) is also an attribute of the object.

When creating such a line in CDIS, the user is free to set the length of the line in any unit he or she chooses, independent of the display units. The length could be set in varas, perches or inches, and yet be displayed in feet or meters. Direction in the form of bearings or azimuths, with options on rounding, is also user-controlled. But it has no physical affect on the line. In other words, any object in CDIS possesses all knowledge about itself. All that the user needs to do is ask the object for what he or she needs.

Spatial data make up a primary component of GIS. Traditional spatial software for GIS arranges space in the form of polygons, which are boundaries defined by a series of coordinates. More complex shapes require more coordinates. As such, curved boundaries consume substantial numbers of coordinate pairings to present the shape graphically. In modern development design, there are many curved boundaries; thus, a large amount of data may be needed to define the space.

CDIS integrates a new concept for spatial intelligence that tracks actual boundary survey. Instead of using polygons, CDIS spatial information reproduces virtually an exact shape by producing each line and arc to precise dimensions. Curves are defined by two items. One is coordinates at each end of the arc and the other is a single center point. Thus, the data amount is reduced significantly and processing speed is increased very much. And since spatial data are actually the physical coordinate geometry, functions such as automatic legal description writing, offsets and variable offsets, and road and utility profile generation, are created directly from parcel identification.

The coordinates themselves are defined as objects. In one convention, various layers might represent different types of linework. One layer might be walkways, another might be buildings, and still another might be sanitary sewer lines. In CDIS, however, the actual end points of the drawing data may be defined; thus, the intersection of a line and an arc may be described internally. The description could be as simple as "lot corner" or as complex as "found one iron pipe 1.5 feet east of a four-inch-square wooden fence post." In some related art systems, only the X, Y and optional Z coordinates may be defined. Other points in those systems might not be defined unless they are databased by complex block objects or other mechanisms.

Having descriptions greatly simplifies point management and can eliminate the tedious "point number" thinking of traditional coordinate geometry. Since topological surface generation is also included in the core of CDIS technology, surface details in existing and proposed surfaces can be defined by what their functions represent instead of, or in addition to, definition by layers.

The concepts of objects/attributes and redefined space may be extended to the features of intelligent design in CDIS. First, one may look at an example for objects and attributes. Assume that the user needs to create a lot of a certain size along a street. The requirements of each lot may include side boundaries perpendicular to the street, have a back that is constrained by an existing boundary line and have an area of 50,000 square feet. If the street happens to be a straight line and the back boundary a straight line parallel to the street, then this is an easy calculation since it involves the drawing of just straight lines. In reality, existing streets and boundaries are rarely straight lines. For non-straight situations, CDIS makes lot design an easy task. Because size is an attribute of the lot, the user simply asks CDIS to create lots that fit a particular size of area.

The concept of redesigned space may extend to the features of intelligent design with CDIS. Many design projects involve a set of lines and arcs that form shapes such as streets, driveways, residential and commercial buildings, and many other things. Since CDIS uses actual geometric shapes with true lines and arcs instead of polygons, the amounts of data dealt with are reduced dramatically. Beyond that usage, these geometric shapes may be used for graphic highlighting and vast numbers of calculations not possible in many other related art systems.

Once the user has solved complex surveying problems, performed integrated site engineering or designed a site using CDIS, he or she may be free to gather information that might be useful in further planning. For example, the user may want to find information about the site, including how many lots are over 45,000 square feet, what the surface area is of the streets, and how much impervious surface is in the site. Because the lot size, open space and impervious surface are all attributes, such information is effectively a click away. Since CDIS uses lines and arcs, the information is quite precise.

A point has location attributes of northing, easting and elevation. These correlate to axes of a planar coordinate system. The description and point number are two other attributes. Drawing entities or fundamental objects are figures in the system. The figures are like atoms and the points are like subatomic particles when using a nuclear physics analogy of the drawing entities or objects. Location is a point. The point is not a drawing entity and cannot be seen but may have a symbol like a dot to make it appear visible. For an illustrative instance, text may be anchored to a particular point. In surveying, as an example, one works with points rather than figures. Points are created at the locations. The figures may be created from the points after one gets the surveying data.

Clustering is the capability of the present system to take any job file and import or bring it in to a current job file. A cluster is a number of figures. The cluster can be taken apart and the figures can be treated separately. A model may appear to have several figures but it is a single figure and cannot be taken apart like a cluster. Clusters do not have names. Parcels have names. Parcels are persistent and clusters are not. If a figure has a name, then it is a parcel even if it is a line. Parcels need to have names. There may be parcels within a cluster where the parcels have names and the cluster does not have a name. The parcel names should be or need to be unique. Layers beside parcels can have names. Layers are attributes of figures.

CDIS has a figure (FIGURE) hierarchy with a number of levels as noted in the following, which includes some review of the notions discussed above. The terms mentioned have their respective program name in parentheses. At the bottom level of the hierarchy is a simple figure (SIMPLEFIGURE). The only attributes a simple figure has are three points which determine the location of the simple figure and whether the simple figure is a line (LINE), an arc (ARC) or a polyline (POLYLINE).

The next level in the hierarchy is a basic figure (BASICFIGURE). A basic figure is a simple figure together with attributes of type (TYPE). This attribute determines the type of the figure. The current figure types are an arrow (ARROW_FIG), circle (CIRCLE_FIG), a label (LABEL_FIG), a model (MODEL_FIG), a symbol (SYMBOL_FIG), a float (FLOAT_FIG), a line (LINE_FIG), a polyline (POLY_FIG), an arc (ARC_FIG), an arc line (ARC_LINE_FIG), a bad figure (BAD_FIG), water (WATER_FIG), man hole (MH_FIG), an inlet (INLET_FIG), a pipe (PIPE_FIG), snap points (SNAPPTS_FIG), a wire line (WIRELINE_FIG), an ellipse (ELLIPSE_FIG), a water line (WATERLINE_FIG), and a dig line (DIGLINE_FIG).

A drawing flag (DRAWINGFLAG) is a collection of attributes that determines characteristics such as whether the figure is closed, whether a line note is displayed when the figure is drawn, what is the orientation of the figure, whether the figure should be smoothed.

Depending on the type of the figure, a basic figure can have attributes of area, length, angle, radius, bearing, and extent.

The next level in the hierarchy is a figure (FIGURE). A figure is a basic figure together with attributes. It may be referred to as a regular or standard figure. A level (LEVEL) is the level to which the figure belongs. Pen (PEN) means the color of pen used to draw the figure. Line type (LINETYPE) is the type of line used to draw the figure (e.g., solid, dotted, dashed, invisible, and so forth). An annotation code (ANNOTATIONCODE) indicates what type, if any, of annotation is to be displayed when a figure is drawn. Annotation pen (ANNOTATIONPEN) indicates what color of pen is used to display the annotation.

Arrow size (ARROW_SIZE) means, if the figure includes an arrow head, the size of the arrow head. Arrow length (ARROW_LENGTH) means, if the figure is an arrow, the length of the arrow. Scale factor (SCALE_FACTOR), if the figure is to be scaled, is the scale factor. For most figures, this is always 1. Offset (OFFSET) is, if an annotation is to be displayed with the figure, the offset from the figure at which the annotation should be displayed, i.e., the size of the space between the text of the annotation and the figure. Label width (LABELWITH) is, if the figure is a LABEL, the width of the label. Label width (LABELHEIGHT) is, if the figure is a LABEL, the font height of the label. Character size (CHAR_SIZE), indicates, if an annotation is to be displayed with the figure, the size of the font used for the annotation. Fill color (FILL_COLOR), means, if a figure is to be filled, the fill color. Font (FONT) is, if the figure is a label, the font family used for the label. Weight (WEIGHT) is, if the figure is a label, the weight of the font used for the label. Label origin (LORG) means, if the figure is a label, the position of the label relative to the point which specifies its location. If P is the point at which the label is to be positioned, one can specify whether the label is left aligned to this point, centered, or right aligned in the horizontal direction. One can also specify whether the label is bottom, top or center aligned in the vertical direction. Border (BORDER) is, if the figure is a label, the type of border to put around the label Finally, a FIGURE can be specialized to any of the types of figures-currently in the software and each of these specializations has its own set of attributes and methods. For example, each specialization knows how to draw itself. A line (LINE_FIG) has a midpoint and an (ARC_FIG) has a center as well as a midpoint. A specialization also may be called a specialization of a figure, a specialization figure or a specialized figure.

Besides its coordinates, a point has a description attribute and a type attribute. The type can be one of the following:
 SIMPLE_PT
 ARROW_PT
 CIRCLE_PT
 RADIAL_PT
 FILELABEL_PT
 CIRCLE_LEADER_PT
 LABEL_PT
 MODEL_PT
 SYMBOL_PT
 PROTECTED_PT
 ERASED
 EMPTY_PT These attributes specify information as to how to draw figures positioned at the point. For example, if a point has an attribute of RADIAL_PT, it is assumed to be the center of an ARC or of a CIRCLE and hence its location is not looked at when determining whether the figure (ARC or CIRCLE is viewable). If a point is an attribute of LABEL_PT, it is assumed that a LABEL_FIG is positioned at that point and so the point should not be used in determining the geometry of a plan.

A parcel has very few attributes (name, area and closedness) but has many methods to determine information about the parcel such as the number of arcs in a parcel, the number of lines in a parcel, whether a point is on a parcel, and so forth.

In summary, CDIS contains a drafting mechanism having entities that include simple figures, basic figures, standard figures, specialization figures and parcels. Each figure has at least a point. A simple figure may be a line, an arc or a polyline. A simple figure has attributes of its points. A point has only an attribute of location. A basic figure has at least one more attribute than the simple figure. A standard figure has at least one more attribute than a basic figure. A specialization figure may be any kind of figure that can draw itself. A parcel may be a simple figure, a basic figure, standard figure or specialization figure having a name.

One of the functions of the drafting mechanism of CDIS is the creation of new technical information such as the creation of a land surface, property lines, figures, parcels, setback easements or other technical information as described below. Technical information is herein understood to mean information that dimensionally relates the parts or details of the underlying object represented in the CDIS system to each other, information such as land contours or property boundaries. Technical information is better understood in contradistinction to information created in the map or blueprint making process, information such as scale, line style, or what to present in a particular view, or information that does not add dimensional relationships such as labels.

Figure 2:
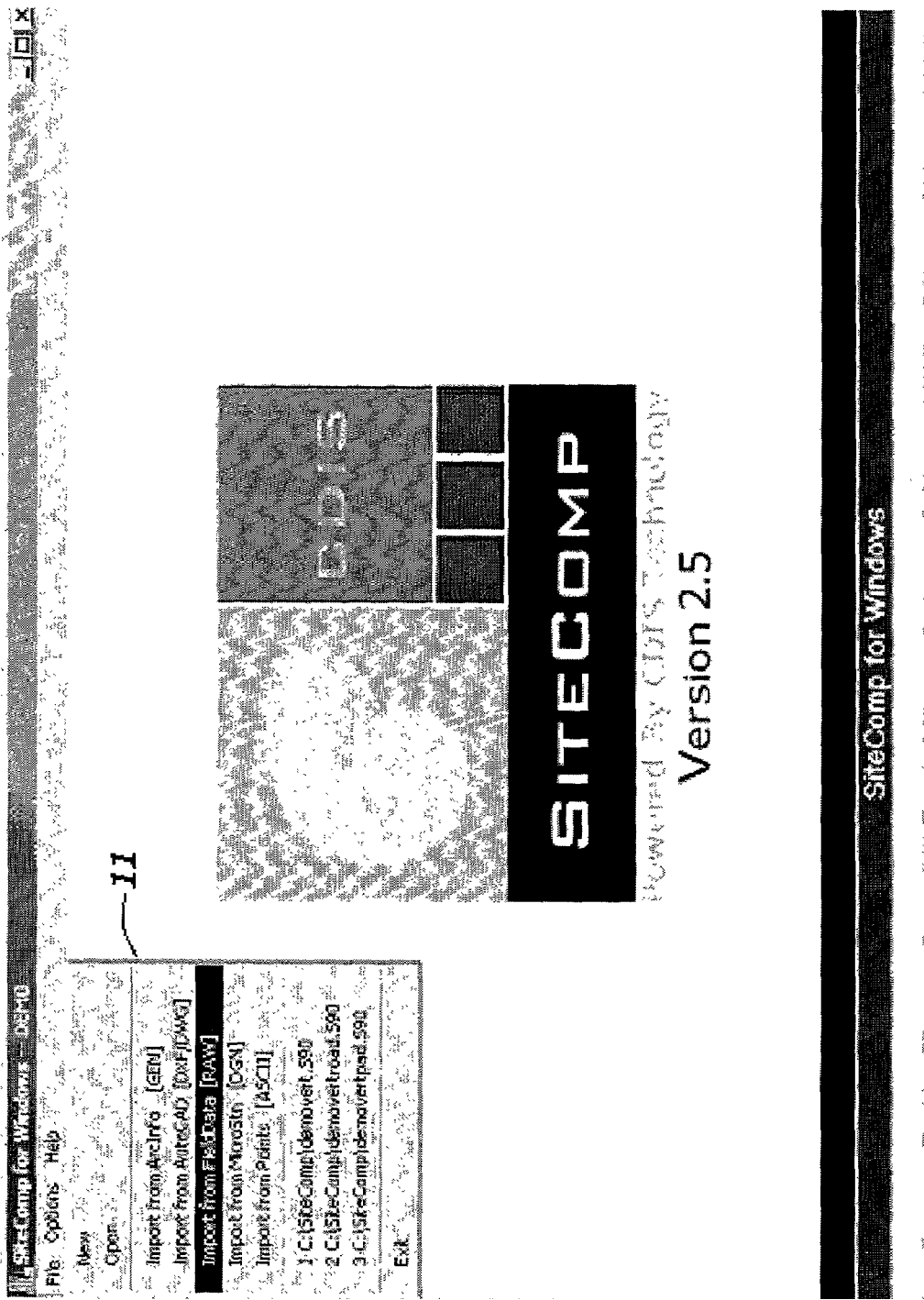
FIG. 2 is a window with the step to the raw data file.
Figure 3:
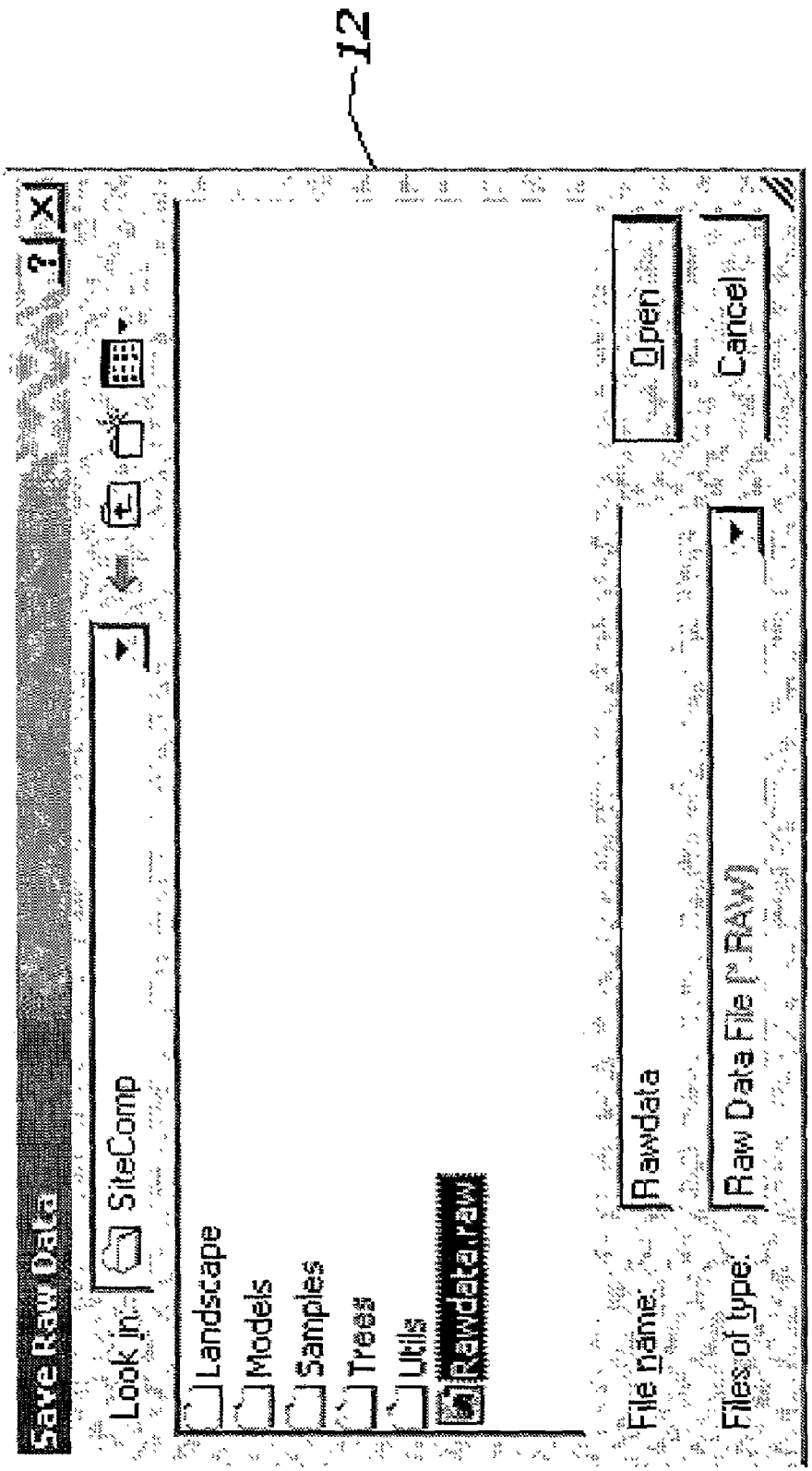
FIG. 3 shows the pop-up box with the raw data files for access.
Figure 4:
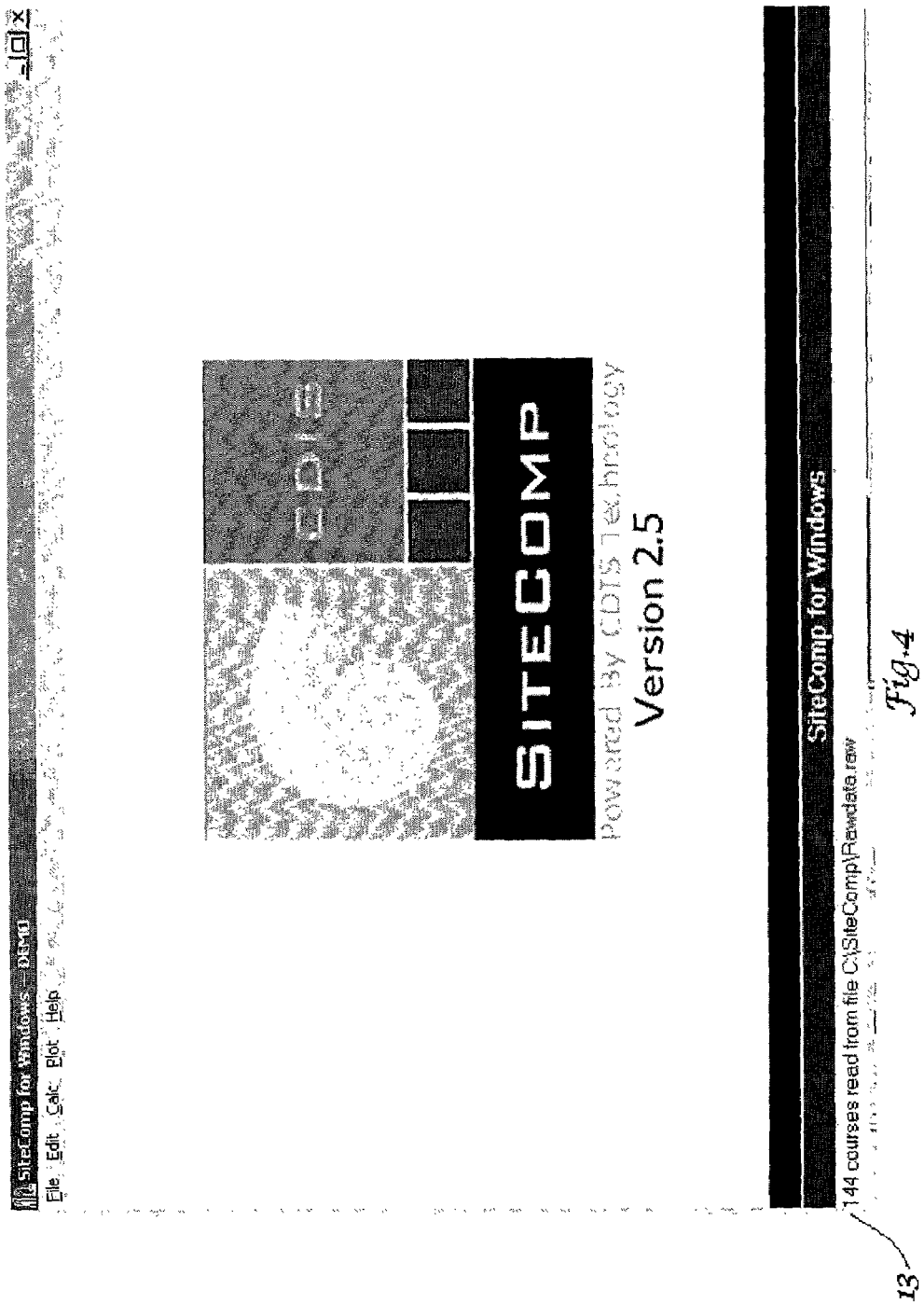
FIG. 4 indicates that raw data was read into the system.
Figure 5:
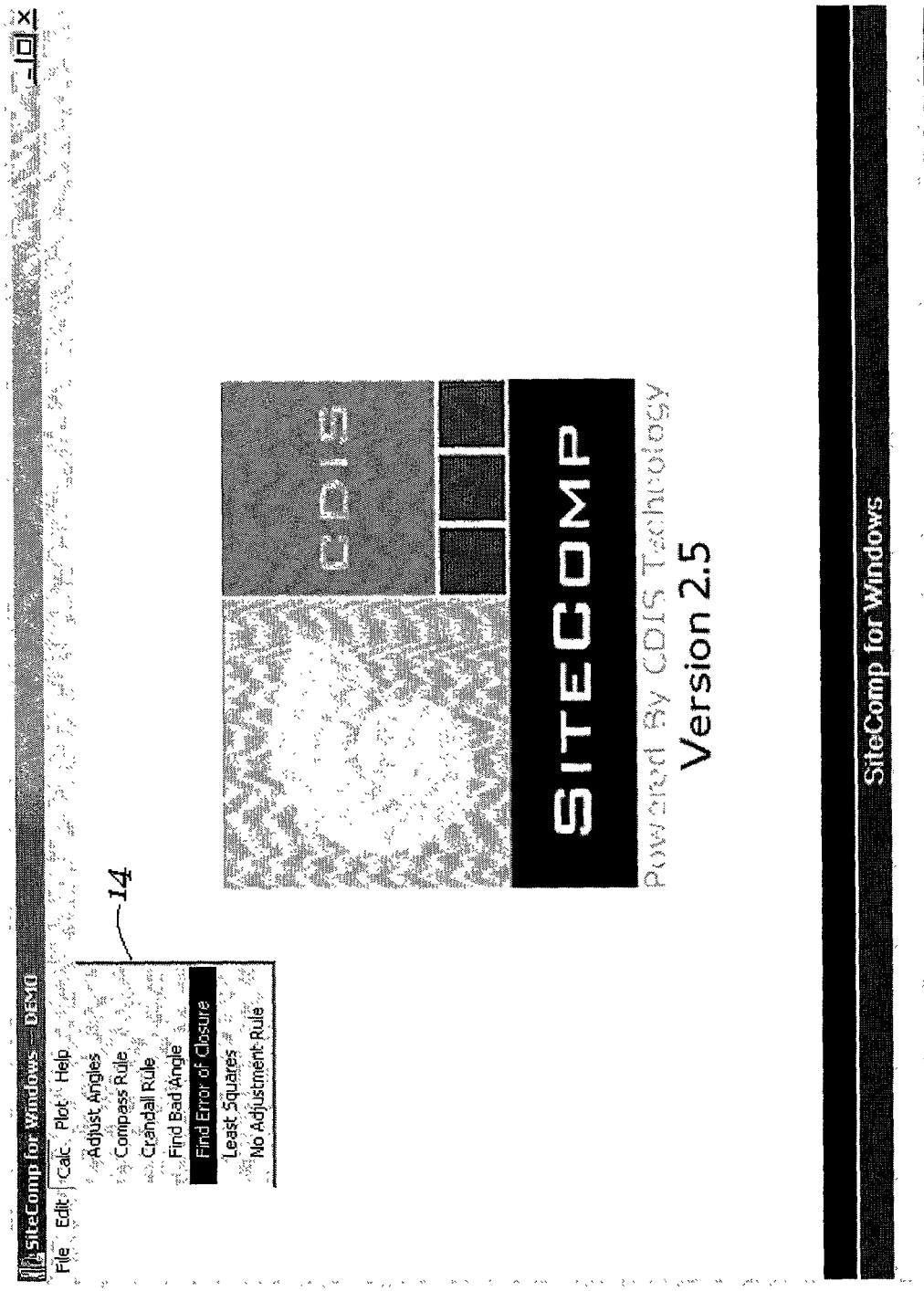
FIG. 5 shows the step to find the error of closure.

The following tour description may reveal the fundamental powers of CDIS. The first part involves surveying. One can read in raw data and adjust. One may select "Import from FieldData (RAW)" under the "File" pull-down 11, as shown in FIG. 2. A pop-up 12 may appear displaying the raw data files in the directory, as noted in FIG. 3. Next, one may select "Rawdata.raw" and click on "Open". The survey menu options may appear at the top of the screen, and a message 13 may appear in the bar at the bottom of the screen stating "144 courses read from file C:\SiteComp\Rawdata.raw," as indicated in FIG. 4. Then one may select "Find Error of Closure" under the "Calc" pull-down 14, as indicated in FIG. 5. A prompt may ask: "Is the traverse beginning with course 1 point 1 closed? [Y/N]". One may press "Y" or the [Yes] button with the mouse left button to verify closure. The display shows the error of closure 15 in FIG. 6. On the pop-up, one may select "File" and "Exit" to close the information form the display. Next, one may select the "Least Squares" under the "Calc" pull-down 14 shown in FIG. 5 to adjust the data using the Least Squares rule. Standard surveying editing and adjustment features are included in CDIS.

Figure 7:
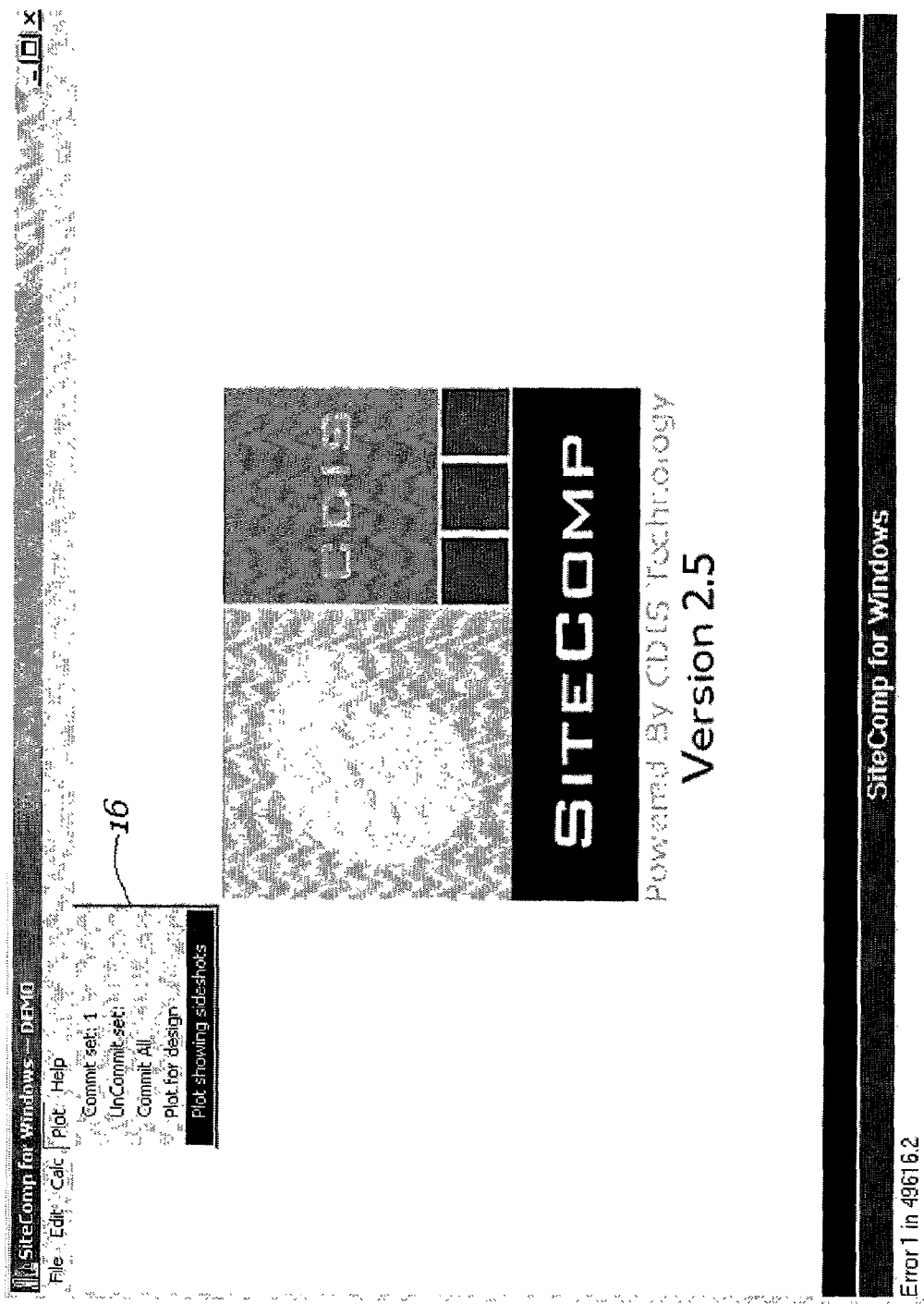
FIG. 7 has the step to the plot showing sideshots.
Figure 8:
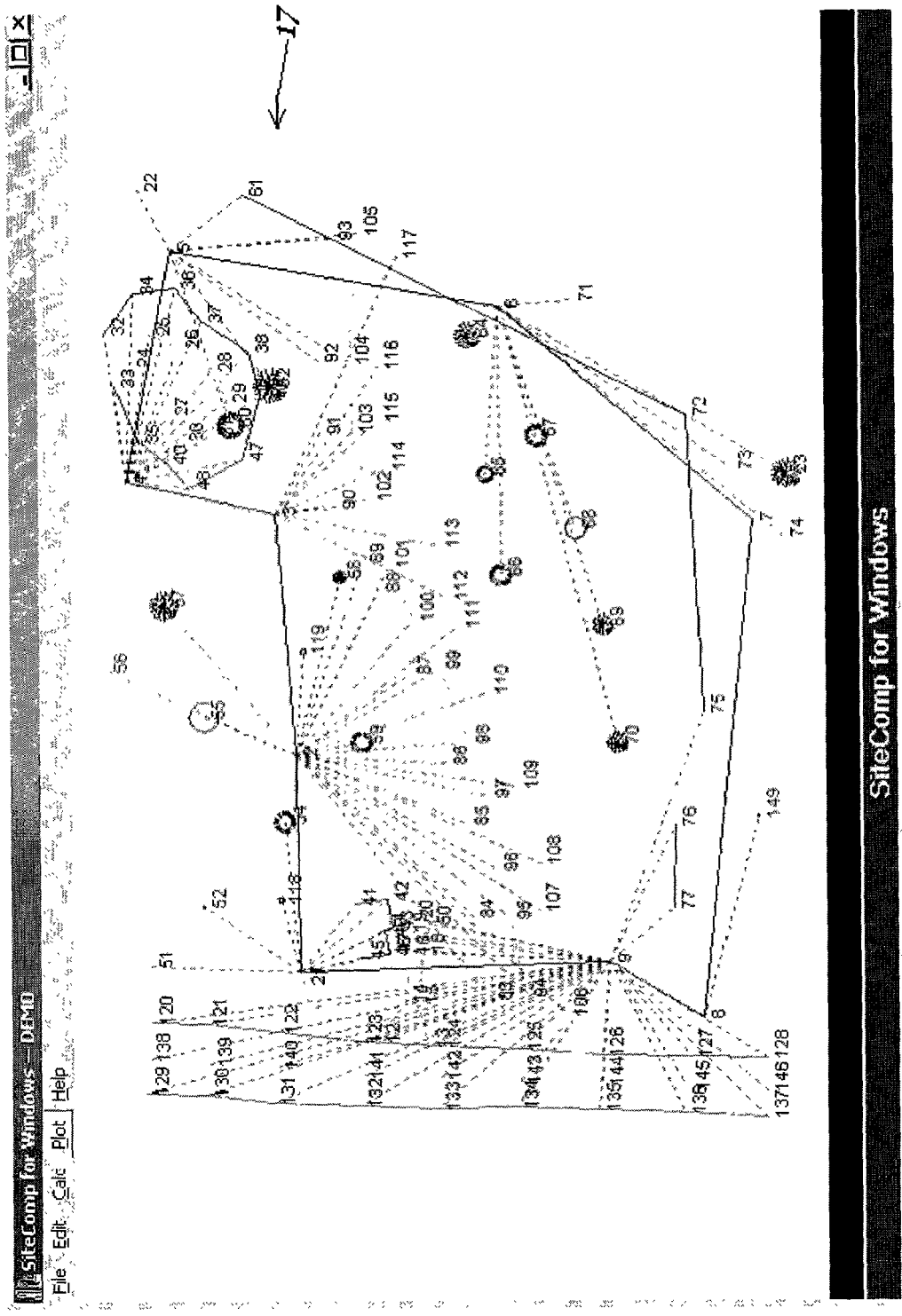
FIG. 8 shows the plot with the sideshots.

One may have automatic plotting of raw survey notes. CDIS may enable one to step through field notes and show both traverse and sideshots along with a wide variety of symbols and automatic line generation features. With very little fieldwork and only a few keystrokes, plotting raw survey notes may become a map. One may select "Plot Showing Sideshots" under the "Plot" pull-down 16, as in FIG. 7. FIG. 8 shows what one may get. Here, CDIS creates linework 17 from the field notes. The dotted lines show the sideshots. To get these results, one does not necessarily have to tie into a third-party package such as a CAD package. So one may not have to learn another package, scale factors or window limits.

Figure 9:
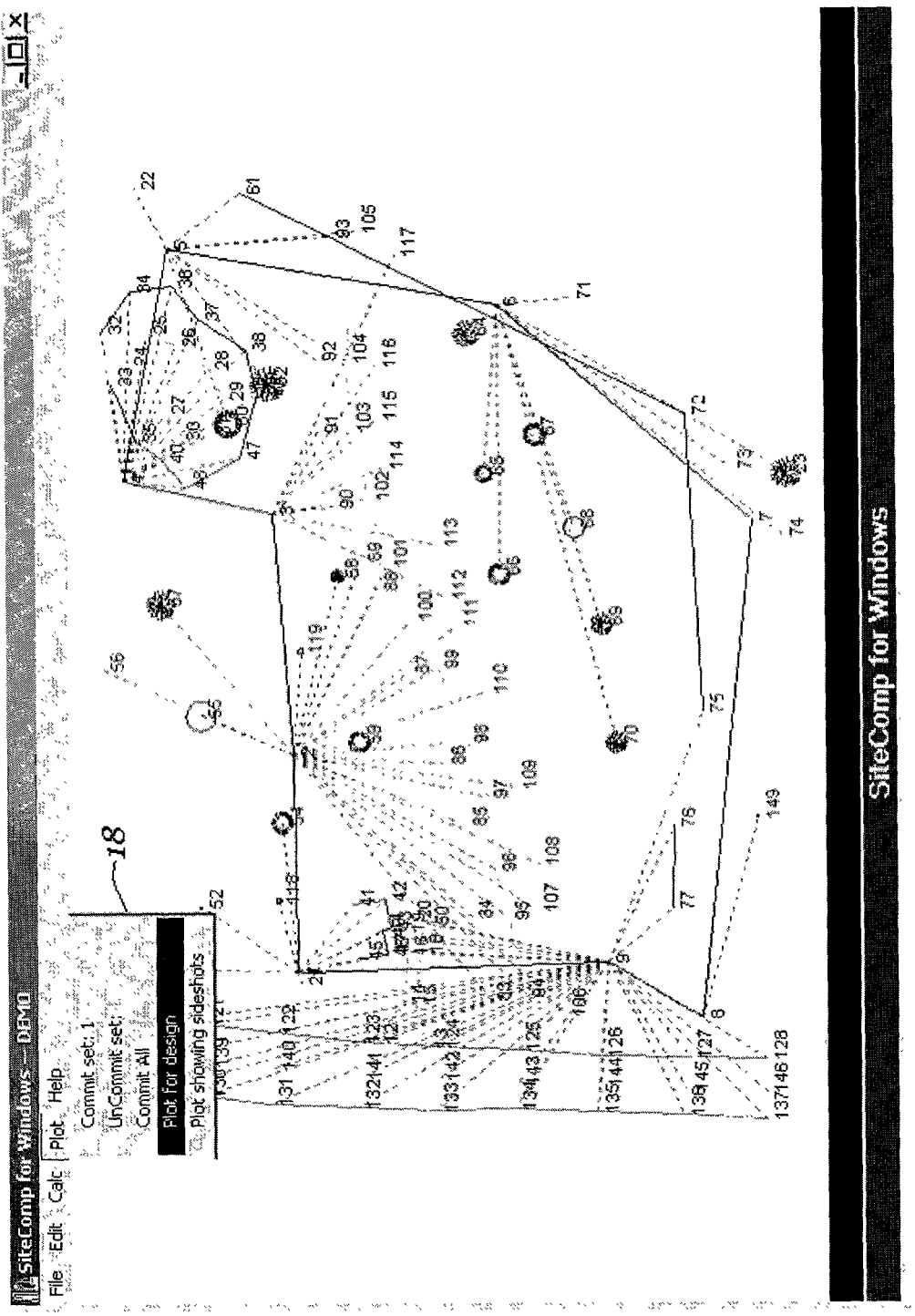
FIG. 9 indicates the step for the plot for design.
Figure 10:
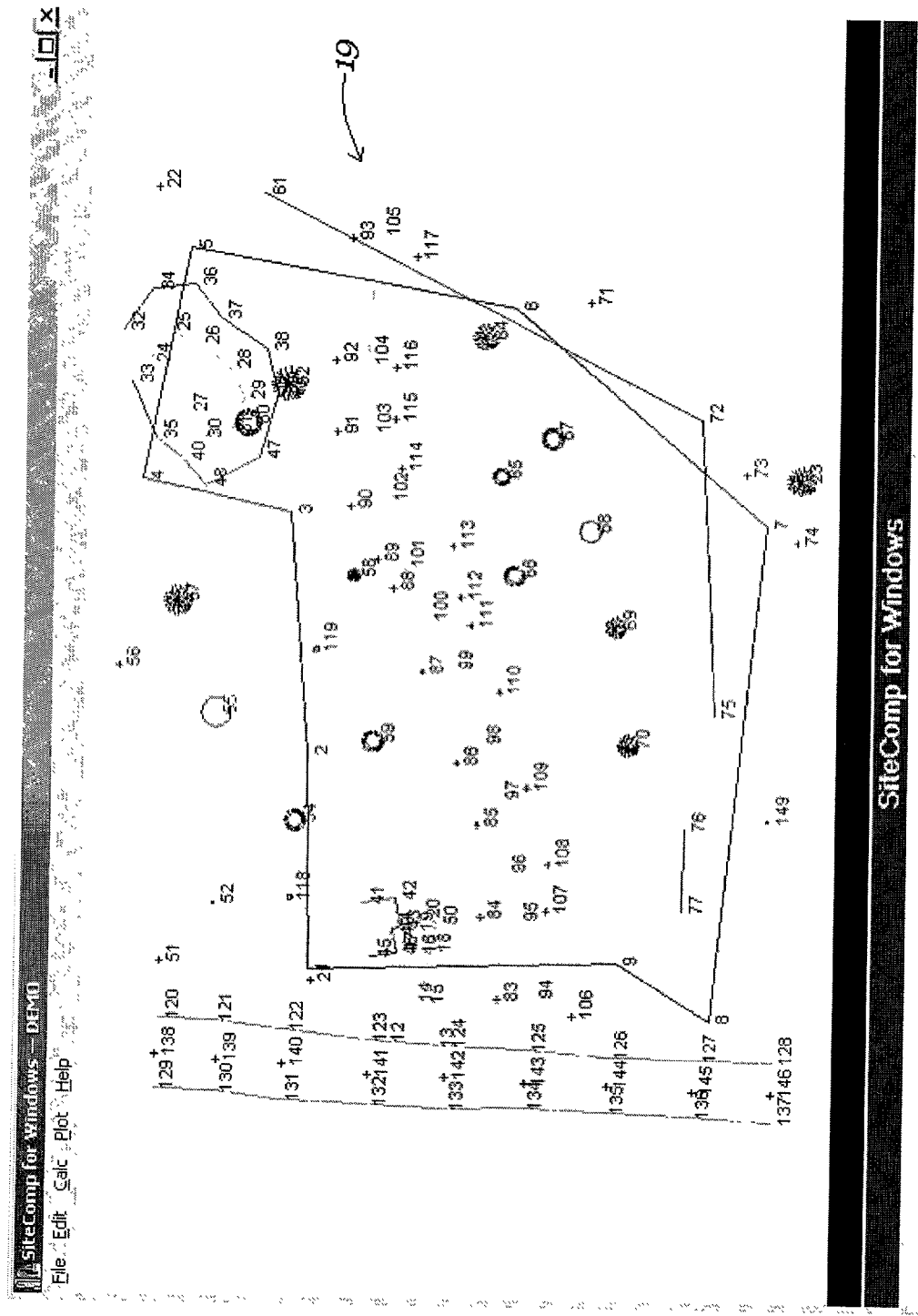
FIG. 10 shows the resultant screen of the plot for design.

"Plot for Design" may be selected under the "Plot" pull-down 18 in FIG. 9, and then select "CommitSet 1" under the "Plot" pull-down 18. The resultant screen 19 is shown in FIG. 10. The "CommitSet 1" selection" sets actual coordinates accurate to 32 significant digits. One may select "Return to Main Menu" under the "File" pull-down. This note reduction and editing are a very important part of CDIS.

Figure 11:
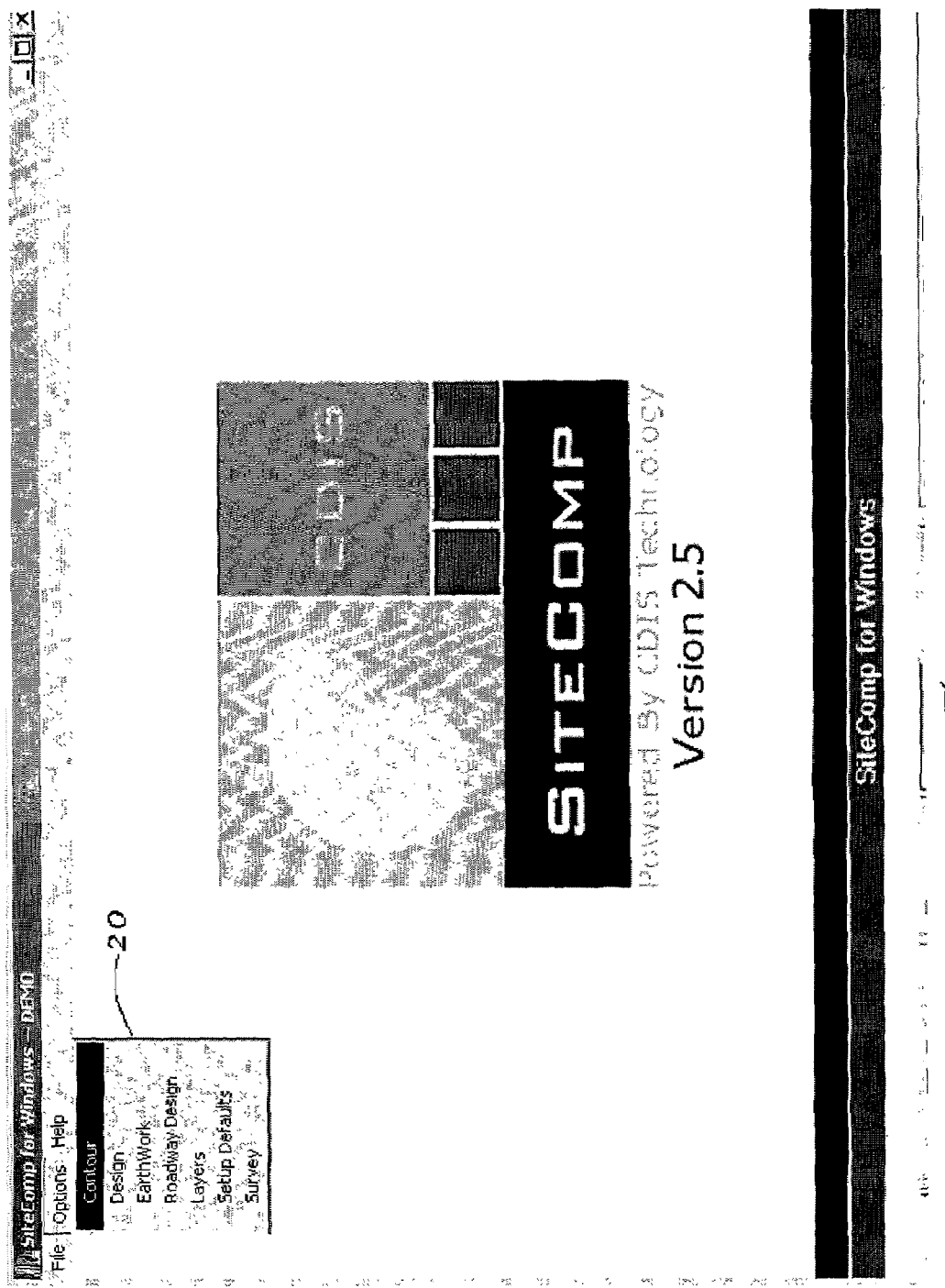
FIG. 11 indicates the step to go to the contour mode.
Figure 12:
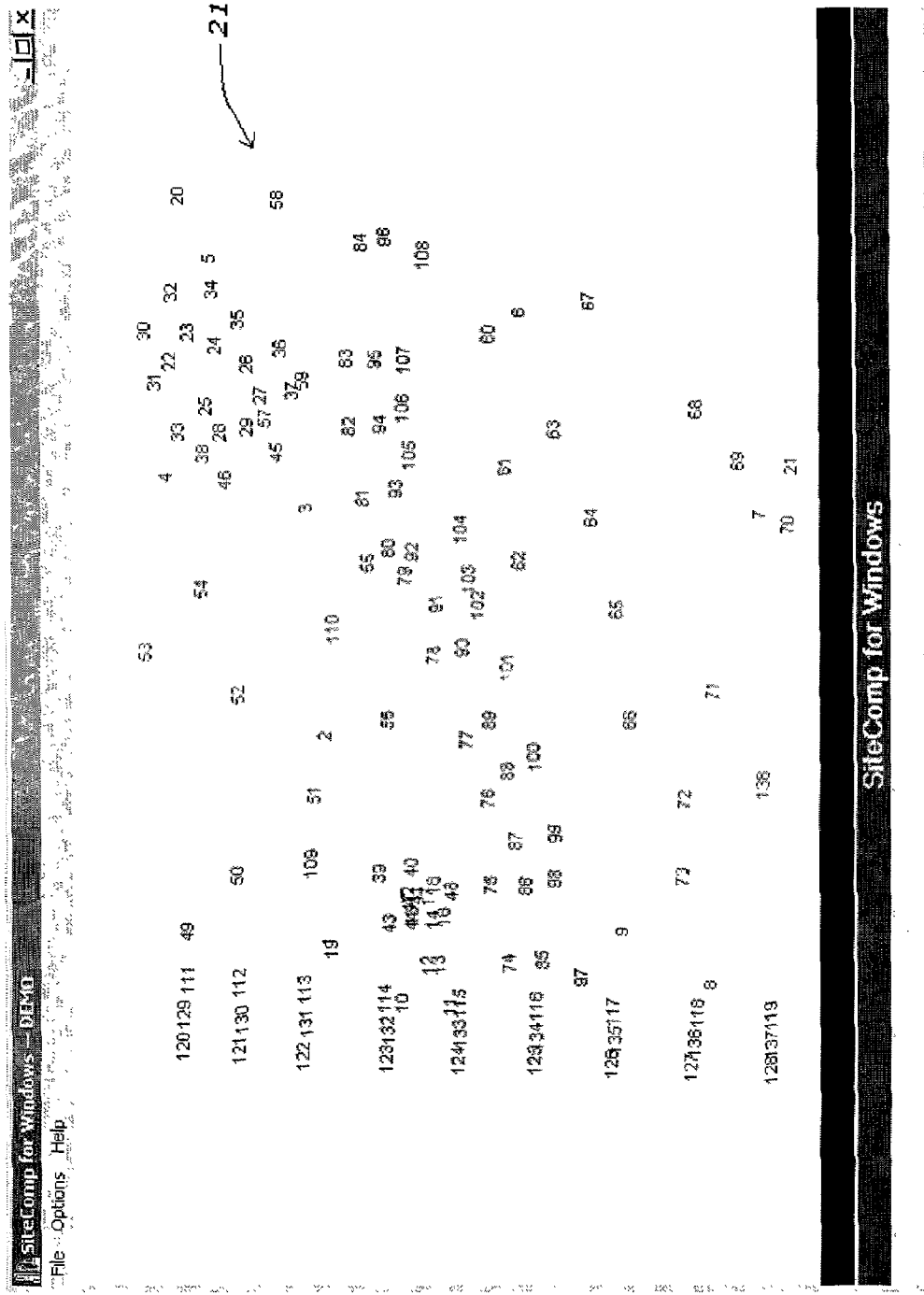
FIG. 12 shows a labeled point screen.
Figure 13:
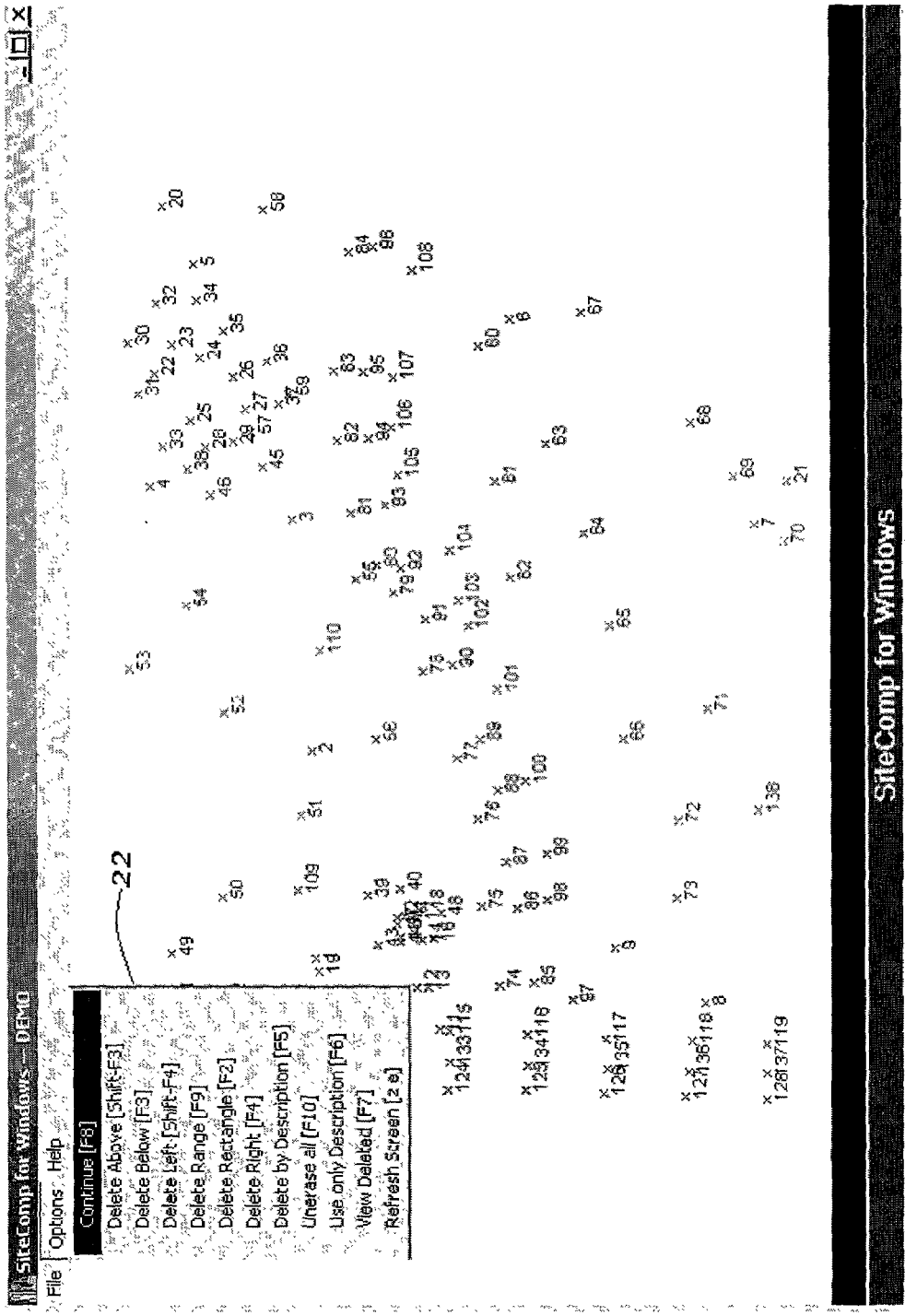
FIG. 13 indicates the step to get the straight line connections to the labeled points.
Figure 14:
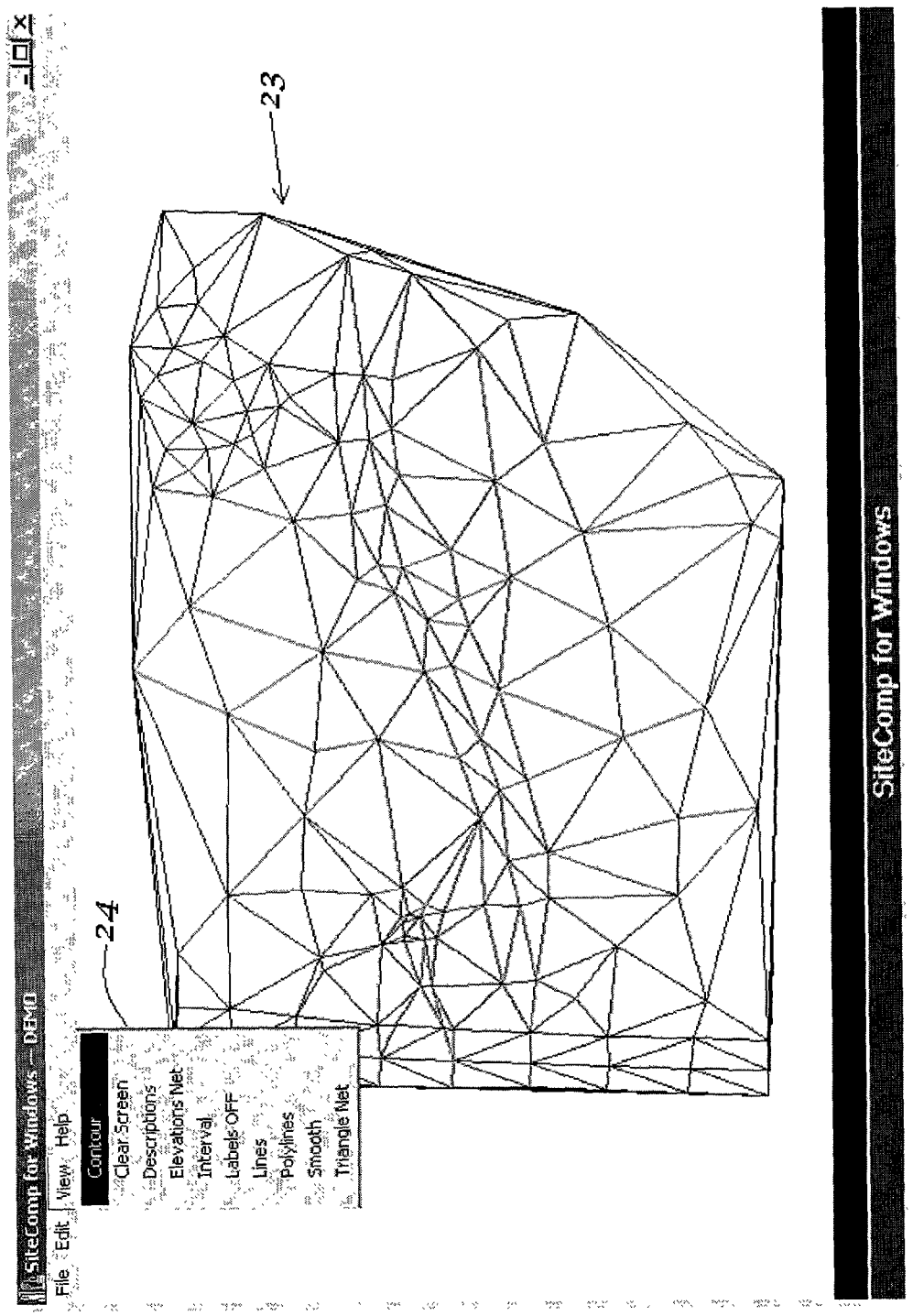
FIG. 14 indicates the step for executing the contours to the diagram in FIG. 13.
Figure 15:
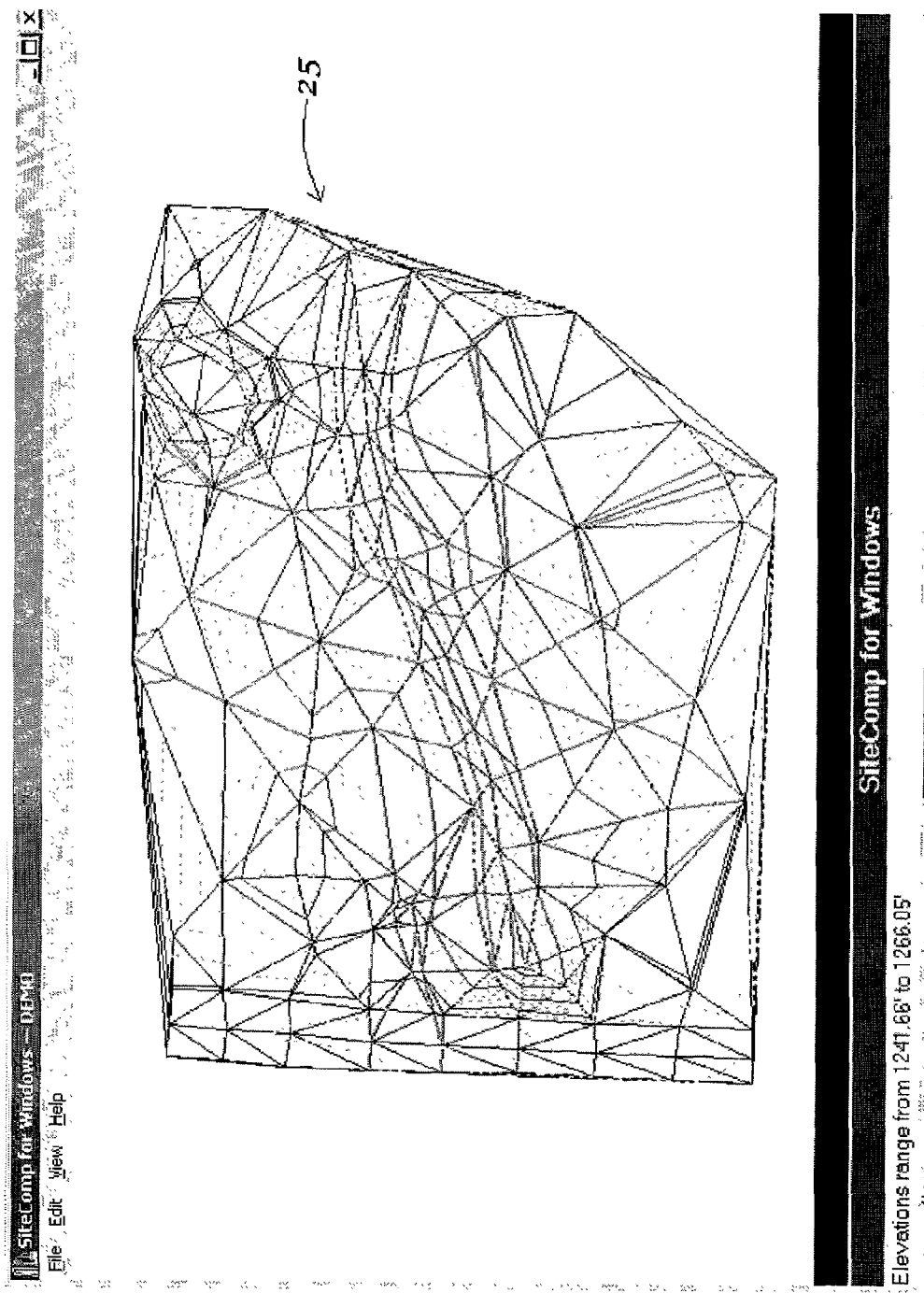
FIG. 15 shows the contour lines of the elevations of a plan layout.

Now one may do the contouring of the field data. In CDIS, land surfacing is internal; it's not a "module". This feature may eliminate complex transfers of files between packages and assures one that there 100 percent compatibility within the package. The drawing (map) surface text parcels and other information are contained in one file. Back at the main menu, select "Contour" under the "Options" pull-down 20 in FIG. 11 and one may get the labeled point screen 21 in FIG. 12. The one may select "Continue[F8]" under the "Options" pull-down 22 in FIG. 13 and get the points connected with lines 23 in FIG. 14. In the latter Figure, one may select "Contour" under the "View" pull-down 24 and one may get the contour 25 on the screen shown in FIG. 15. So far, one has worked with survey notes to reduce and calculate three-dimensional coordinates and create a land surface. CDIS may allow one to go back into the surface generation function to make changes. Note that one may be in the same program thereby not having to load and unload "modules". At this time, one has not created a single "point" other than the ones shot by the survey crew.

Figure 16:
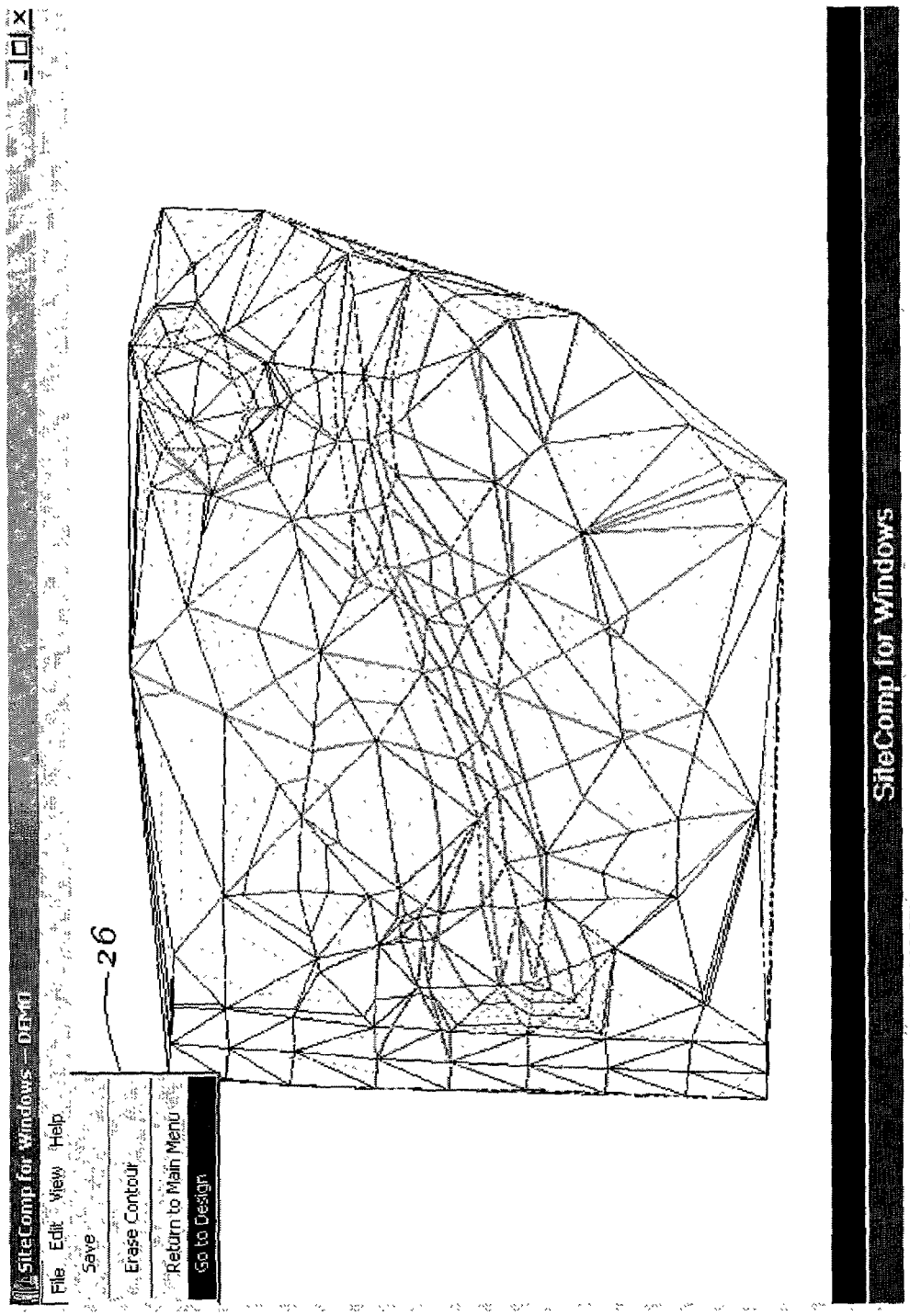
FIG. 16 indicates the step to the design function for the layout.
Figure 17:
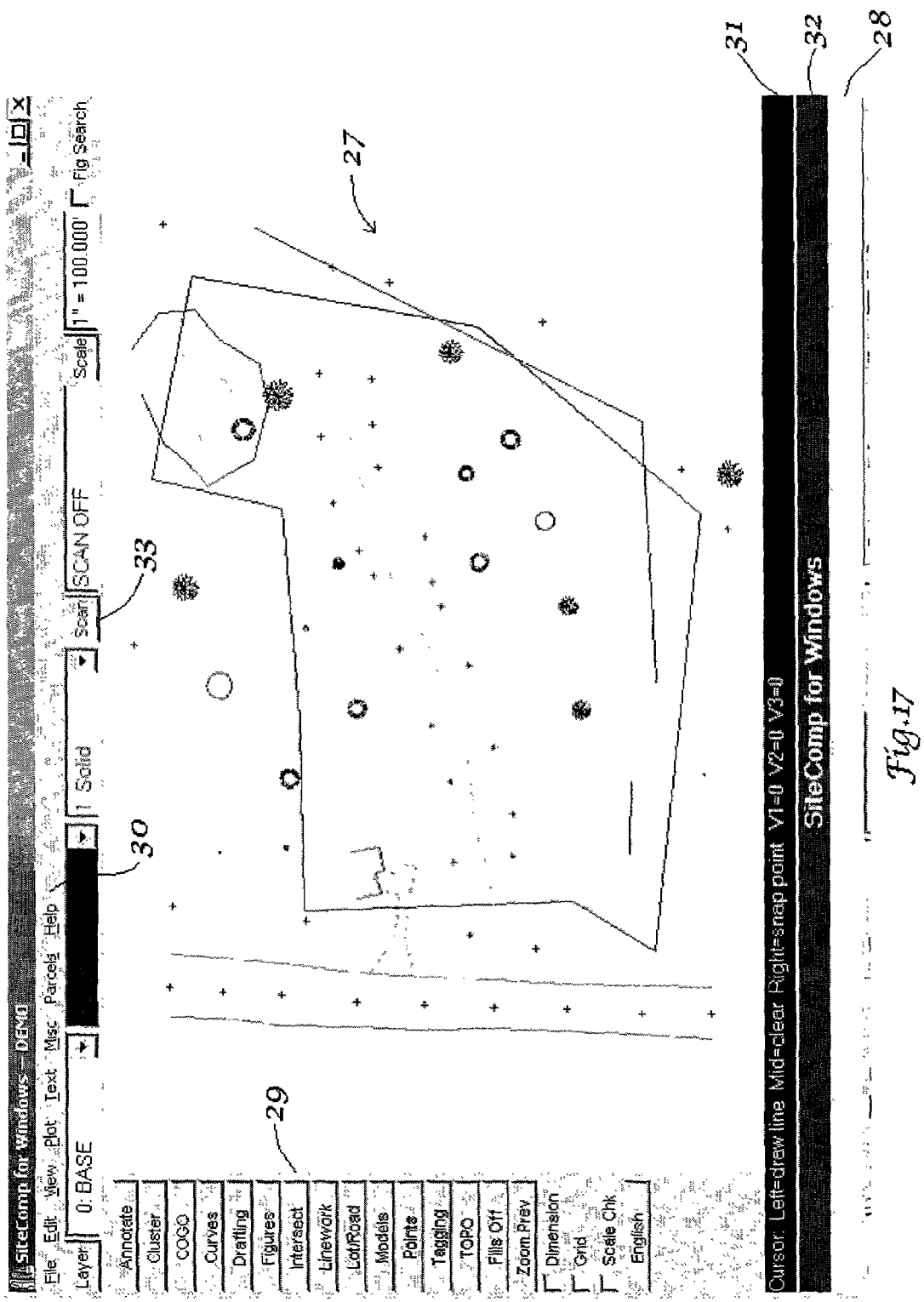
FIG. 17 shows a drawing derived from survey notes.

Survey boundary work may be reviewed. One may select "Go to Design" under the file pull-down 26 in FIG. 16. The result may be the drawing 27 as it exists from the survey notes. The drawing 27 is shown in FIG. 17. The contour surface is in a memory. One need not set the scale factor systems, window limits or other factors. The output area is at the bottom bar line. This is the output line. The side 29 and top 30 "menus" are a selection of design and drafting options. The "graphic area" is at the center of the screen. The mouse functions are listed in the first bar line 31 just below the graphic area of FIG. 17. In this prompt or "cursor" line 31 there are three positions labeled V1, V2 and V3. These are memories that may allow one to snap to points for calculations. The bar line between prompt line and the output line is an input line 32.

One may click with a mouse on the "SCAN" button 33 of the screen shown in FIG. 17. The prompt line will ask what objects that one would like to scan for. The input line may become a white blank one can then type in "Rod" and then press "Enter" on one's keyboard. Hold down the "Shift" key and press "V". Now that one has assigned "Rod" as what to scan for, and one will just see the display point numbers (i.e., 2, 8, 22, 56, 71 and 74) for only rods, as shown on the screen in FIG. 18. CDIS takes out the painstaking task of remembering point numbers, or referencing to a point list to figure out which coordinates one is dealing with. Here one can deal with the actual object. If one overlaid the descriptions of the points without the Scan on, then the screen would appear too cluttered.

Figure 18:
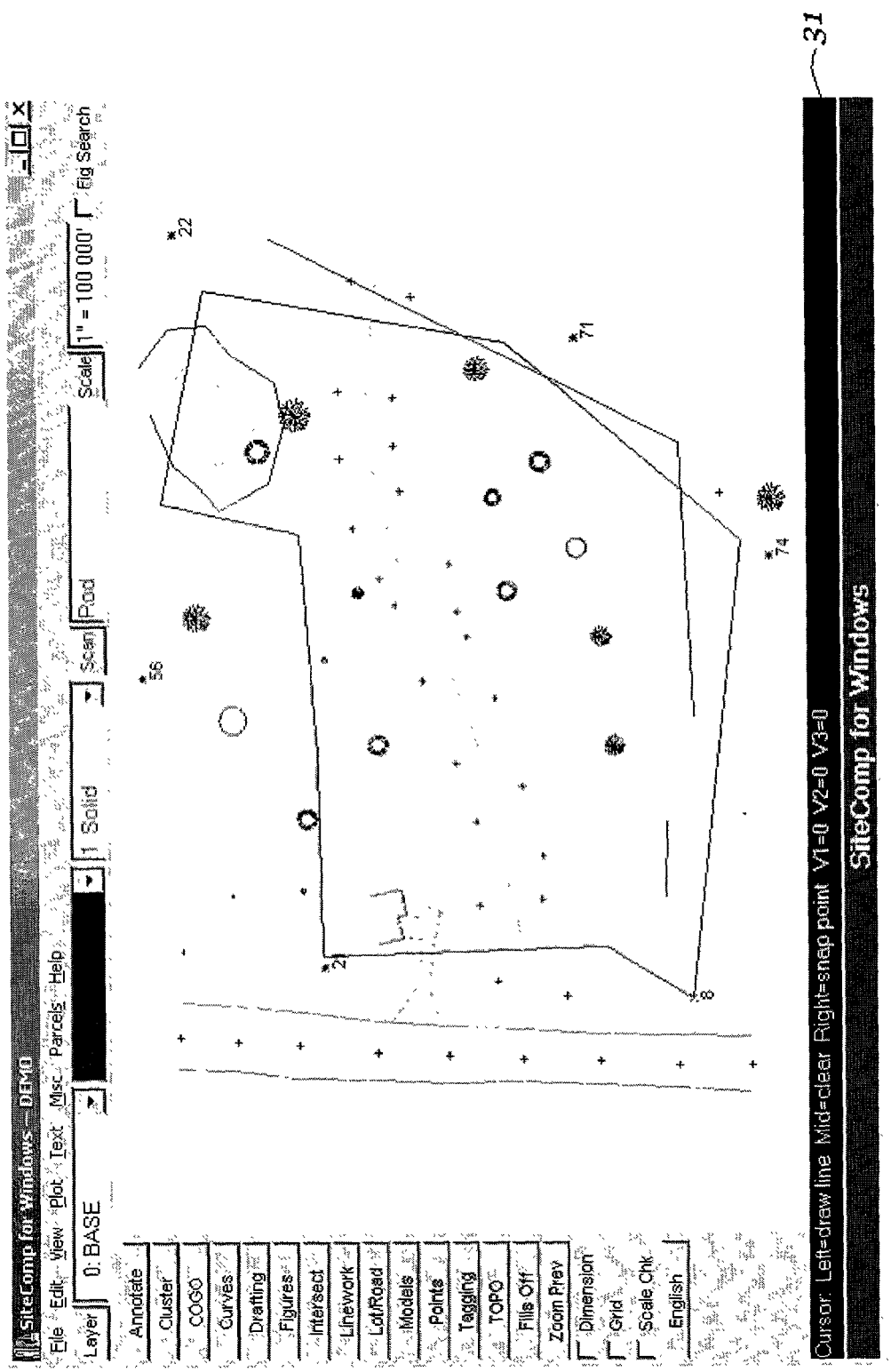
FIG. 18 shows the assigned numbers of the points where the rods of a plot are.
Figure 19:
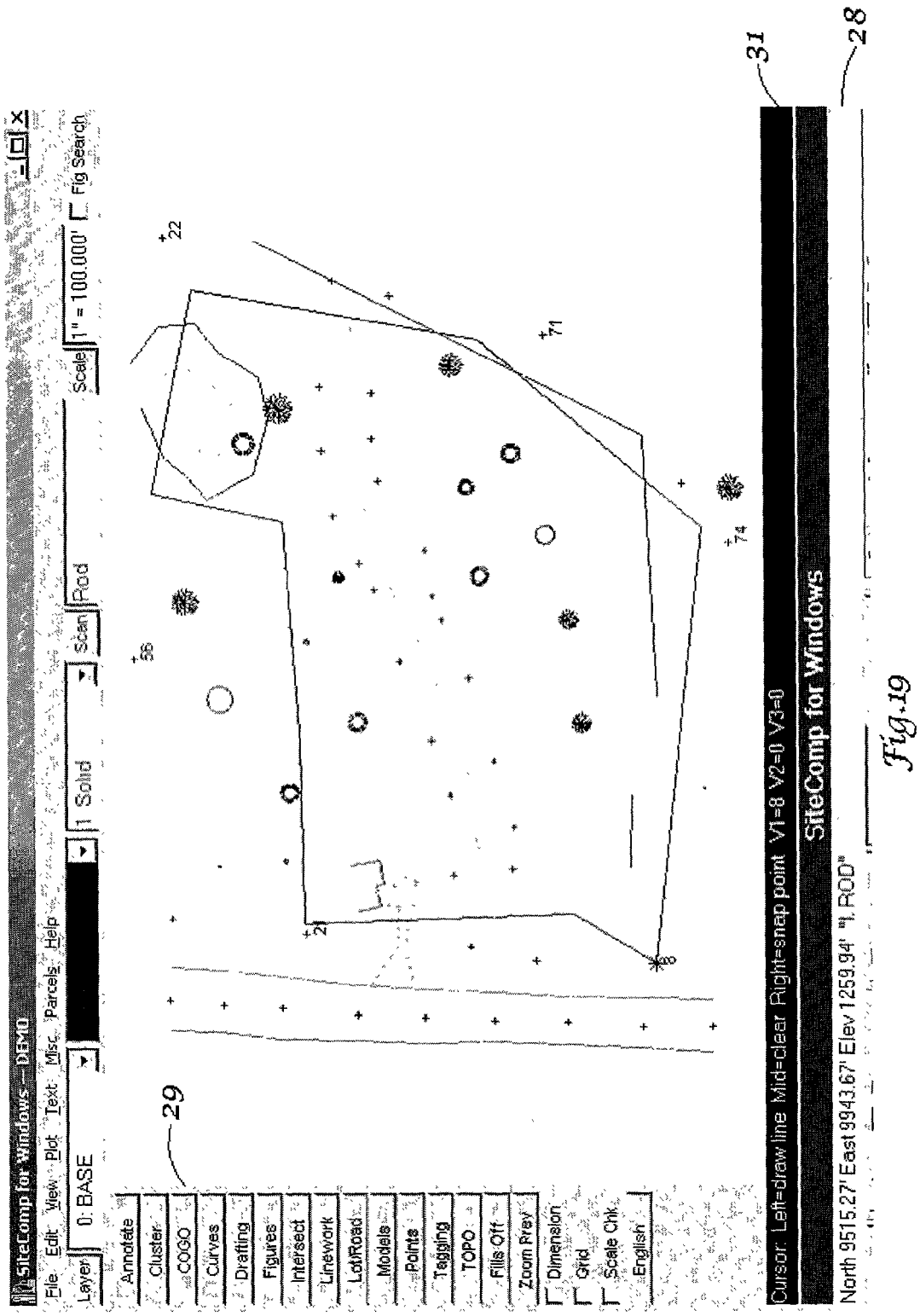
FIG. 19 reveals point 8 attributes in the bottom line.

The cursor line 31 at the bottom of the screen may indicate points that are occupied in the V memory since points that are used for calculations are placed in the V memory. So before continuing, it is a good idea to be sure that no points are occupied. To clear these points, one may click the mouse's middle button, if there is one, or press "Ctrl" and the mouse's left button. Then the cursor line 31 may show, "V1=0 V2=0 V3=0", as shown in FIG. 18. One may move the mouse into the lower left part of the graphics area close to the point number 8 and snap to the point by pressing the mouse's right button. Since SCAN is for a "Rod", that is the only point that one will snap to. Because of this, one does not have to be exactly on point. A star-like symbol 34 appears at that point and the cursor line 31 shows "V1=8 V2=0 V3=0" indicating that point 8 is the first point in memory. The output line 28 at the bottom of the screen in FIG. 19 may reveal the point 8 attributes as North 9515.27' East 9943.67' Elev 1259.94' "I.ROD". These numbers are feet of northing and easting relative to a reference, and of elevation relative to sea level. The reference may be one of the plain coordinate system used in the jurisdiction (state, county, country) of where the site may be or thought to be located.

Figure 20:
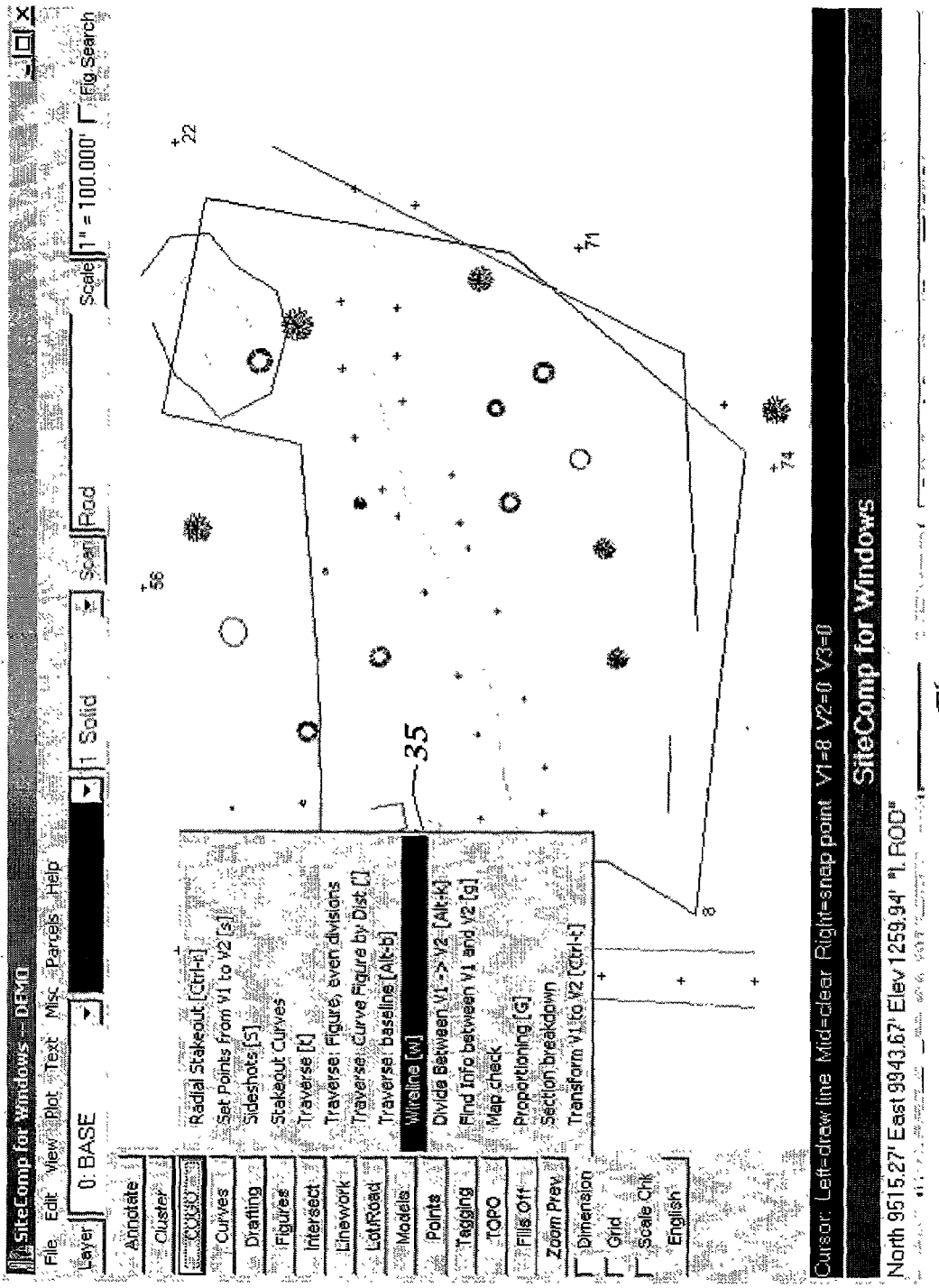
FIG. 20 indicates the step to creating property lines from one physical object to another.
Figure 21:
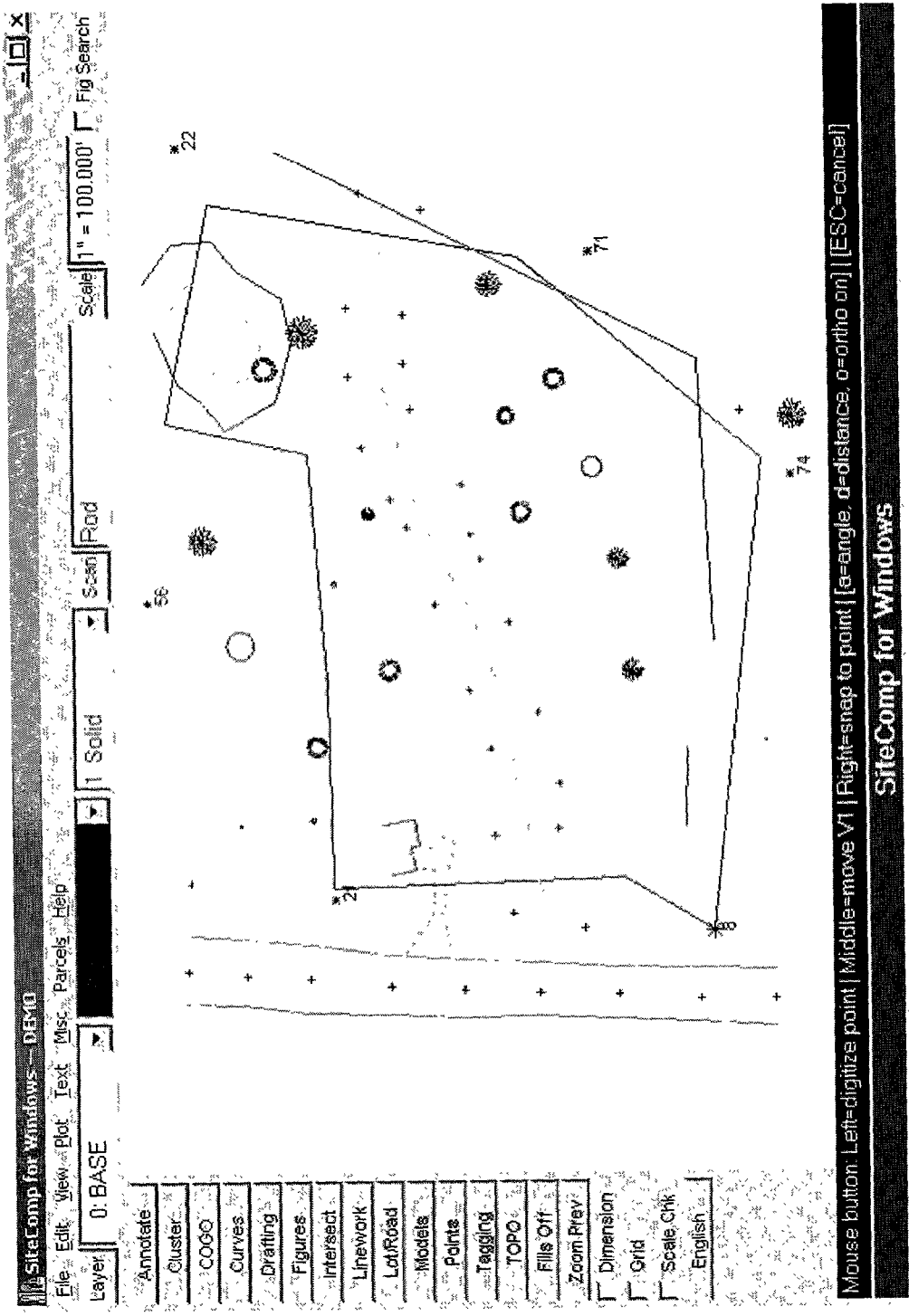
FIG. 21 shows point 8 as ready for snapping a line from point 8 to point 21.
Figure 22:
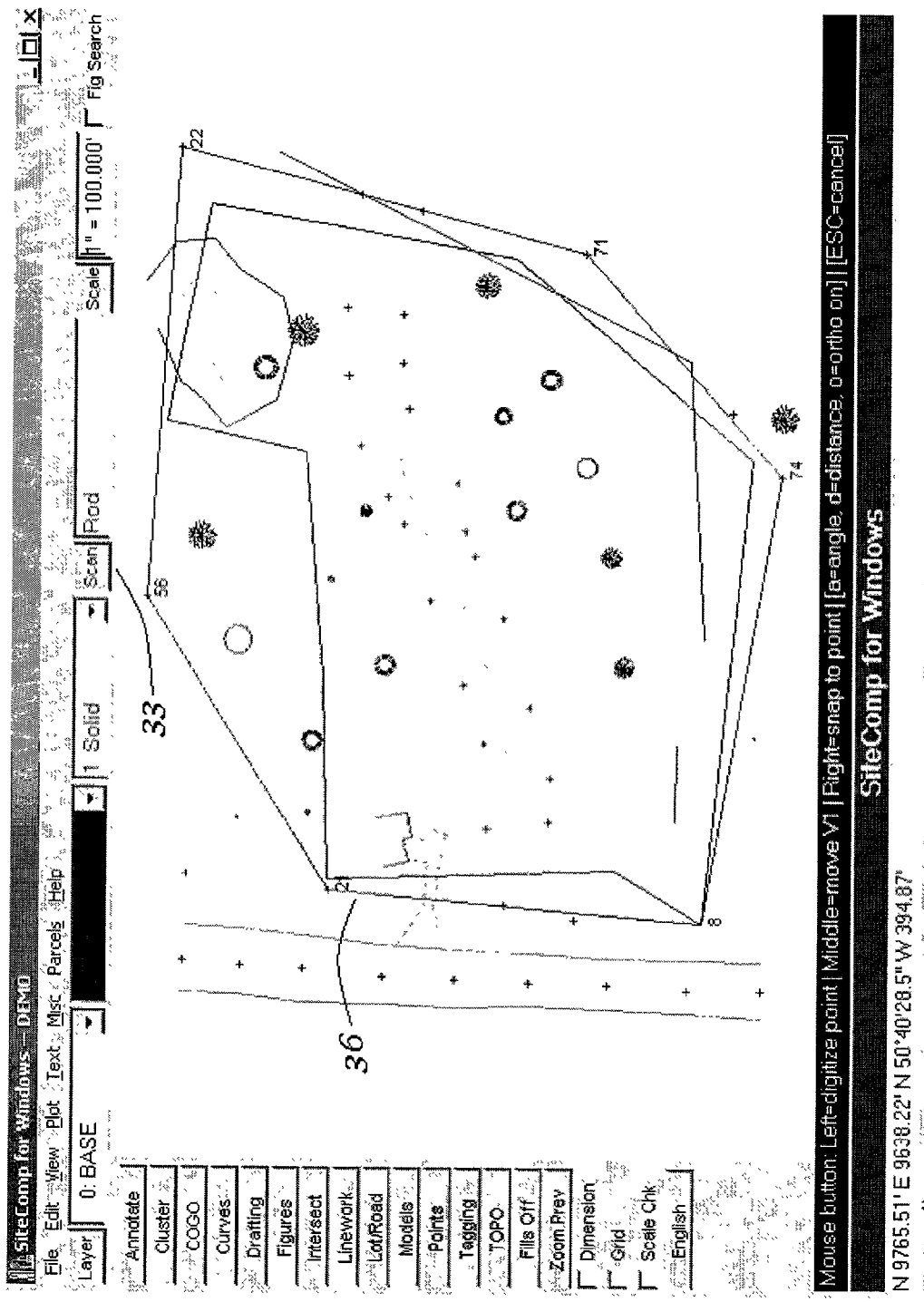
FIG. 22 shows the property lines from rod to rod around an enclosure.

One may create property lines to physical objects such as the iron rods. One may move the mouse into the "side menu" 29, click on "COGO" and then click on "Wireline" 35 as in FIG. 20. FIG. 21 shows point 8 is ready for snapping a line to from point 8 to point 21. Next, one may hold the mouse's right button and move the mouse near the upper left corner point 21, and then release the right button. This is snapping to point 21. A property line 36 connects point 8 to 21. One may also snap to points 56, 22, 71, 74 and back to point 8, and thus lines connect the preceding snapped to line to the next one as shown in FIG. 22. Sine "Wireline" is a repeating command, one might want to press "Esc" when finished snapping to all of the points of the rods. Further, since scanning is finished, one may turn Scan off.

In the previous paragraph, the first step in doing coordinate geometry in the CDIS manner was described. Property lines were created connecting physical objects (i.e., iron rods) without the need to manually snap or enter point numbers. The first "LINE" figures were just created here. In CDIS, figures are drawing instructions that are defined by coordinate points. In "entities" of some related-art systems, like CAD, there is no coordinate geometry. Unlike such systems, all line work is based on one point location. One can snap to a "figure" and that line or arc knows the point "numbers" that create it. One can perform coordinate geometry using the "figures" because "the drawing is the geometry." In the related-art packages such as CAD, require the "point numbers and description" to be a separate database than the actual drawing. Because this, these related-art packages cannot do coordinate geometry and drafting with the same step. The CDIS approach may reduce drafting efforts significantly.

Figure 23:
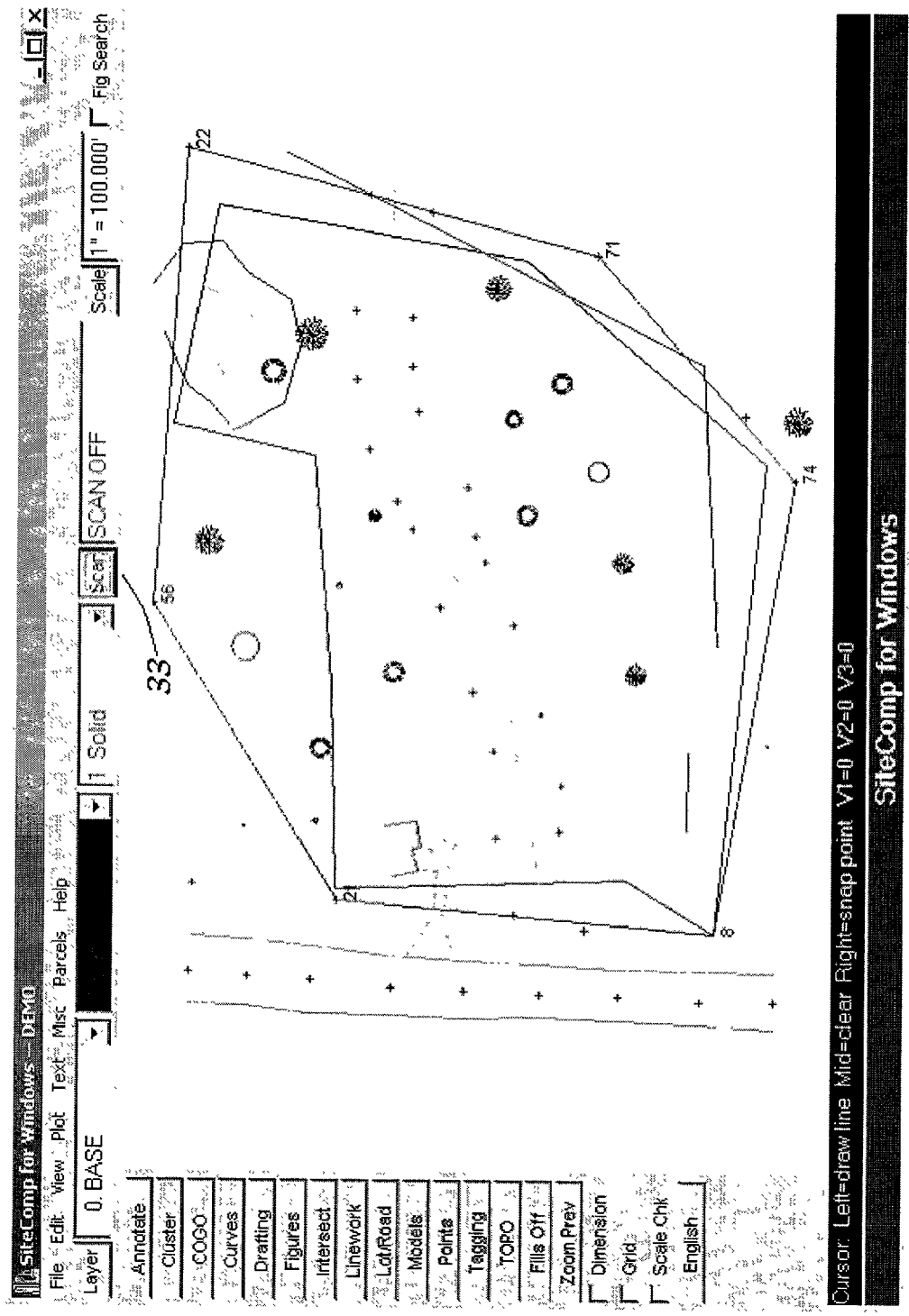
FIG. 23 has the "Scan" turned off from "Rod"
Figure 24:
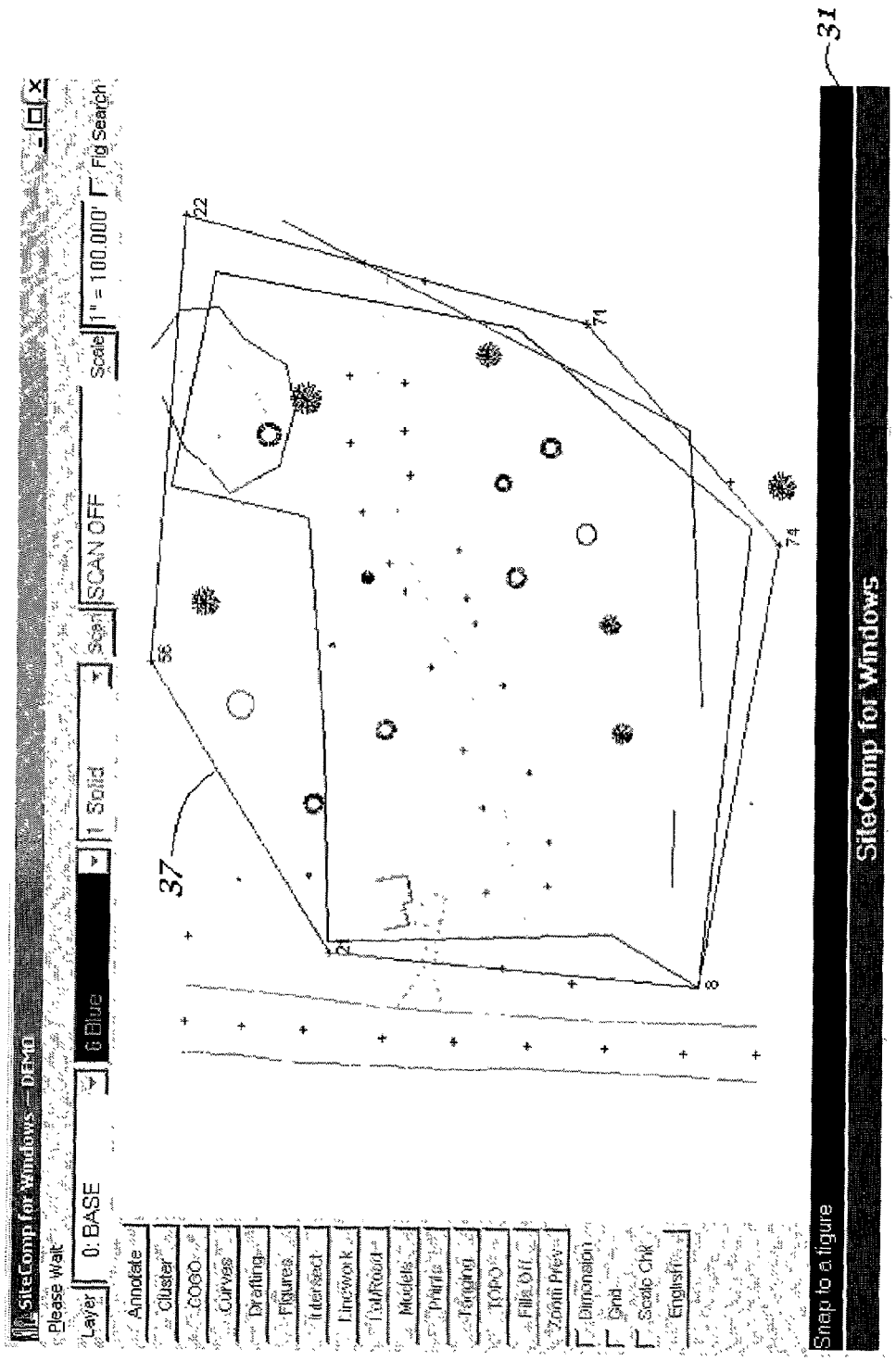
FIG. 24 indicates that one may snap to a figure, in the top bottom line.
Figure 25:
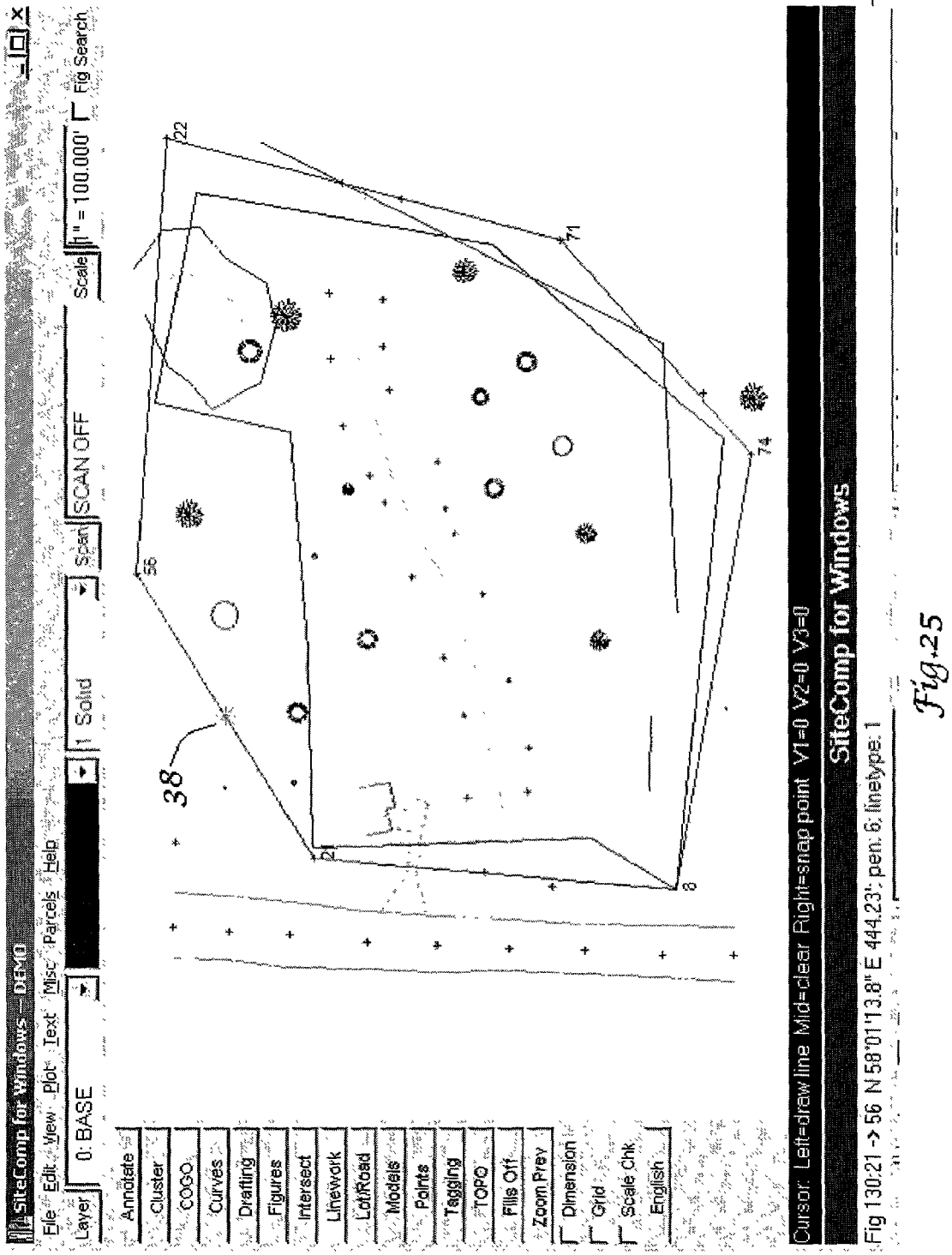

Now the user may create a survey's area by creating a parcel. With a display of FIG. 23, "f" on the keyboard may be pressed which results in information in the cursor line 31 saying, "Snap to a figure," as indicated in FIG. 24. To do so, one may place the mouse in the middle of one of the lines created between the iron rods, and press the mouse's left button to snap to that line. It may be important get as close to middle as possible. "Middle" means directly between the two end points that are used to create the line. The line 37 between points 21 and 56 was snapped and star-like mark 38 appeared in the middle of the line, as shown in FIG. 25. CDIS may eliminate the step it takes to "list" entities or nodes in related-art systems to determine the information related to points and figures. The output line 28 at the bottom of the screen may display the specifics of the figure that was just snapped, including the points used to draw the figure, and the layer, color and the linetype information for the figure, as shown in FIG. 25. In the present case, one snapped to a "line" figure which displayed the bearing and distance along the points at the end of the line. If it were a curve, the radius, delta, arc length, tangent and chord length would have been displayed.

Figure 26:
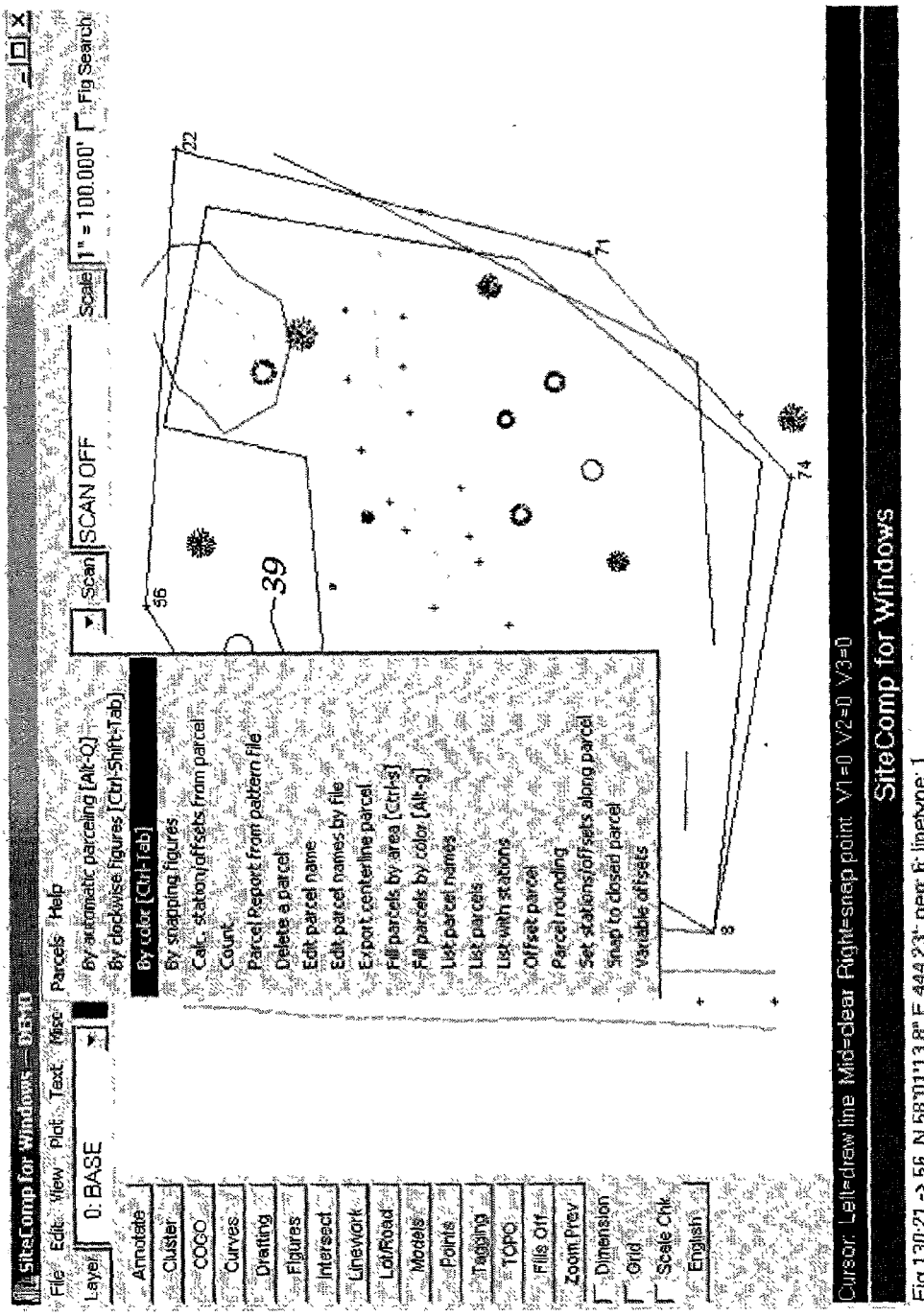
FIG. 26 shows the step to a parcel by color.
Figure 27:
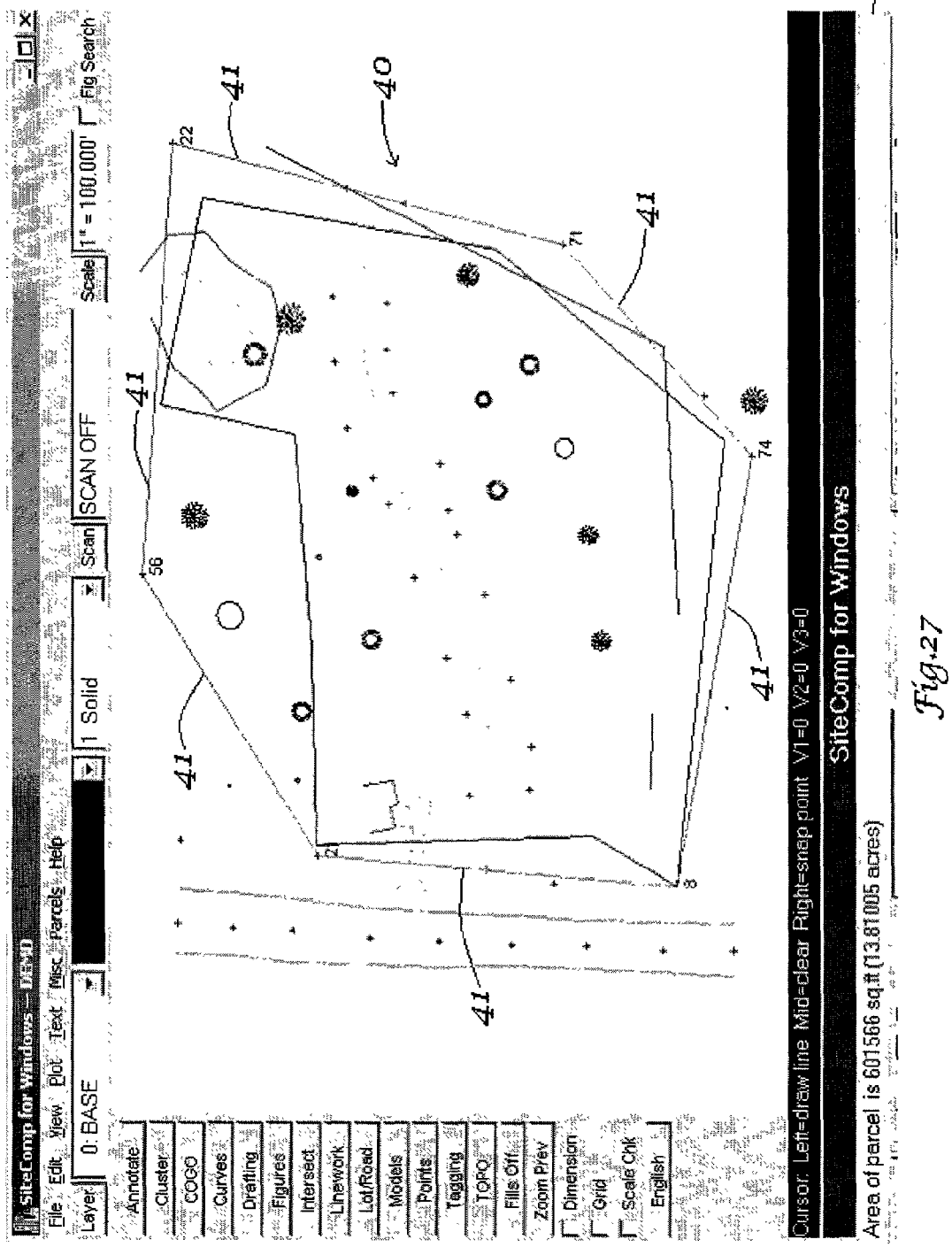
FIG. 27 indicates the area of the parcel in the bottom line.

One may move the mouse into the "top menu" and click on "Parcels" and then on "By color [Ctrl-Tab]" of pull-down 39 as in FIG. 26. A prompt may ask one for the name of the parcel to be created. The cursor line says, "Enter name for parcel or alignment". In the input line one may type "Site" and press "Enter". Just after pressing "Enter", the screen 40 is like that in FIG. 27, where the output line 28 states, "Area of parcel is 601566 sq.ft (13.81005 acres)". The lines 41 connecting the points are the outer boundary of the tract or parcel. Now one has created a unique "parcel" that may be used for geometry and GIS applications. CDIDS will not allow one to repeat these unique parcel names. Parcels that do not close are "alignments". Many related-art systems require one to create a "poly-line" around objects in space to determine areas. CDIS removes those steps and allows one to determine and list crucial areas easily, quickly and accurately.

Figure 28:
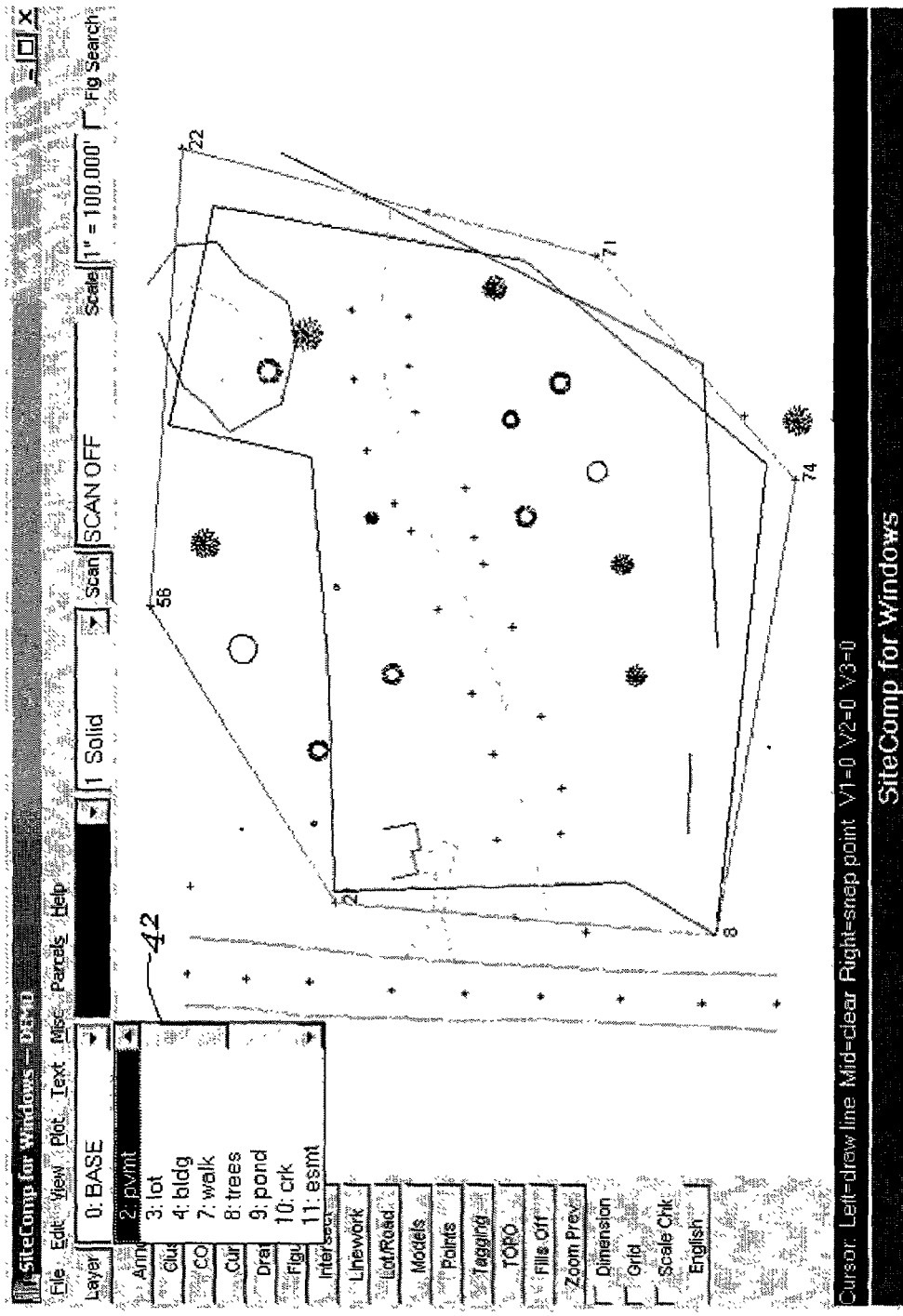
FIG. 28 indicates the layer selection menu.
Figure 29:
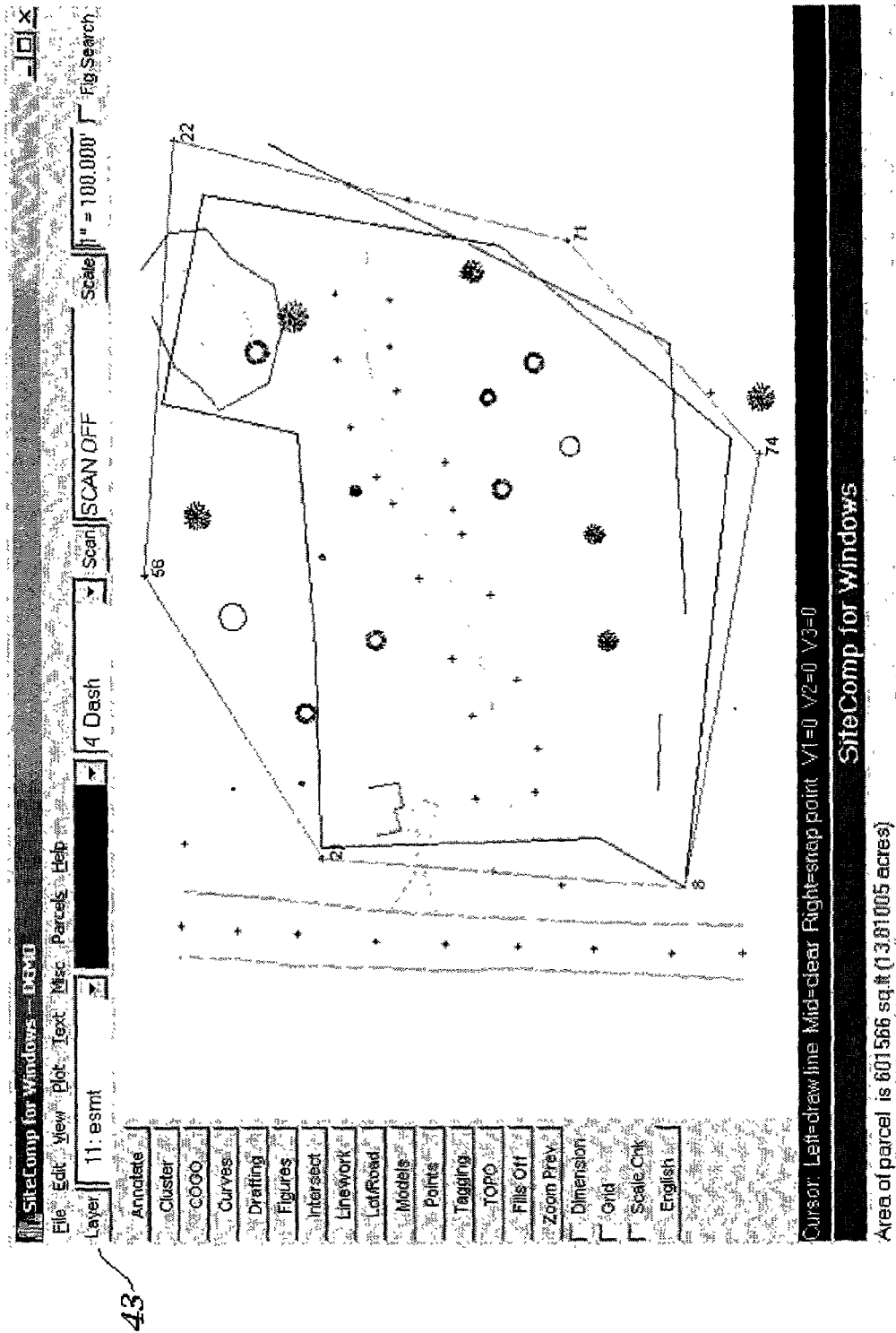
FIG. 29 shows the layer selection as by easement.

One may create a setback easement within the boundary. First, one may place the mouse in the first box to the right of the layer button, and then press the left mouse button to display a list 42 of available layers, as shown in FIG. 28. One may note the pen and line type in the upper information bar. Layer 11 may be selected with the mouse and the left button released. The layer 43 is now labeled "esmt", as in FIG. 29, and the pen changed to pen 1 and the line type to 4. This is similar to layers in the related art, except that with CDIS one may use layers to perform designing that would be impossible with certain related-art based packages. One may not be restricted to a "by Layer" mode in CDIS.

Figure 30:
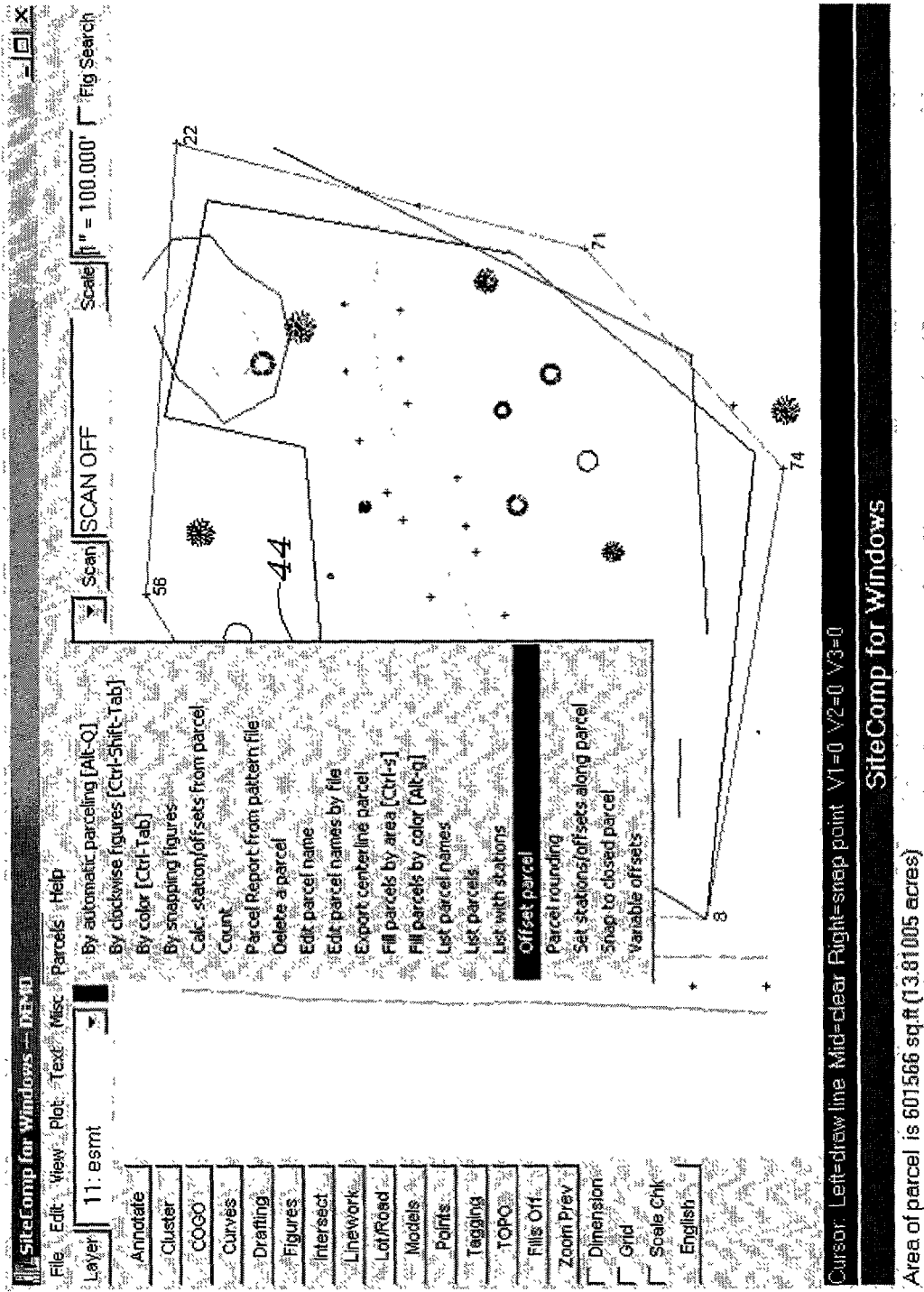
FIG. 30 shows the context of the offset parcel selection.
Figure 31:
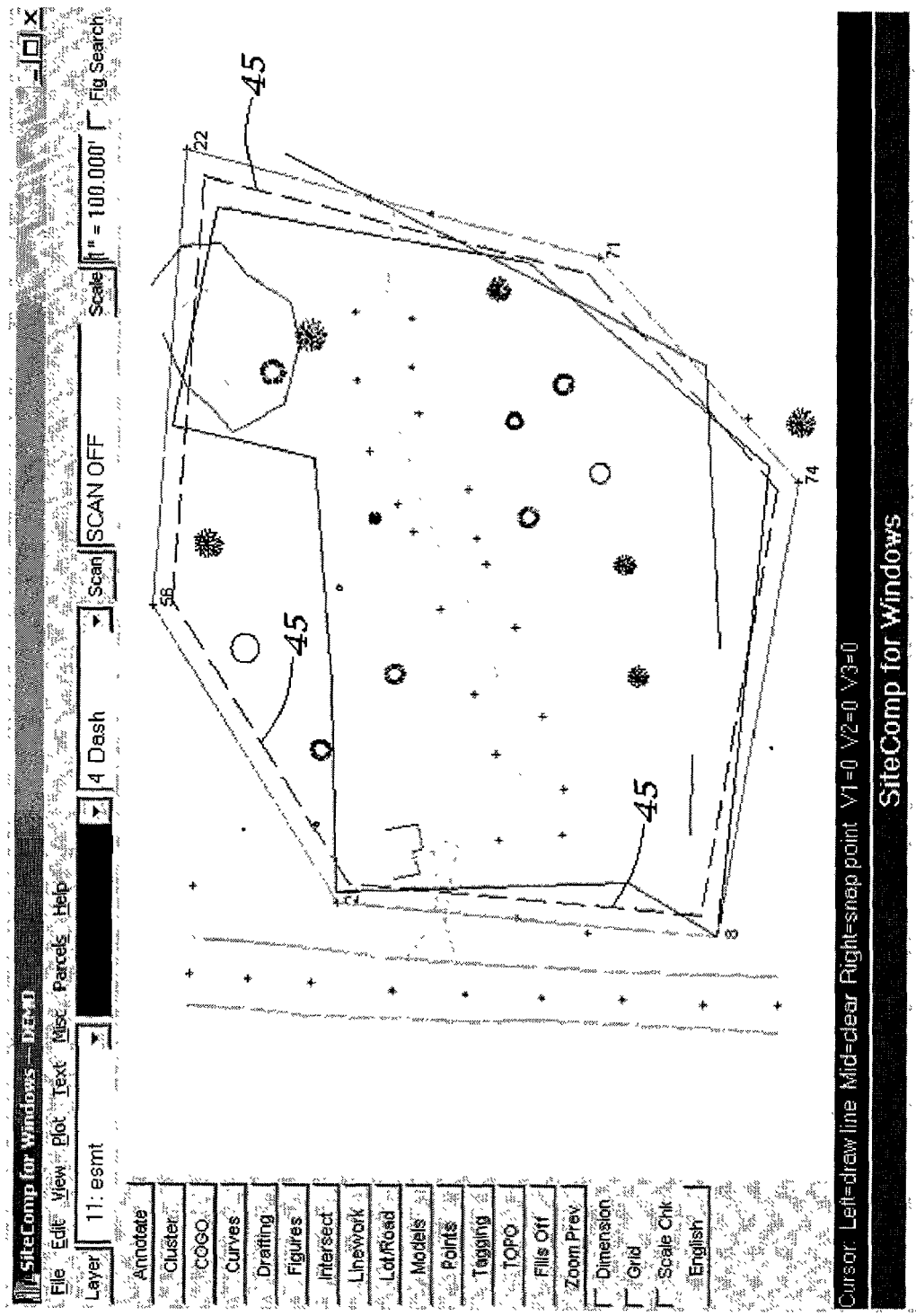
FIG. 31 shows the dashed easement line.
Figure 32:
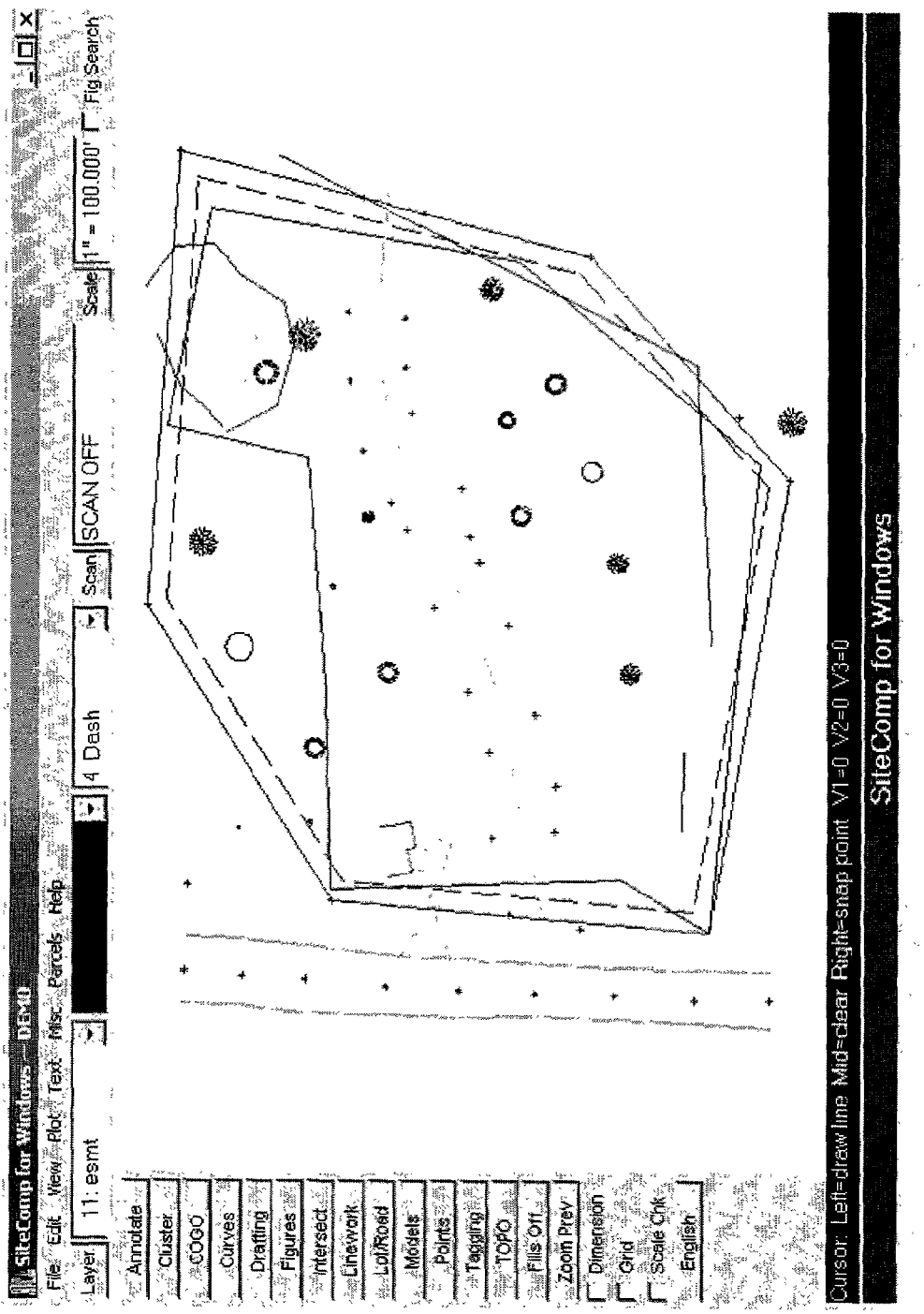
FIG. 32 shows the point numbers removed.

A 25-foot easement may be set within the parcel named "Site". The mouse may be moved into the "top menu" and then clicked on "Parcels" and "Offset Parcel", of pop-down 44 respectively, as displayed in FIG. 30. The cursor line requests, "Enter name of parcel or alignment to find". Then "Site" may be typed in the next line below and the "Enter" button pressed. A prompt may ask for an offset (i.e., "Enter OFFSET (neg if left), ELEVATION FACTOR (neg if down)") and in response, "25" may be typed in and the "Enter" button pressed. Since this is a repeating command, "Esc" may be pressed to exit this prompt. That the offset is computed may be noted. The easement line 45 is revealed on the display in FIG. 31. To refresh the display, "Shift" "Z" may be pressed, which removes the point numbers of FIG. 31 as seen eliminated in FIG. 32. CDIS may compute a dedicated point at each corner, not just linework as in some related-art package that is to be tied to a third party "data base" that is hopefully tied properly in one's drawing.

Figure 33:
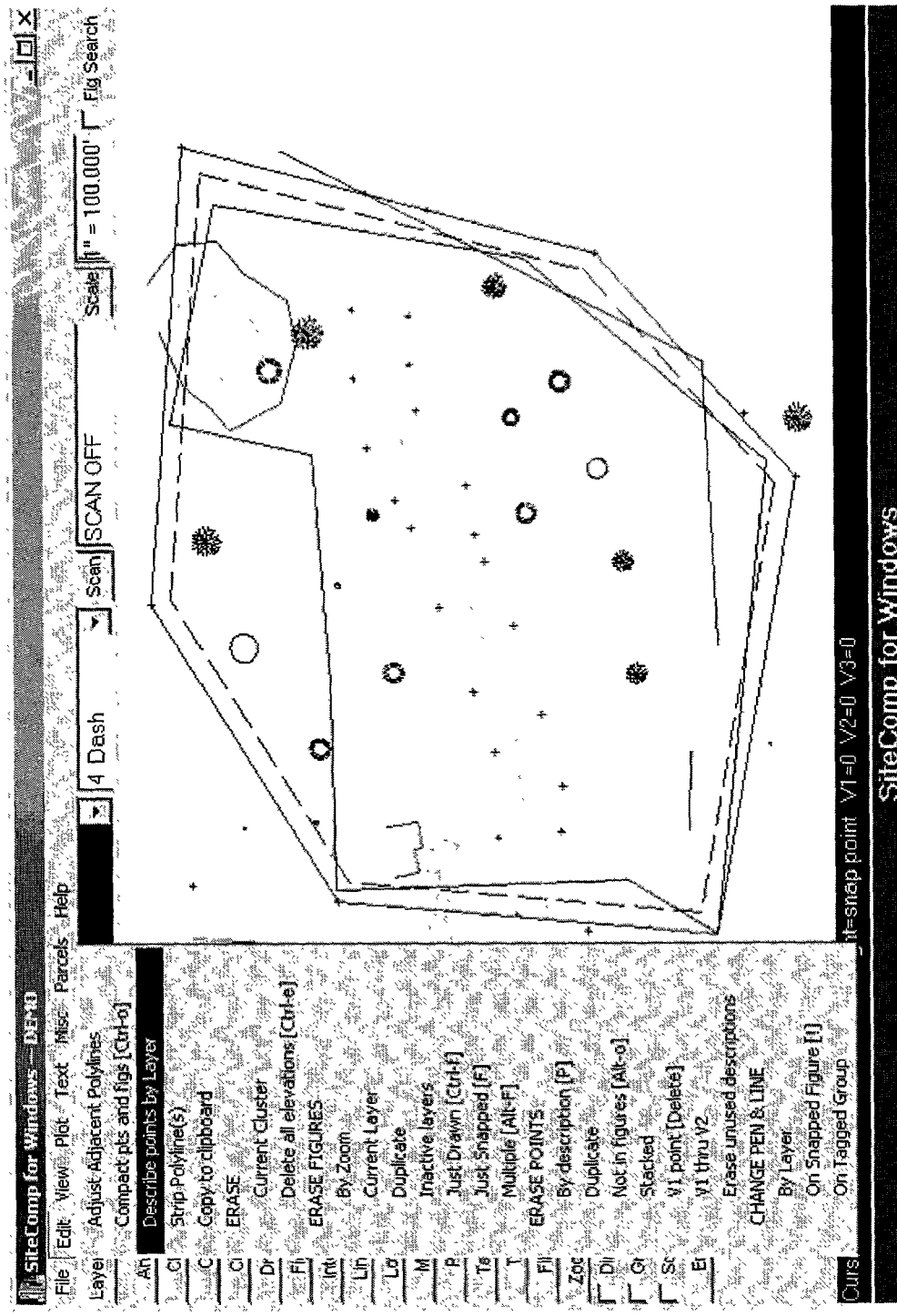
FIG. 33 shows the step to describe the points by layer.

Objects may be created from computed points. New points are created for the first time here. The previous activity has been done without adding a coordinate. The points may be made into objects. One may click on "Describe points by Layer" under "Edit" as shown in FIG. 33. A prompt in the cursor line asks, "Enter Point Description for the current layer". "easement corner" is typed in the input line and the "Enter" button is pressed. The next prompt asks, "Do you want to overwrite existing descriptions?? [Y/N]". One may type "y" or press the "yes" button to overwrite descriptions. Now all points associated with on layer 11 are described as easement corners. In some related-art packages, layers represent types of lines, lots, paving utilities and other features. CDIS takes it to the next step and allows one to name the points by layer. This allows one to download into the data collector specific points for stakeout using the SCAN feature. In some related-art packages one may have been in contouring and exited to go into the present routine. Here, the system did not ask for a file name for the contour surface because the surface is an integral part of the job.

Figure 34:
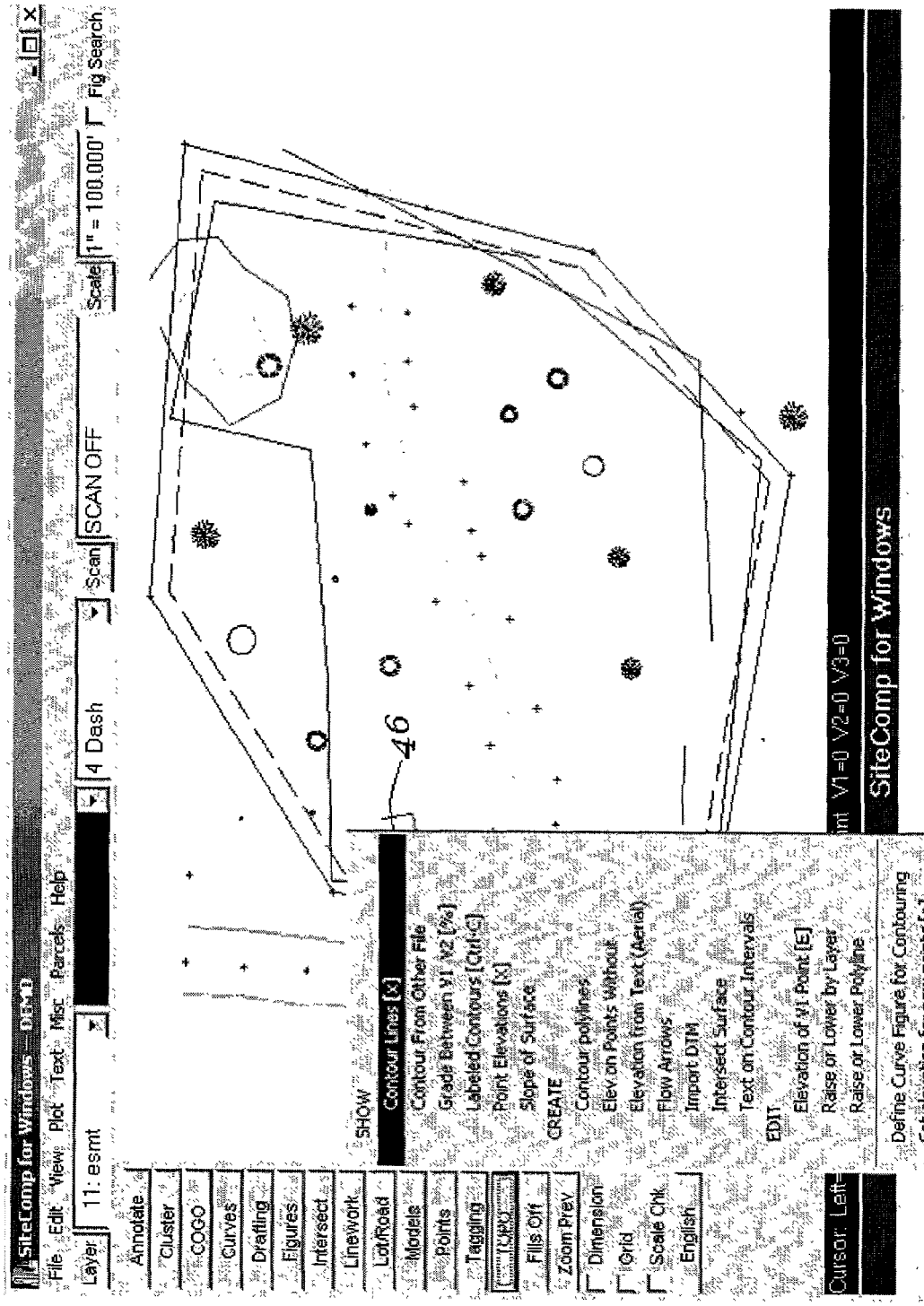
FIG. 34 indicates a step to showing a flood plain contour line.
Figure 35:
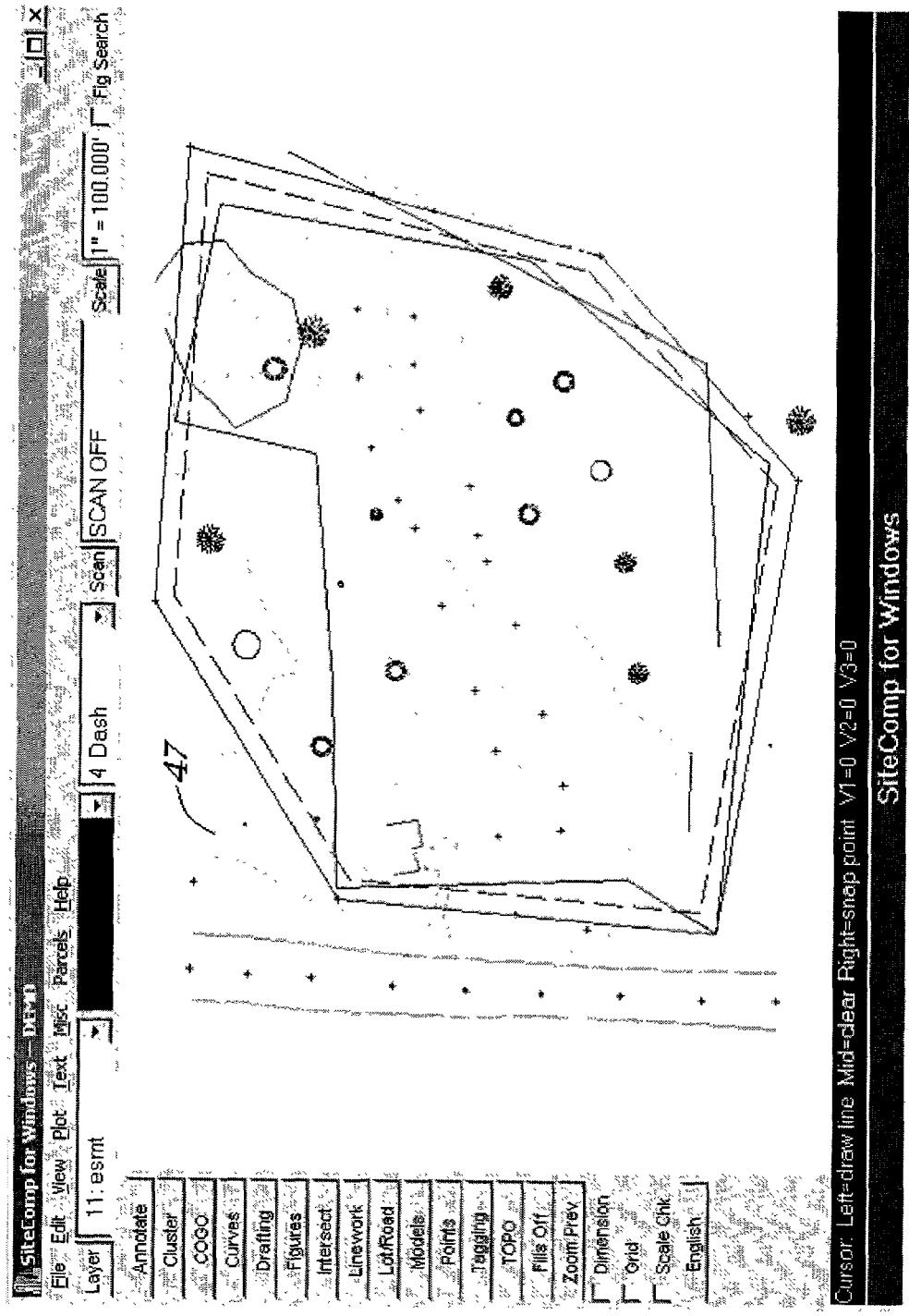
FIG. 35 shows a flood plain contour line.
Figure 36:
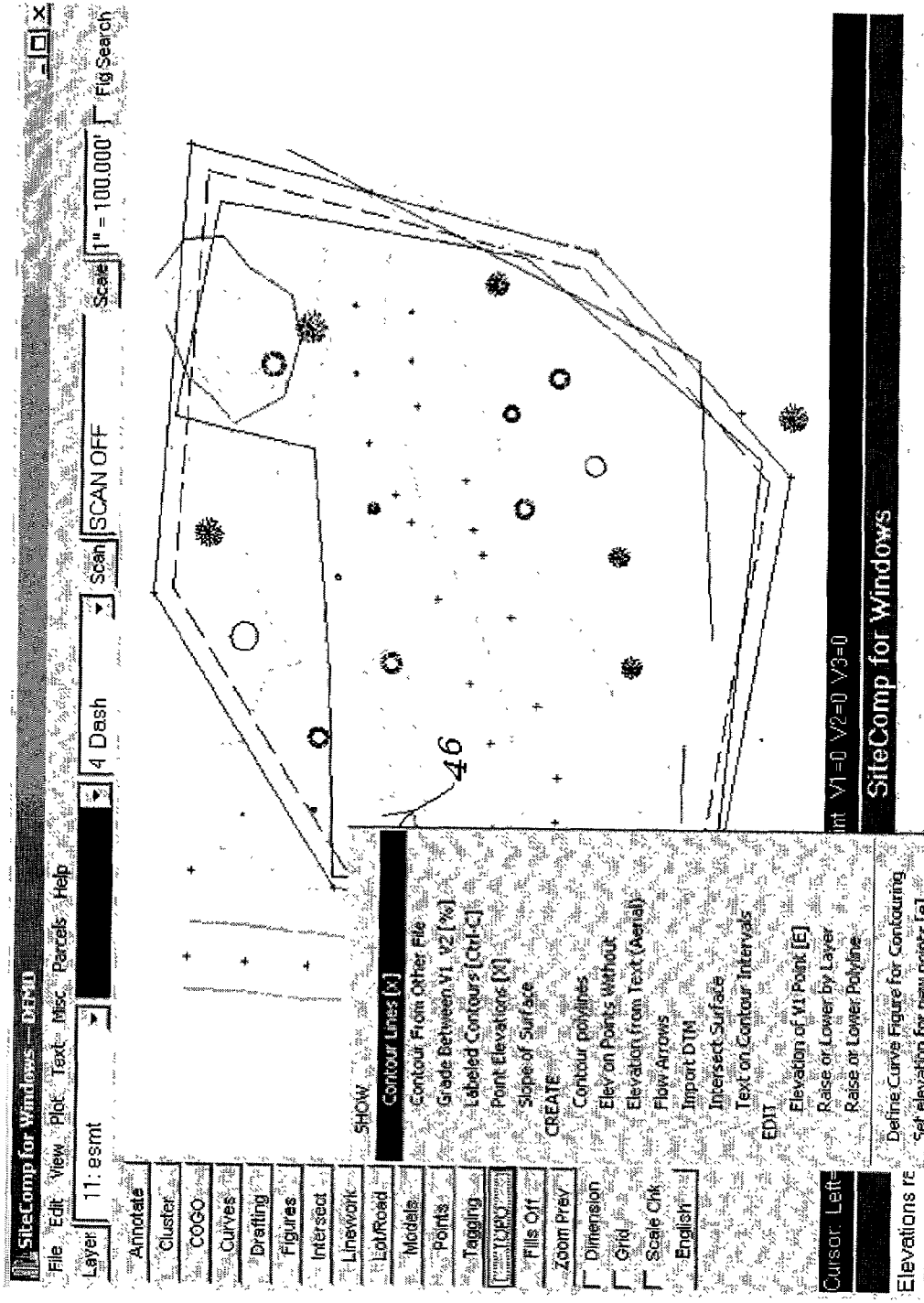
FIG. 36 shows a step to showing contour lines
Figure 37:
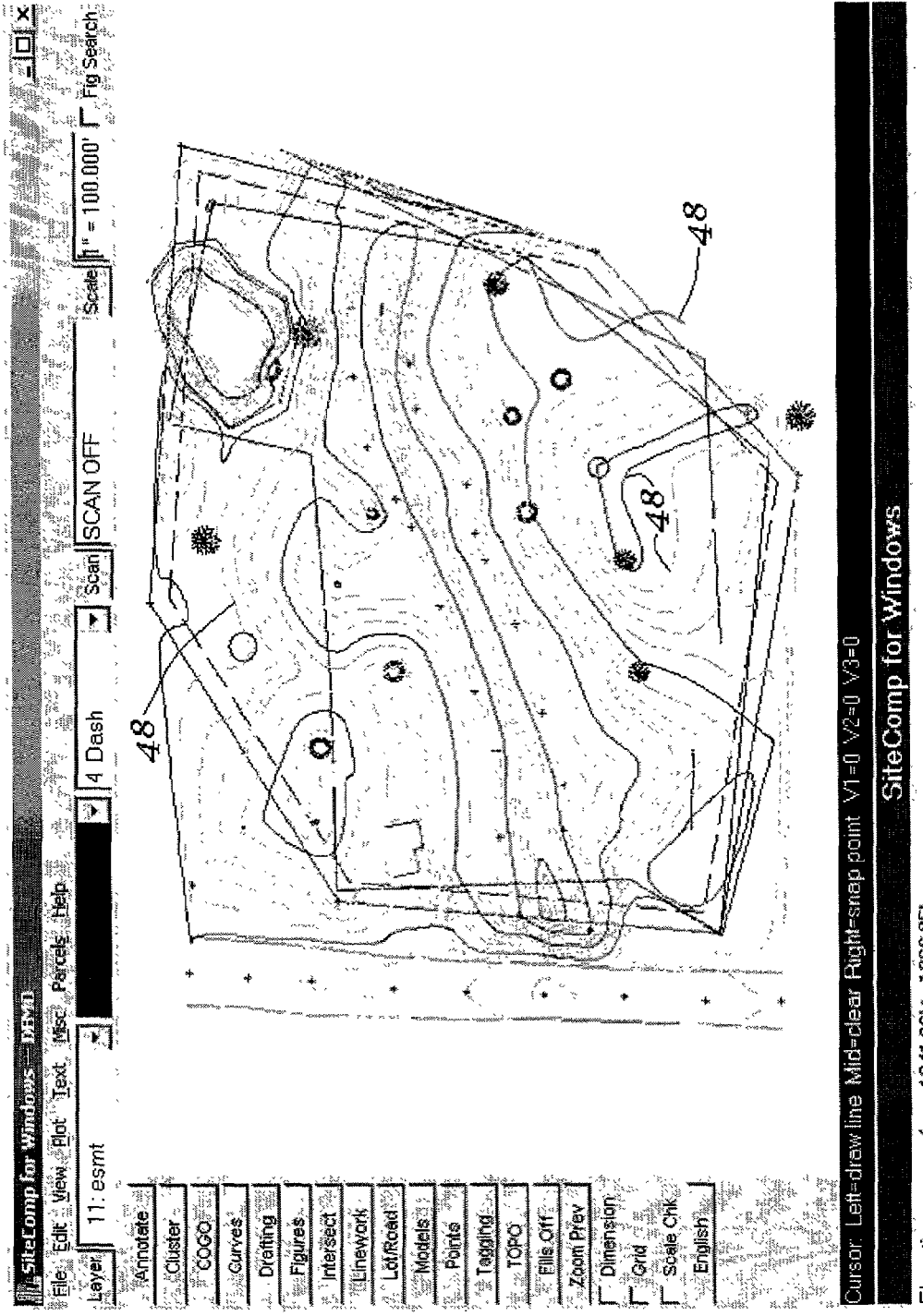
FIG. 37 shows a plurality of contours lines at a selected interval.

Contouring may be displayed form the survey. One may move the mouse into the "side menu" and click on TOPO and on contour lines 46, respectively, like in FIG. 34. A prompt in the cursor line asks for the interval of the contour lines, "Interval (neg.=smooth)(Optional, lower, upper limits)". "1257.3" may be typed in and "Enter" pressed. The contour line at the 1257.3-foot flood plain line 47 may be noted in FIG. 35. Next one may move the mouse into the "side menu" and click on "TOPO" and then "Contour Lines" 46, as in FIG. 36. The cursor line prompt asks for the interval of the contour lines, "Interval (neg.=smooth)(Optional, lower, upper limits)." That the prompt says to specify a negative interval to display smooth contour lines may be noted. "−!" may be typed into the input line of the graphic display. Also the prompt indicates that "Esc" may be pressed to disable the contour overlay. One may press "Enter" and get the resulting display of smooth one-foot interval contour lines 48 as shown in FIG. 37. The bottom output line 28 in FIG. 37 indicates that the elevations range from 1241.66 feet to 1266.05 feet. Some related-art packages push the smoothed line off the true contour. CDIS keeps the smoothed line as close to the surface as possible for accuracy of the lines.

Figure 38:
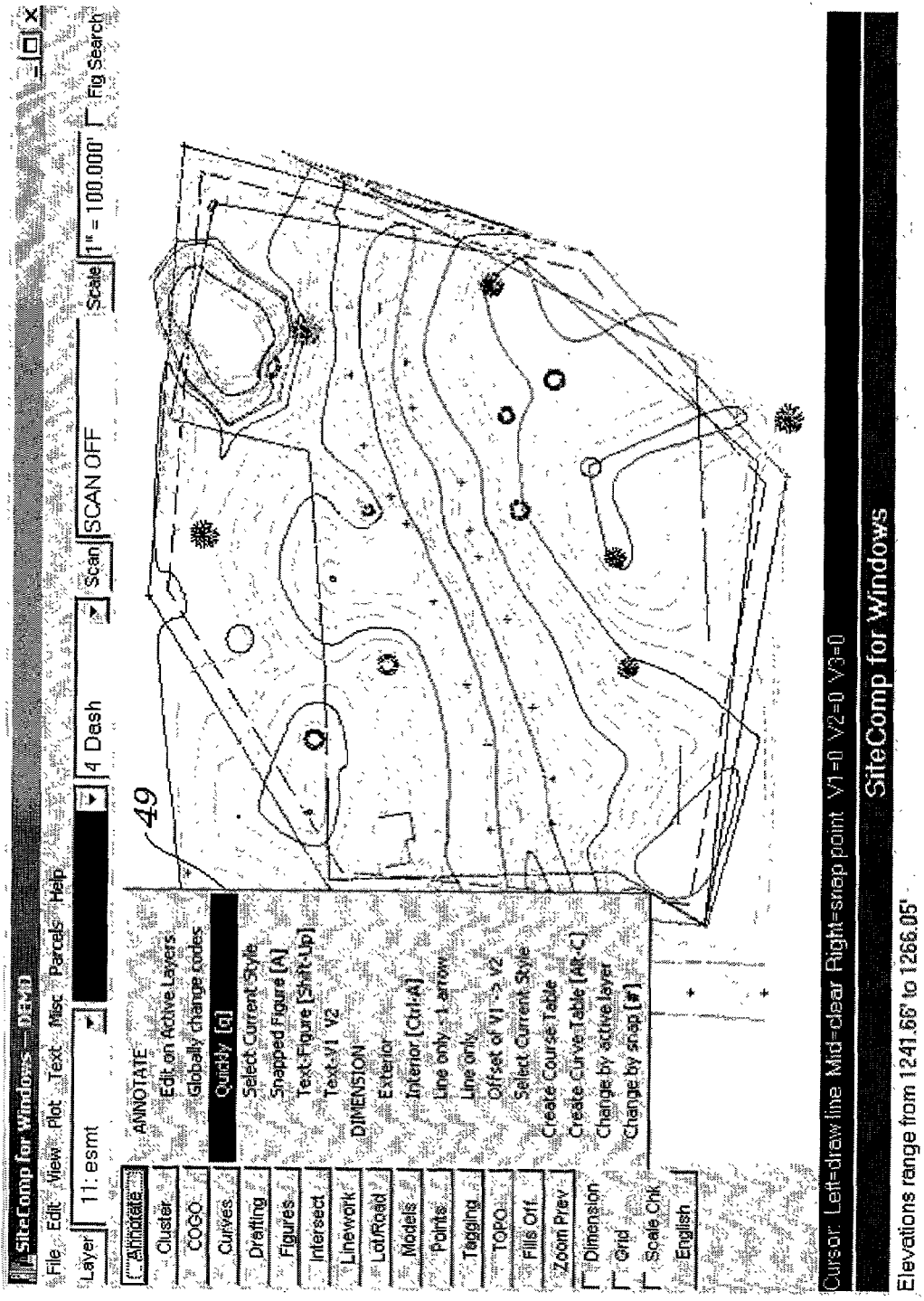
FIG. 38 indicates an annotation step selection.
Figure 39:
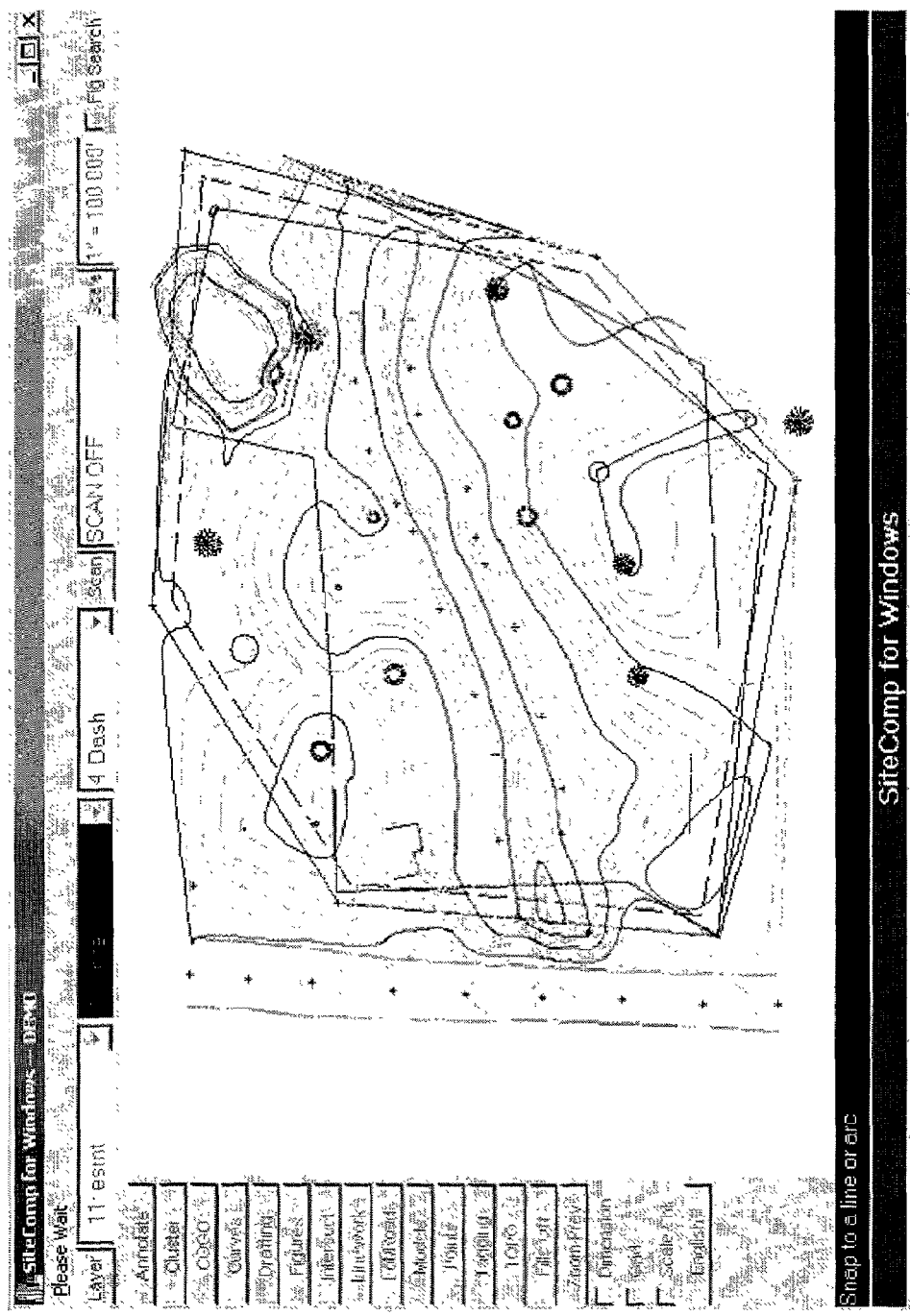
FIG. 39 shows the plot drawing set up for snapping to a line or an arc.
Figure 40:
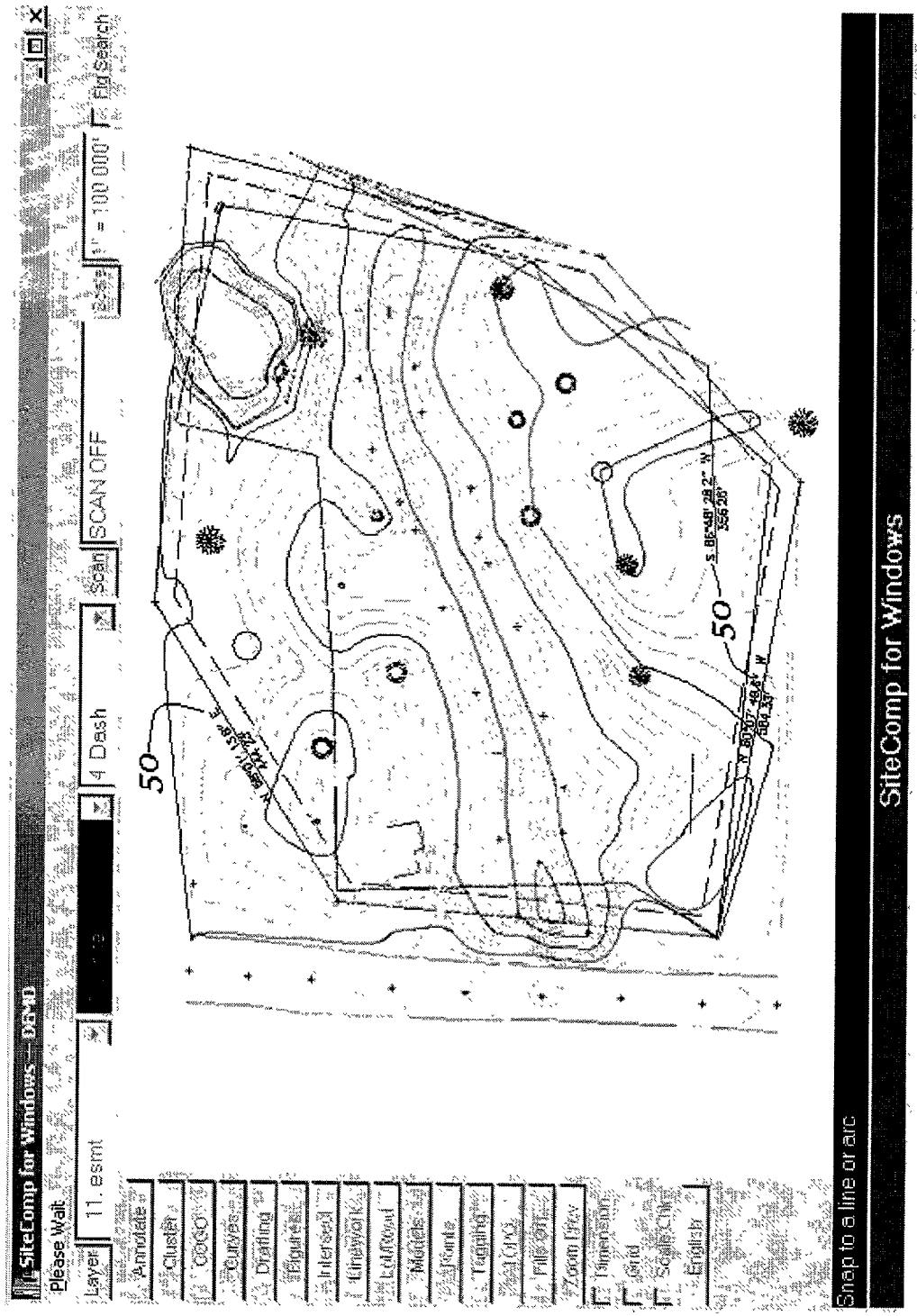
FIG. 40 shows several lines snapped to with an annotation.

The site or details may have intelligent annotation. The mouse may be moved into the "side menu", and clicked on "Annotate" and "Quickly [q]" 49, respectively, as in FIG. 38. The prompt of the cursor line asks one to "Enter annotation code [offset(optional)]. "1" may be typed in and "Enter" pressed. A "figure snap" mouse line appears at the cursor line 31—"Snap to a line or arc", as in FIG. 39. One may move the mouse's target to the middle of several (blue) lines, and press the mouse's left button on each line to make an annotation 50, as shown on lines in the upper left and at the bottom of the graph in FIG. 40. Since this is a repeating command, one may press "Esc" to exit this feature. CDIS computes the annotation 50 as the line or arc is being drawn. One may have any offset from the line at the same time. An annotation 50 along curves automatically follows the arc. If one annotates a curve with a code of 1 or 2, and have a curve table present in the drawing, the curve table will be automatically update when one adds or removes annotations to or from the curve. The CDIS annotation is a mathematical component of the actual figure, and the figure is a mathematical component of the coordinates. If the coordinate changes, so does the annotation 50. Many related-art packages do not have this kind of feature.

Figure 41:
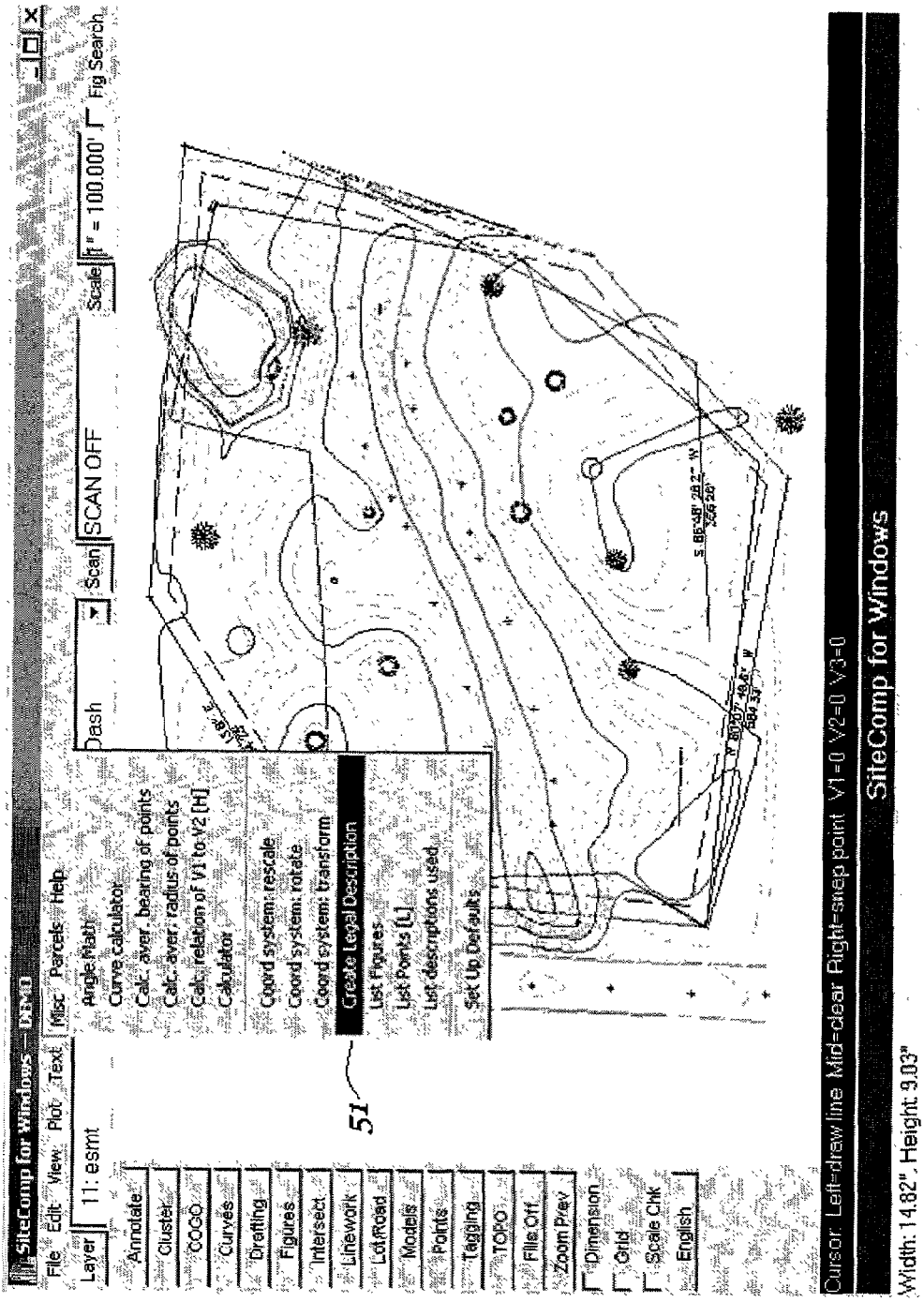
FIG. 41 indicates the step to creating a legal description of the parcel.
Figure 42:
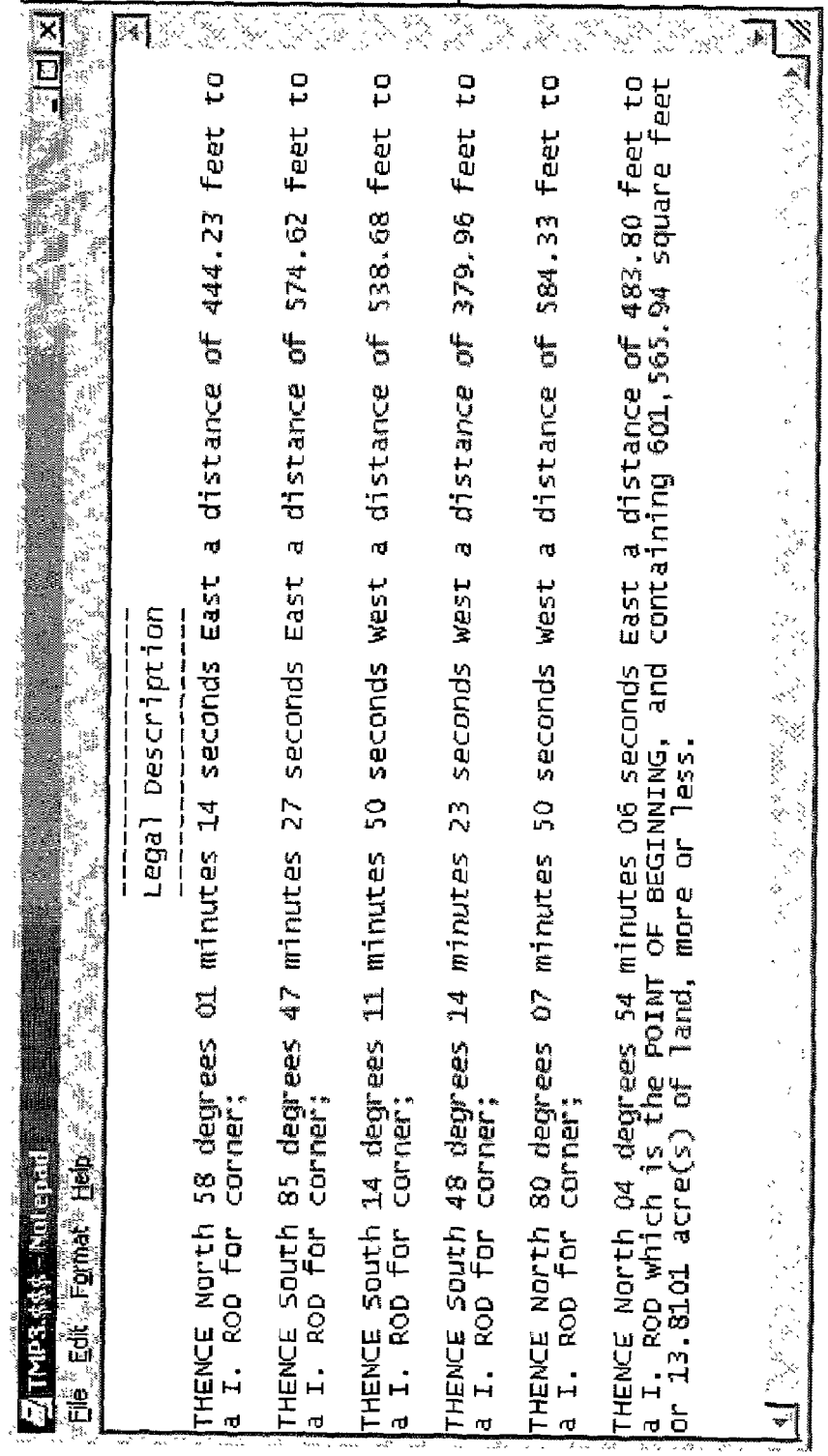
FIG. 42 shows the legal description.

Legal descriptions can be immediately created from one's work up to now. In the "Misc" pull-down, one may select "Create Legal Description" 51 as in FIG. 41. Then one is prompted by the cursor line to enter the name of the parcel to be used, i.e., "Enter the name of the parcel (or alignment)". "Site" may be typed in and "Enter" pressed. The next prompts state in the following order, "Text Width:

0=no specific width, [ENTER]=80; or enter maximum" and "Course Separation: [ENTER]=space between; 2=no space". "Enter" may be pressed at each of these prompts. After this, a legal description 52 pops up as in FIG. 42. It may take only 26,000 bytes to store this job including the surface.

Figure 43:
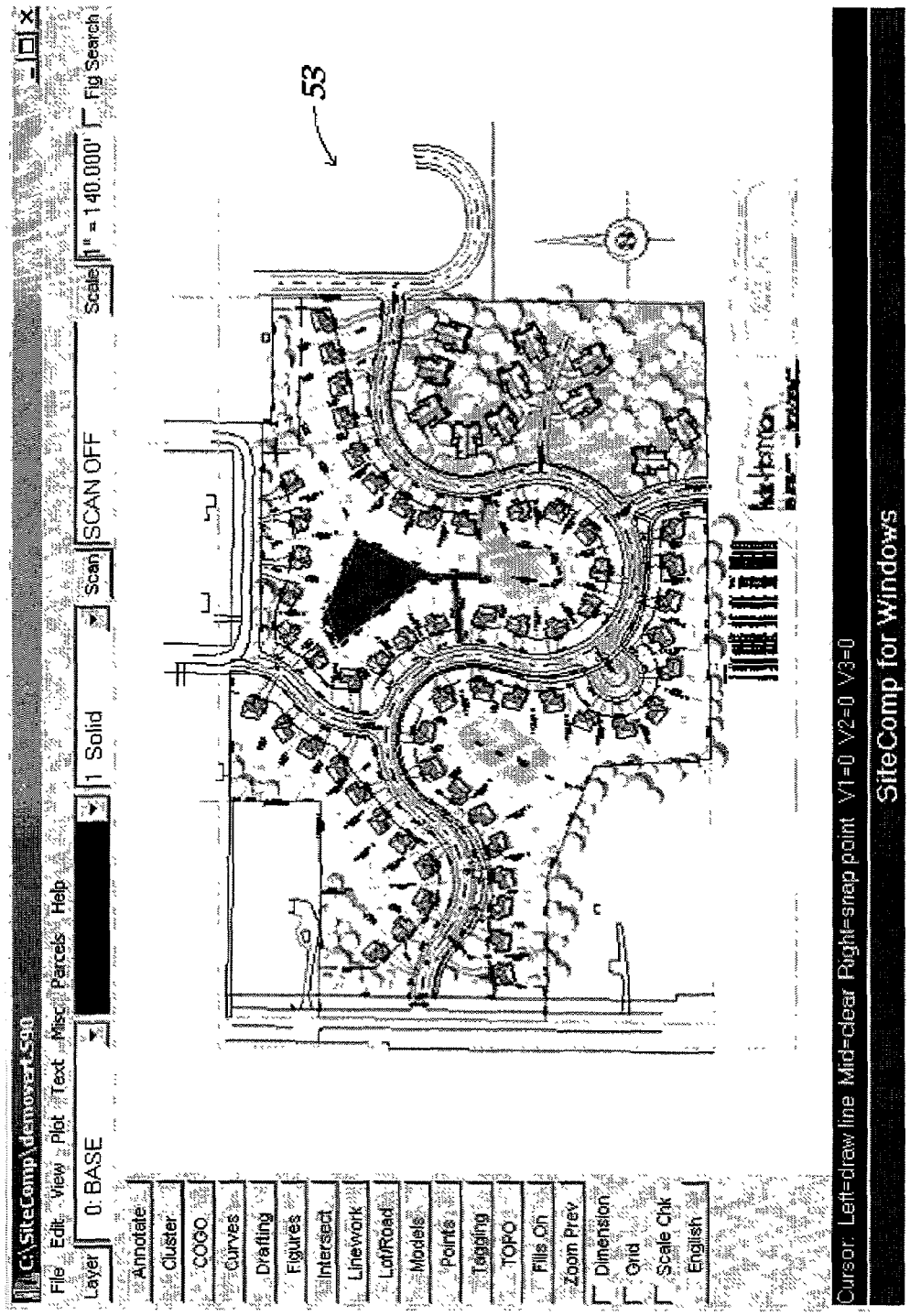
FIG. 43 shows a plan view of a housing area.

CDIS has many capabilities for civil engineering purposes. The civil engineering design portion of CDIS relates to the design and layout in a vertical environment of roadway alignments, utility lines, cross section design and earthwork, and plotting profile data. The roadway designs are stored integral to the job file so there may be less "road or utility" job files to manage. To load the civil engineering design example data, one may select "File" and "Open", then double click on "demovert.S90" and get the data 53, some which is displayed in FIG. 43. This file contains design features such as topography, parcels and design centerlines.

Figure 44:
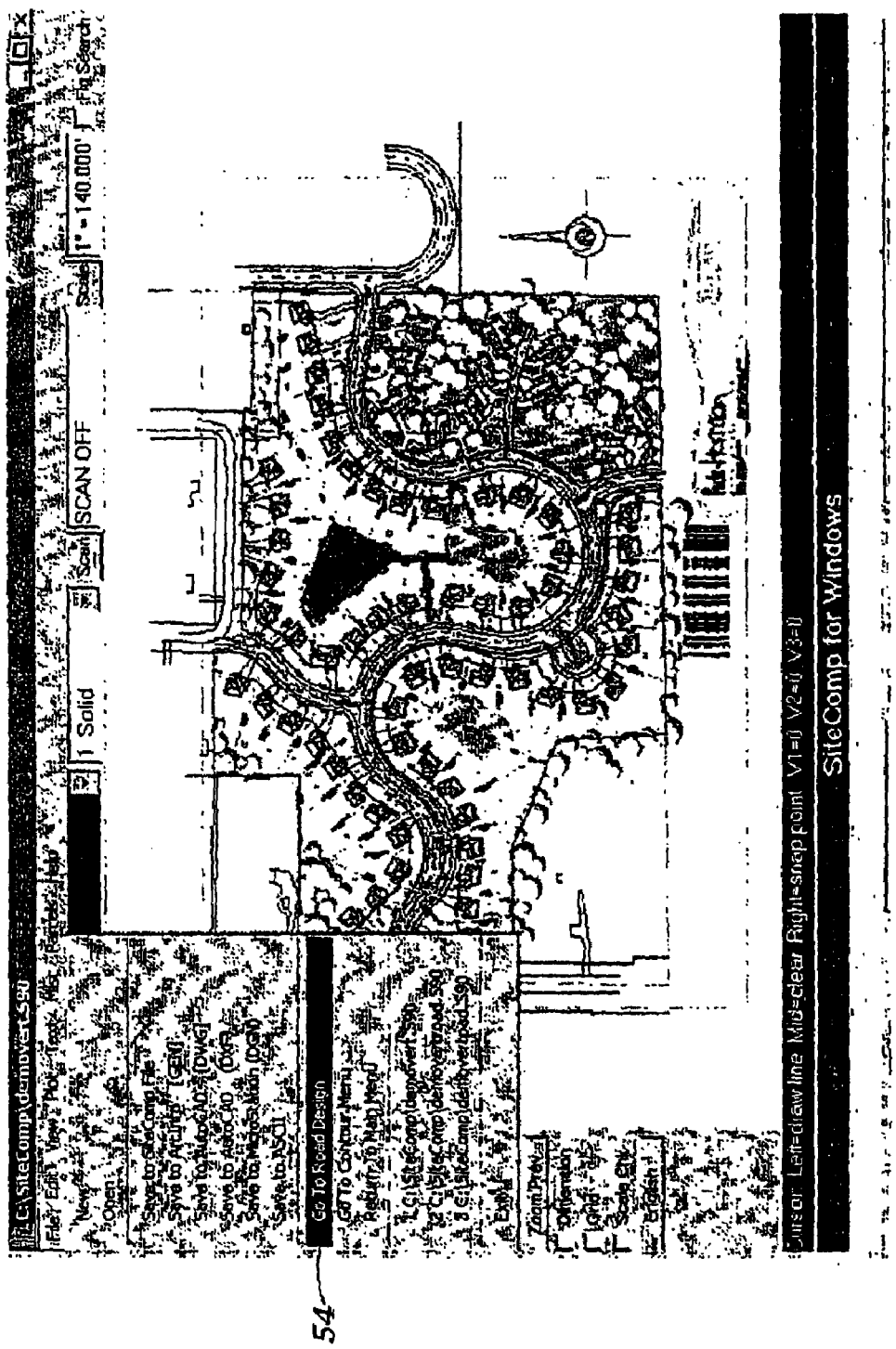
FIG. 44 indicates a step to road design.
Figure 45:
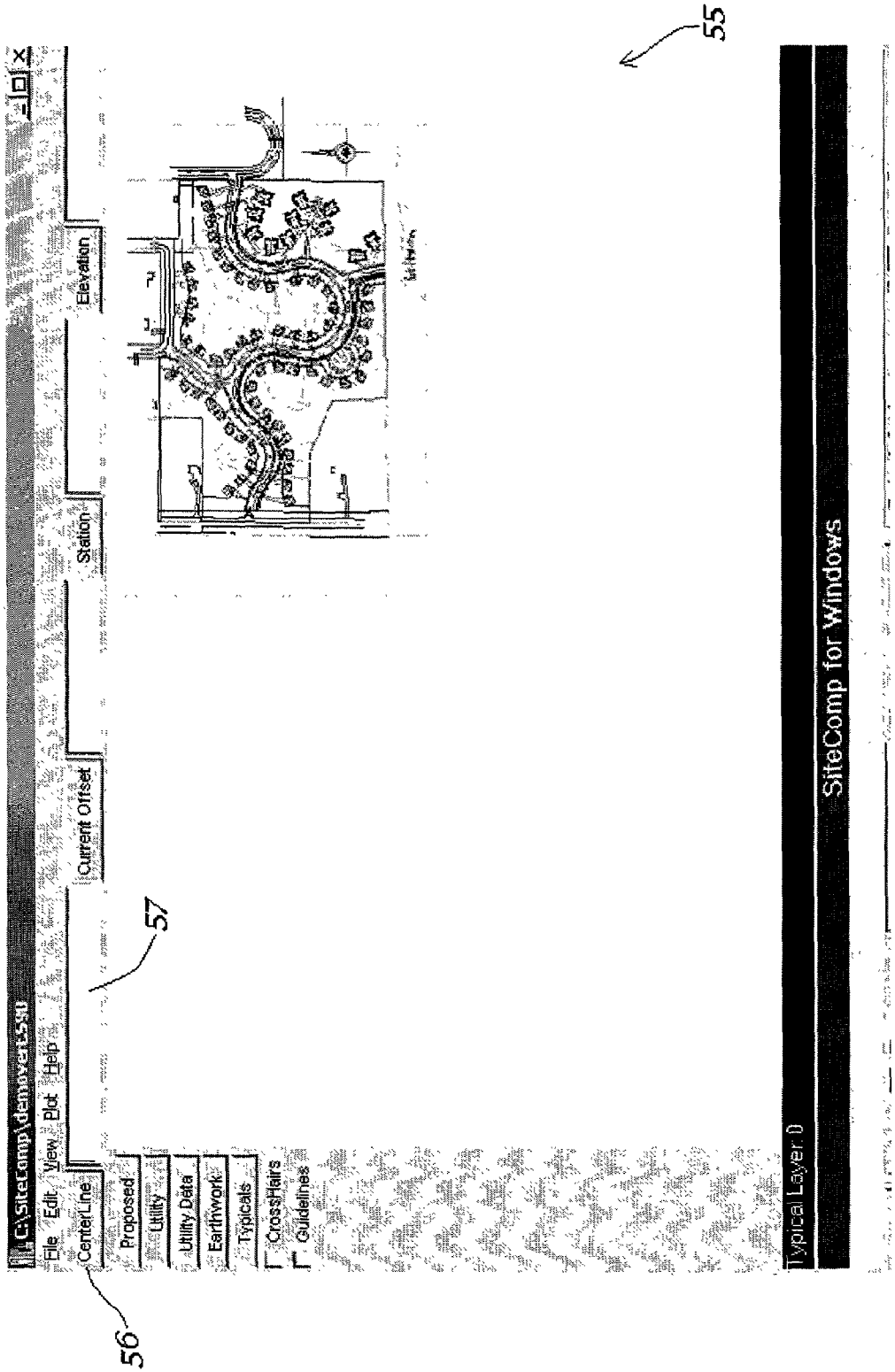
FIG. 45 shows a roadway design screen.
Figure 46:
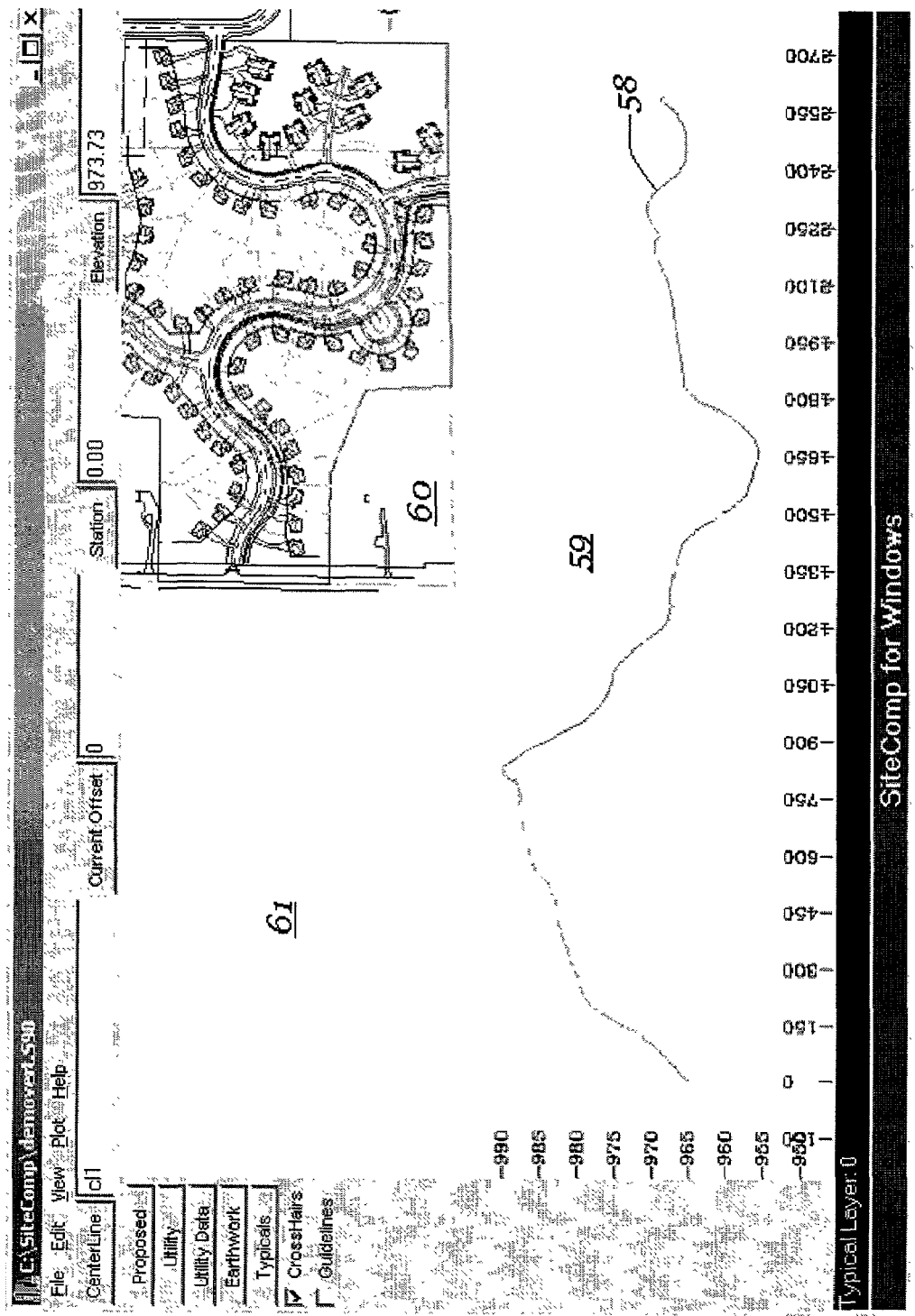
FIG. 46 shows the natural ground centerline in the lower portion of the screen.

For instance, a design centerline may be a roadway centerline or even an actual utility alignment, a centerline of easement or actual pipes. Access to roadway and utility design is easy. One may select "File" and then "Go to Road Design" 54, as in FIG. 44, and get the Roadway Design screen 55 as shown in FIG. 45. The upper left of the screen has a button 56 that says "Center Line". To the right of that is an input box 57. One may click within the box and enter "cl1". A cursor line prompt appears asking the user to "Enter starting station: (Enter=0.00)". The "Enter" button may be pressed for the beginning station to default to 0+00.00. The lower part of the screen now shows the natural ground centerline 58 as noted in FIG. 46. Note that the detail along the natural ground appears quite fine. CDIS works with the natural actual ground. Because of this, the resolution and the calculations are not restricted to "stations". There are three screens. The lower screen 59 is the profile design screen. The upper right screen 60 is the plan screen where one sees the plan view as one moves in the profile view screen. The upper left screen 61 is the information screen for designing templates and various output graphics.

Figure 47:
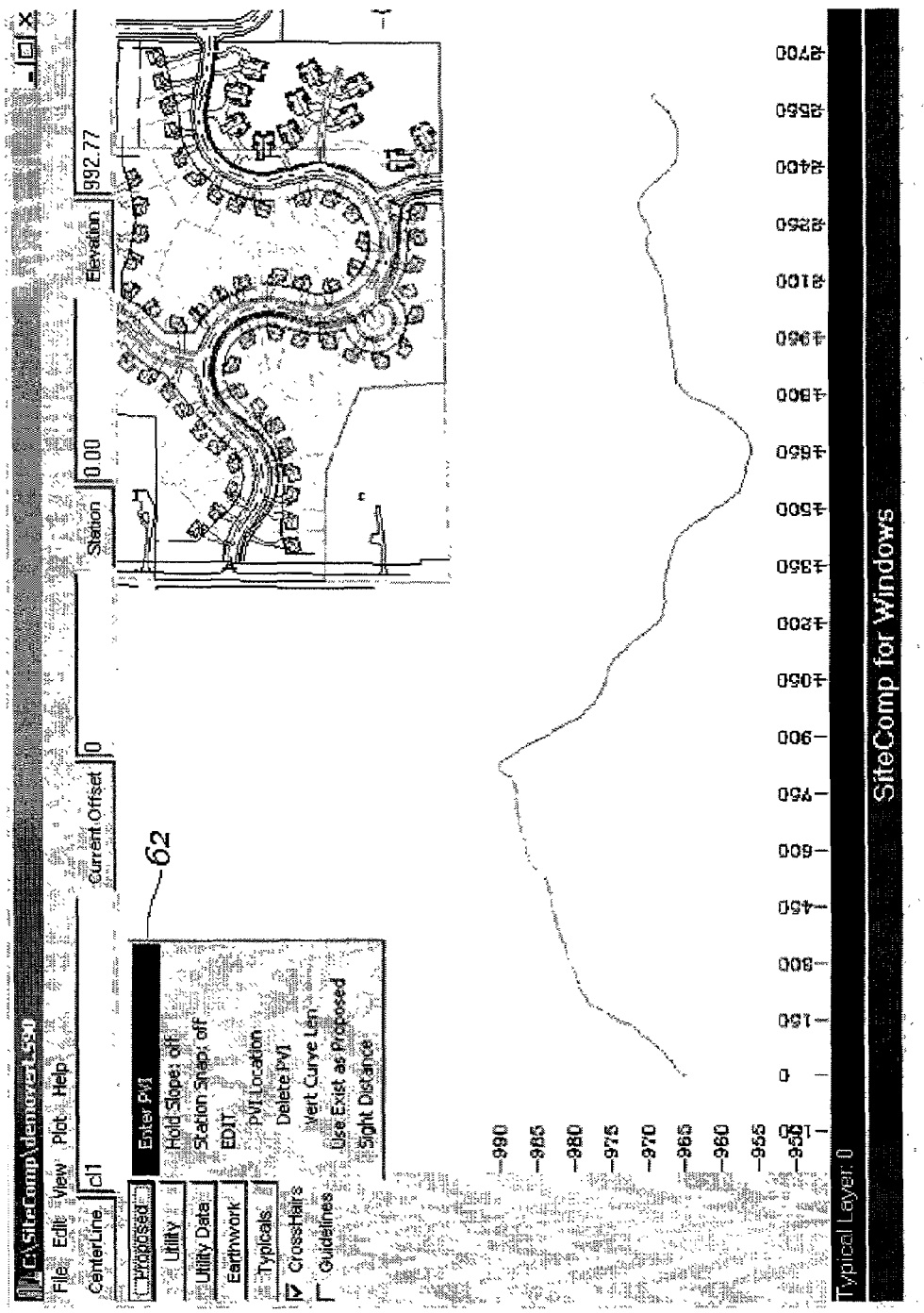
FIG. 47 shows a step to a design centerline.
Figure 48:
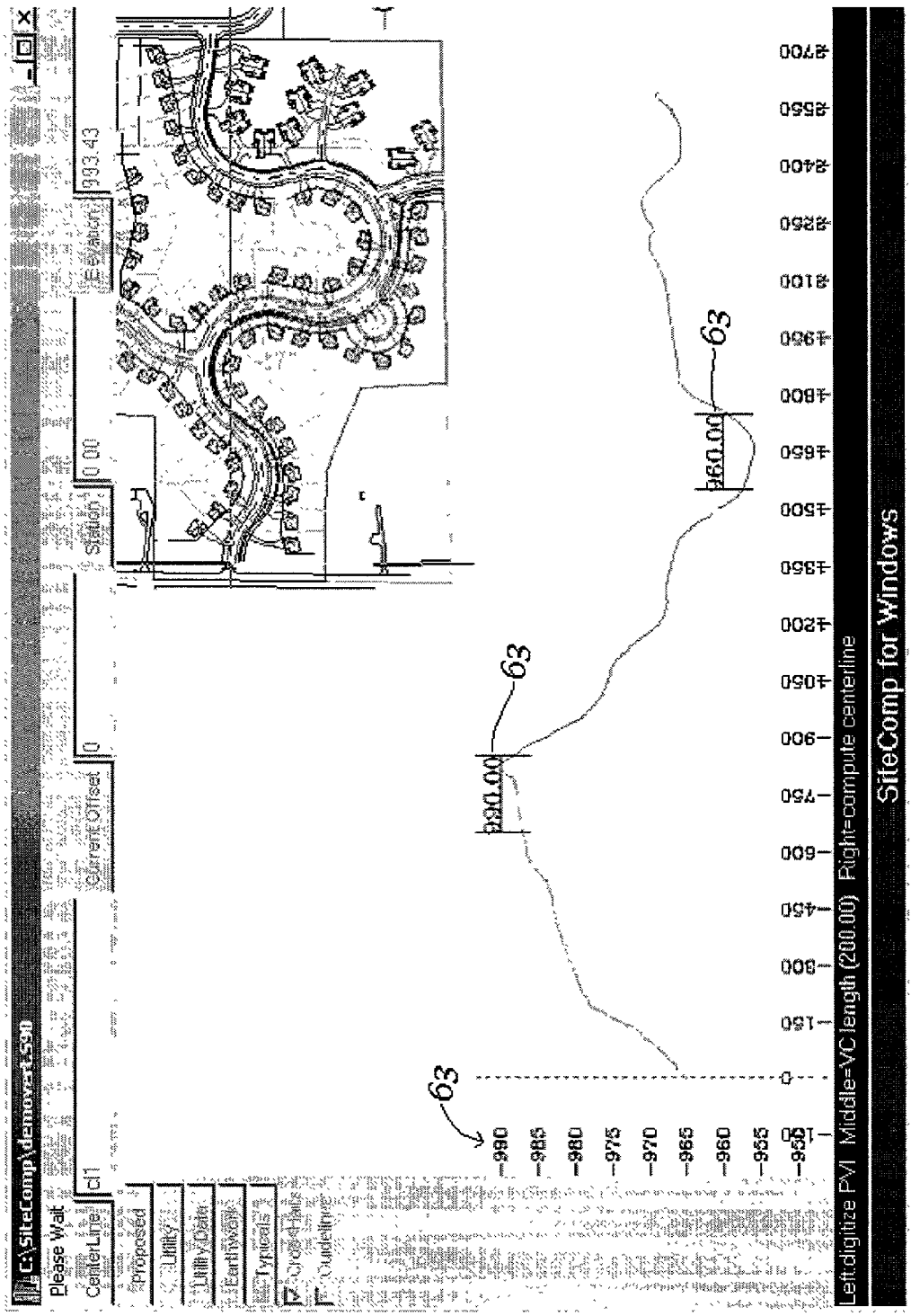
FIG. 48 states the high and low elevations of the natural ground centerline.
Figure 49:
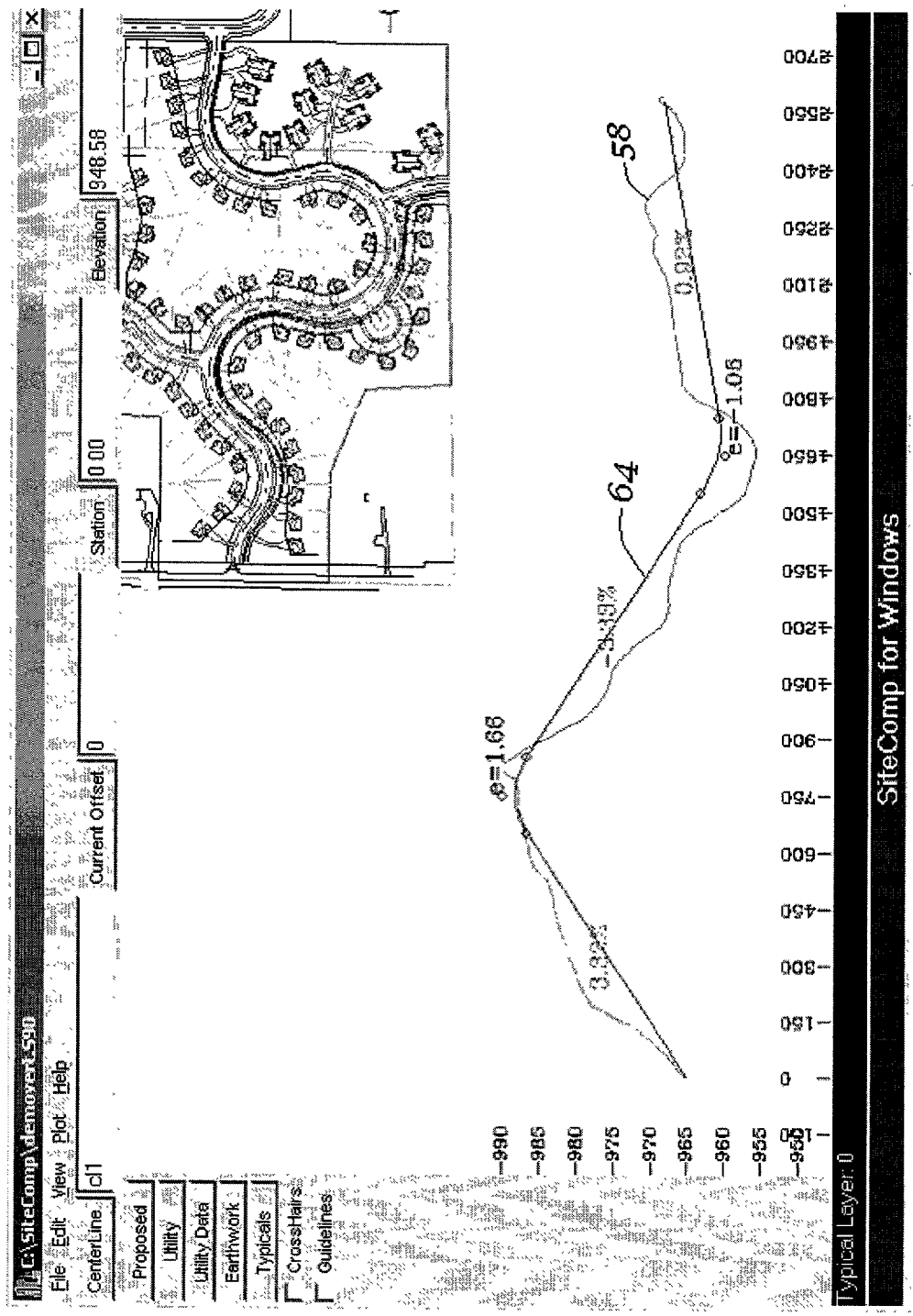
FIG. 49 reveals the computed centerline and the proposed profile.

A design centerline may be created. "Proposed" and "Enter PVI" 62 may be selected as indicated in FIG. 47. A cursor line prompt asks for a VC station, elevation and length. One may type in 750, 990, 200 for a station 750, an elevation of 990 and a vertical curve (VC) of 200, and then press "Enter". Then one may type in 1650, 960 and press "Enter". Note that one need not repeat the VC length entry if using one already entered. "Enter" may be pressed to obtain a prompt for digitized entry, the mouse may be placed in the "profile" lower window, and the mouse right button may be pressed to compute the centerline, in that order. One might press "Enter" twice to use beginning stations, ending stations and elevations 63 of natural ground, as shown in FIG. 48. FIG. 49 reveals the computed centerline 58 and the proposed profile 64. One can easily enter PVI data; but for the consistency of this disclosure, the PVI data were entered manually.

Figure 50:
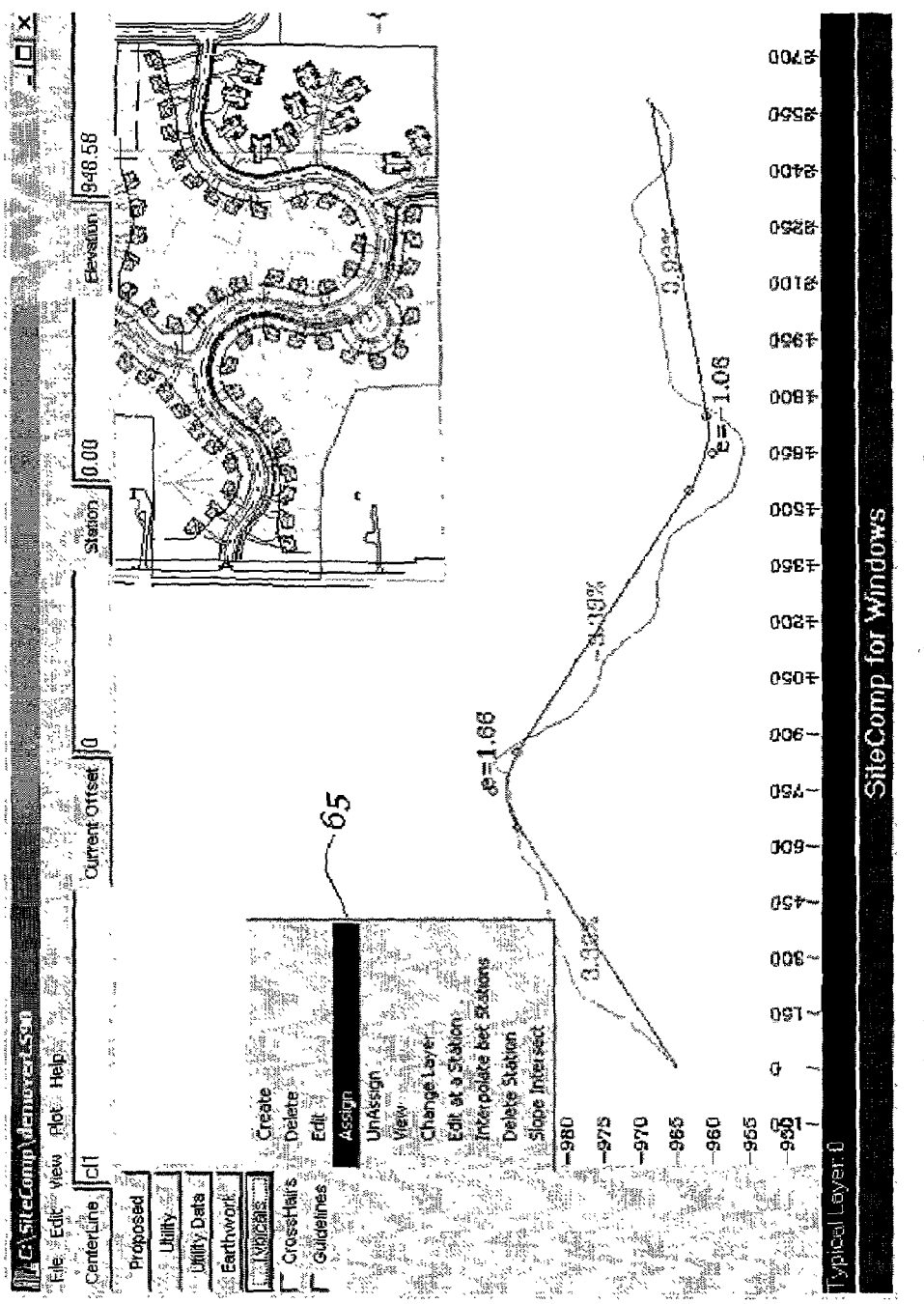
FIG. 50 shows a step to creating and assigning typicals.
Figure 51:
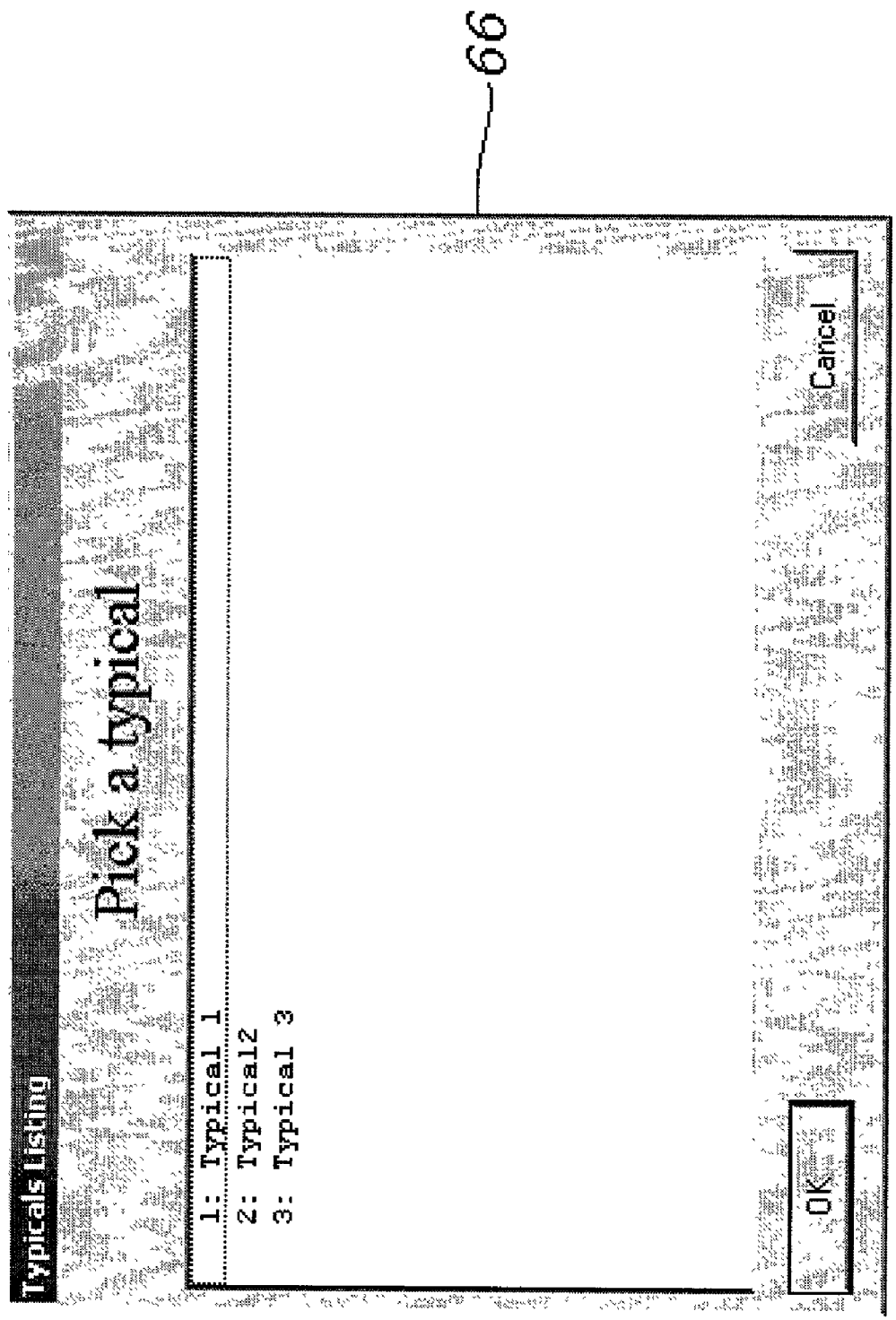
FIG. 51 shows a typicals listing.

Typicals may be created and assigned. One may select "TYPICALS" and "Assign" 65 as shown in FIG. 50. A cursor prompt says, "Enter typical number or name to assign". Pressing "Enter" may result in a window 66 appearing with typical names, as in FIG. 51. One may double click on a typical in the window, such as "1: Typical 1". A prompt appears stating, "Enter correcting offset [ENTER=0.0]". One may press "Enter" for no correcting offset. The next prompt says, "Beginning station [Press ENTER for first station]". One may press "Enter" to begin at the first station. The next prompt says, "Ending station [press ENTER for last station]". One may press "Enter" to end at the last station. The next prompt states, "Intersect slopes? [Y/N]". One may select "Y" or press "y" to intersect slopes. The next prompt says, "Enter cut, fill for left slope (example: cut of 3:1 fill of 4:1 is 3,4)". One may type 3,3 in the input line and press "Enter" for a 3:1 slope for both cuts and fills from the left. The next prompt says, "Enter cut, fill for right slope (example: cut of 3:1 fill of 4:1 is 3,4)". One may type 3,3 in the input line and press "Enter" for a 3:1 slope for both cuts and fills from the right. The next prompt is, "Enter left maximum limits, right maximum limits [press ENTER for −50,50]". One may type −100,100 and press "Enter" for left and right maximum limits of −100,100 (100 feet left and right). The results of a calculation for the entered information is a table 67 of "slope intersect data" shown in FIGS. 52a, 52b, 52c and 52d. The last line of FIGS. 52a, 52b and 52c is repeated as the first line of the respective subsequent figure. CDIS may allow up to ten different typical layers for the very complex road design tasks.

Figure 53:
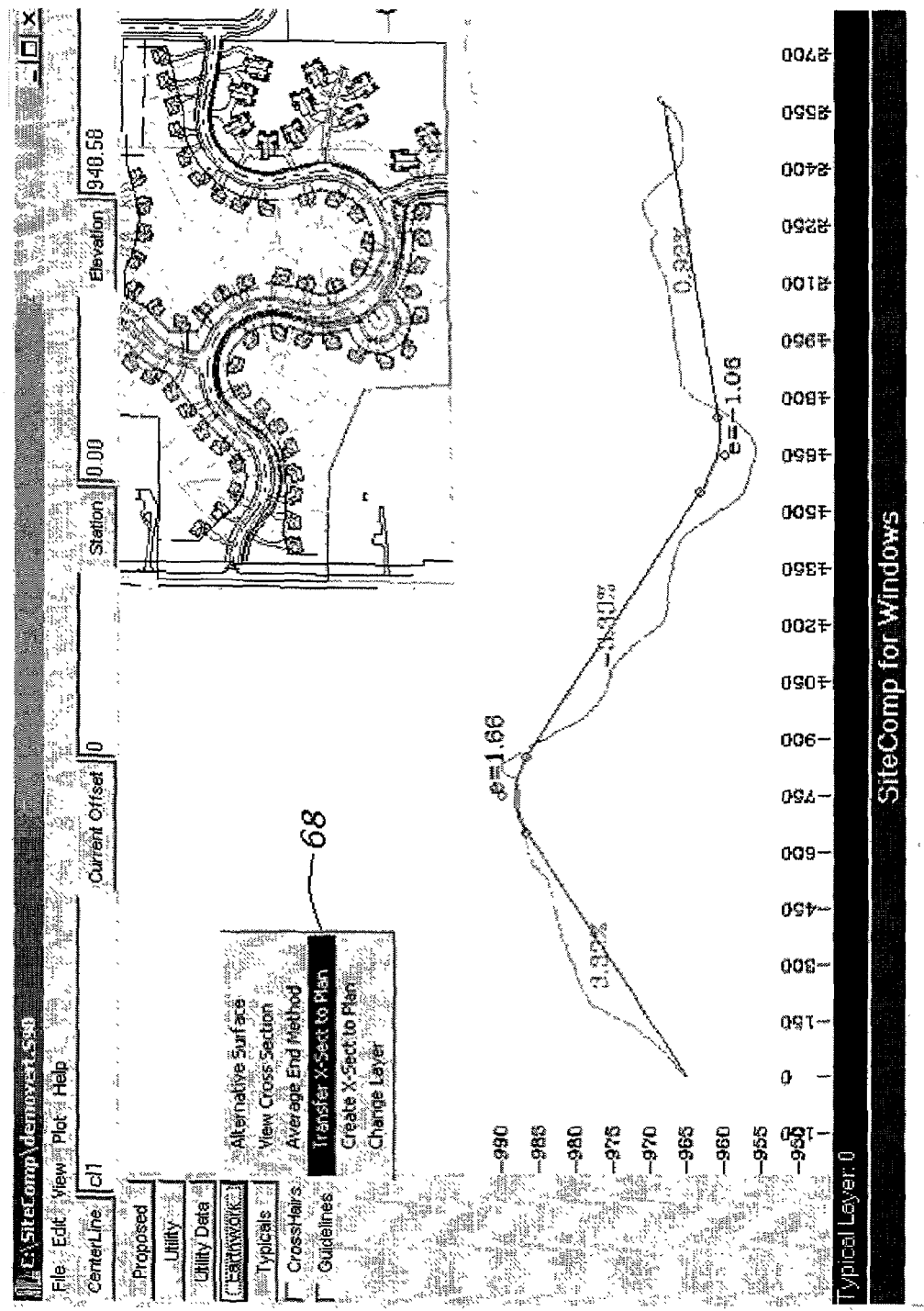
FIG. 53 gives a step to creating a contour of proposed data.
Figure 54:
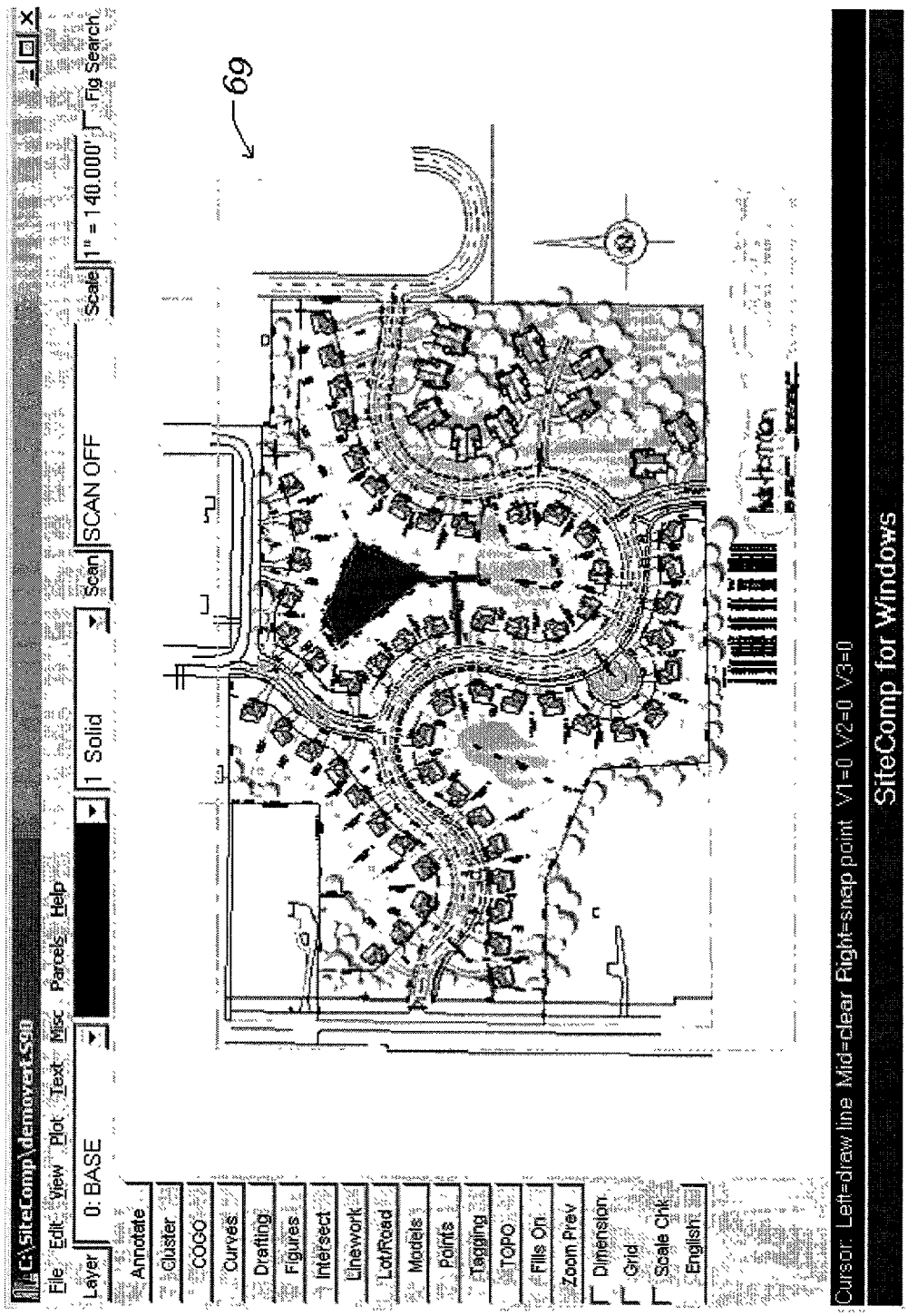
FIG. 54 shows the housing layout with plot lines.

A contour of proposed data may be created. "Earthwork" and "Transfer X-sect to Plan" 68 may be selected as indicated in FIG. 53. A cursor prompt states, "Enter beginning station, ending station to store [press ENTER for all]". One may at this prompt press "Enter" for all stations. The next prompt says, "Add PVC/PVT points to plan? [Y/N]". One may press "yes" to not transfer PVC and PVT data to the plan. One may then select "File" and "Exit to Design" and get the graphic illustration 69 in FIG. 54. One may note the cross sections that are plotted.

Figure 55:
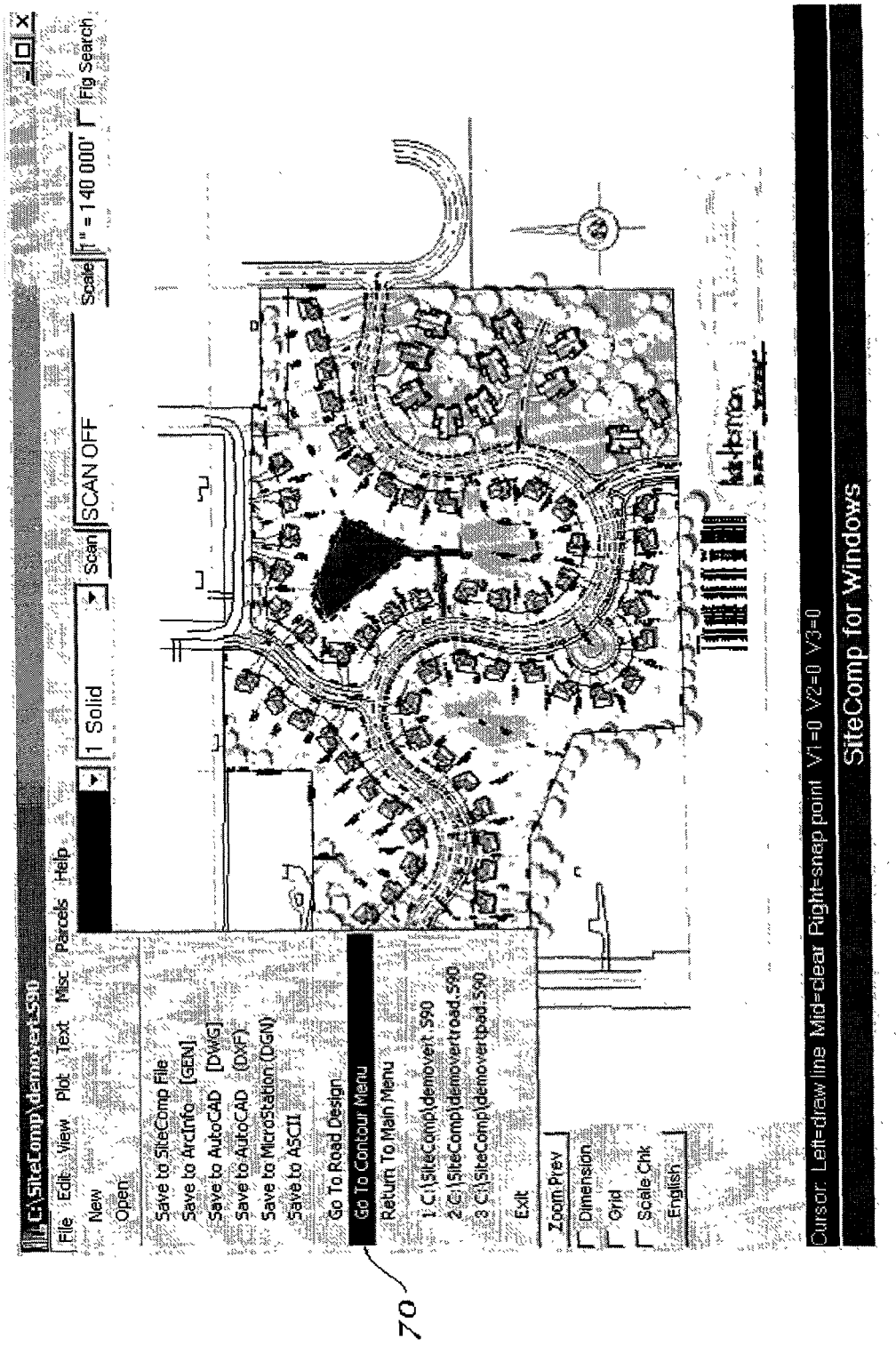
FIG. 55 shows a step to the contour menu.
Figure 56:
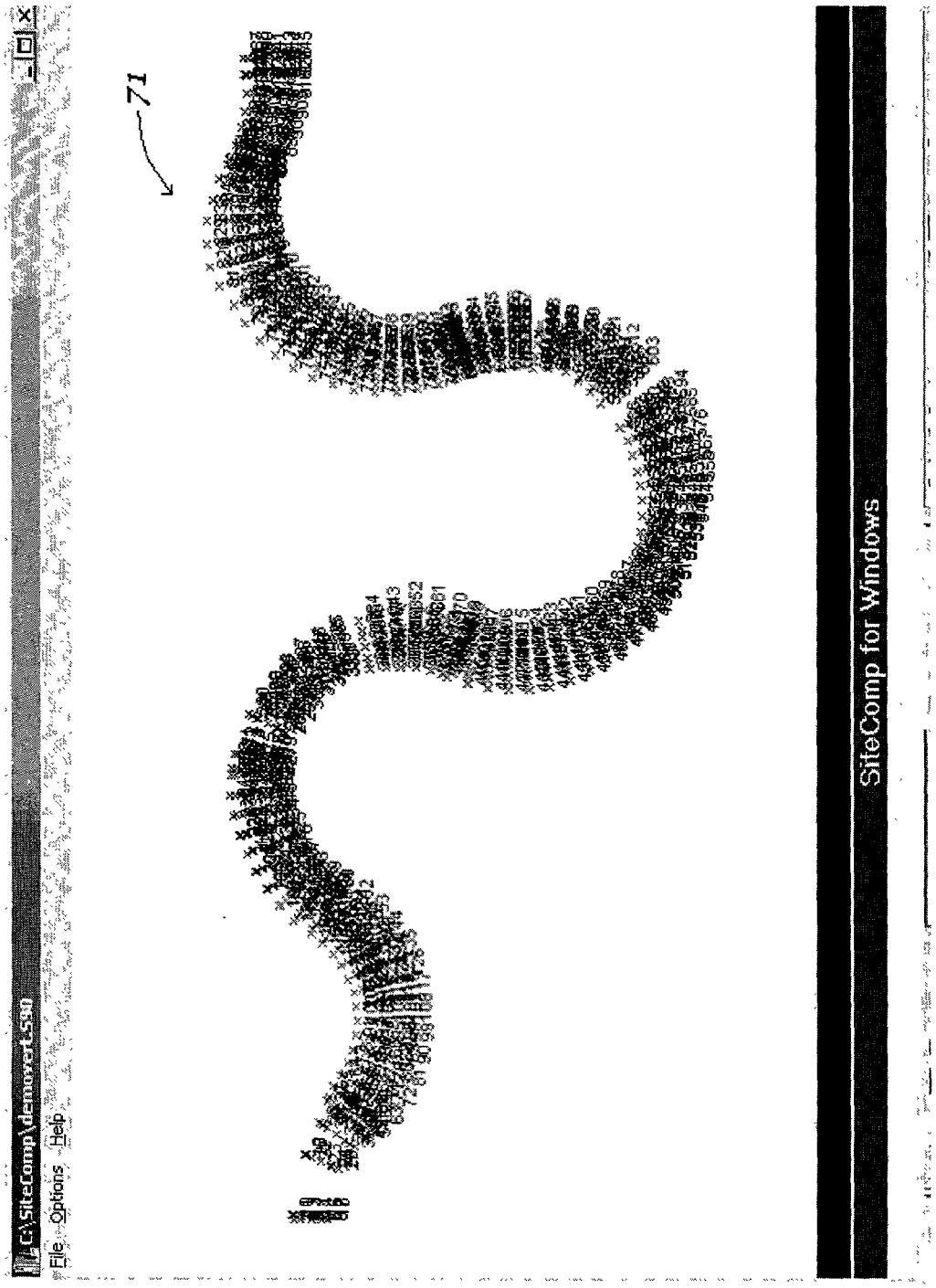
FIG. 56 shows surface points of a road.
Figure 57:
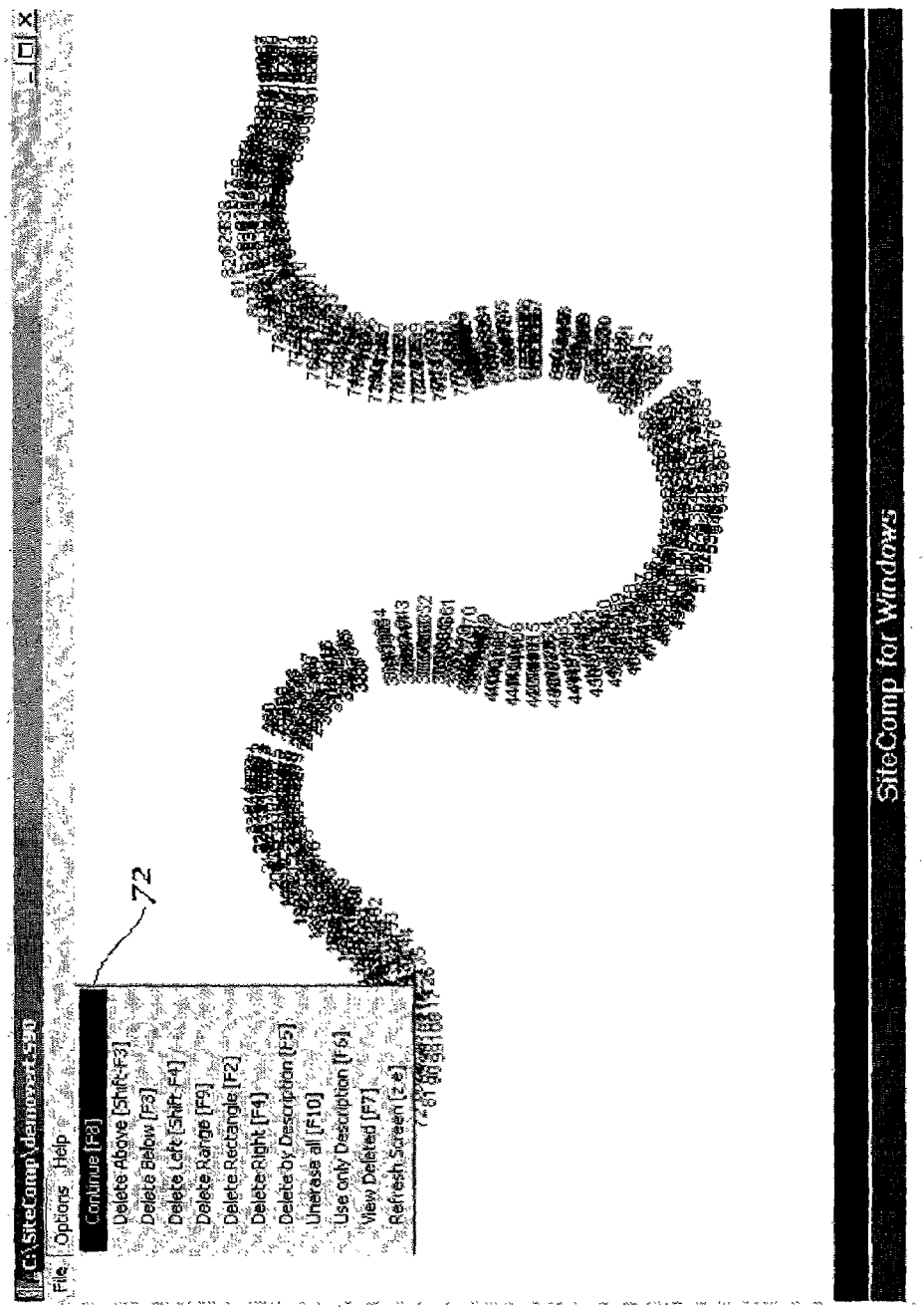
FIG. 57 indicates a step to a roadway net of lines connecting the points.
Figure 58:
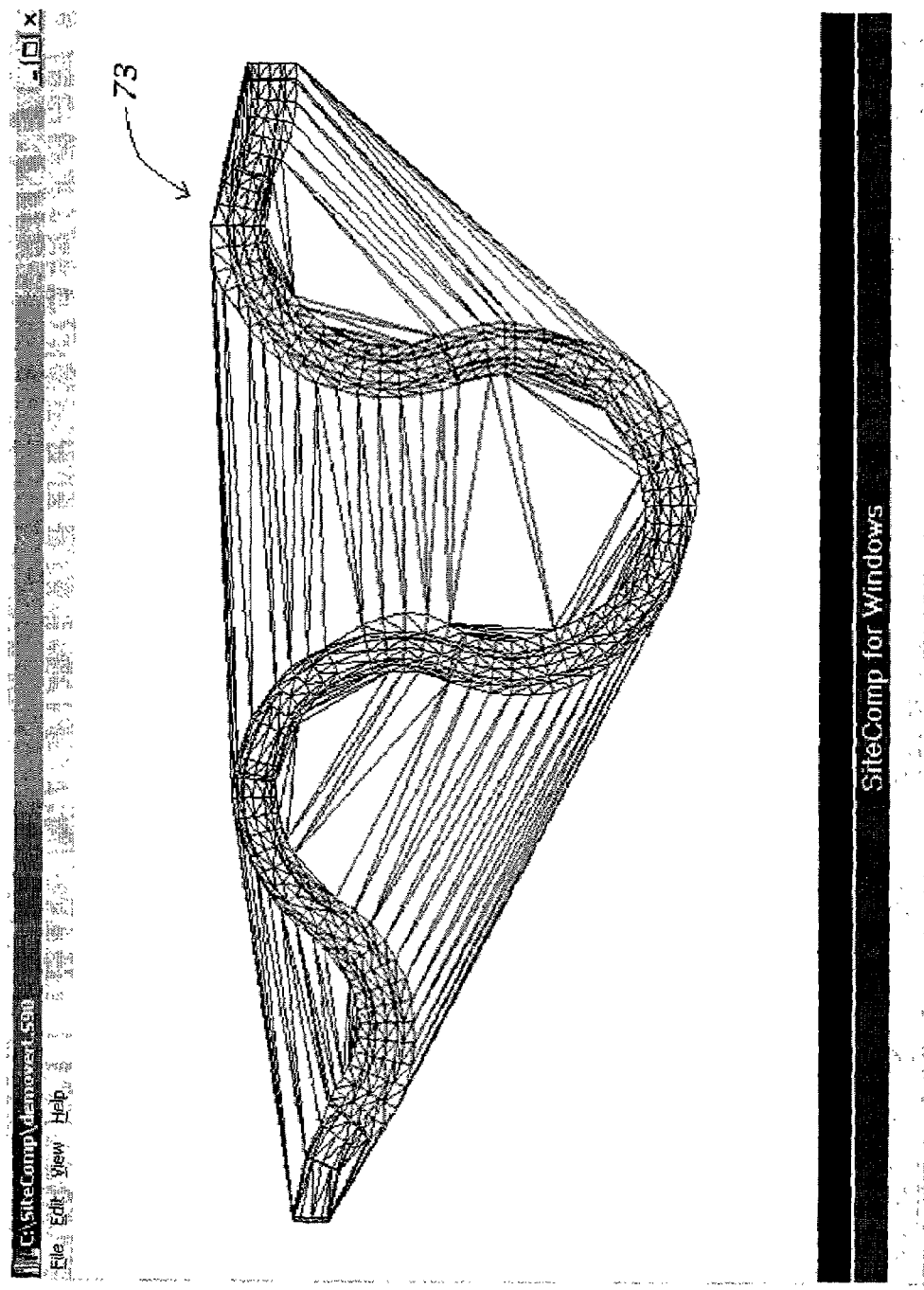
FIG. 58 reveals the roadway net.
Figure 59:
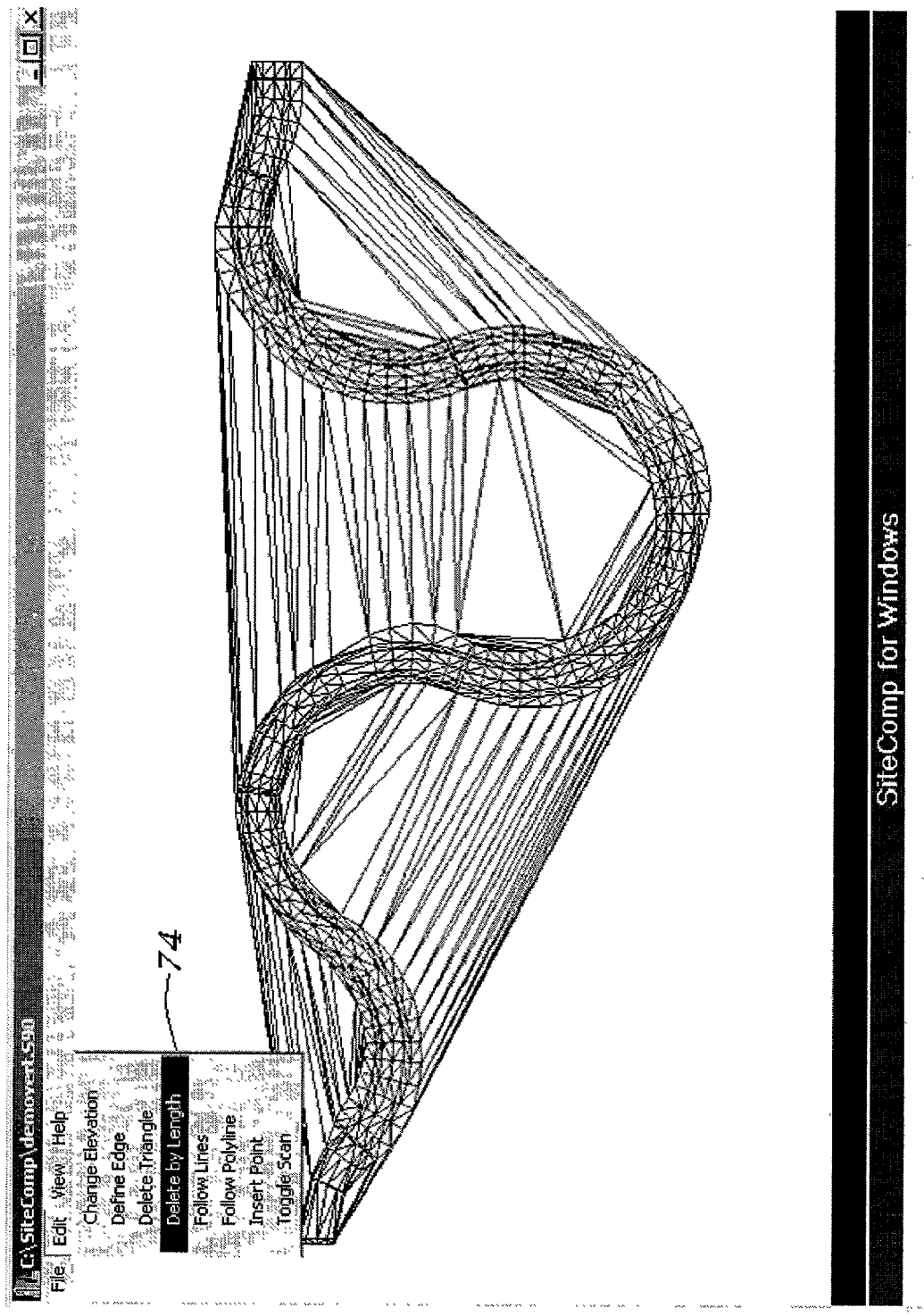
FIG. 59 shows a step to selecting and deleting lines in the net by length.
Figure 60:
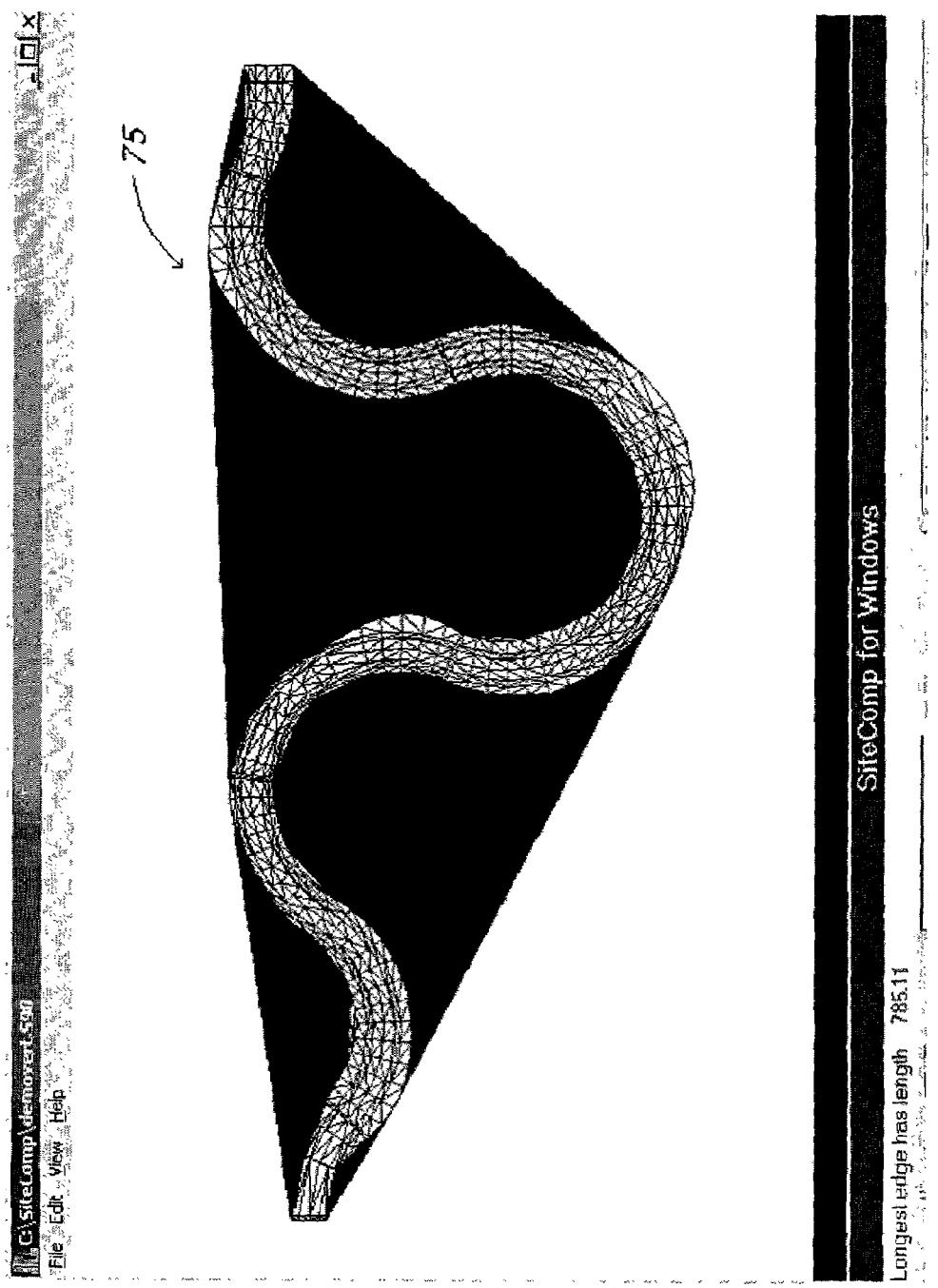
FIG. 60 shows selected triangles having lines or edges to be deleted due to excessive length.
Figure 61:
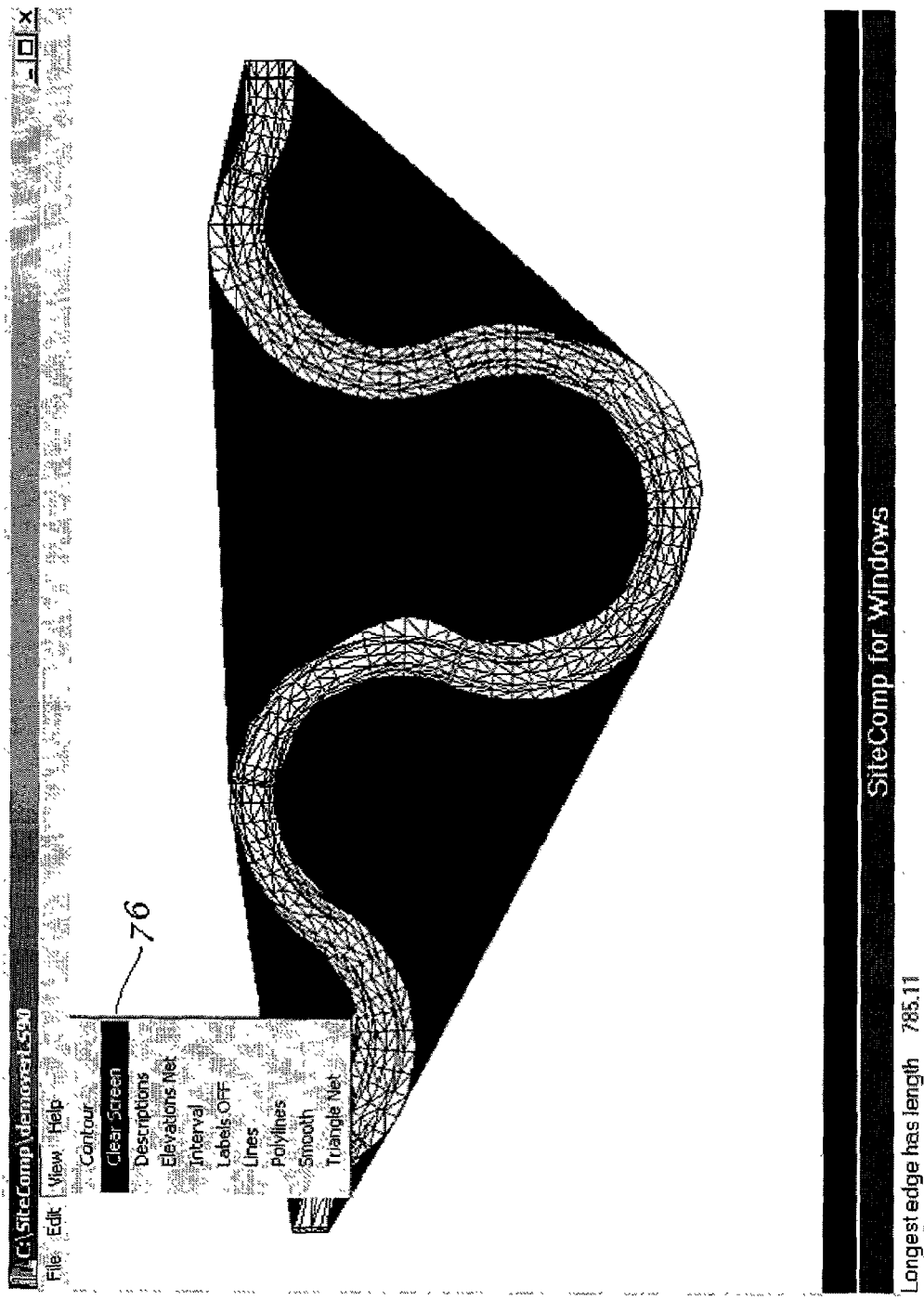
FIG. 61 indicates a step to clearing the screen of the triangle delete information.
Figure 62:
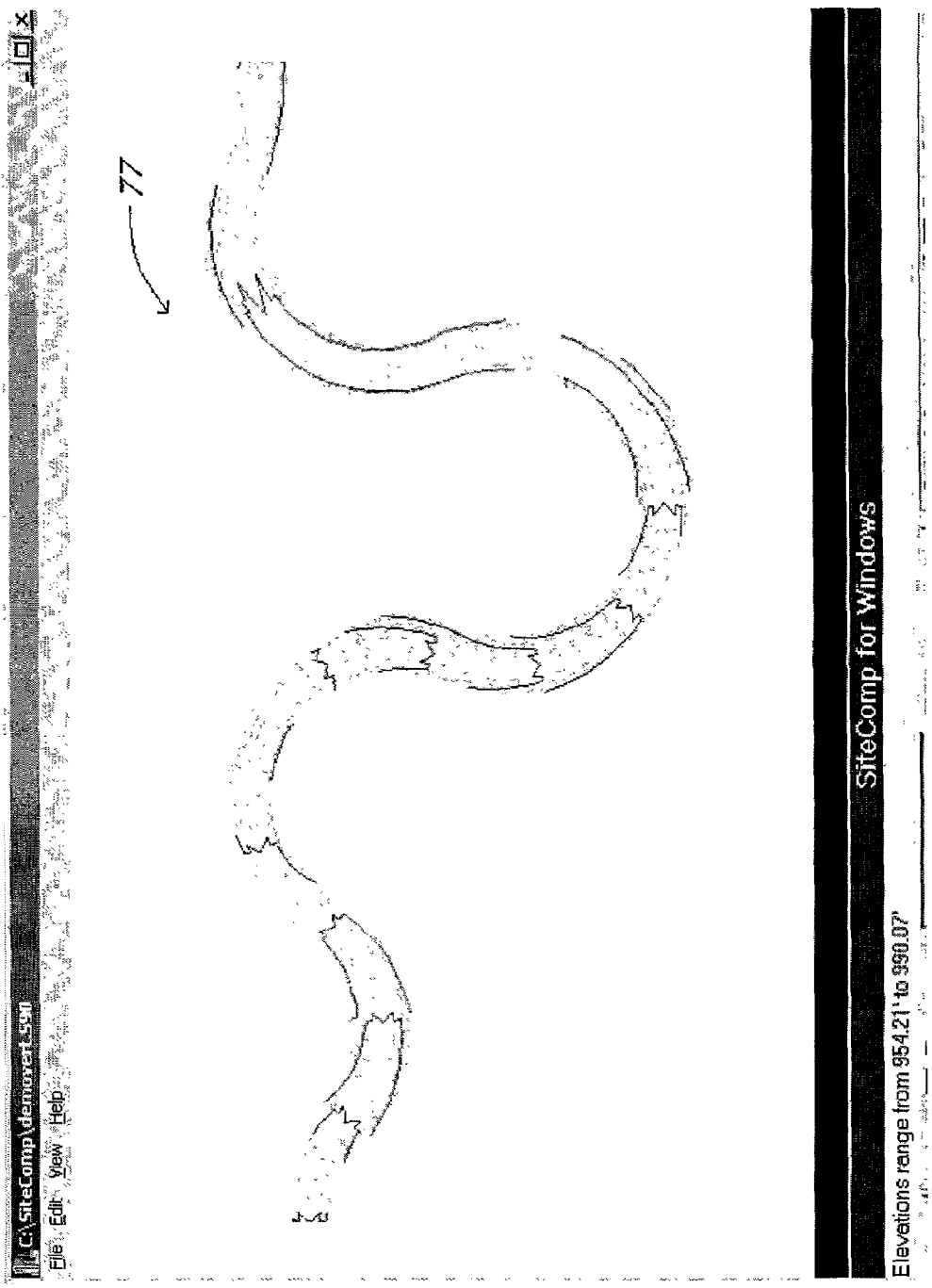
FIG. 62 shows the screen without the triangle delete information and a road design after a contour and view selection.

One may select "File" and "Go to Contour Menu" 70 as in FIG. 55. The cursor line states, "ENTER=net in memory N=new net E=recreate net with existing surface points". "E" is pressed to use the existing points in memory. The resultant display 71 is shown in FIG. 56. Next, one may select "Options" and "Continue" 72 as indicated in FIG. 57. Then, the roadway net 73 appears as shown in FIG. 58. One may select "Edit" and " "Delete by Length" 74 as in FIG. 59. The cursor prompt line now says, "Enter length of edges to erase". In response to the prompt, type −100 and press "Enter". The output line states, "Longest edge has length 785.11." Since all cross sections are 25 feet (in vertical setup, unless someone changed it), there should be no "triangles" with a side greater than 100 feet. Then the prompt line asks "Erase these triangles (y/n)?". "yes" is pressed. The result 75 is shown in FIG. 60. One may select "View" and then "Clear Screen" 76 as in FIG. 61, resulting in a clear screen. "Contour" under "View" is selected leading to the design 77 displayed in FIG. 62.

Figure 63:
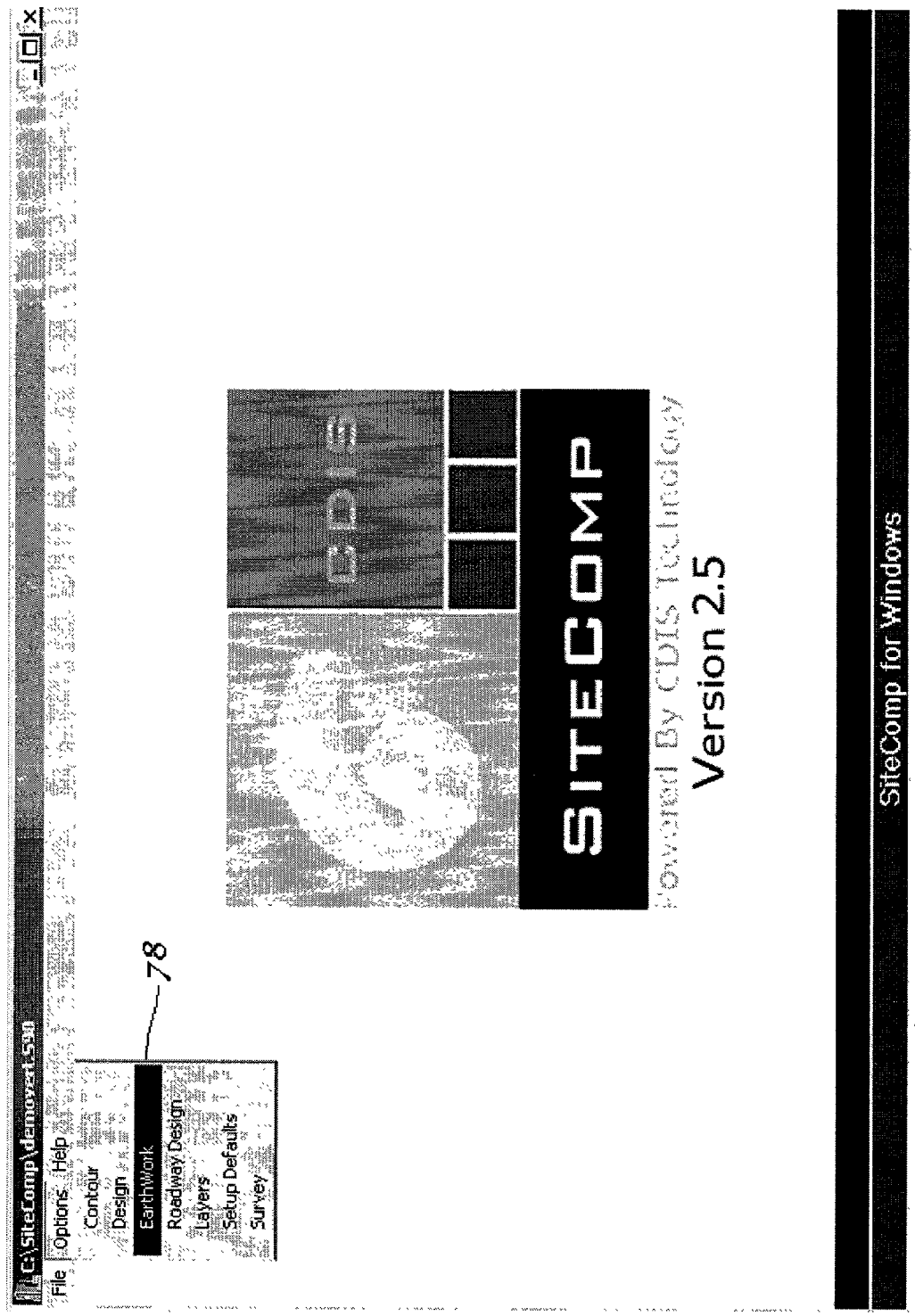
FIG. 63 shows a step to earthwork.
Figure 64:
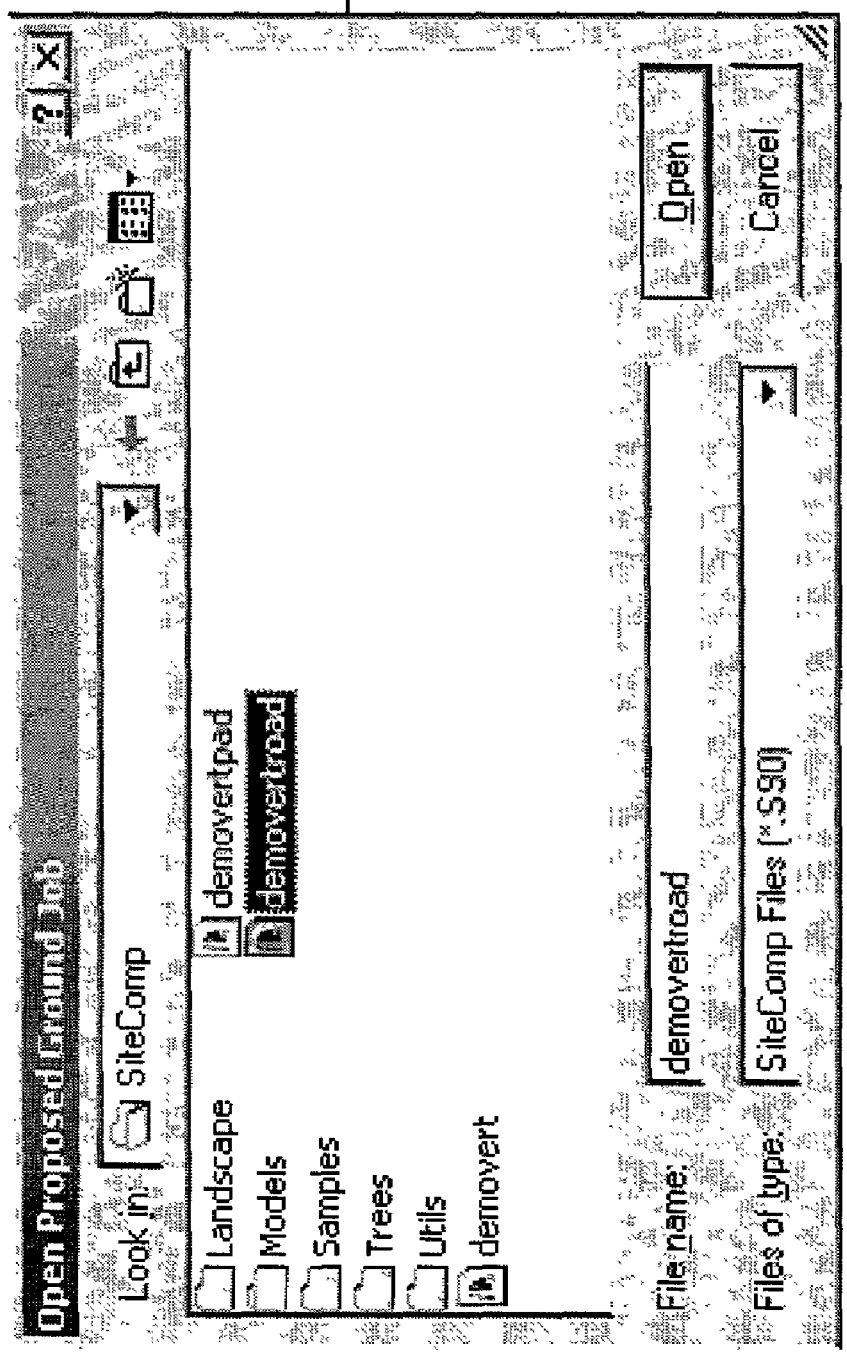
FIG. 64 is a pop-up entitled "Open Proposed Ground Job"
Figure 65:
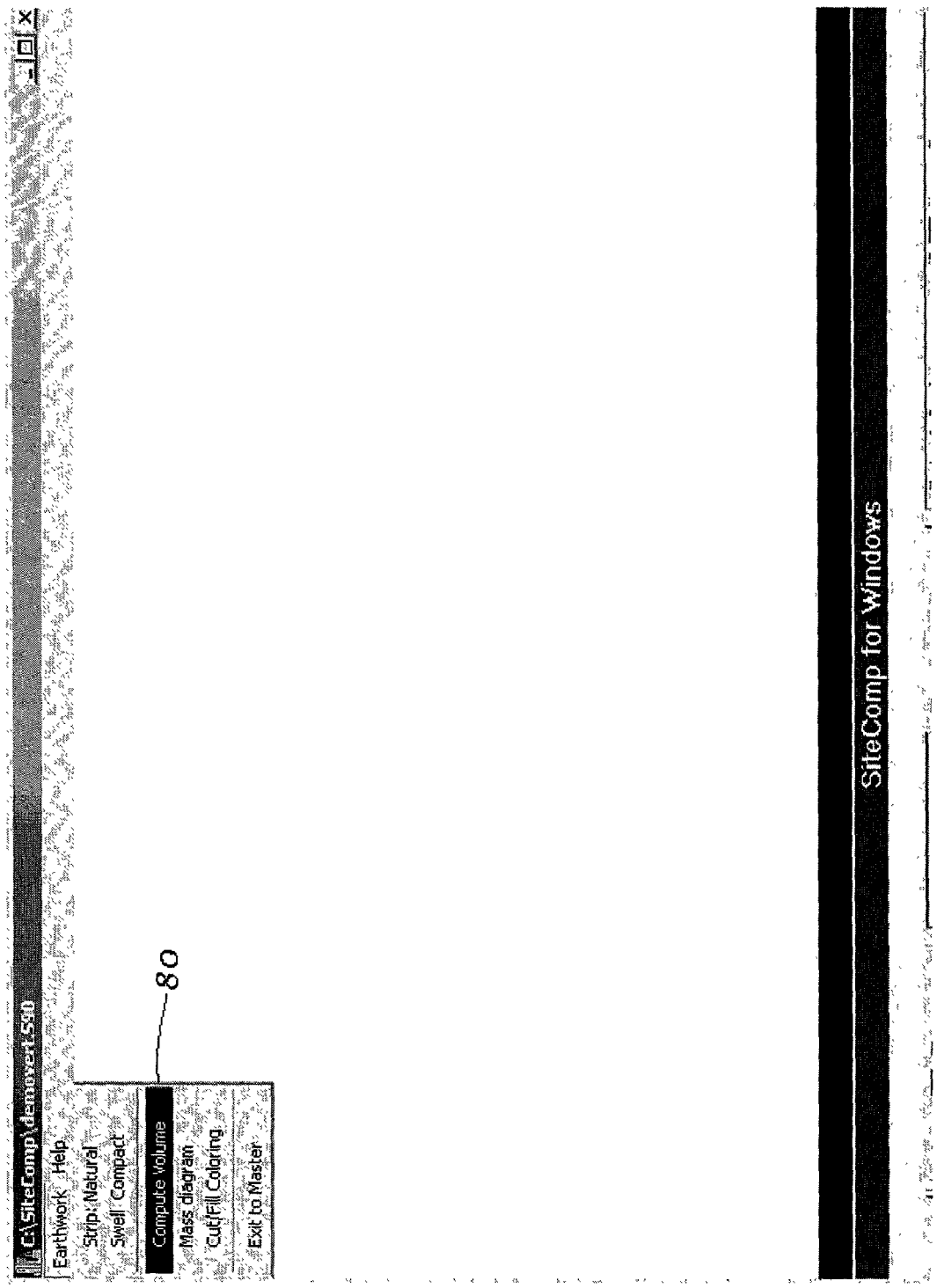
FIG. 65 shows a step to computing earth work volume.
Figure 66:
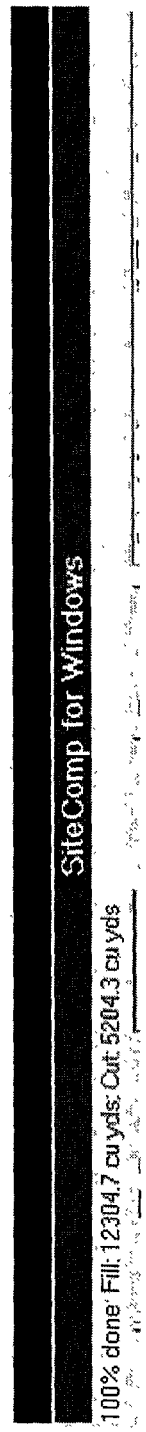
FIG. 66 reveals volumes of certain earth work.

CDIS includes a site surface earthwork system. The following utilizes an actual job of development. The file contains natural ground and proposed ground. In the "main Menu", one may select "Options" and "Earthwork" 78 in FIG. 63. A file entry pop-up appears, within which one may select "demovert.S90" and press "Open", resulting in another pop-up 79 entitled "Open Proposed Ground Job", shown in FIG. 64. From this pop-up 79, one may select demovertroad.S90 and an earthwork menu appears. "Earthwork" and "Compute Volume" 80 may be selected as in FIG. 65. The result is a display 81 about volumes as in FIG. 66. CDIS quickly calculates the surfaces twice, one way and the other way by reversing the natural and proposed surfaces to make sure that there are no significant internal errors.

Figure 67:
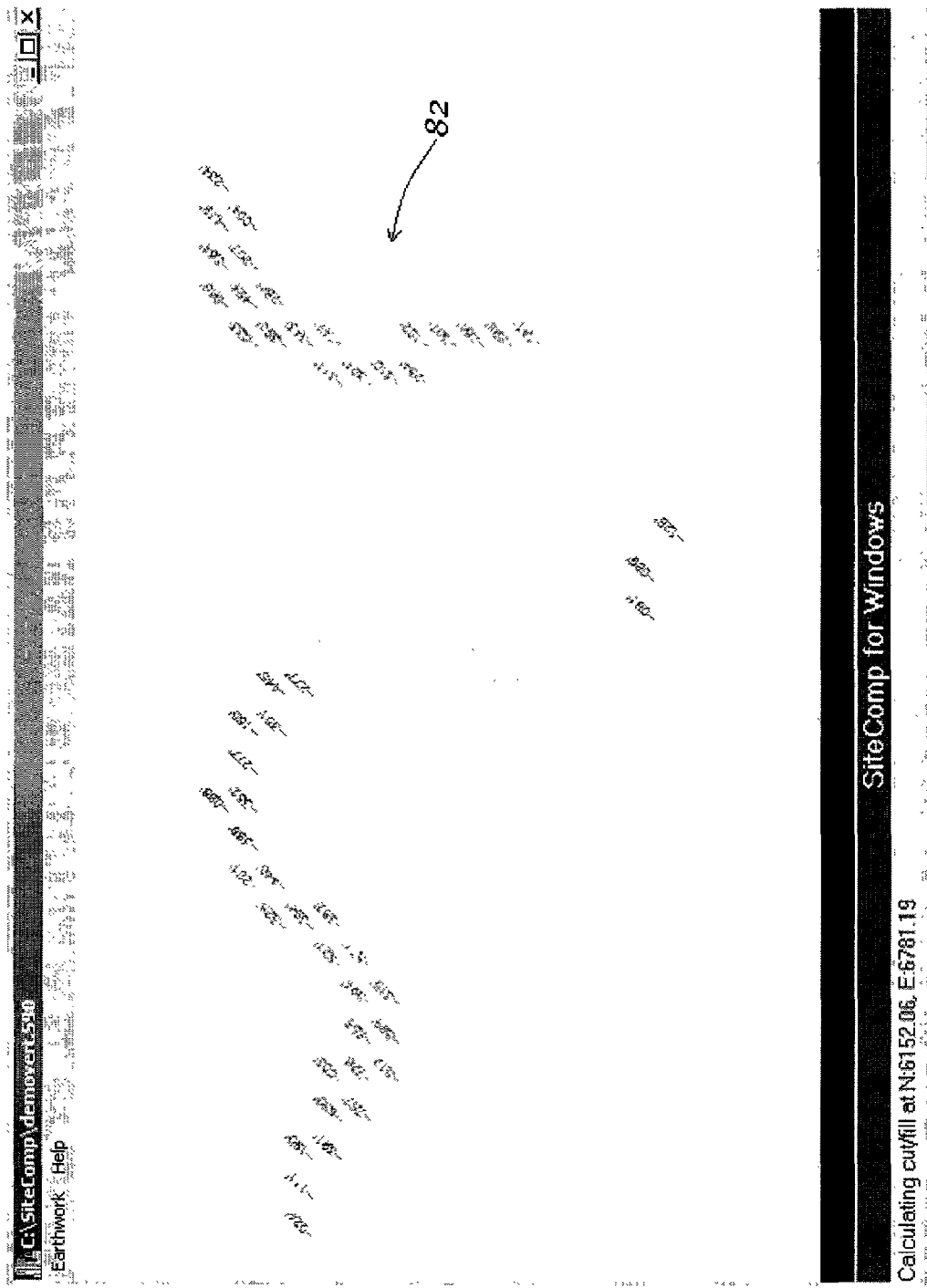
FIG. 67 shows cut and fill depths of a road.
Figure 68:
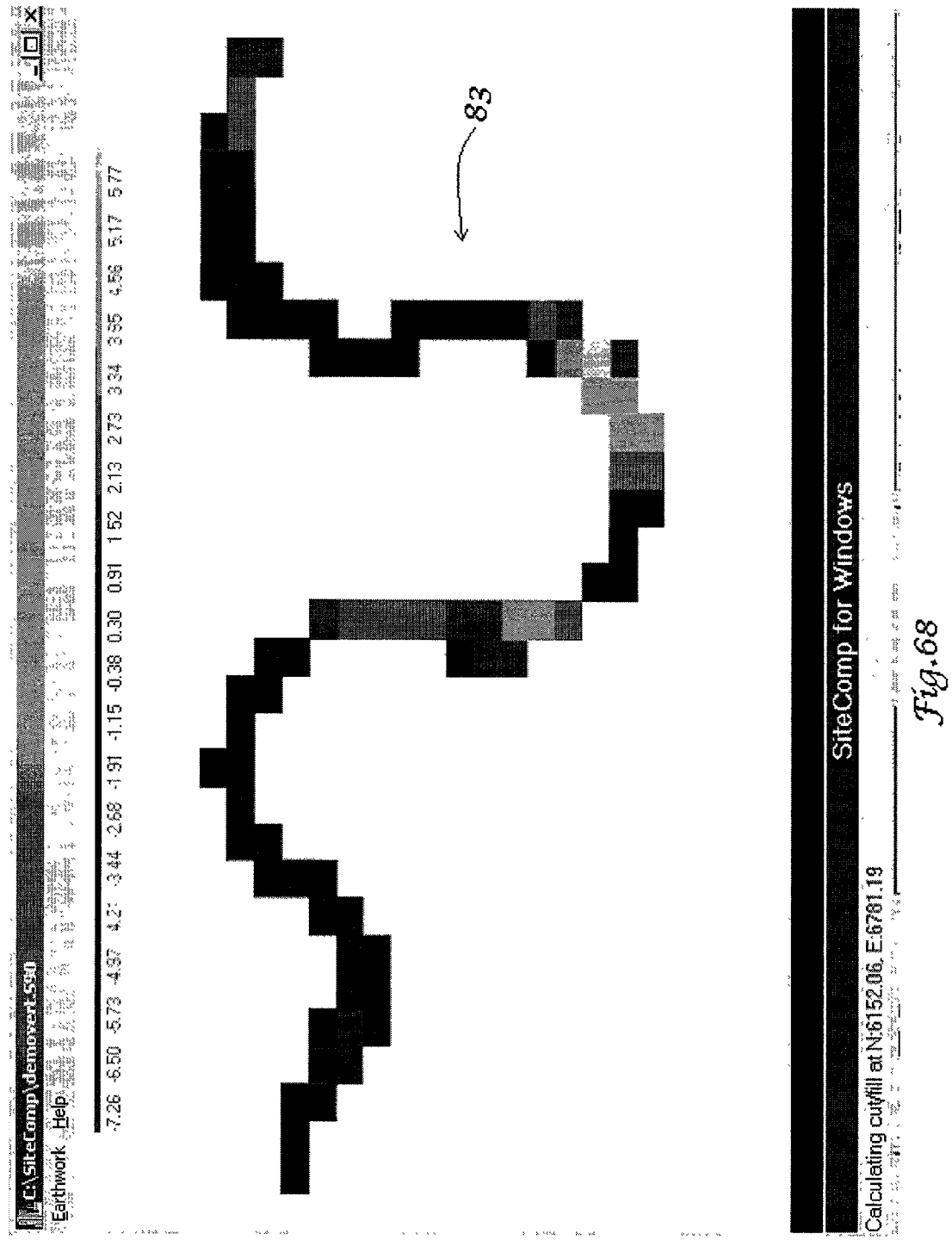
FIG. 68 uses shading to represent the information in FIG. 67.

One may select "Earthwork" and "Mass diagram" with the result 82 in FIG. 67 which shows cut depths of a road in darker print "−" numbers and fill depths in lighter "non −" numbers indicating feet. In a color version, the green numbers are fill and the red numbers are cut. Next, one may select "Earthwork" and "Cut/Fill Coloring" resulting in a display 83 in FIG. 68 using shading to represent the information 82 in FIG. 67. In color, a shade of green represents a fill and a shade of red represents a cut with the scale for those shades at the top corresponding to the depths of fill or cut. CDIS drawings are geometry. Because of this, they contain all required information and yet are transferable to and from other related-art packages.

Figure 69:
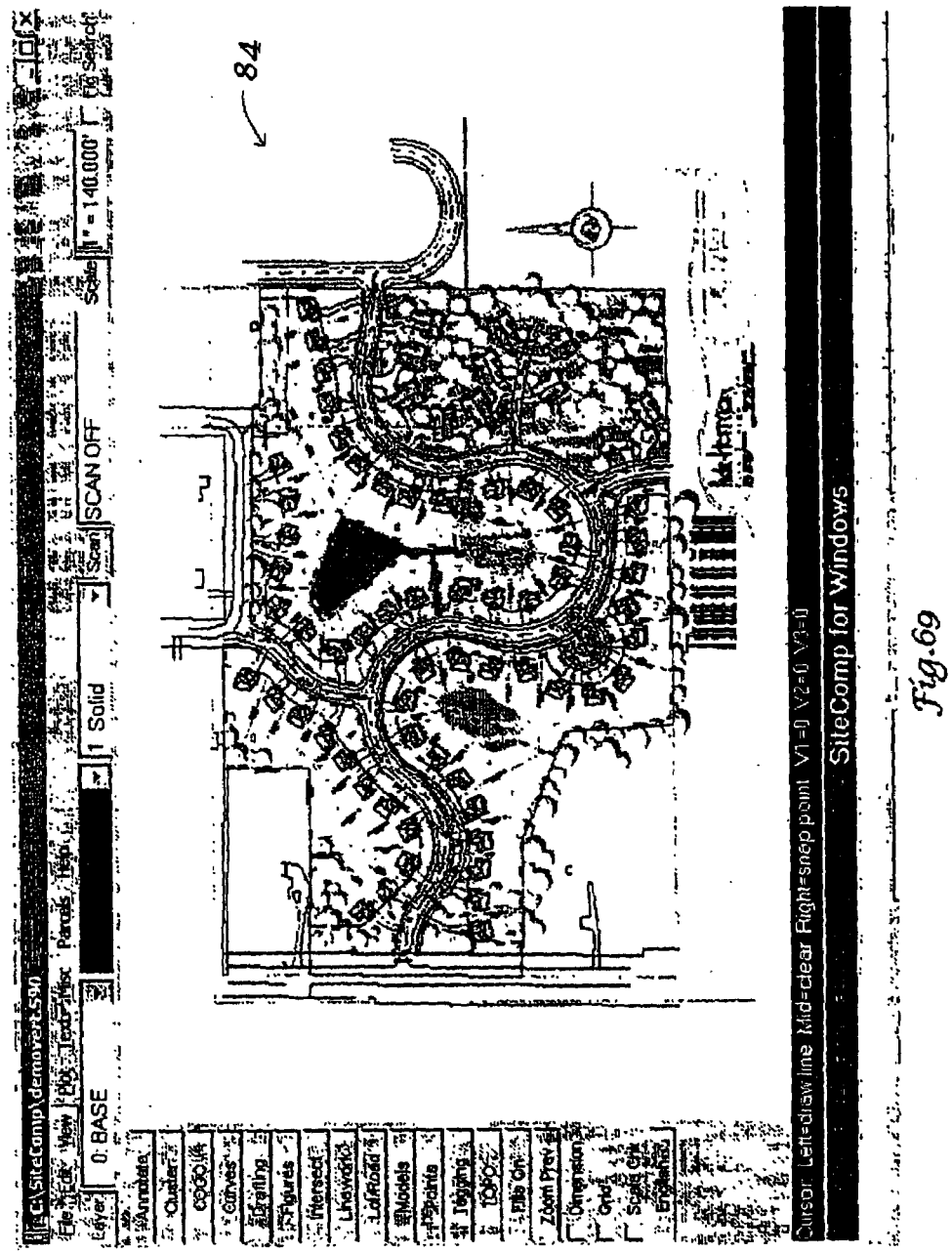
FIG. 69 shows a return to a housing area drawing.

CDIS has powerful capability in that it can find, calculate and determine areas with its parceling features. One may go to the "File" button of the "main Menu", select "Open", double click on "demovert" and get the area 84 shown in FIG. 69. Even though not apparent in this description, the various areas of FIG. 69 and other figures in CDIS are of different colors to provide a life-like look to the displayed diagrams.

Figure 70:
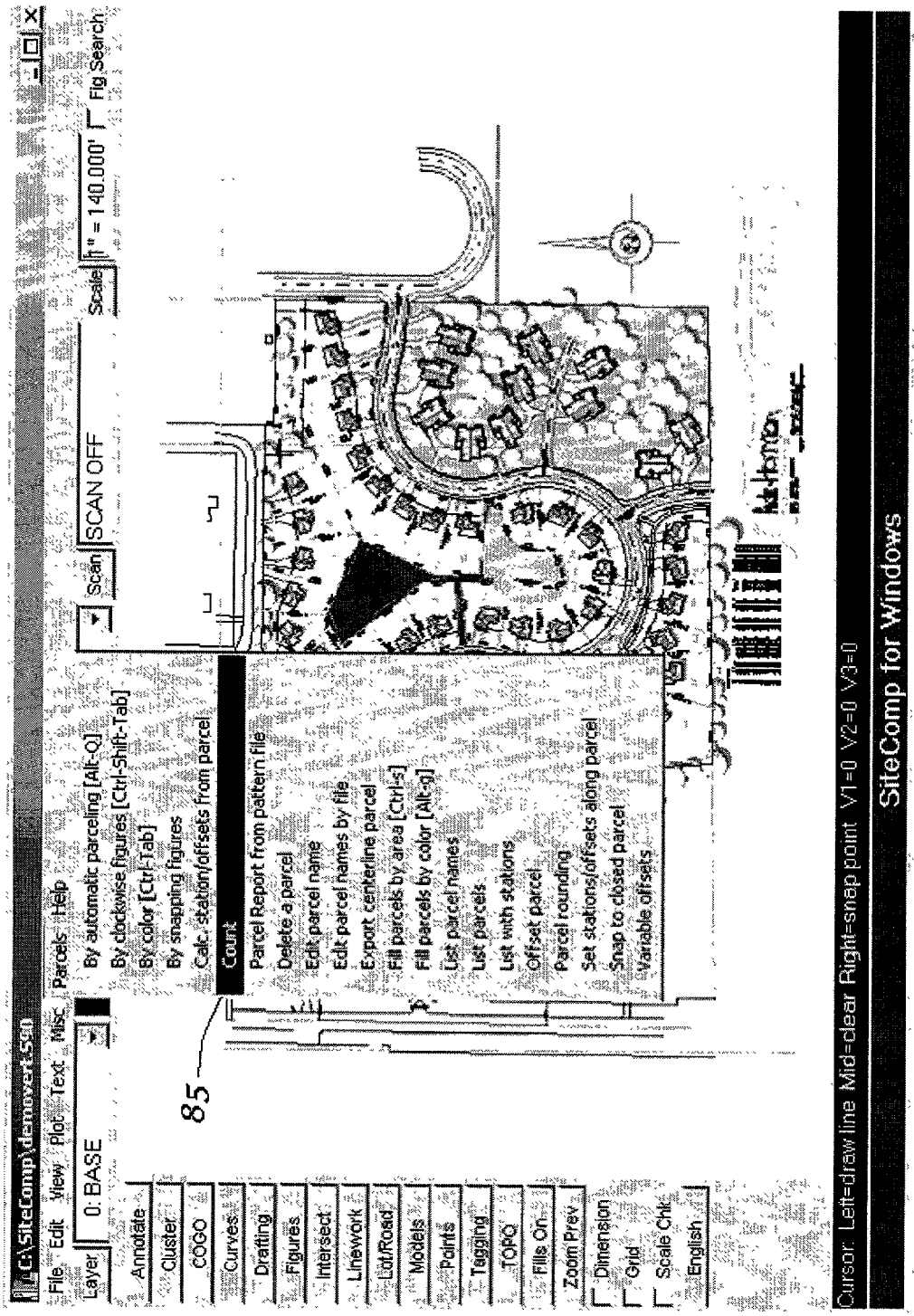
FIG. 70 shows a step leading to a count of the parcels.
Figure 71:
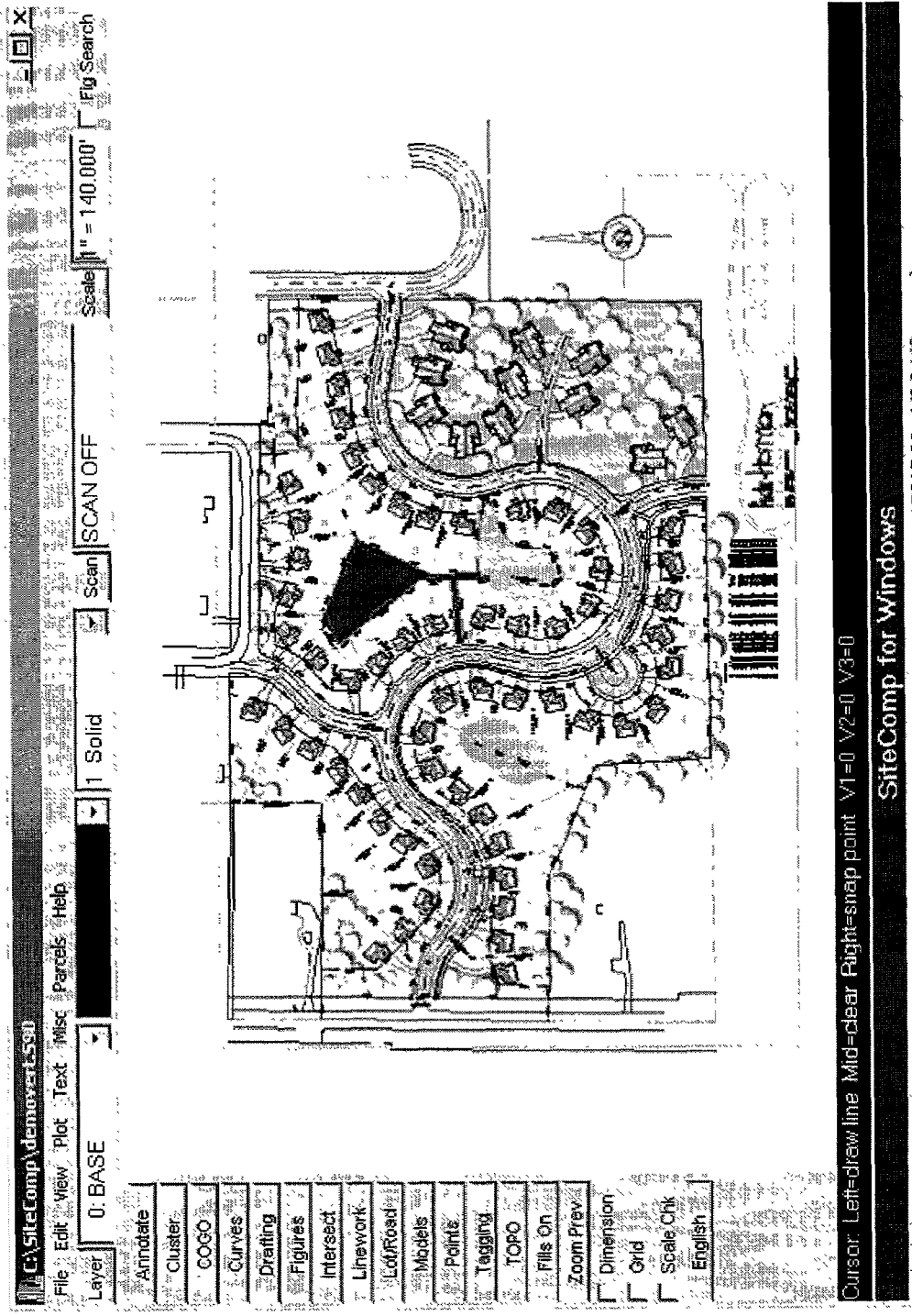
FIG. 71 has a bottom line with a parcel count and area information.

"Parcels" and "Count" 85 may be selected from the top menu bar as indicated in FIG. 70. A cursor line prompt states, "Enter name to search for on parcel list [press ENTER for all]". In other words, this prompt is asking which parcels one would like to count. One may type in "lot" into the input line in response to the prompt and press "Enter". The result is given in the bottom output line 28, as shown in FIG. 71. That line indicates 57 parcels found, 57 closed with a total area of 19.6515 acres and a parcel having an average area of 0.3448 acre. This answer is not a database but actual raw calculations of each lot quickly.

Figure 72A:
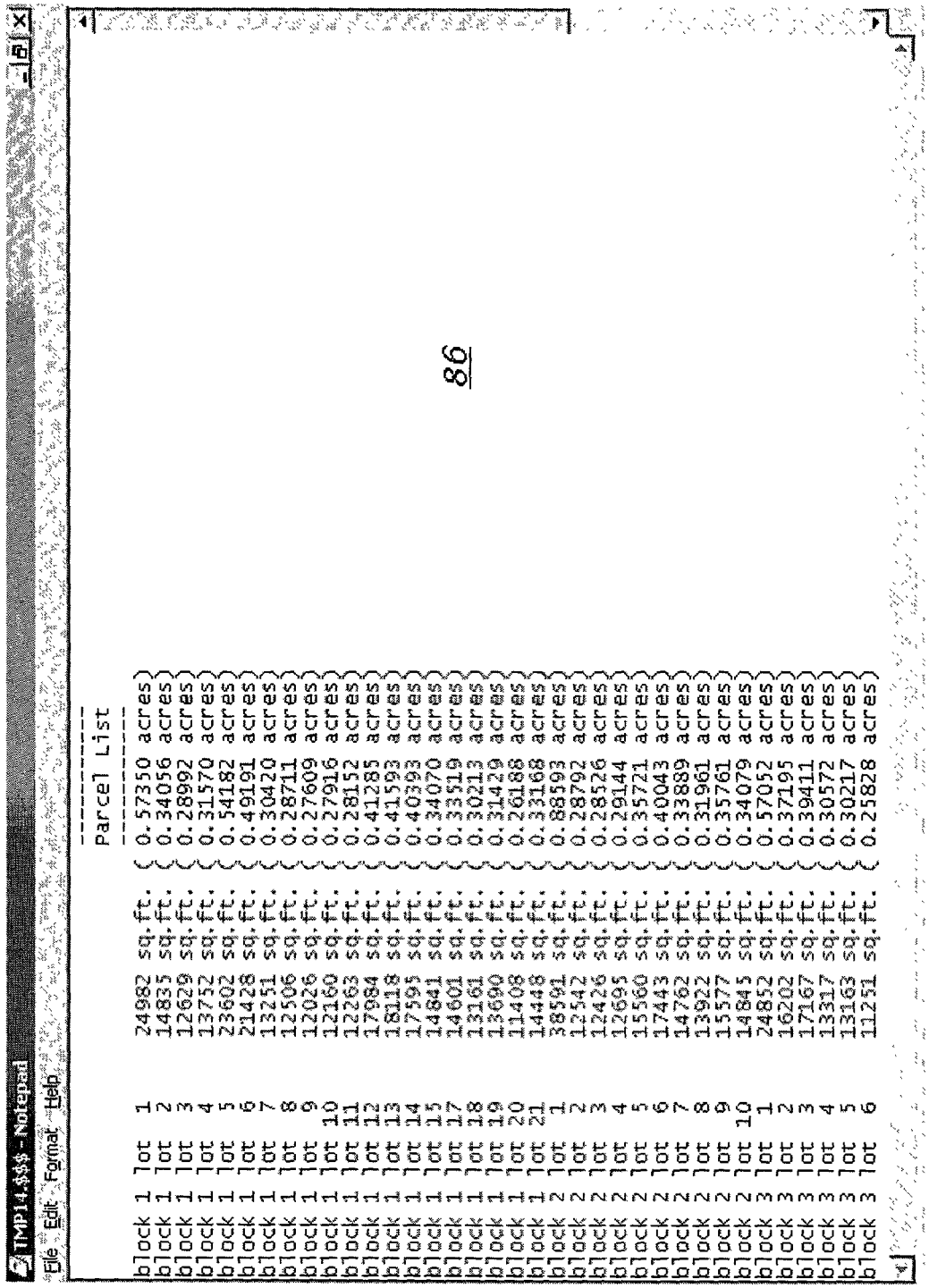

Parcels may be listed according to a particular type. One may select "Parcels" from the top menu bar and then select "List Parcel Names". The prompt then asks, "Enter name to search for on parcel list [press ENTER for all]", in other words, which parcels one may want to find. "lot" may be typed into the input line and the "Enter" button pressed. The result is a list 86 of all the parcels, with their designations and areas, as shown in FIGS. 72a and 72b. The last line in FIG. 72a is repeated at the top of FIG. 72b.

Figure 73:
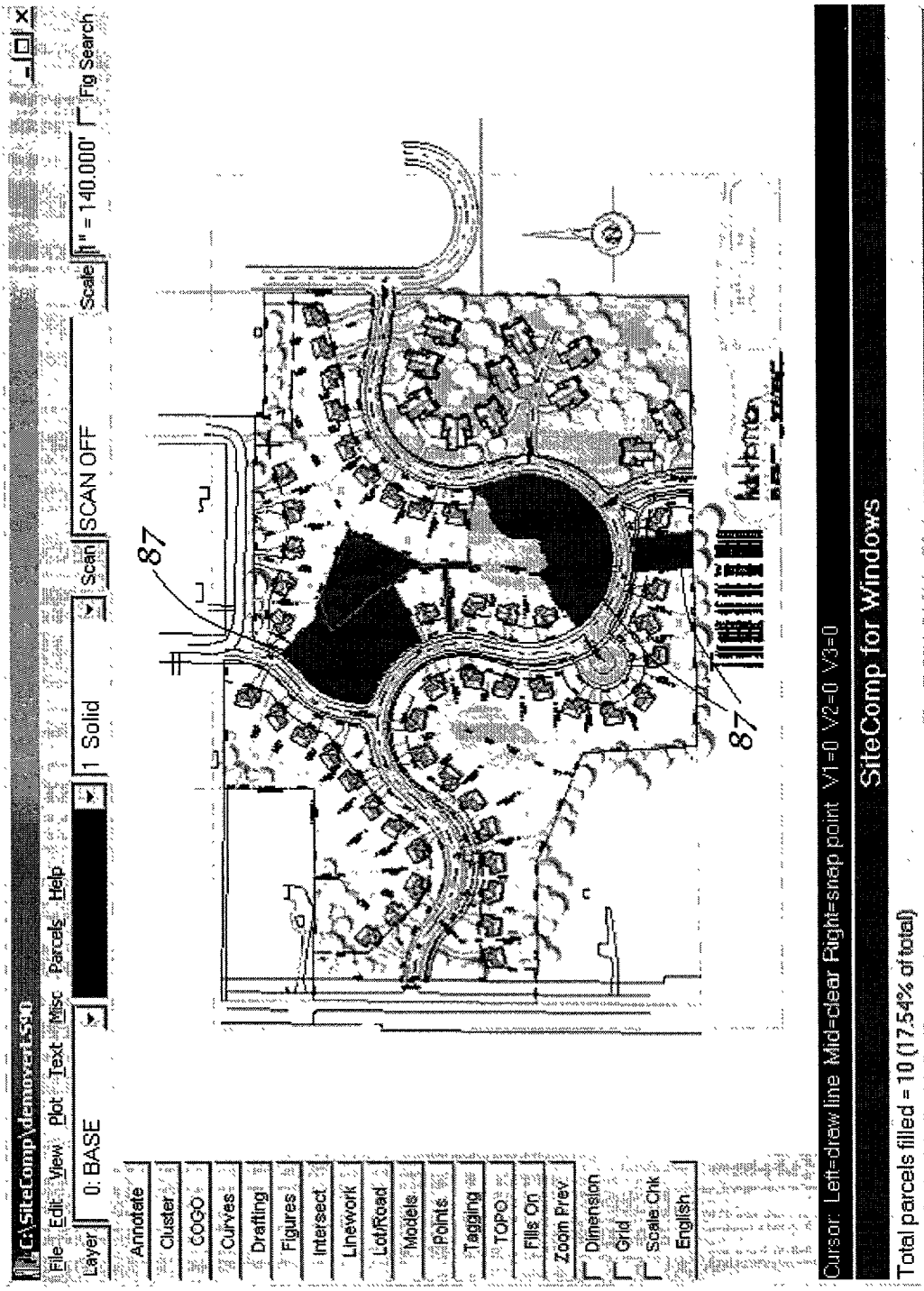
FIG. 73 is a view of a housing area that has lots below a certain size as shaded or filled in with a distinguishing color or shading with the number of them noted in the bottom line.
Figure 74:
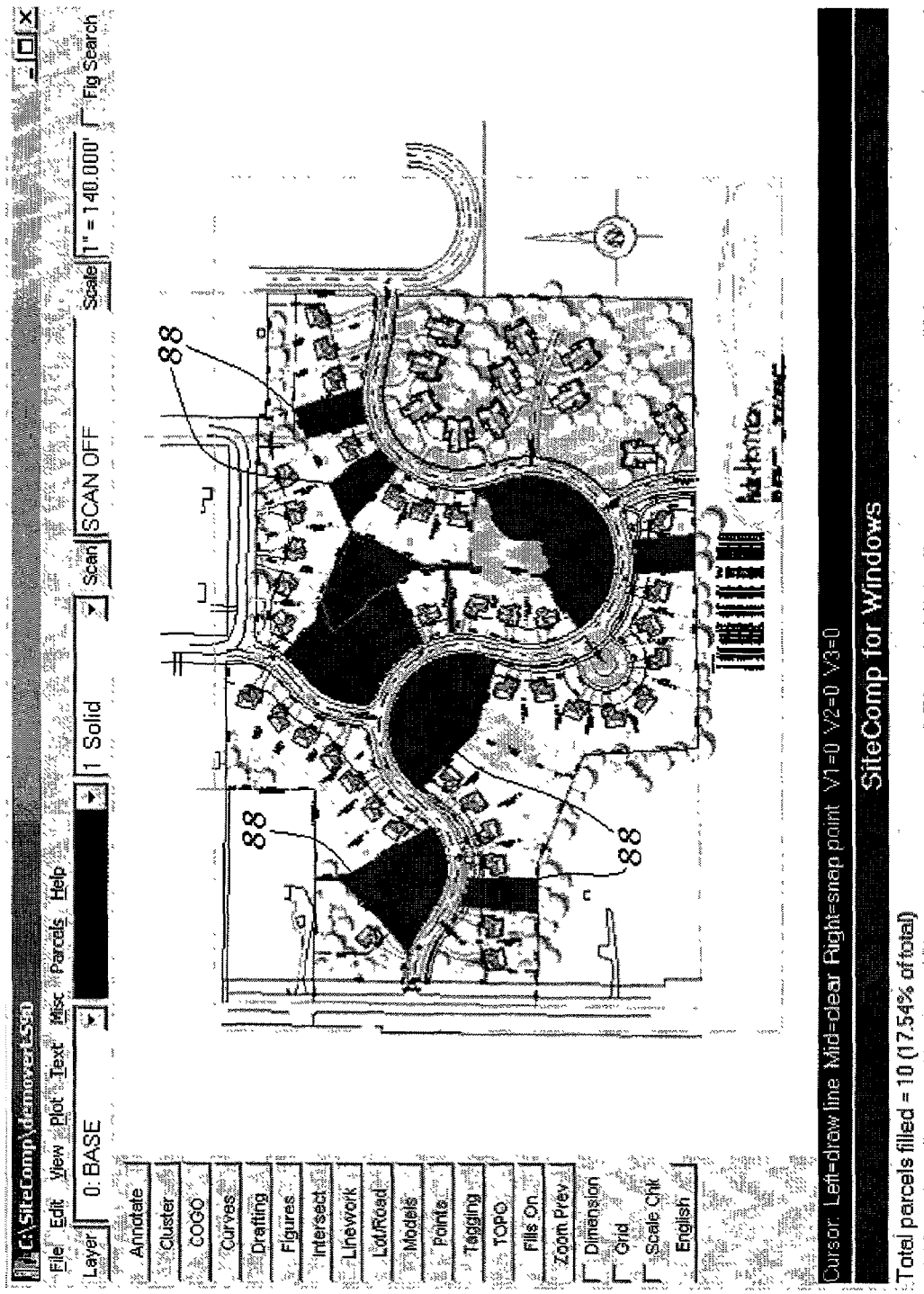
FIG. 74 is like FIG. 73 except lots of another size are also shaded or filled in with a distinguishing color or shading.

One may find parcels within a particular area range. One may select "Parcels" and then "Fill Parcels by Area" from the top menu. A prompt appears asking, "Enter parcel name (or common characters) [press ENTER for all]". One may type in "lot" and press "Enter". The next prompt asks, "Enter minimum, maximum range". "0,11999" may be typed into the input line and the "Enter" button pressed. CDIS filled the lots with shaded areas 87 having an area from 0 square feet to 11,999 square feet, under the assumption that 12,000 square feet are required for a legal lot, shown in FIG. 73. The output line indicates that the total number of parcels filled equals 10 (17.54 percent of the total). Next, one may want to look at parcels between 12,000 and 13,000 square feet. One may select "Parcels" and "Fill parcels by Area". The prompt asks for a name to which "lot" is typed in. "Enter " is pressed and a prompt requesting area range appears. "12000, 13000" is typed as an area range. The result 88 is shown by FIG. 74. CDIS calculates these results quickly without the use of "polylines" or true arcs.

Figure 75:
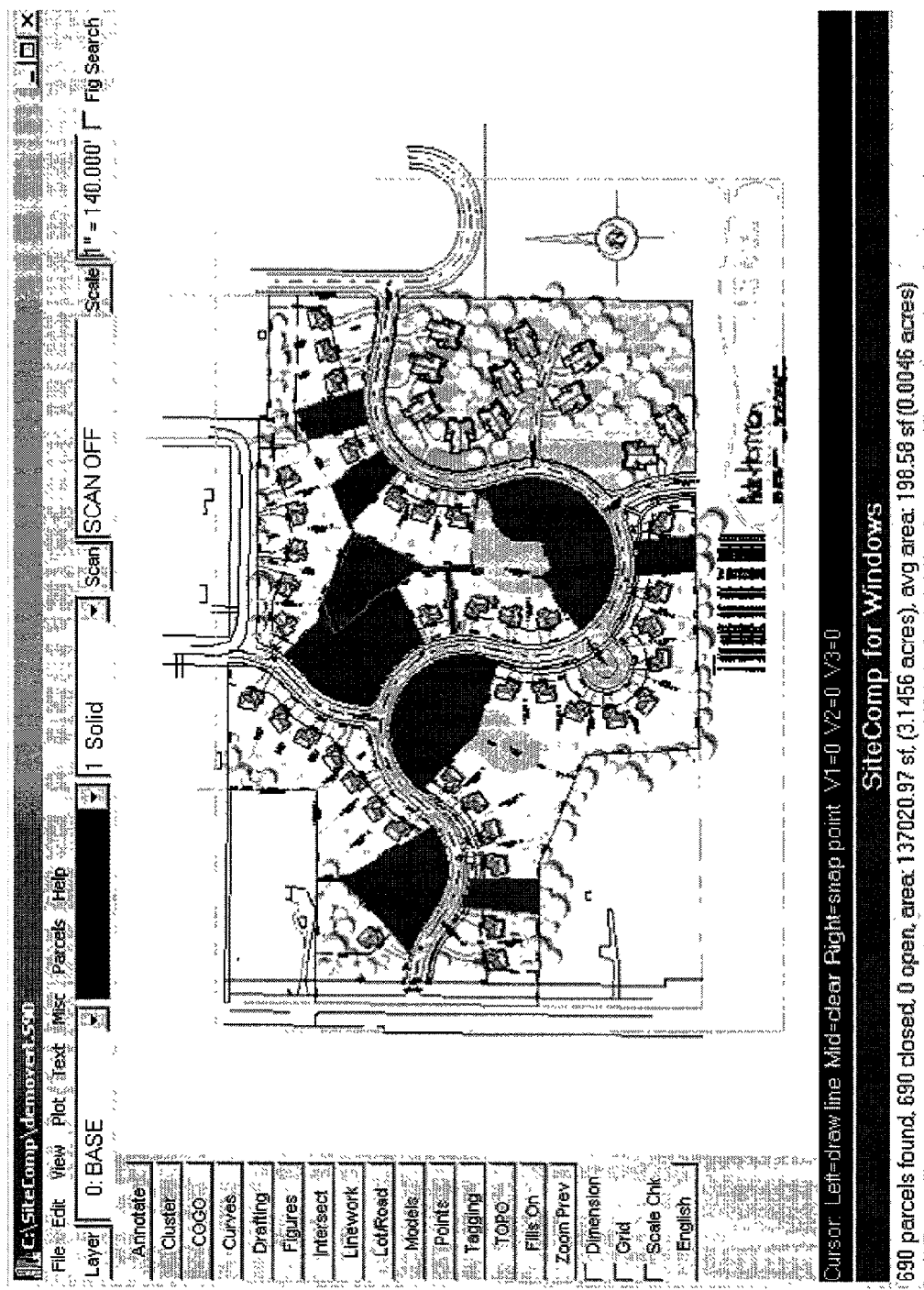
FIG. 75 provides the roof area of the housing represented in FIGS. 73 and 74, in the bottom line of the screen.
Figure 76:
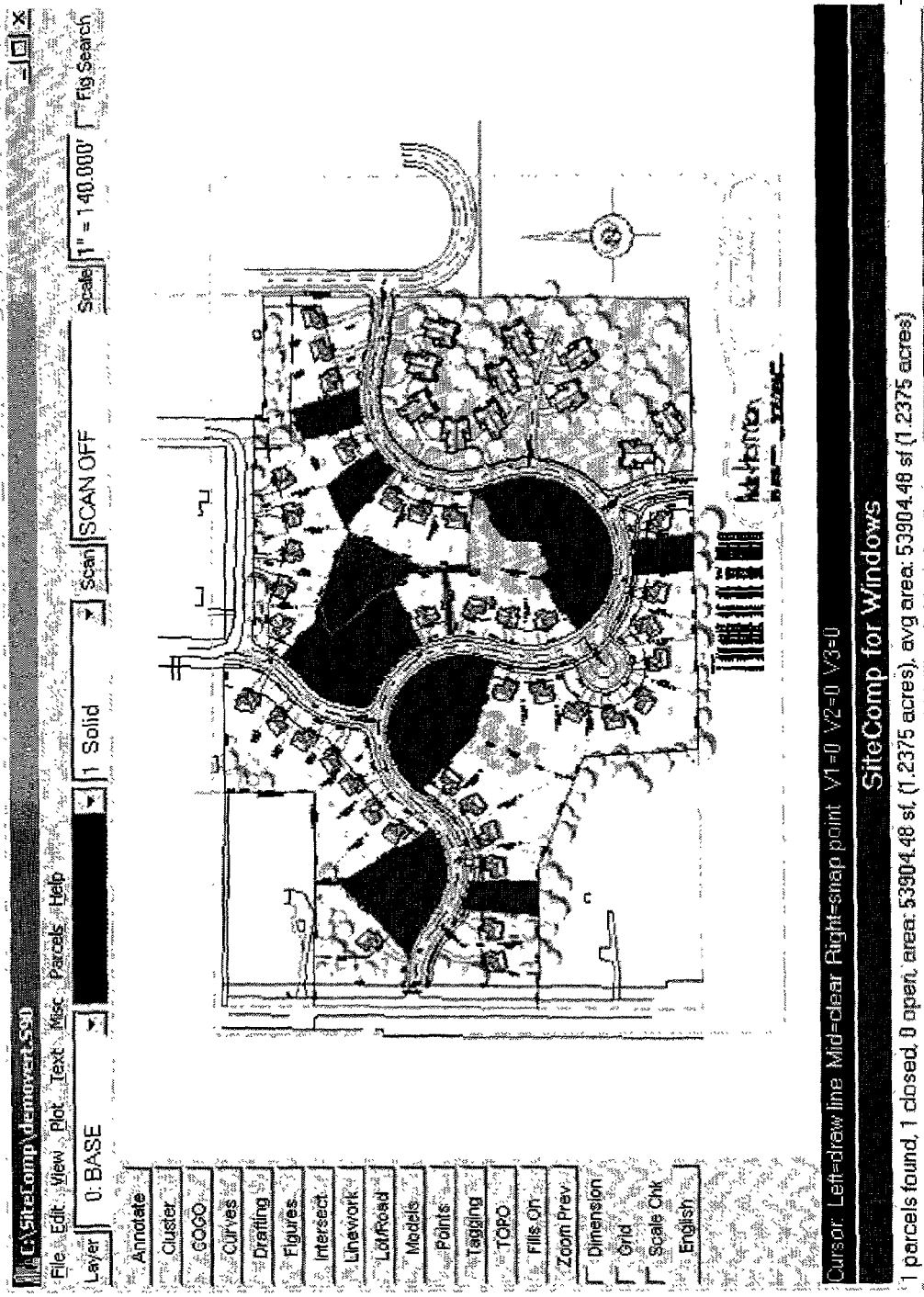
FIG. 76 indicates the amount of parking space in the bottom line of the screen for the housing area noted in FIGS. 73, 74 and 75.

Total roof area for runoff may be determined. One can do a parcel count on "roof". The result is in output line 28 of FIG. 75 with a total of 137,020.97 square feet or 3.1456 acres of roof area. One may also determine the amount of parking space in the same manner, that is, to do a parcel count of "park". The result is shown in output line 28 of FIG. 76 in the form of shading and a measure indicating 53,904.48 square feet of parking space.

Figure 77:
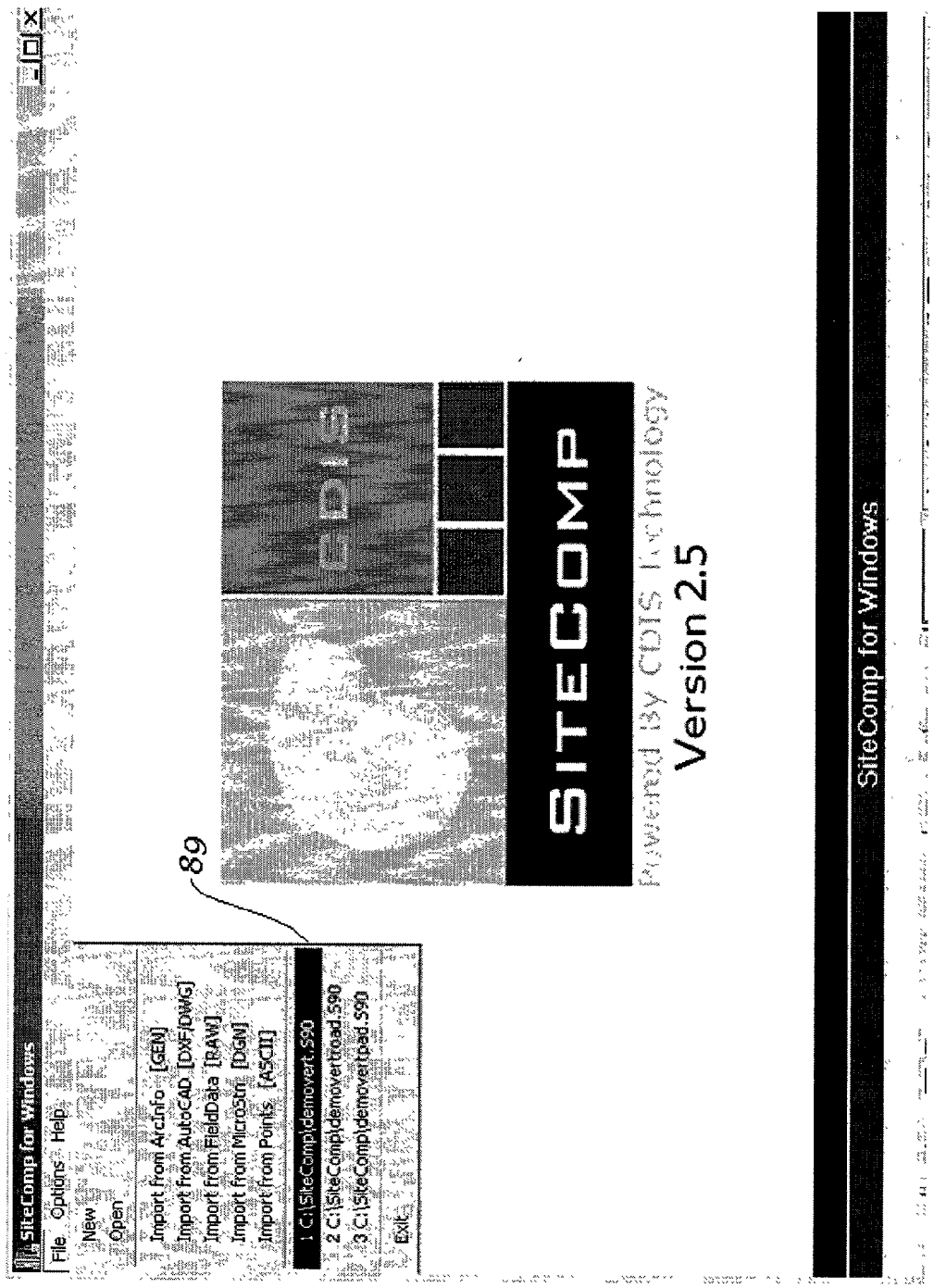
FIGS. 77 through 93 indicate a way to incremental numbering with automatic parceling.
Figure 78:
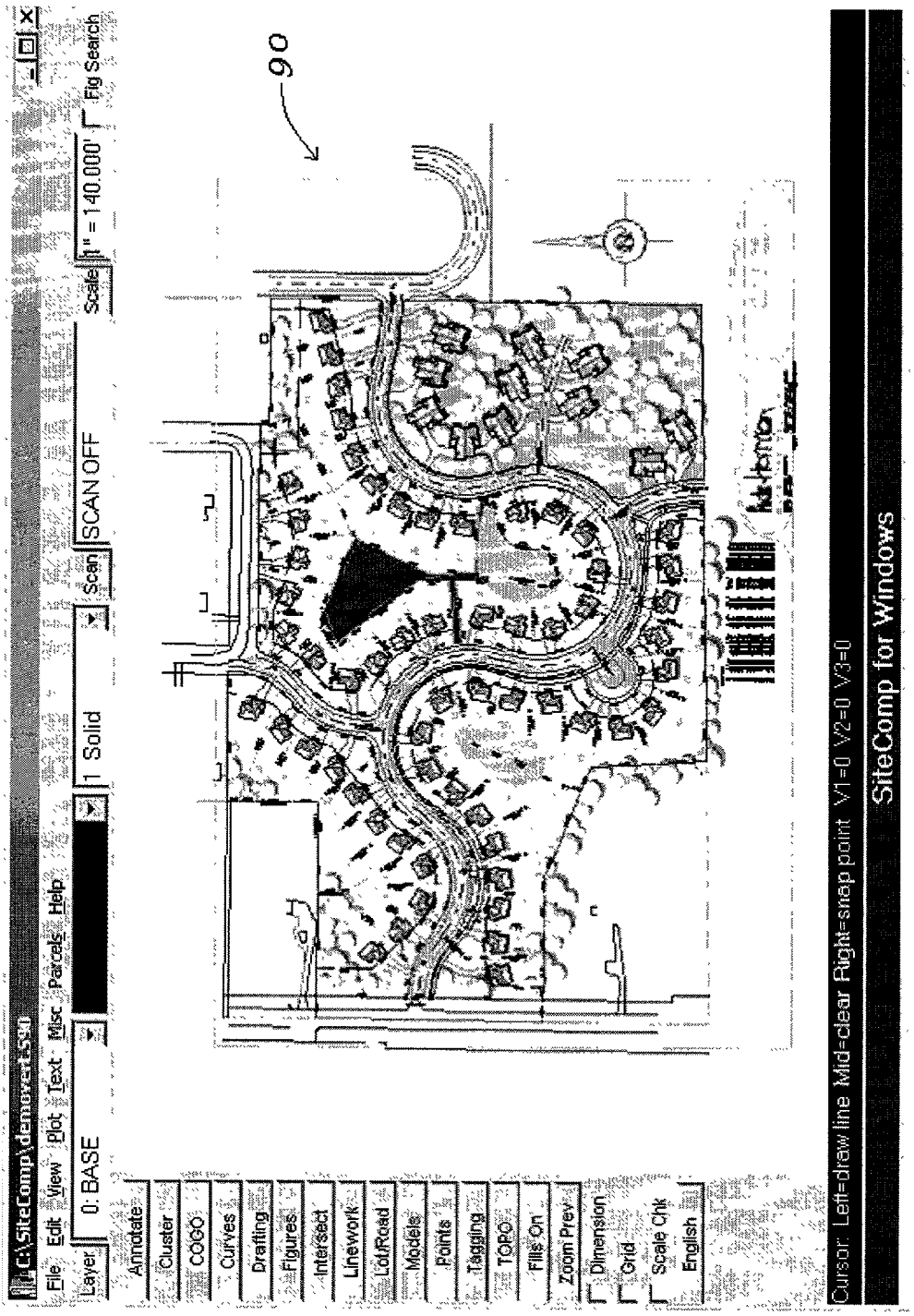
Figure 79:
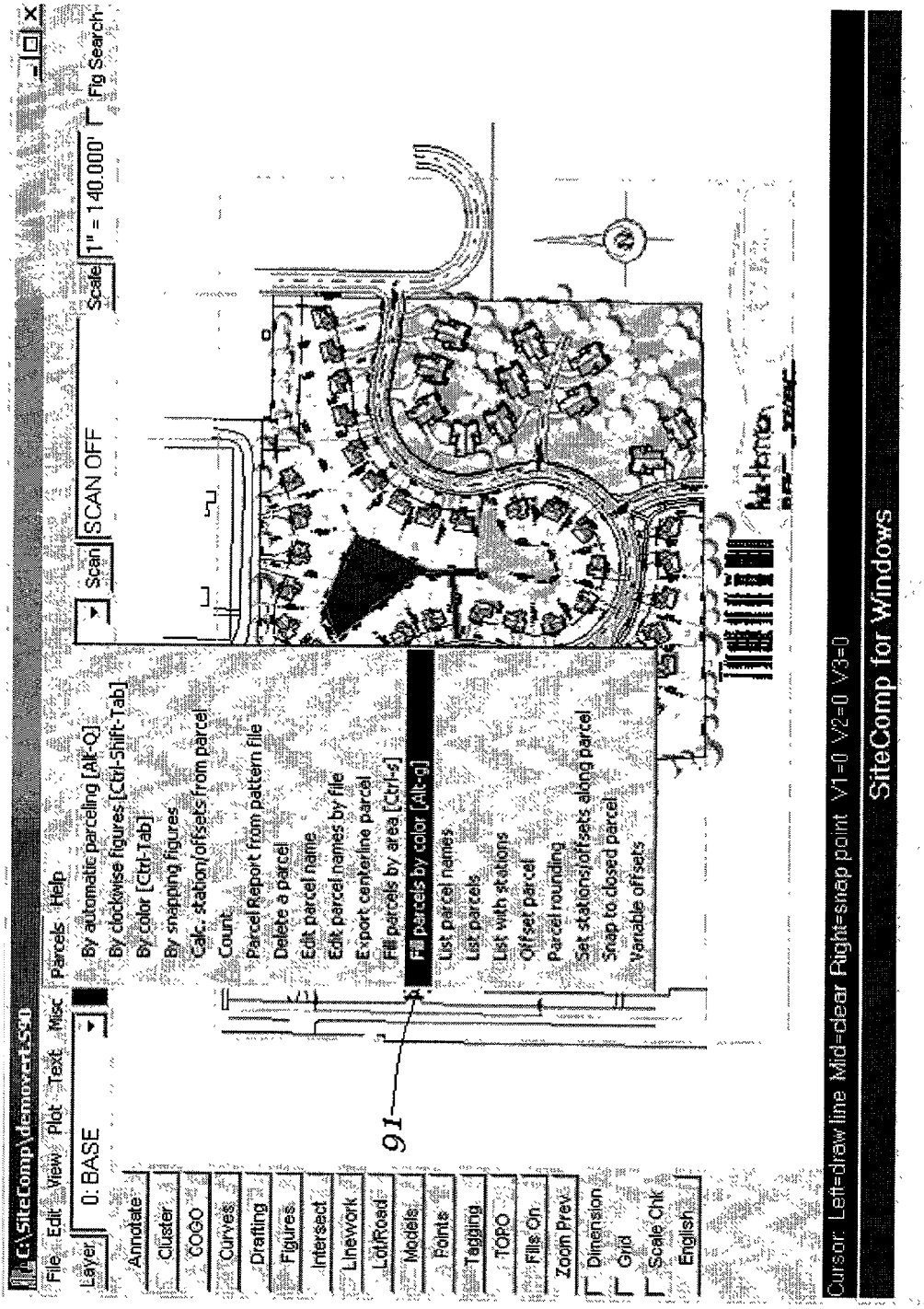
Figure 80:
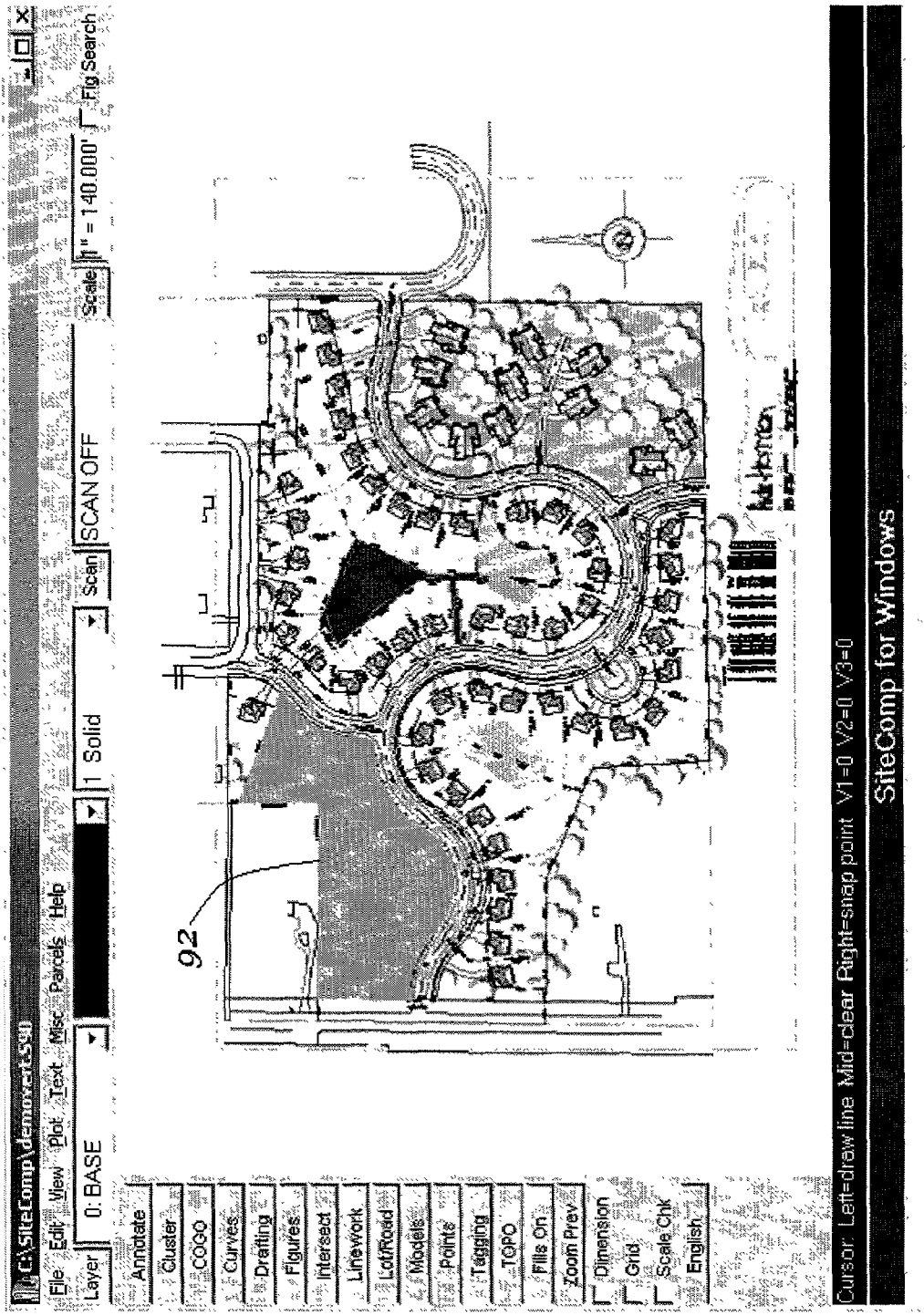
Figure 81:
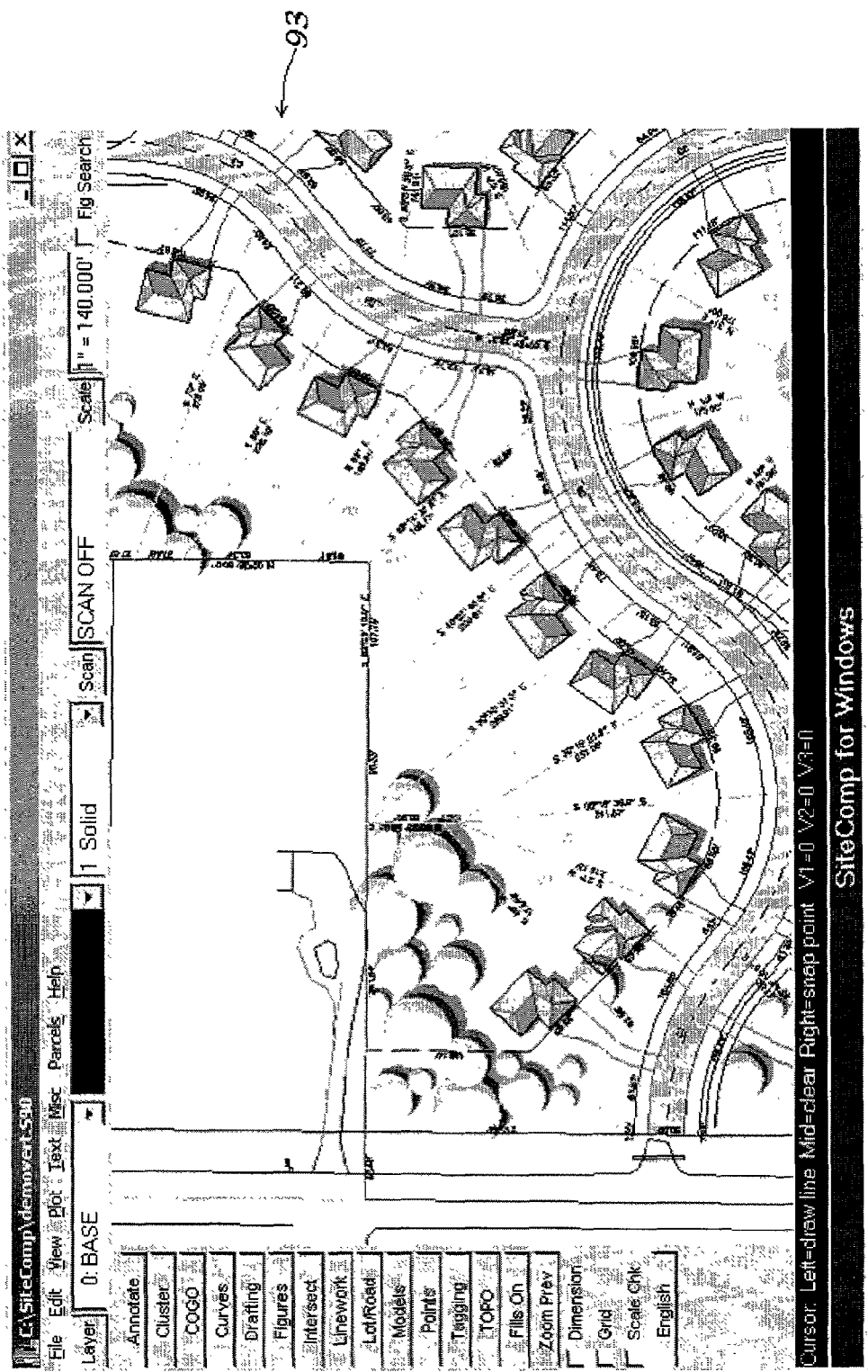

Incremental numbering with automatic parceling is a feature of CDIS, which enables the user to quickly label all of the lots on a site. One may go to the main menu and under "File" select "C:\SiteComp\demovert.S90" 89 as shown in FIG. 77 to load demovert which leads to a display or screen 90 in FIG. 78. Then one may select "Fill parcels by color [Alt-g]" 91, as in FIG. 79, to get a screen that has a prompt in the first line at the bottom which states "Enter parcel name (or common characters, or *=ALL), color ([Ctrl-n]=chart)". In the second line, which is blank, one may enter "block 2" and press "Enter". The area of block 2 is filled in with a color or shading 92, as in FIG. 80. One may press "z" on the keyboard for zoom and drag a box around the filled or shaded area using the left mouse button. As soon the left mouse button is released, the block 2 area will be zoomed into and the details of block 2 parcels appear with the shading removed. This result 93 is shown in FIG. 81.

Figure 82:
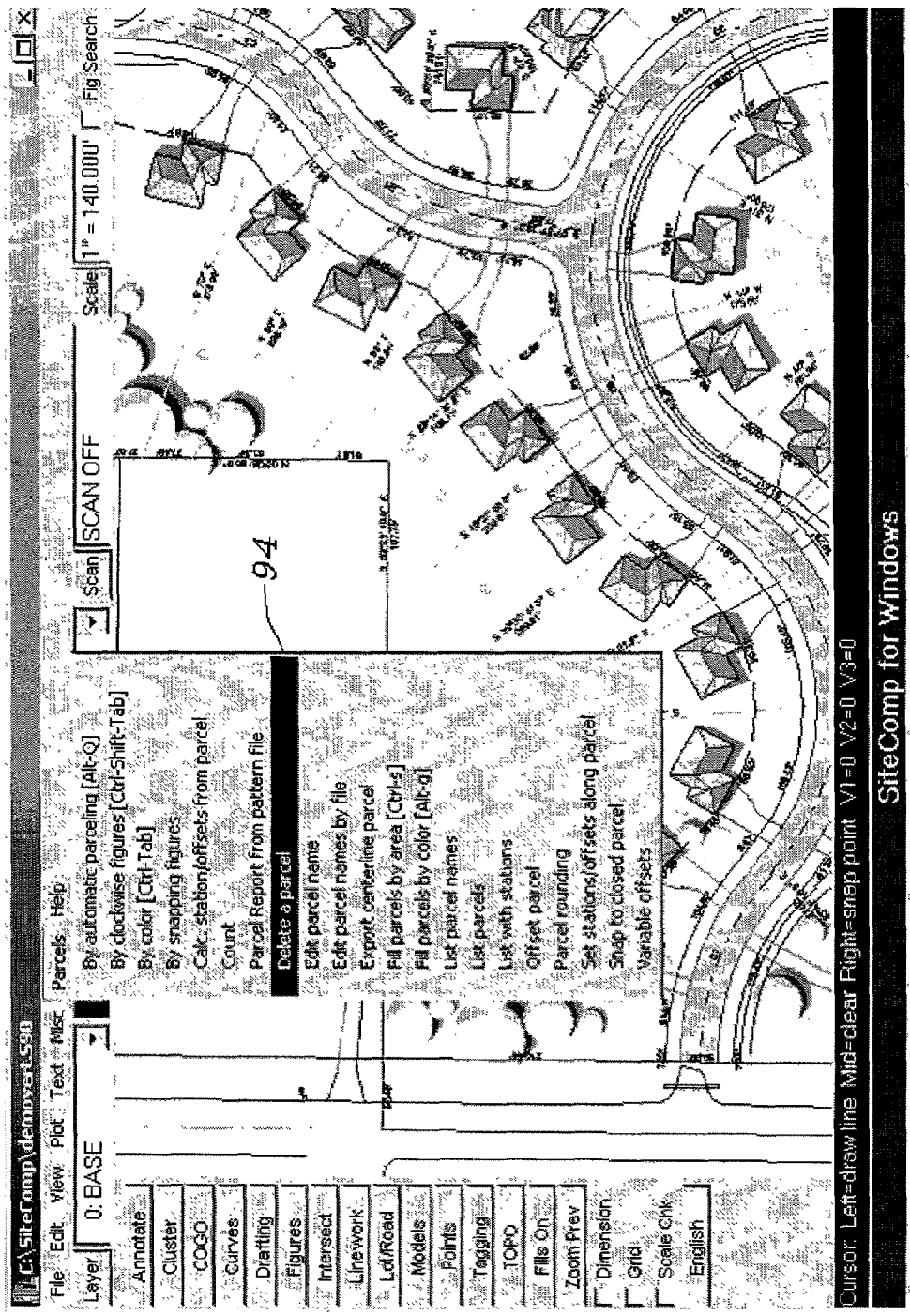
Figure 83:
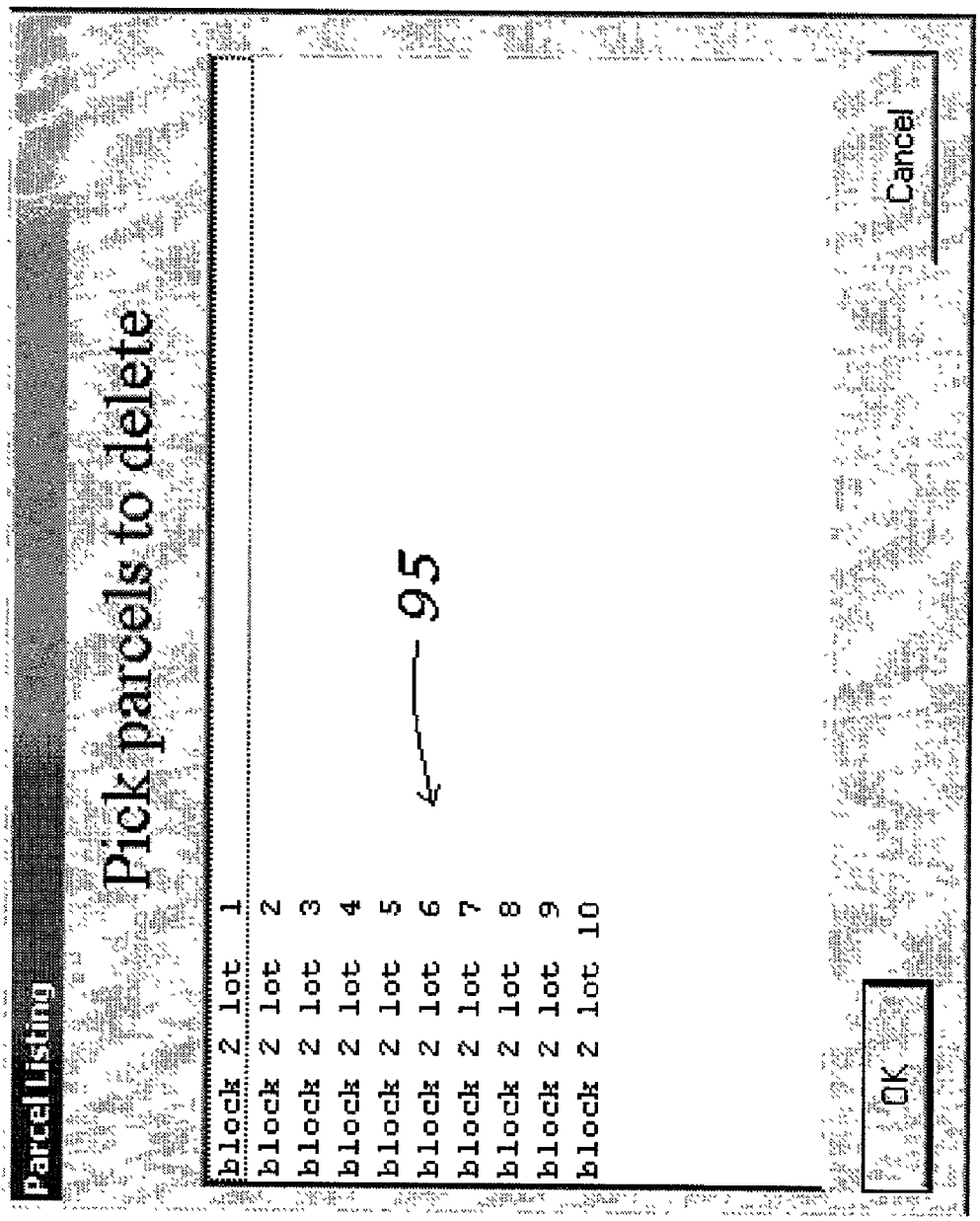
Figure 84:
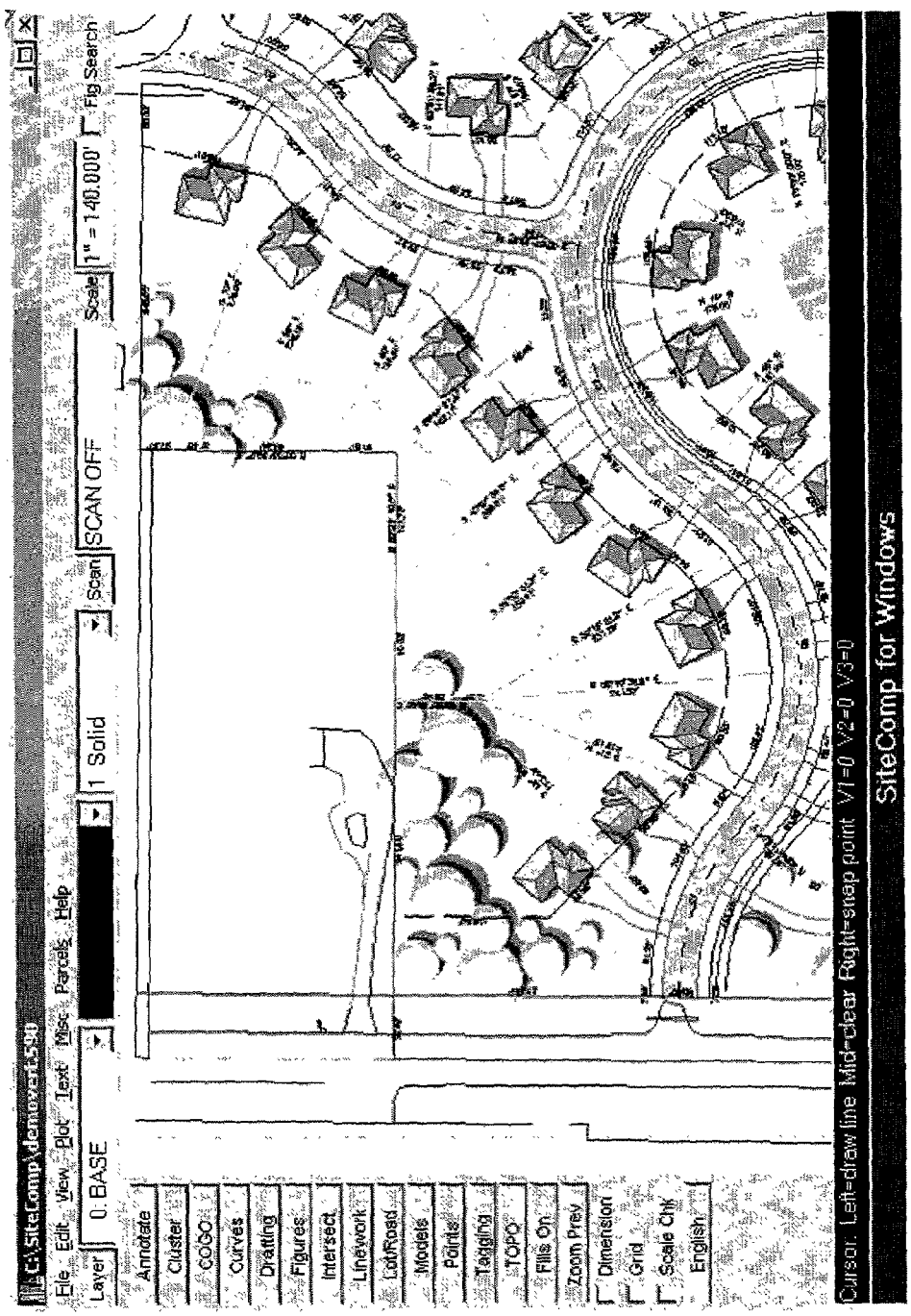

Block 2 may be deleted by selecting "Delete a parcel" 94 under "Parcels" as in FIG. 82. The prompt line below the drawing of block 2 says, "Enter parcel name to delete (Wildcards are OK, *=ALL)". In the next line down, enter "block 2*" and press "Enter". A box with a list 95 of names of block 2 parcels appears as in FIG. 83. One may select all of the parcels and delete them. To select and delete them, select the first parcel on the list and then hold down the "Shift" key, select the last parcel on the list and click on the "OK" button of the box. The output or result line 28 at the bottom in FIG. 84 states, "10 parcels deleted".

Figure 85:
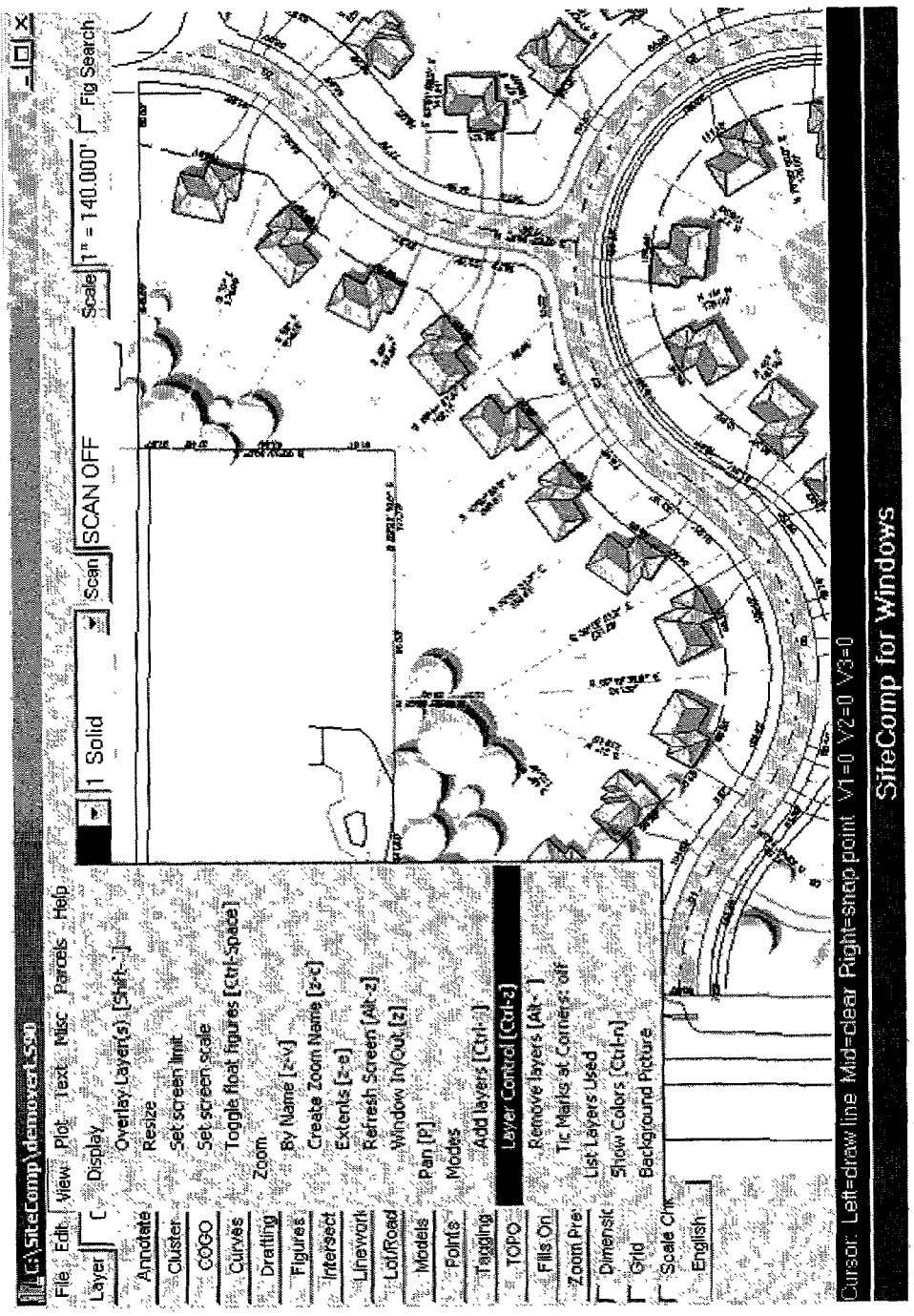
Figure 86:
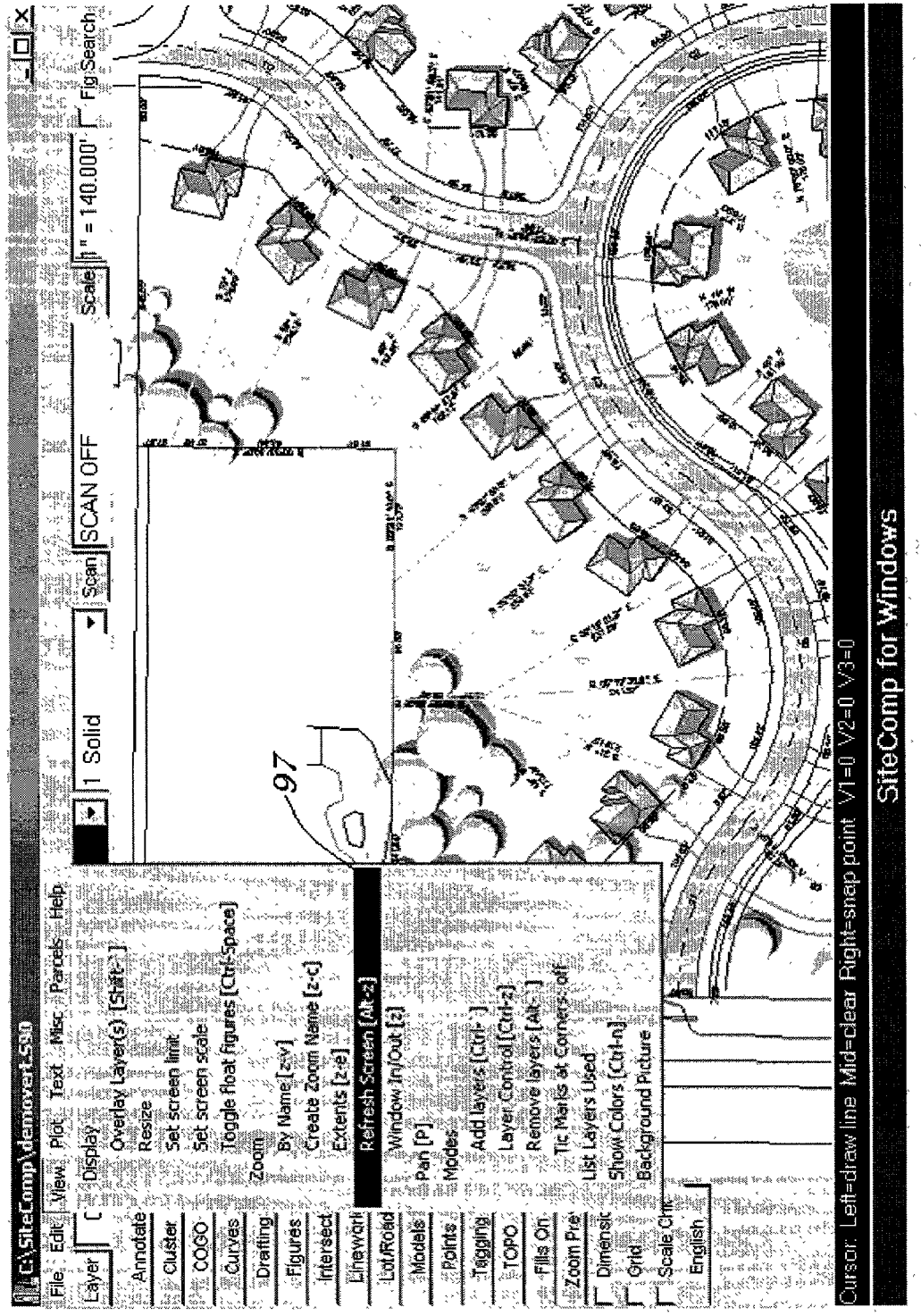
Figure 87:
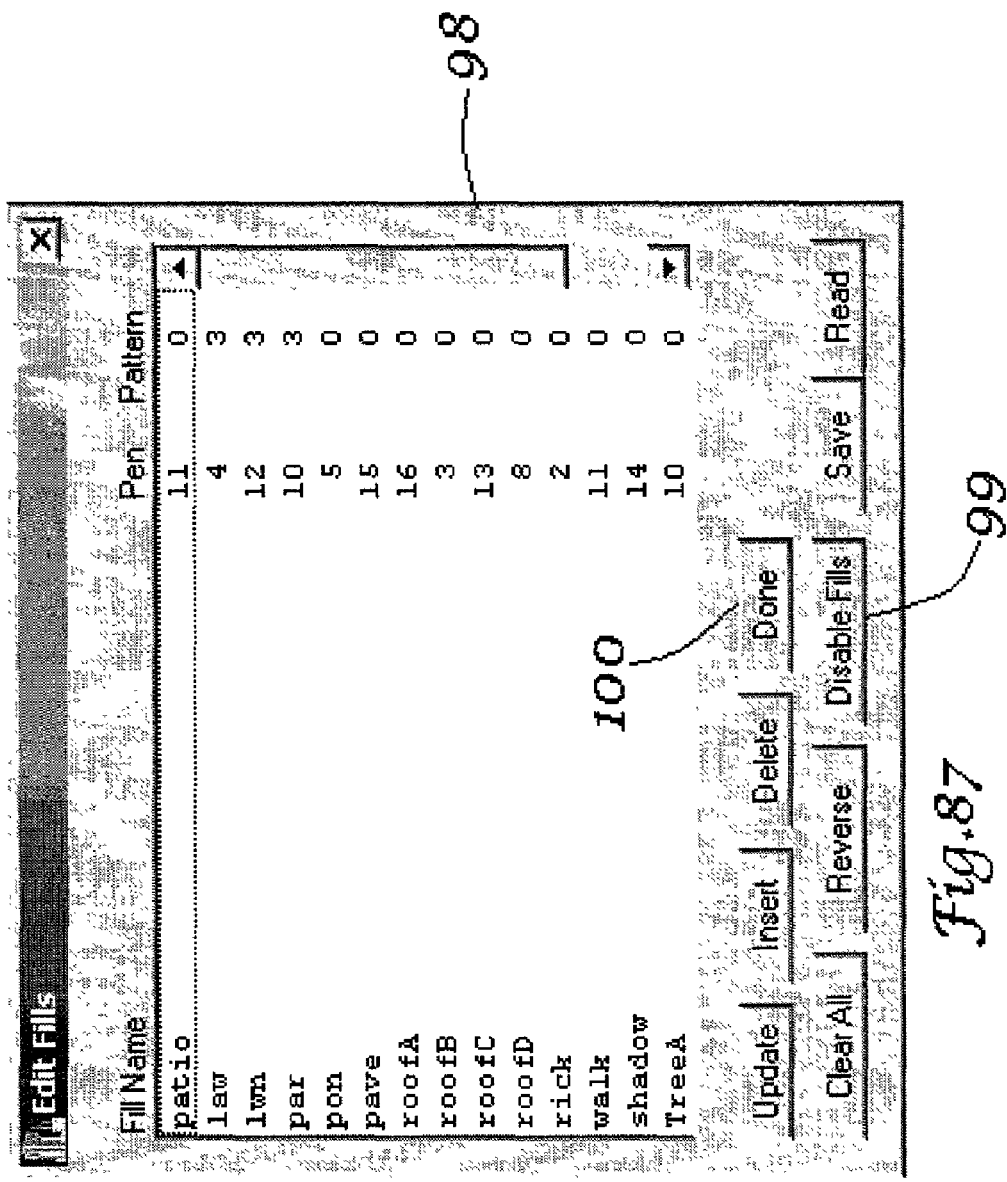
Figure 88:
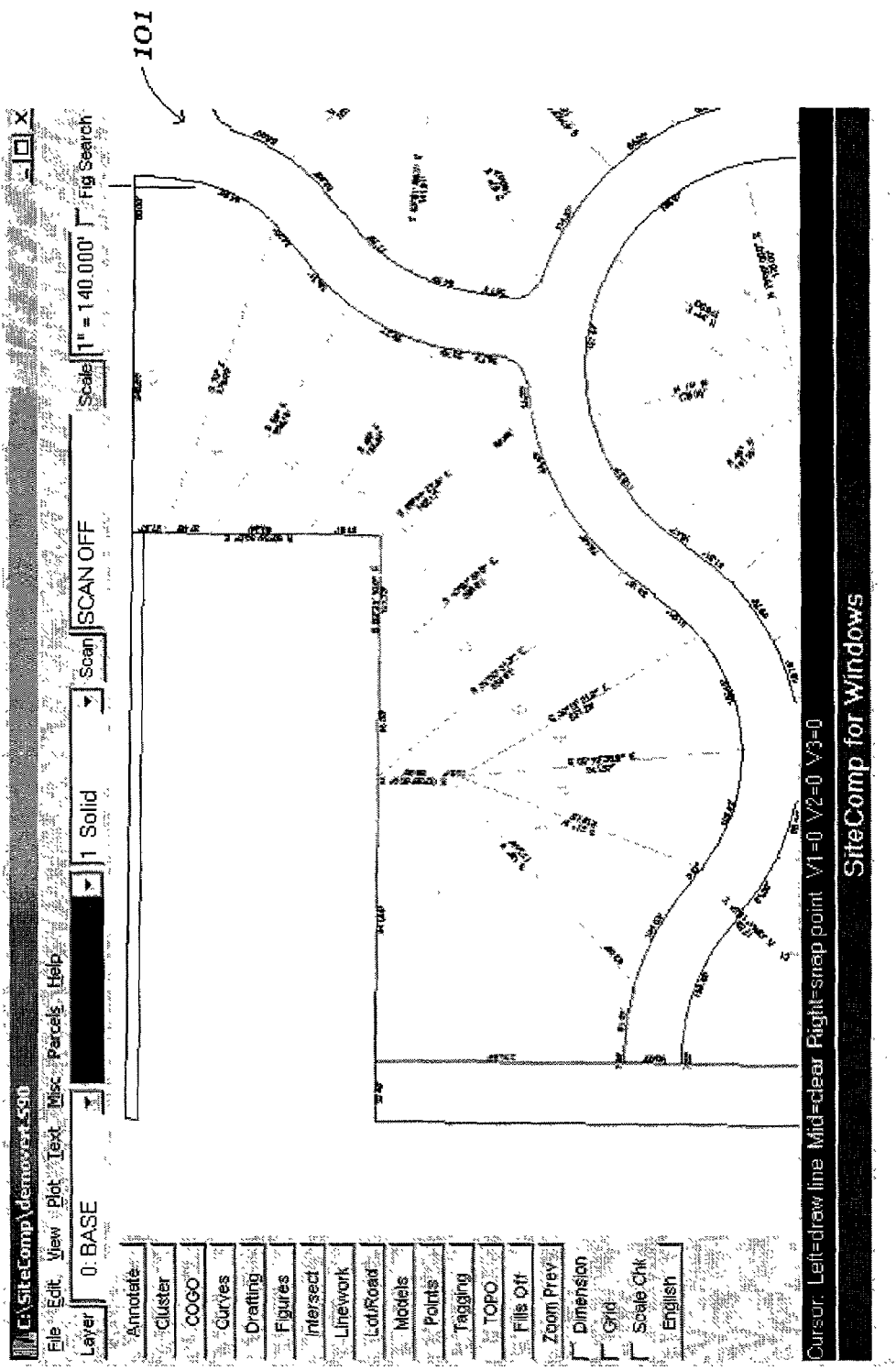

One may turn on only the lot and right-of way layers. "Layer Control [Ctrl-z]" 96 under "View" may be selected as in FIG. 85. The prompt line says, "Enter layers to be plotted (example: 234/12/23/1/52-60) [ENTER=ALL]". One may enter "0,3" on the input line and press "Enter". "View" and "Refresh Screen [Alt-z]" 97 may be selected, as in FIG. 86, to reveal only the lot lines. On the side menu, select "Fills" to get the box 98 of FIG. 87 and click on the "Disable Fills" button 99 which switches to an "Enable Fills" button. Then one may press the "Done" button 100 to result in the screen 101 of FIG. 88.

Figure 89:
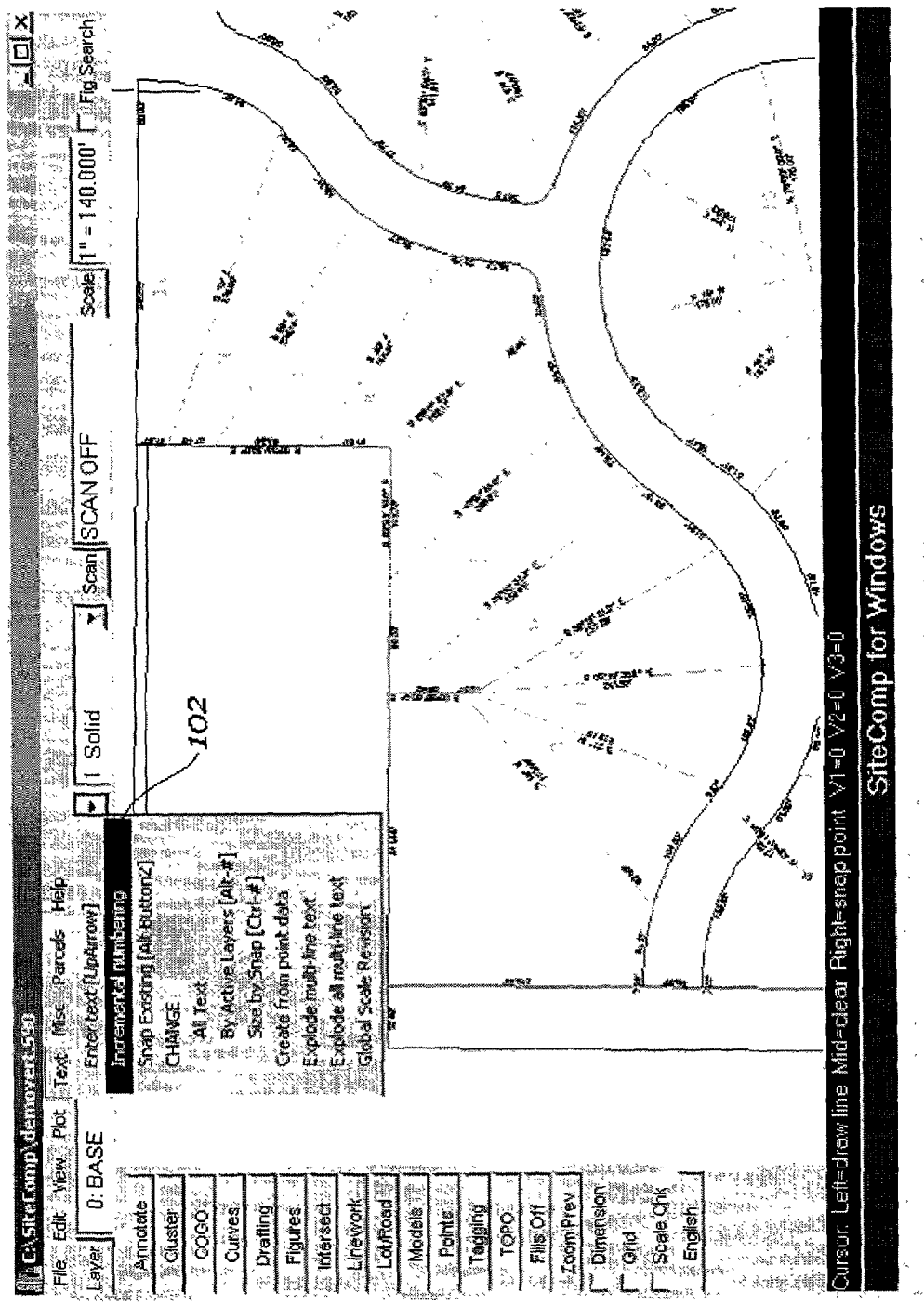

One may create new block 2 parcels by using incremental numbering with a prefix. To start, "Incremental numbering" 102 under "Text" of the top menu may be selected as in FIG. 89. A prompt line appears saying, "Enter beginning number". "1" can be entered. Another prompt says, "Enter increment [press RETURN for 1]". "1" is entered and another prompt says, "Enter prefix label". "block 2 lot . . . " may be entered. The ellipsis place the numbers in decimal tab location for reporting purposes and the prefix may be added in front of each incremental number.

Figure 90:
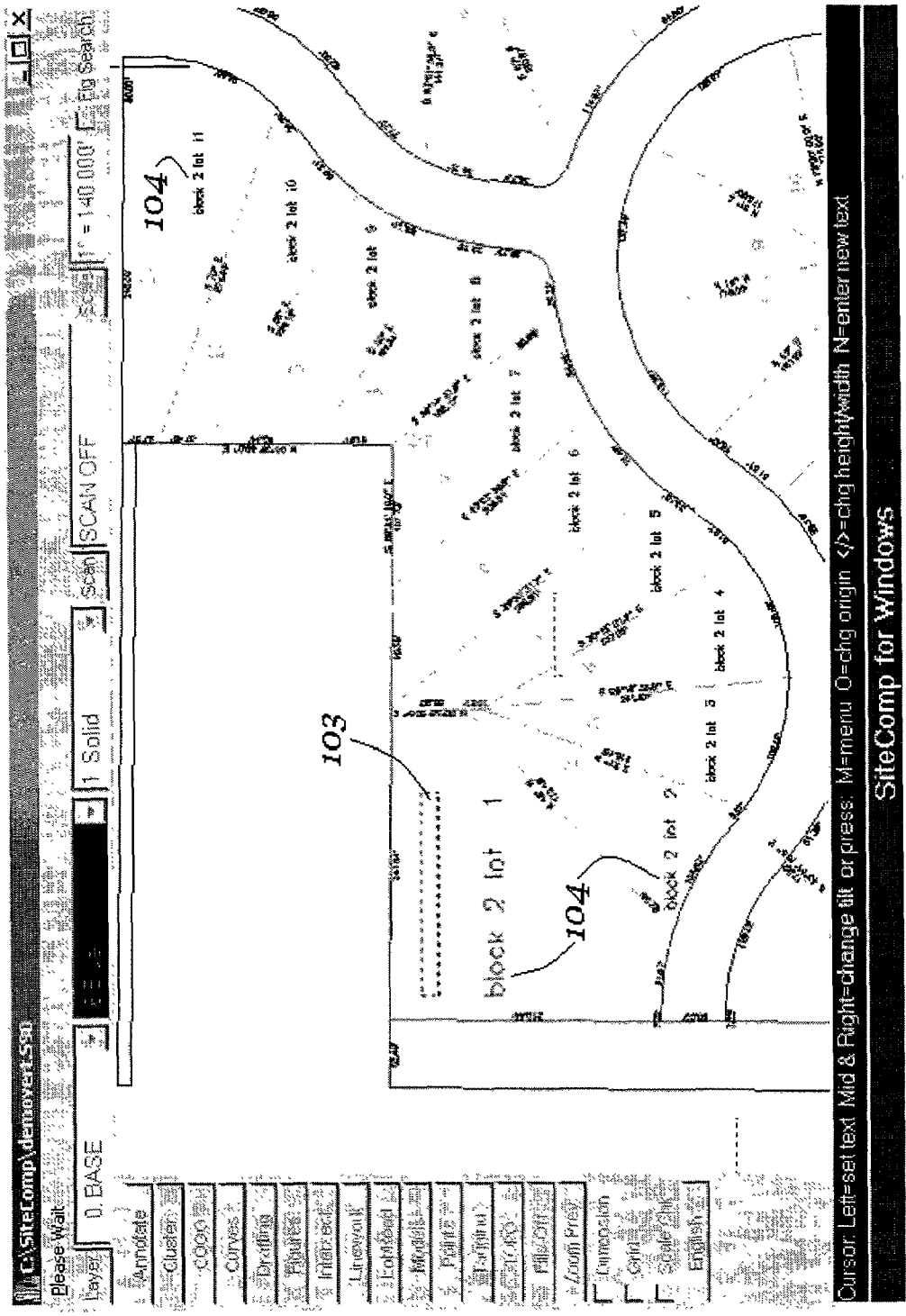
Figure 91:
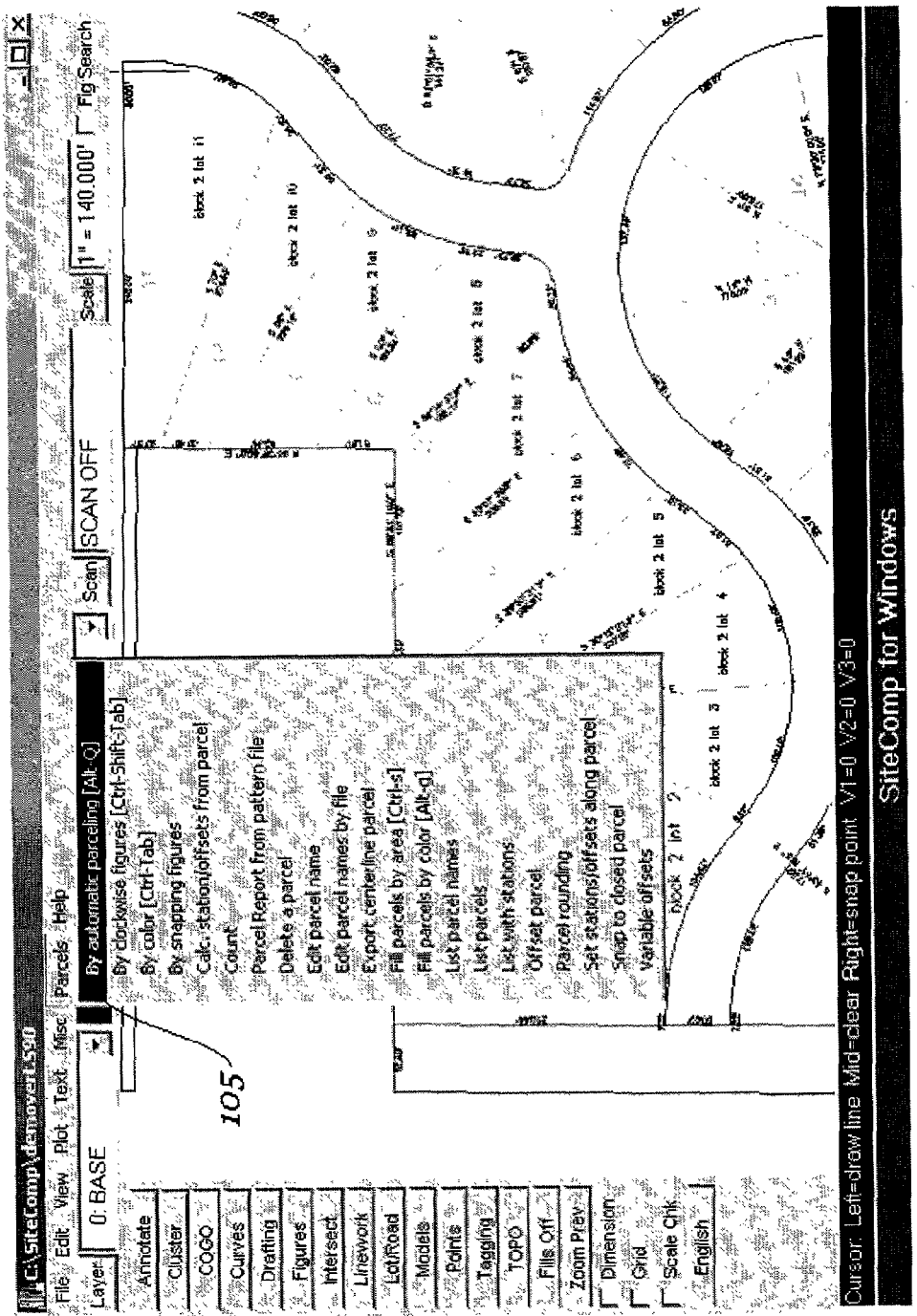
Figure 92:
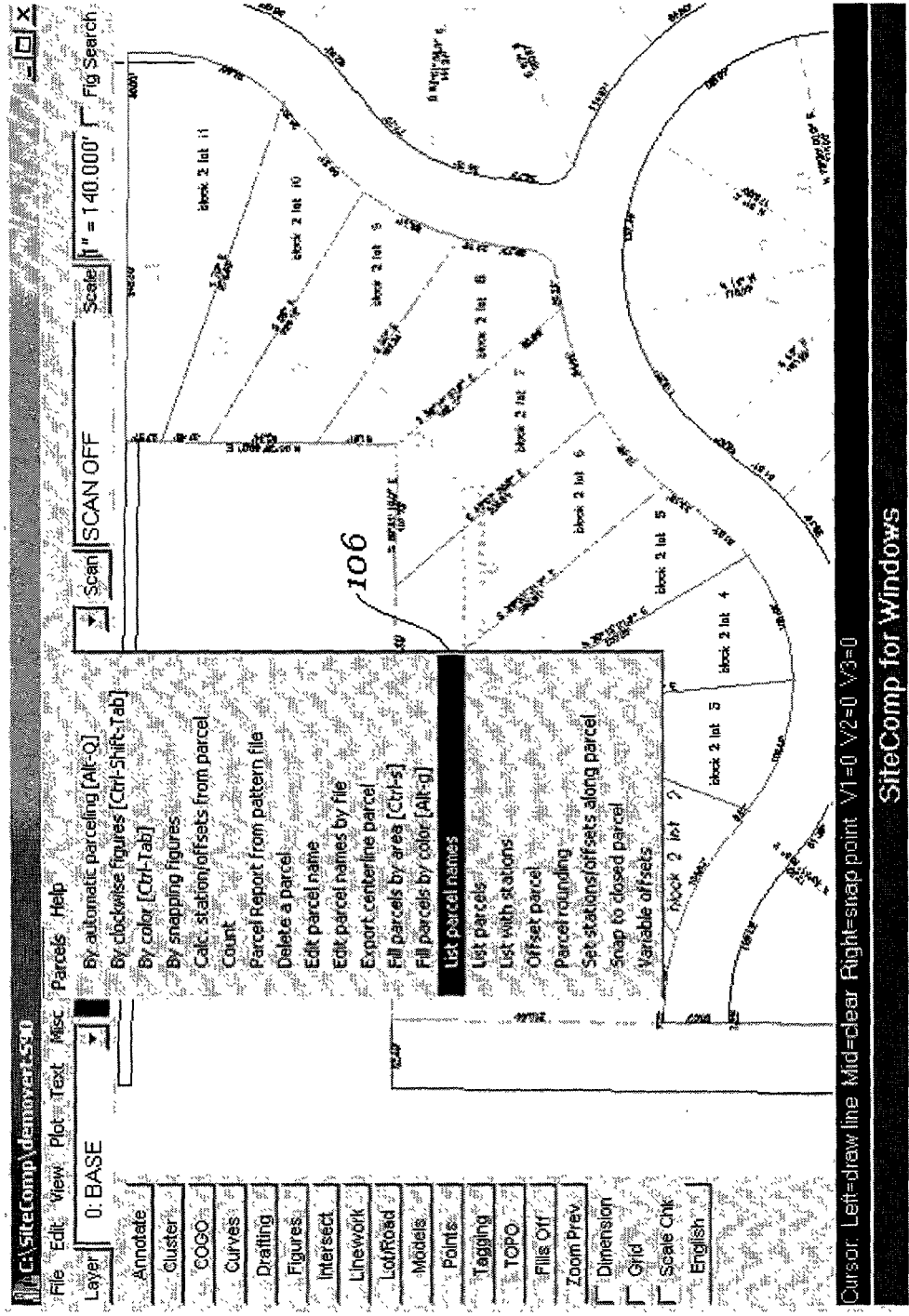
Figure 93:
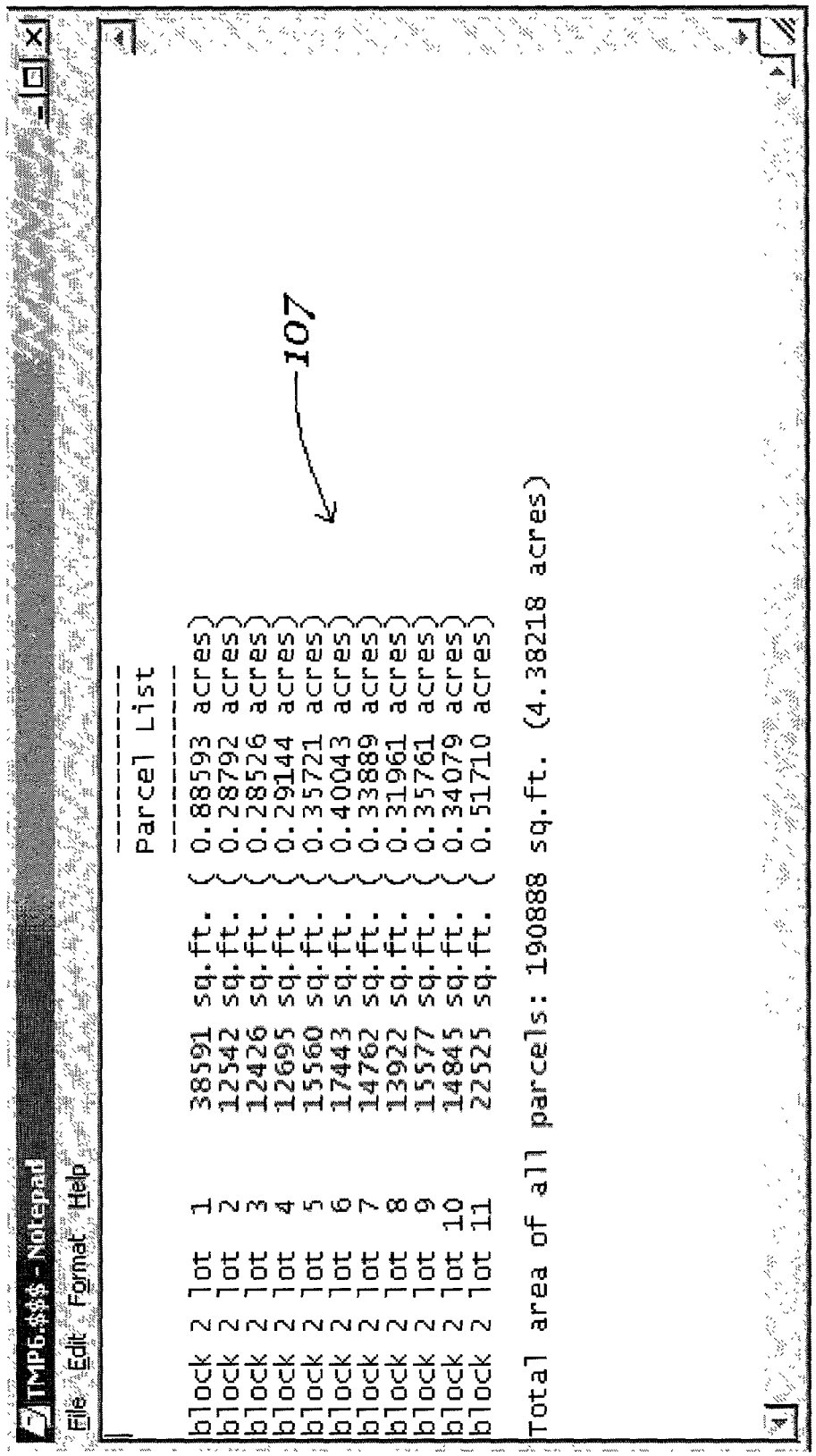

After a prefix is entered, a text box 103 (a dashed box shown in lot 1 of FIG. 90) appears, attached to the mouse pointer which may be placed on the drawing. The text box may be resized by pressing the "down arrow" button or the "up arrow" button on the keyboard up to four times. Text labels may be placed in the lots beginning on the left by using the left mouse button. As each label is placed, the number will increment by "1". The text labels 104 "block 2 lot 1" through "block 2 lot 11" have been placed on the lots 1-11 as indicated in FIG. 90. After the last label is placed, one may press "Esc" to end the command and select "By automatic parceling [Alt-Q]" 105 under "Parcels" of the top menu, as in FIG. 91, to create the parcels using the names given by incremental numbered text. Finally, as in FIG. 92, one may click on "Parcels" of the top menu, and then on "List parcel names" 106. Subsequently, a parcel list 107 may appear as in FIG. 93.

Figure 93A:
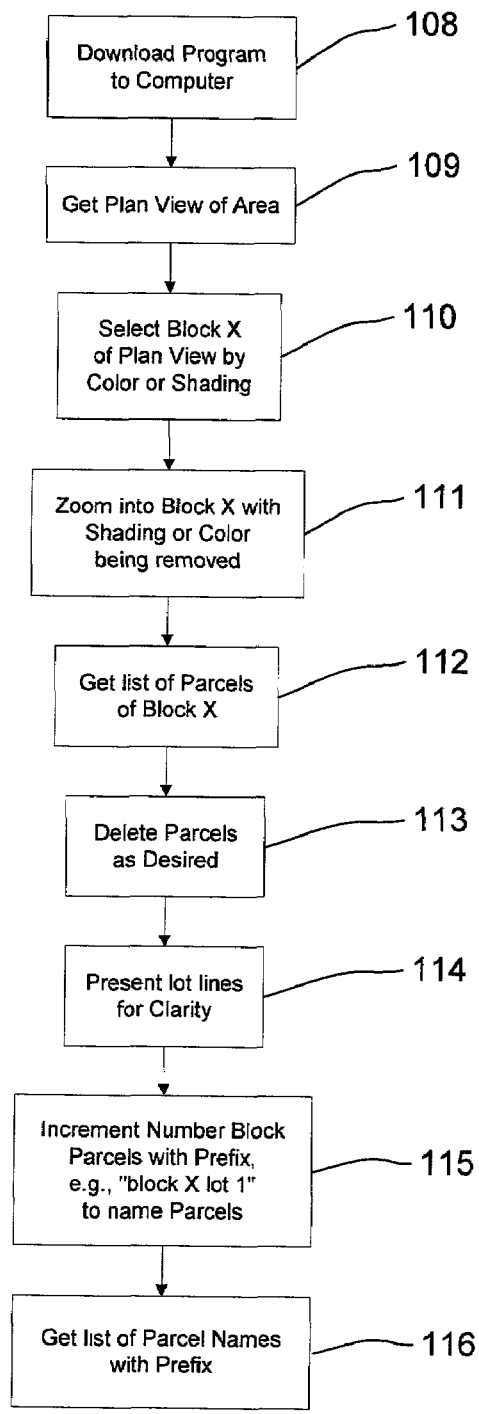
FIG. 93a is a block diagram for incremental numbering with automatic parceling.

FIG. 93a is a flow diagram of incremental numbering with automatic parceling. Block 108 is download program to computer. Block 109 is get plan of area, which is followed by block 110 which is select block x of plan view by color or shading. From the latter block, block 111 is zoom into block x with shading or color being removed. Block 112 follows with get list of parcels of block x, which leads to block 113 which is delete parcels as desired. Block 114 is present lot lines for clarity. The following block 115 is increment number block parcels with a prefix, for example, "block x lot 1", to name the parcels. The last block 116 is to get a list of parcel names with the new prefix.

Figure 94:
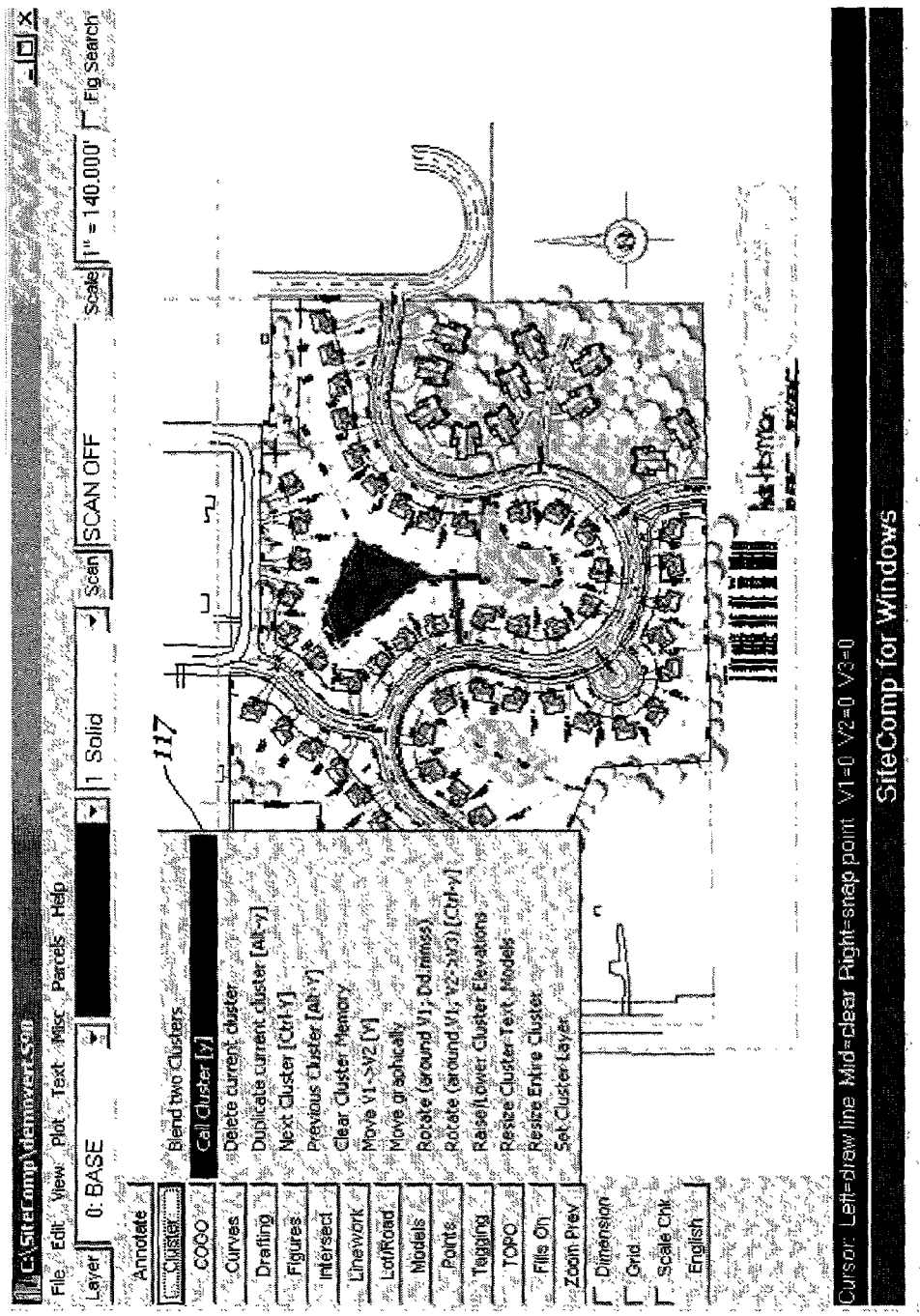
Figure 95:
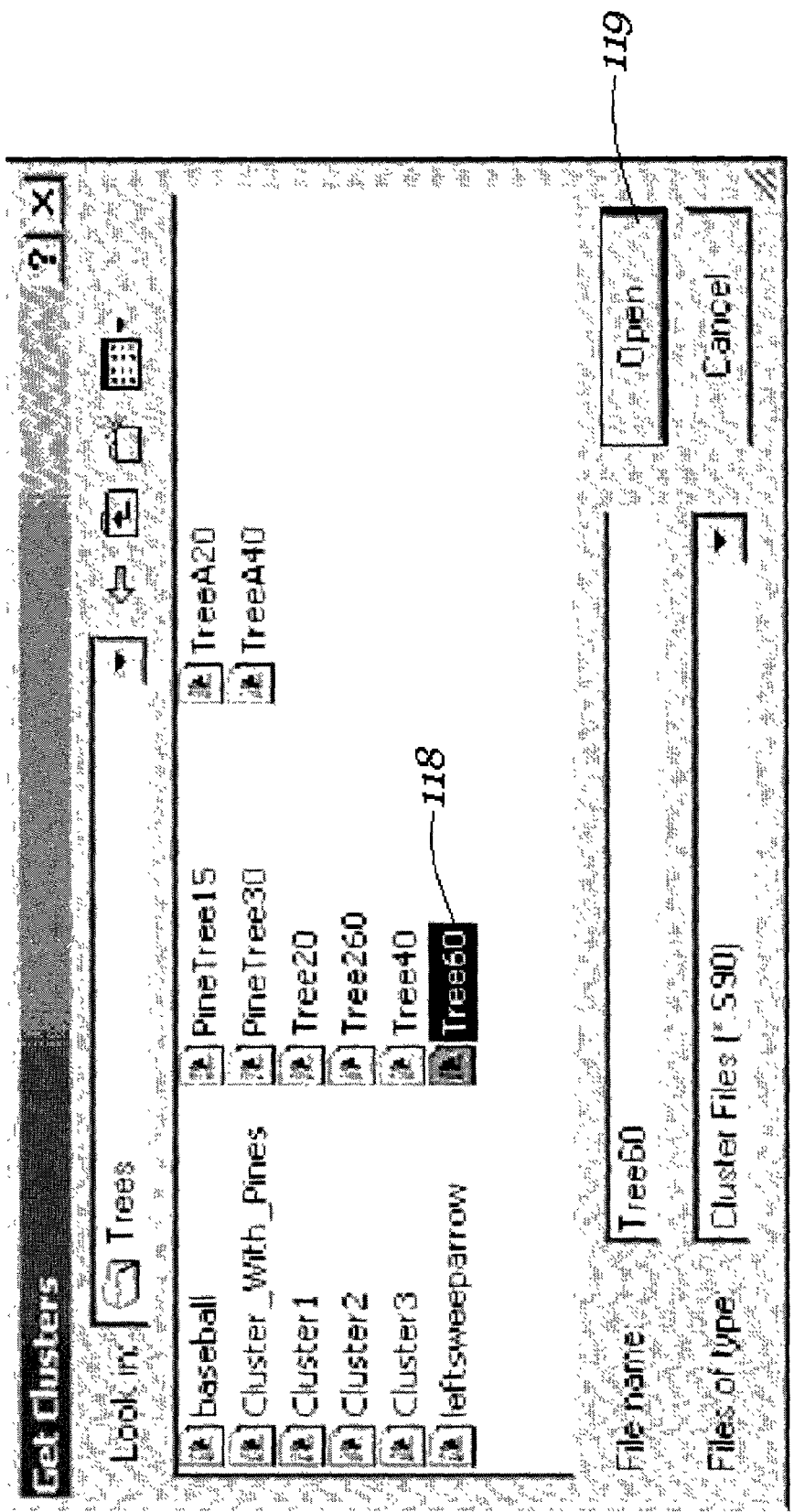
Figure 96:
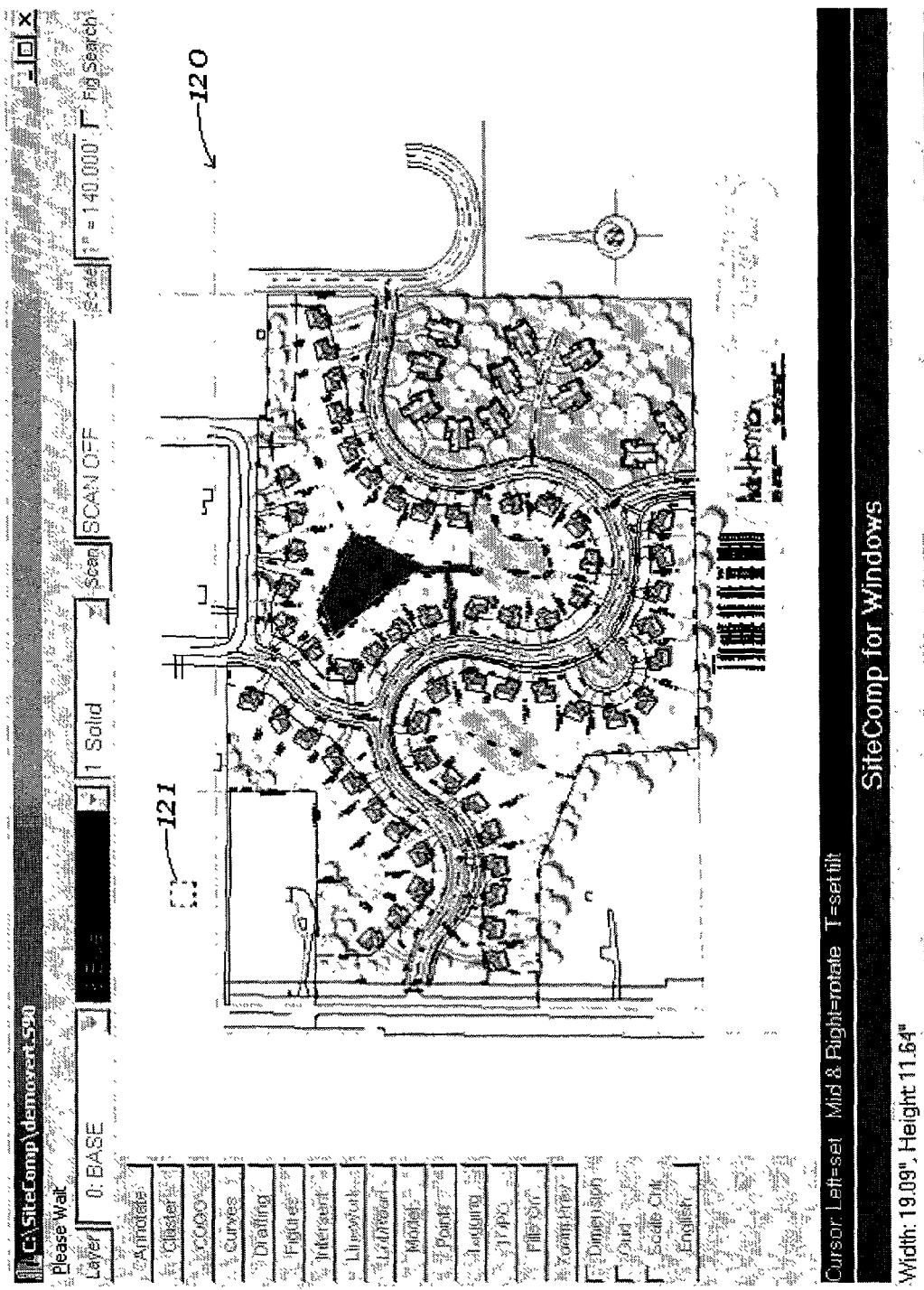
Figure 97:
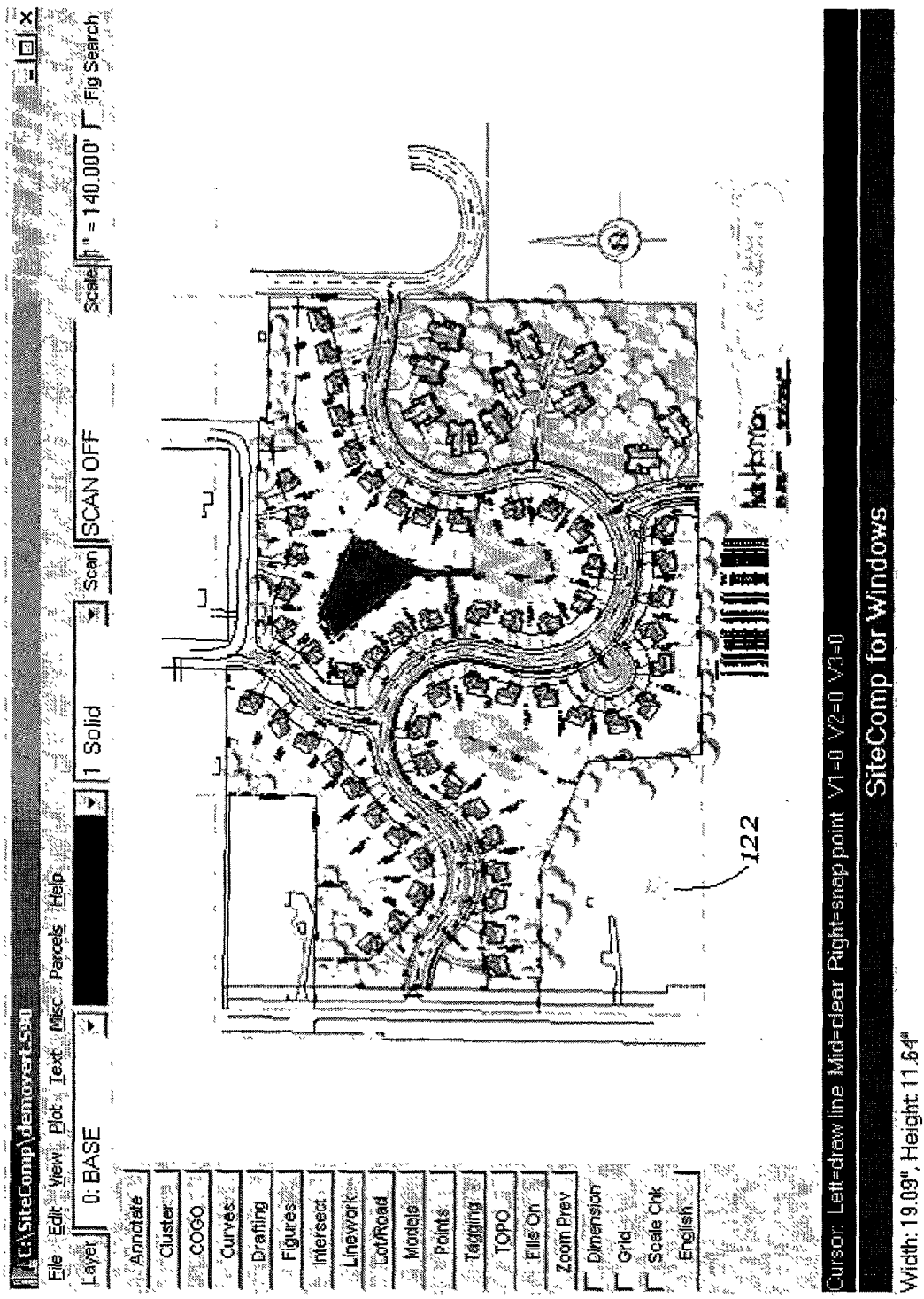

CDIS has the capability to duplicate the current cluster. From the side menu, a "Cluster" and "Call Cluster [y]" 117 may be selected as in FIG. 94. A box appears and from there "Trees" may be selected. From the next box of files shown in FIG. 95, "Tree60" 118 may be selected and the open button 119 clicked on. The layout 120 of the housing appears and the cluster in the form of a dashed box 121 may be anchored to the mouse pointer by pressing the left mouse button, as shown on the upper left part of FIG. 96. The cluster 122 is placed in the lower left part of FIG. 97. One may duplicate the just placed cluster by selecting "Cluster" and "Duplicate current cluster [Alt y]" which is the fourth item down in the submenu from the side. Then the cluster dashed box may be anchored to the mouse pointer by pressing its left button. Then the mouse pointer and the box can be moved to the place where it is preferred to put the cluster, and then the left button is pressed again to situate the duplicate cluster 123 in the job file, as shown in FIG. 98.

Figure 98A:
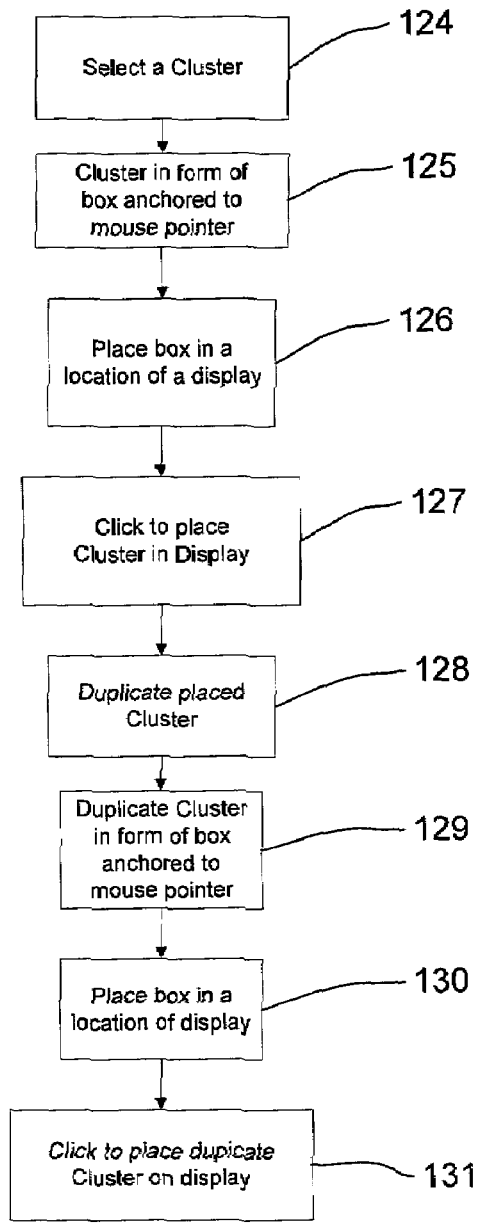
FIG. 98a is a block diagram for duplicating a current cluster.

FIG. 98a is a flow diagram for duplicate a current cluster. Block 124 is select a cluster which leads to block 125 which is cluster is in a form of a box anchored to the mouse pointer. Block 126 is place the box in a location of a display. Click to place the cluster in display is the next block 127. Block 128 is to duplicate placed cluster, followed by block 129 which is to duplicate cluster in form of another box anchored to mouse pointer. Place box in a location of display is the subsequent block 130 followed by block 131 which is click to place duplicate cluster on display.

Figure 99:
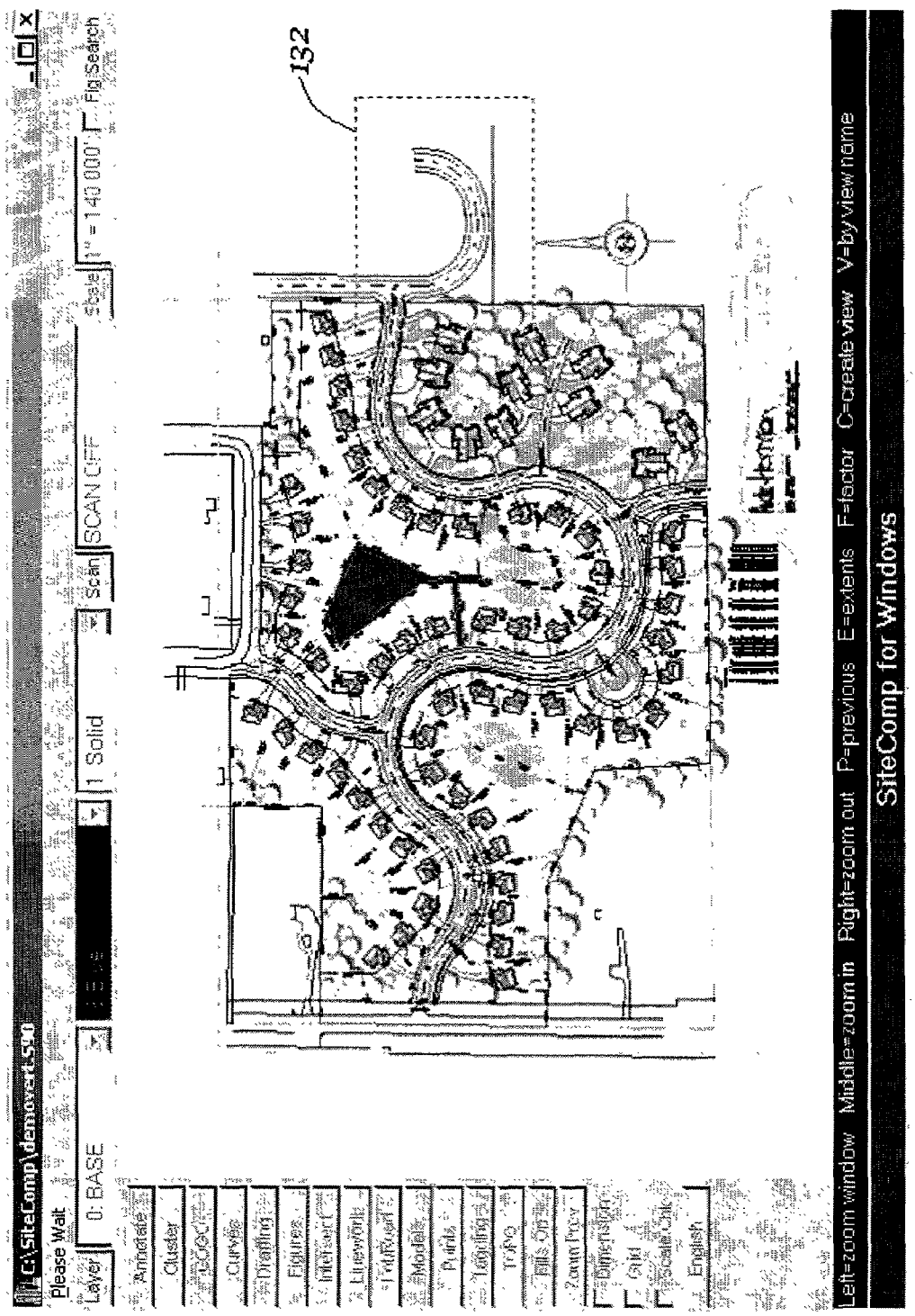
FIGS. 99 through 105 indicate a way to pull a line tangent to a curve.
Figure 100:
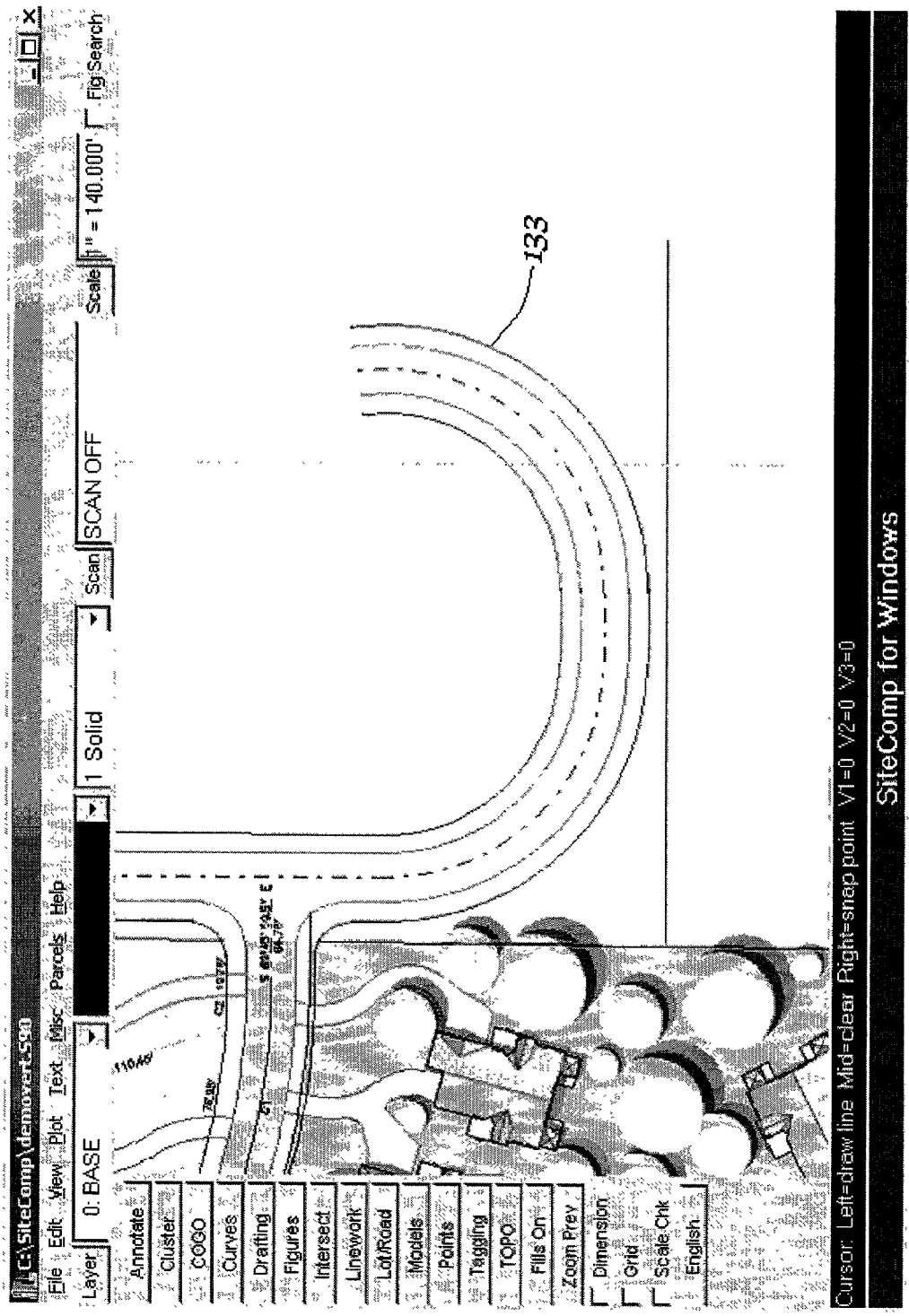
Figure 101:
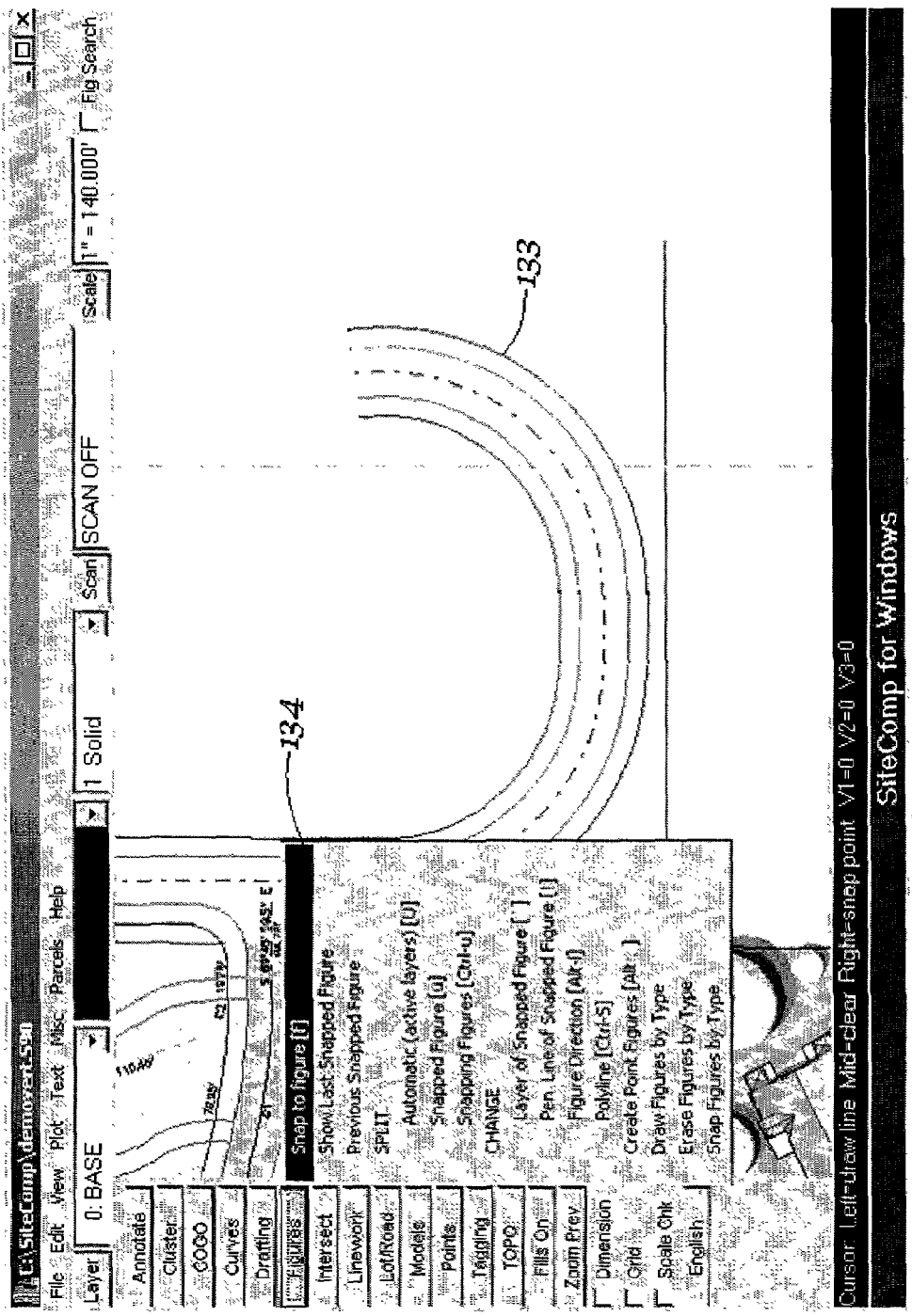
Figure 102:
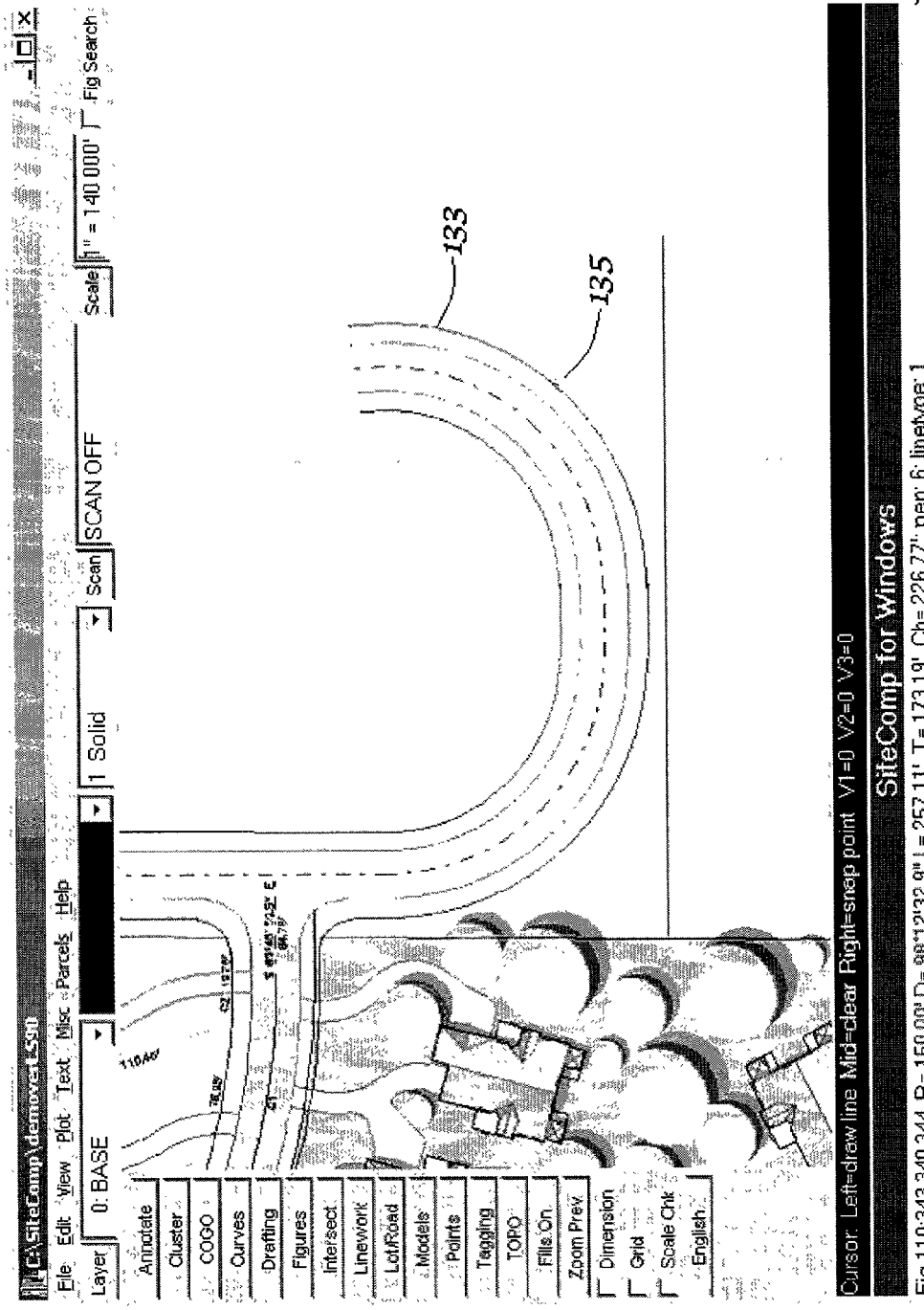
Figure 103:
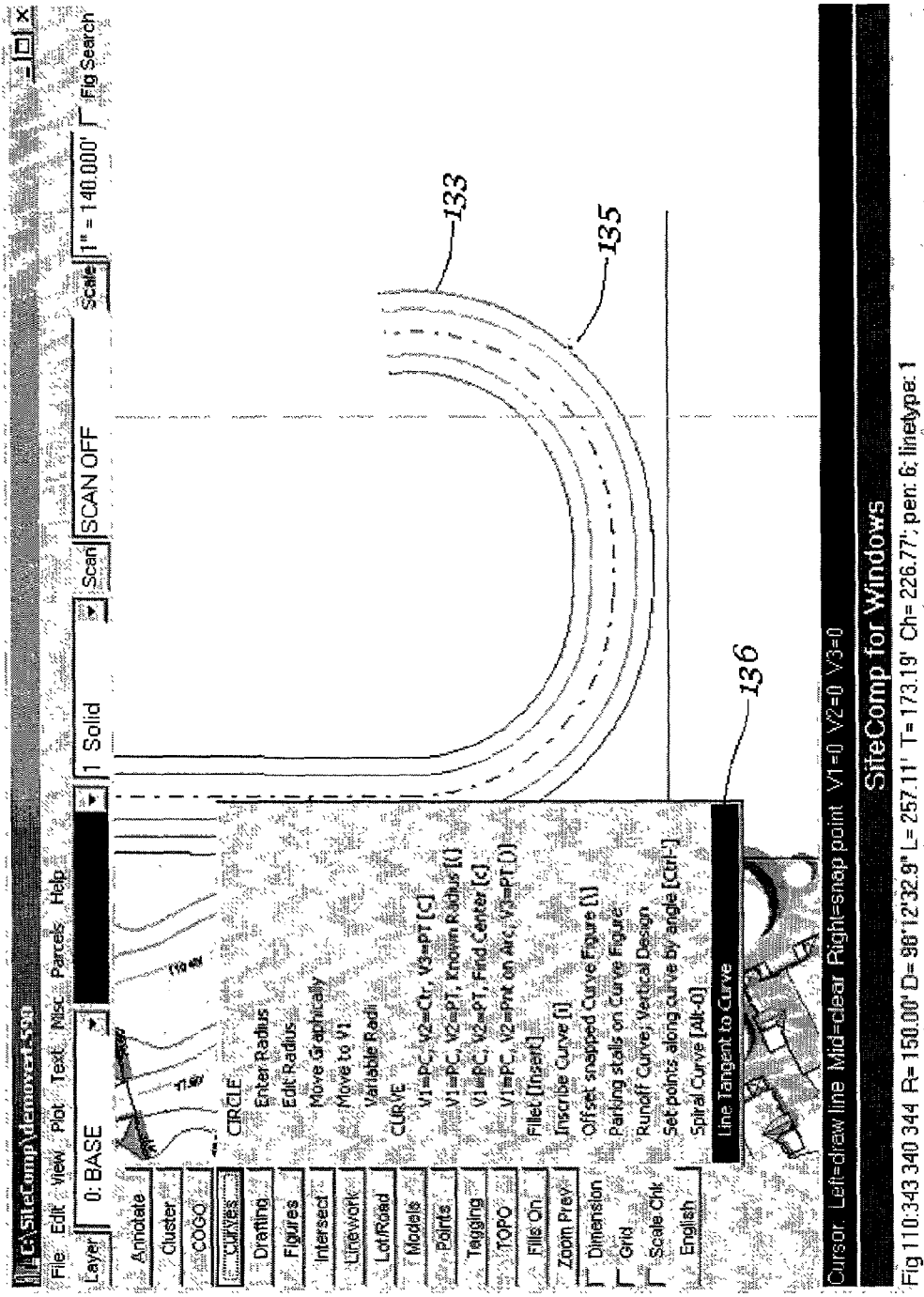
Figure 104:
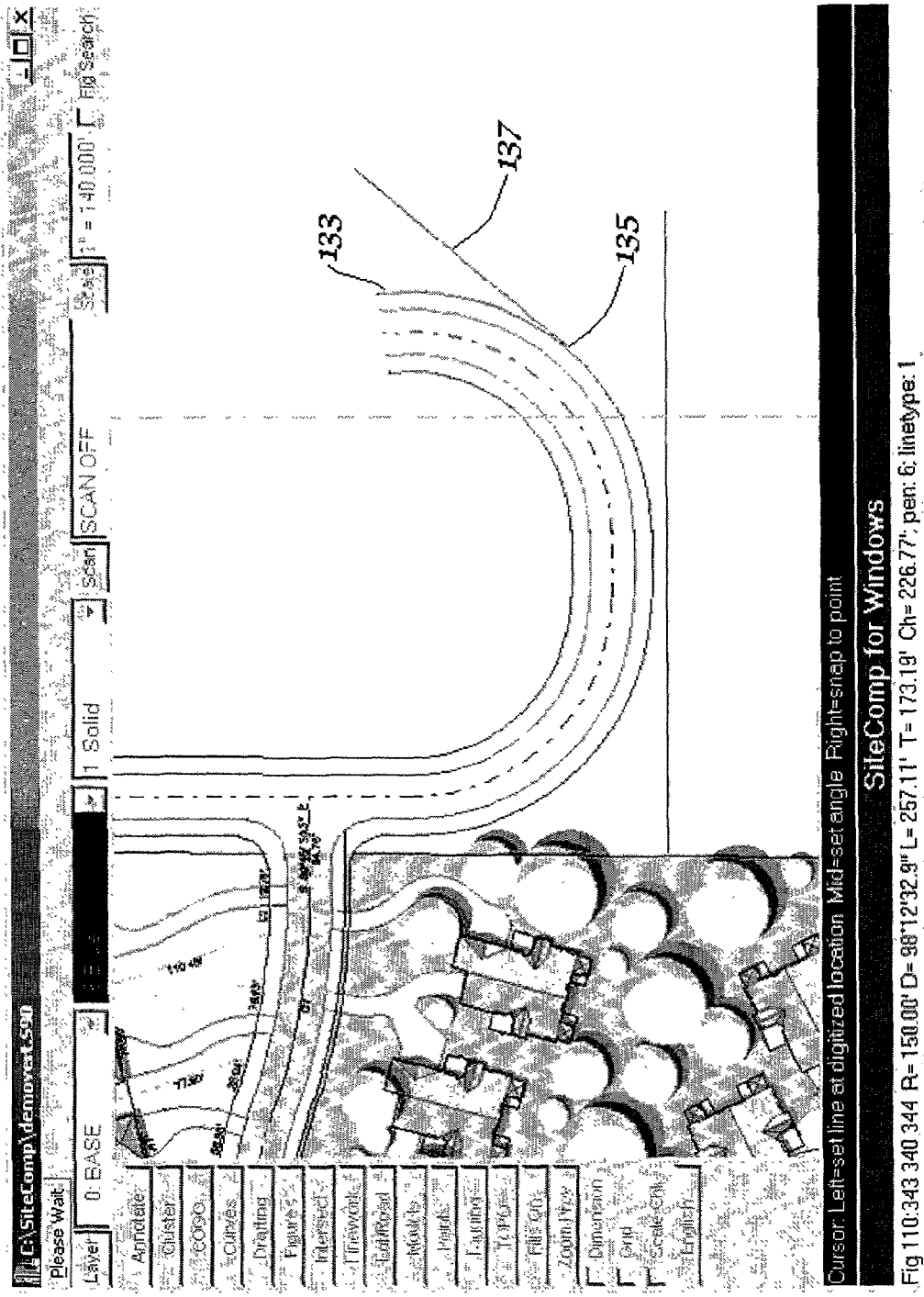
Figure 105:
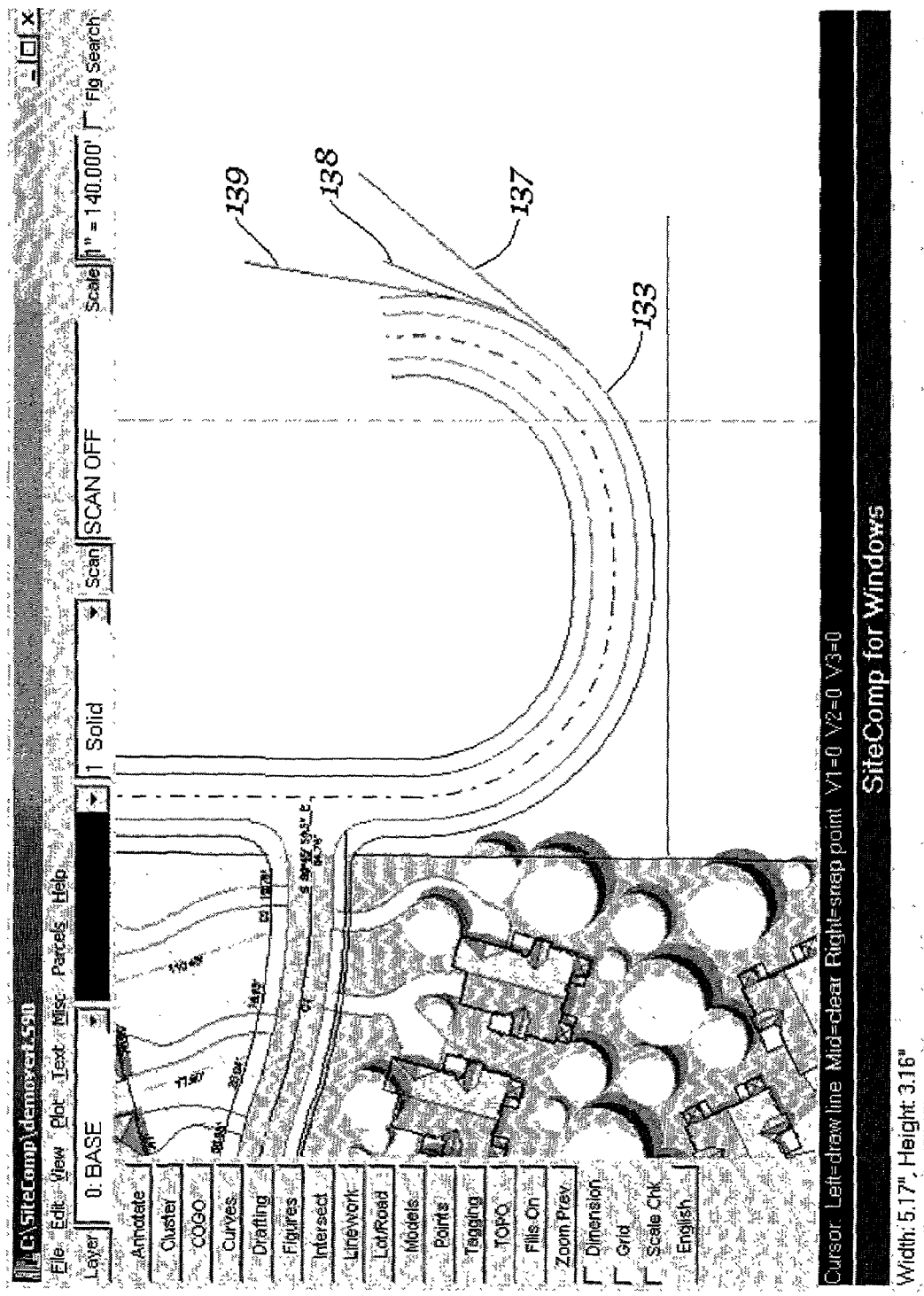

CDIS has the capability to pull a line tangent to a curve. One may zoom in on a portion of the screen having a curve to which a line tangent may be pulled to. Press "z" and drag a box 132 with the mouse with the left button pressed around that area with the curve 133 as shown in FIG. 99. After the box is in place around the area to be zoomed, then release the button and the area of the box 132 will be enlarged to fill the screen as in FIG. 100. "Figures" and "Snap to figure" 134 from the side menu may be clicked on, as in FIG. 101, and as shown by the starlike symbol 135 on the curve 133 and the information in the bottom output line 28 in FIG. 102. "Curves" and " "Line Tangent to Curve"136 may be selected from the side menu, as in FIG. 103. By pressing the left mouse button one may place a line tangent 137 to the place 135 on the selected curve as in FIG. 104. Additional lines 138 and 139 may be placed tangent to the selected curve 133 in the same manner as the first line 137 was placed, as revealed in FIG. 105.

Figure 105A:
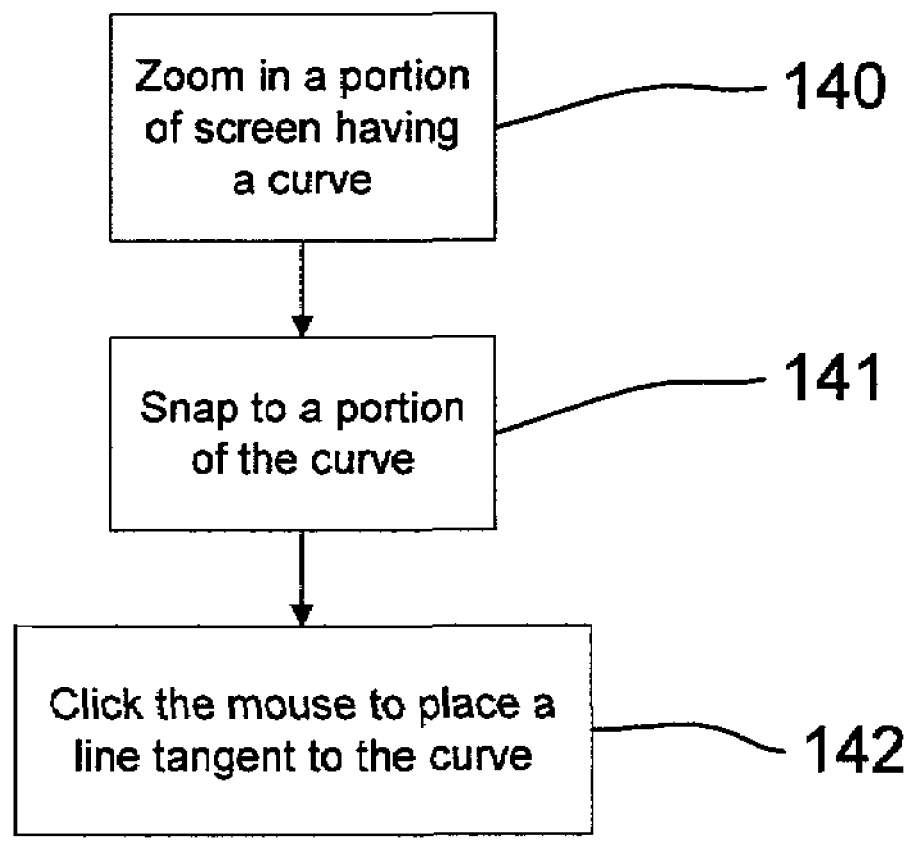
FIG. 105a is a block diagram for pulling a line tangent to a curve.

FIG. 105a is a flow diagram of pulling a line tangent to a curve. Block 140 is to zoom in a portion of the screen having a curve. Then snap to a portion of the curve is block 141. Block 142 is to click the mouse to place a line tangent to the curve.

Figure 106:
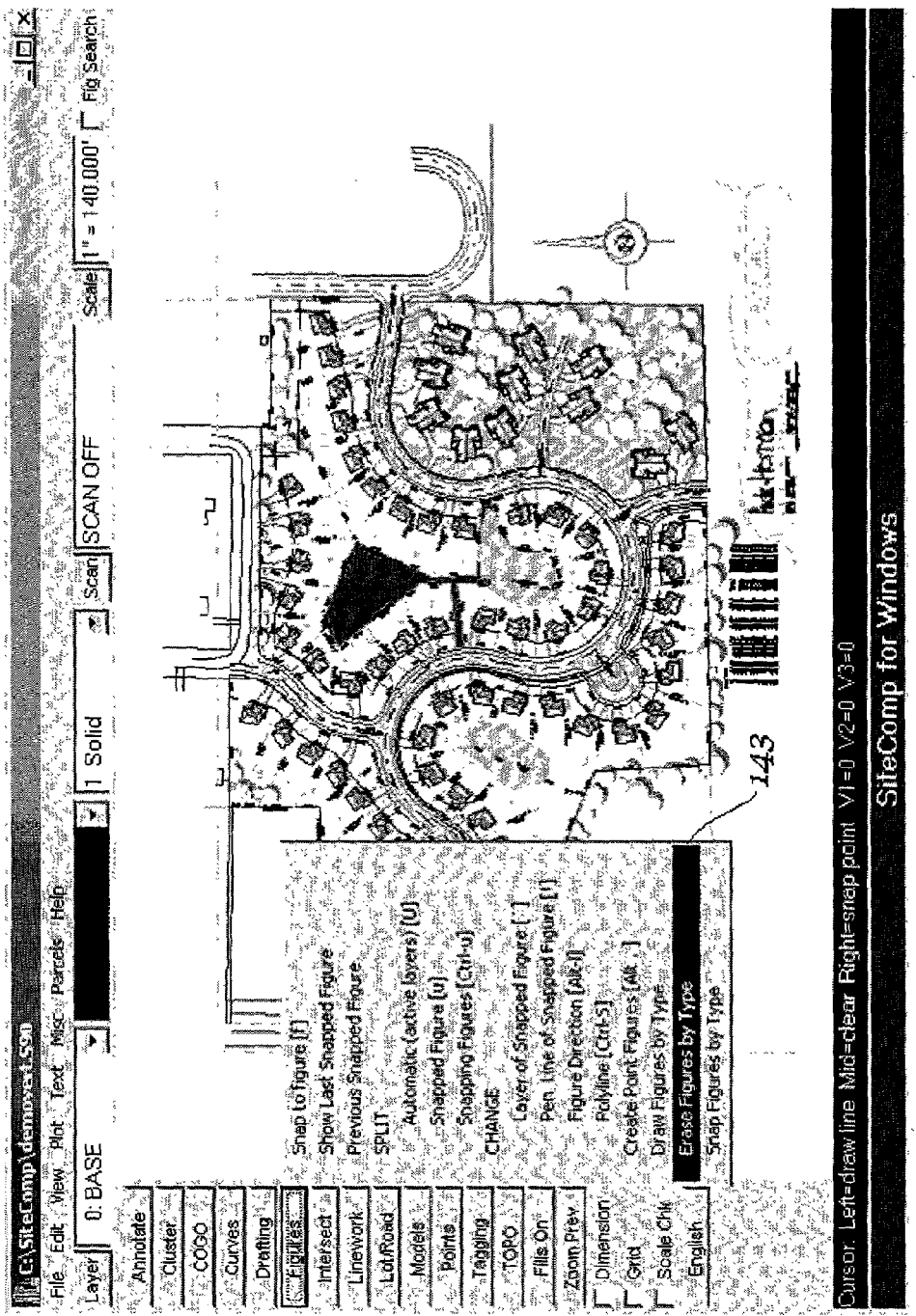
FIGS. 106 through 107 indicate a way to erase figures by type.
Figure 107:
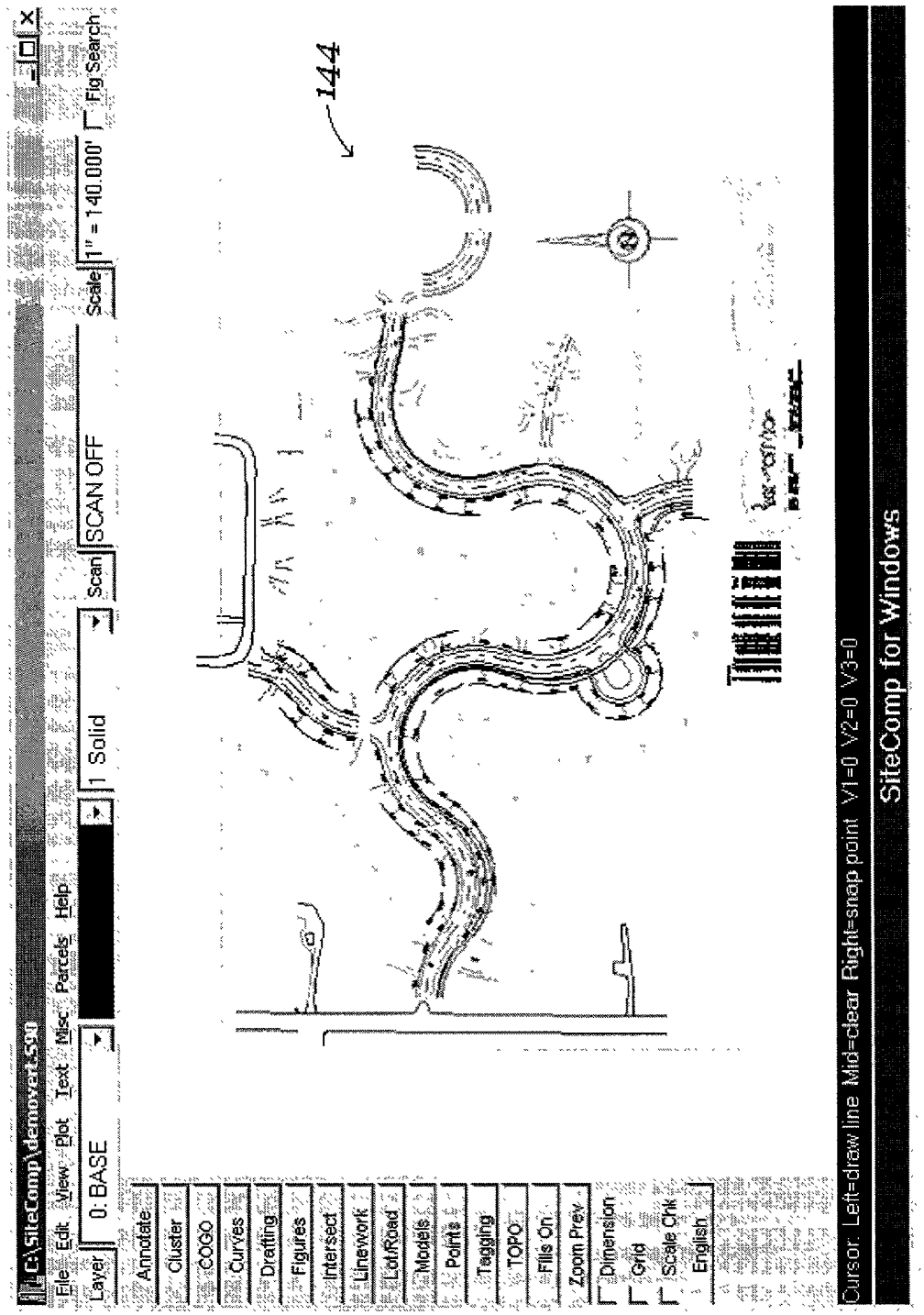

CDIS has the capability to erase figures by type. From the side menu, select "Figures" and "Erase Figures by Type" 143 as in FIG. 106. The prompt line provides nine types of figures that may be erased—1: Arrow; 2: Circle; 3: Label; 4: Model; 5: Symbol; 6: Float; 7: Line; 8: Poly; 9: Arc. The number by the type of figure may be pressed on the keyboard to select that type for erasure. Here "7" may be pressed for illustrative purposes. Then a prompt line has a question appear that asks, "Do you want to erase all line figures? [Y/N]". "Y" or "Yes" may be selected. Next, all lines disappear from the screen and the prompt line asks, "Do you want to unerase these figures? [Y/N]". To this question, "N" or "No" may be pressed. The "Esc" may be pressed to end the command because the prompt line again lists the nine types of figures that may be erased. The resultant screen 144 has no straight lines as shown in FIG. 107.

Figure 107A:
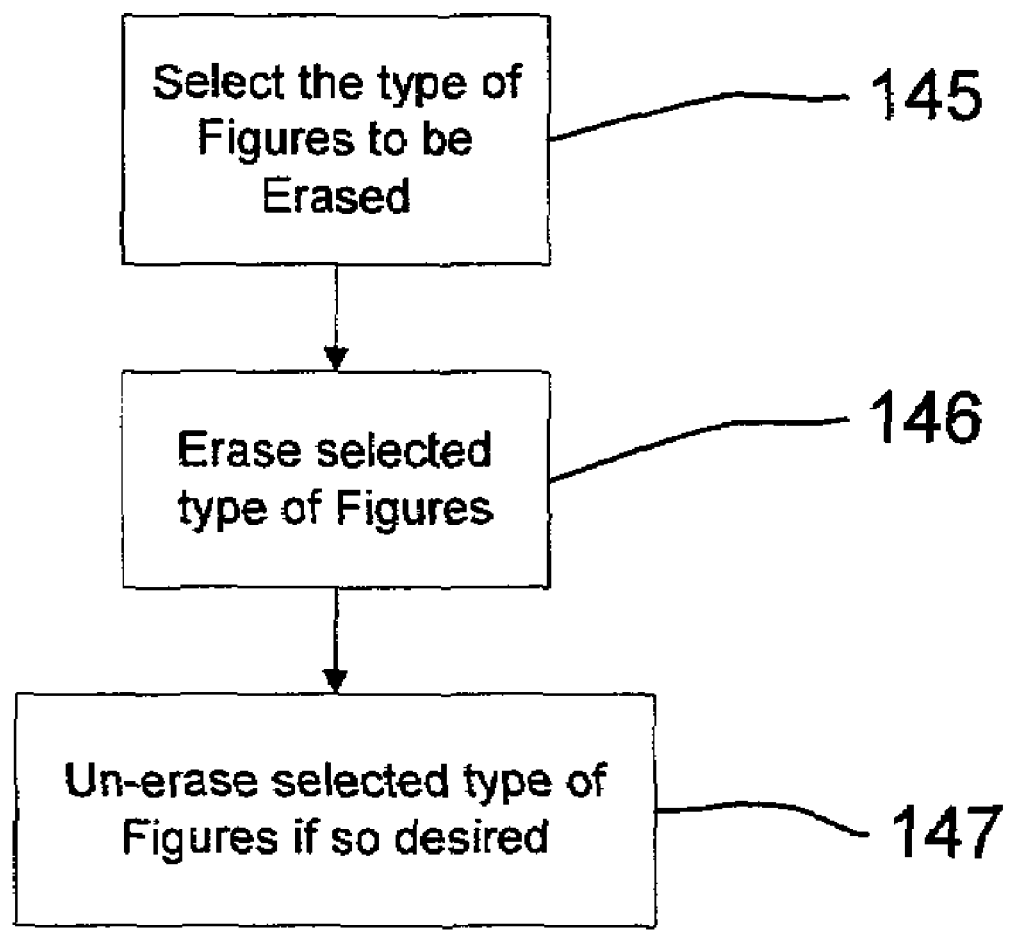
FIG. 107a is a block diagram for erasing figures by type.

FIG. 107a is a flow diagram of erasing figures by type. Block 145 is to select the type of figures to be erased. Erase the selected type of figures is block 146. Unerase the selected type of figures if so desired is the remaining block 147.

Figure 108:
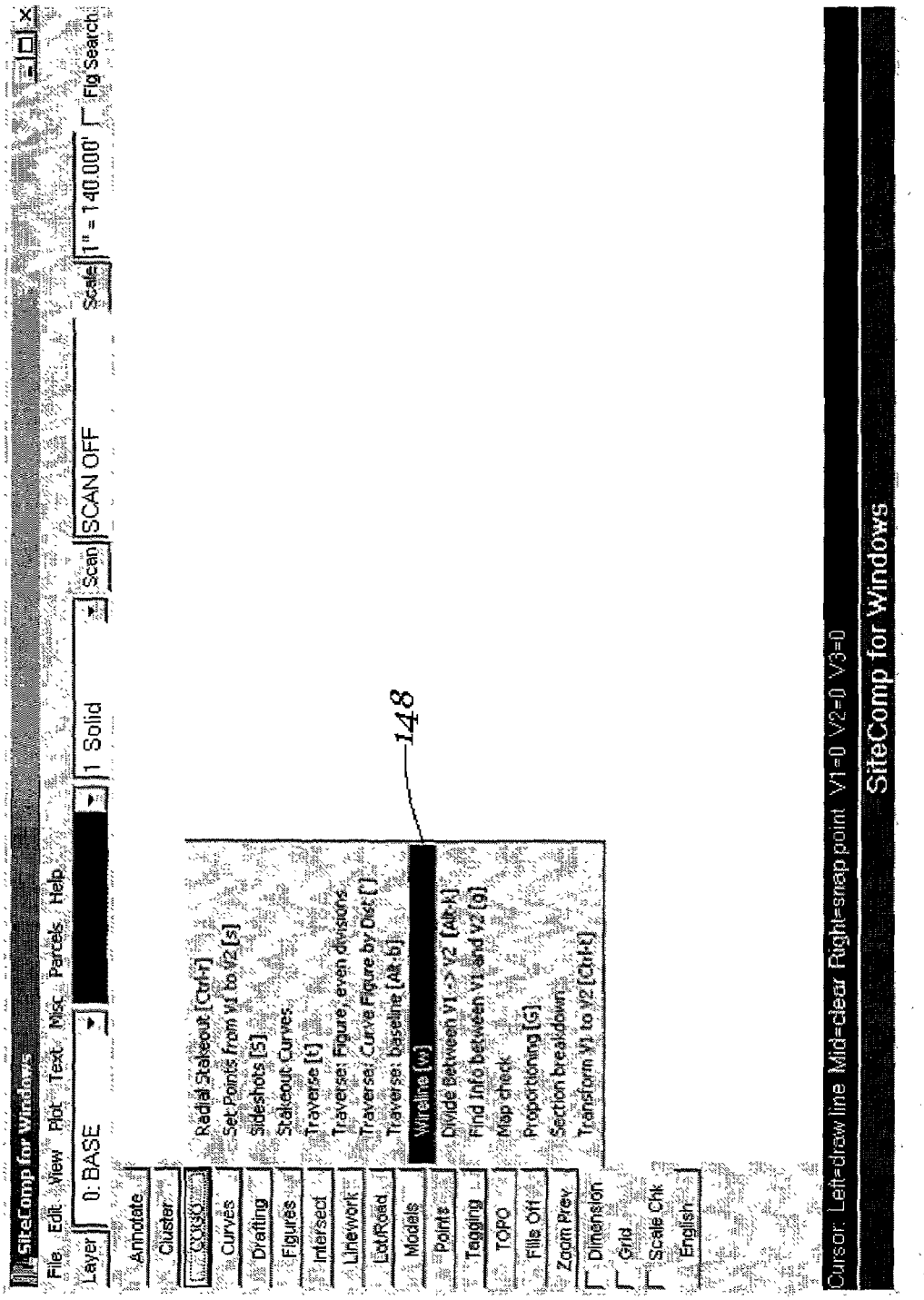
FIGS. 108 through 111 indicate a way to convert lines to polylines.
Figure 109:
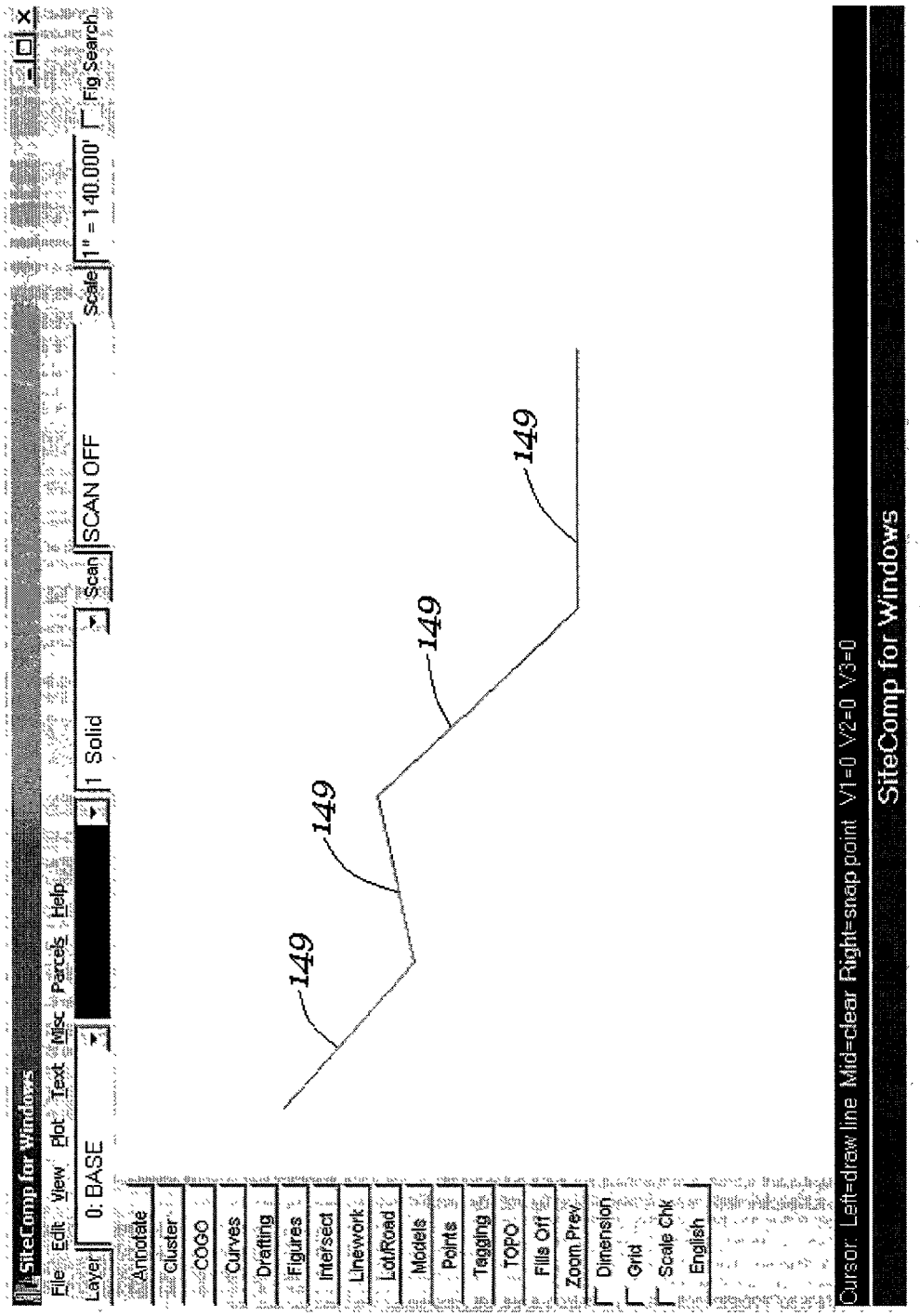
Figure 110:
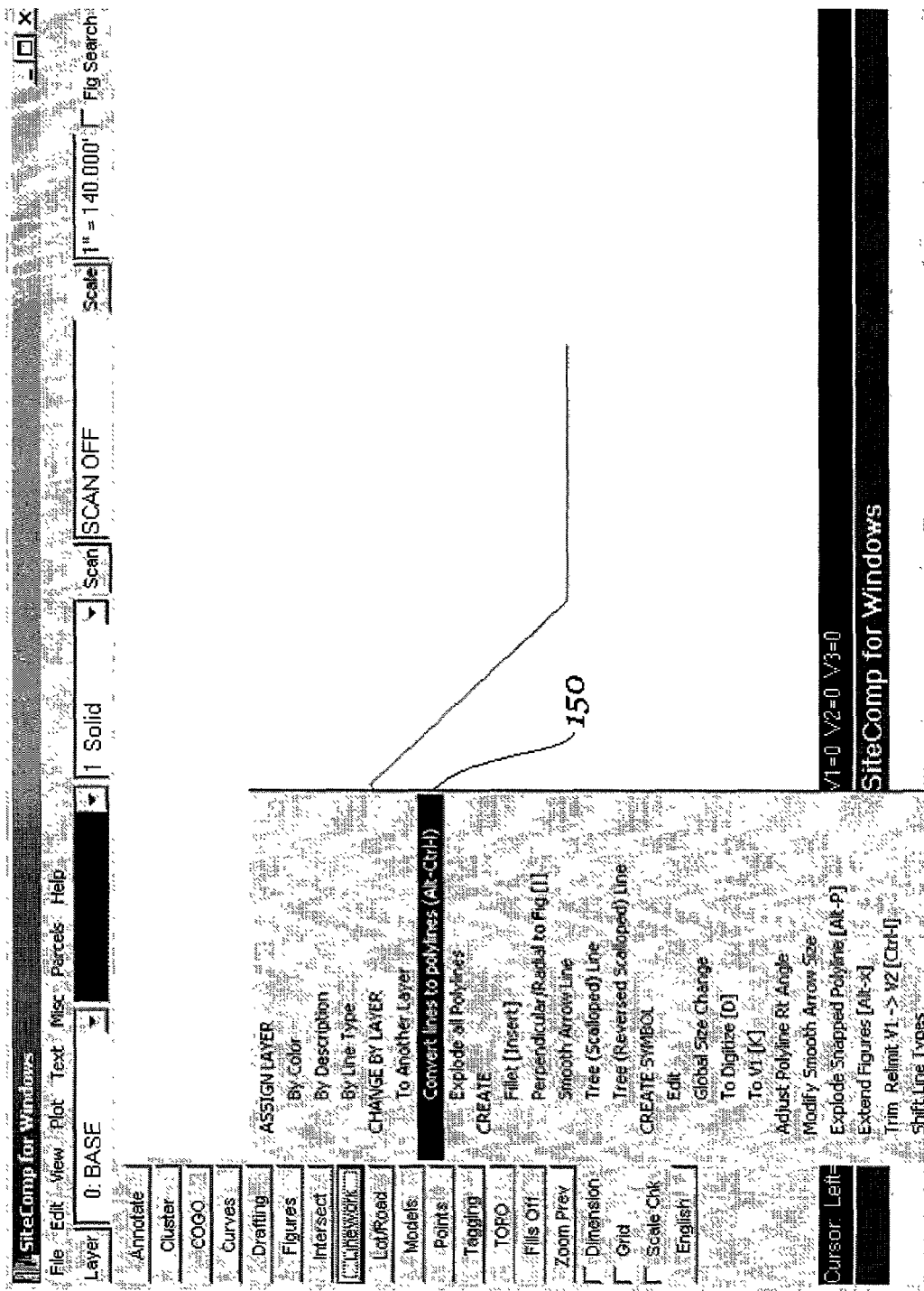
Figure 111:
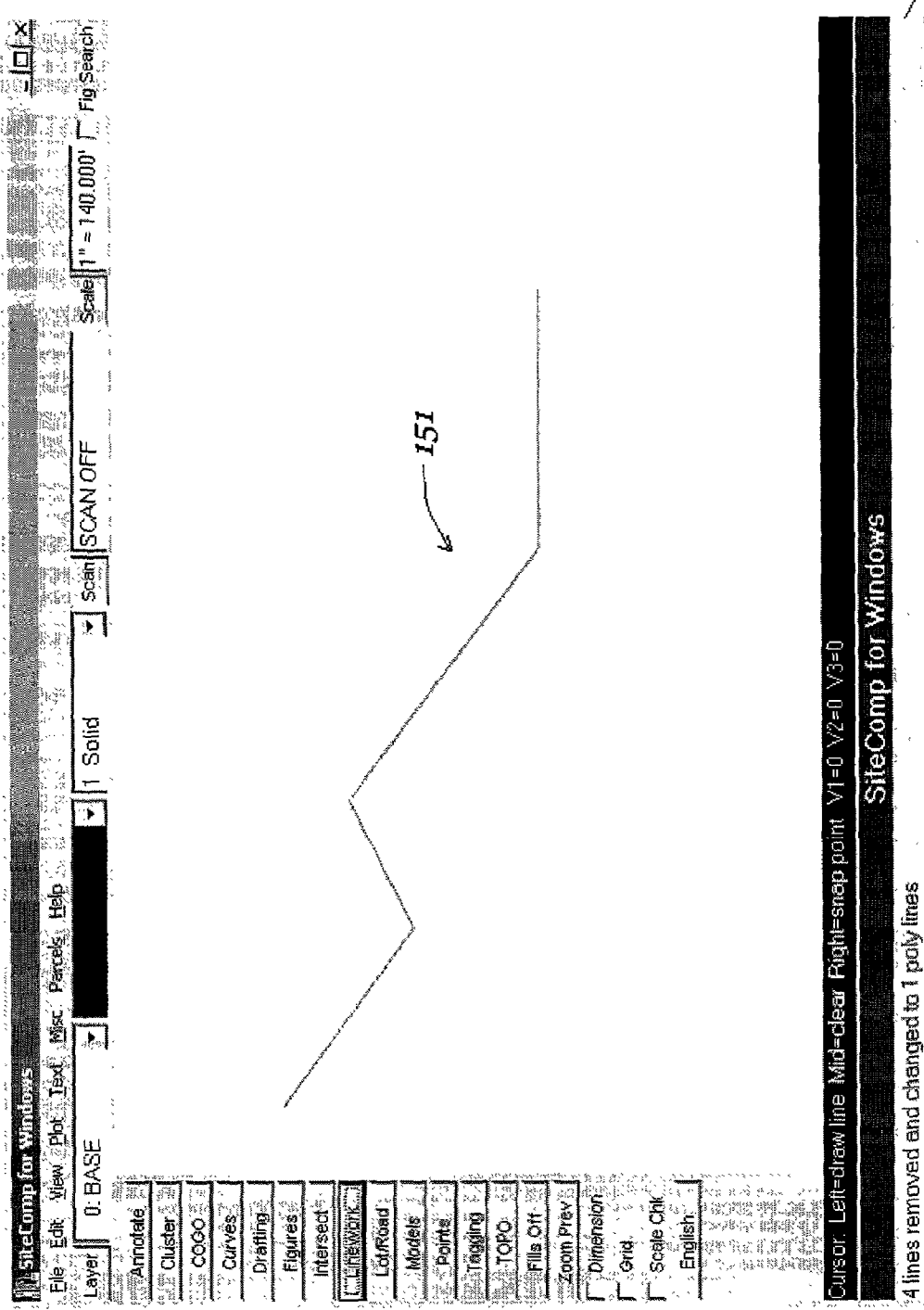

CDIS has the capability to convert lines to polylines. From "File" of the top menu select "New". "Enter" may be pressed for the default beginning point and pressed again for the default screen size. From COGO of the side menu, "Wireline [w]" 148, illustrated in FIG. 108, may be selected to create lines. One may then press and hold the left mouse button, move the mouse pointer a few inches across the screen and release the left mouse button to create a line. This process may be repeated three more times to create four connected yet individual lines 149 shown in FIG. 109. Since this command is repetitive, the "Esc" button may be pressed to end this command. From the "Linework" menu on the side of the screen, one may select "Convert lines to polylines (alt-Ctrl-l)" 150, as in FIG. 110, and the four lines 149 may be removed and in their place one polyline 151 is created. The four FIGS. 149 may have become one FIG. 151 and may be manipulated as one FIG. 151. The output line 28 of FIG. 111 indicates such.

Figure 111A:
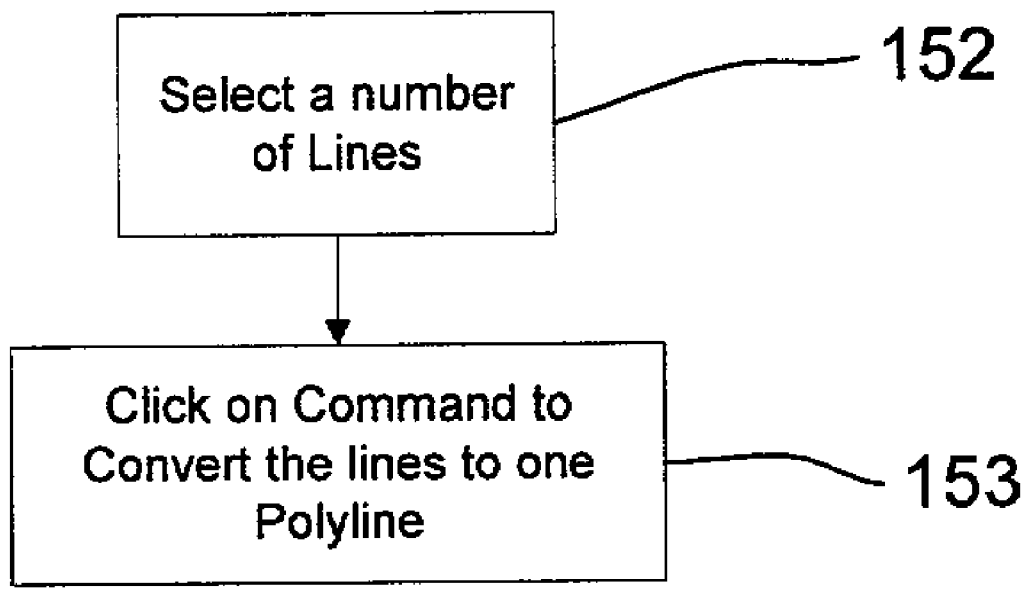
FIG. 111a is a block diagram for converting lines to polylines.

FIG. 111a is a flow diagram of converting a plurality of lines into a polyline. Block 152 is to select a number of lines. The following block 153 is to click on a command to convert the lines to one polyline.

Figure 112:
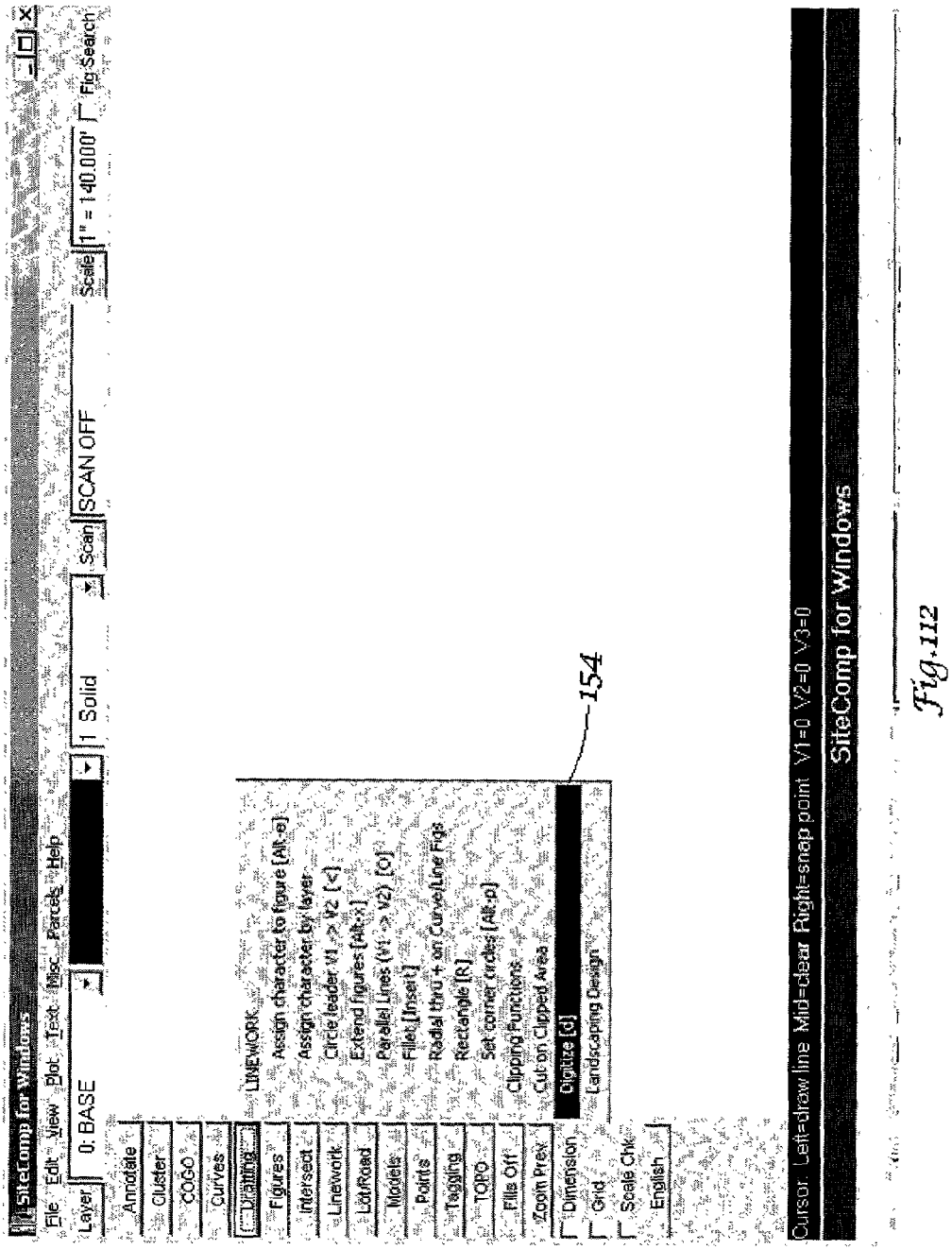
FIG. 112 through 113 indicate a way to compute an average radius of digitized points.
Figure 113:
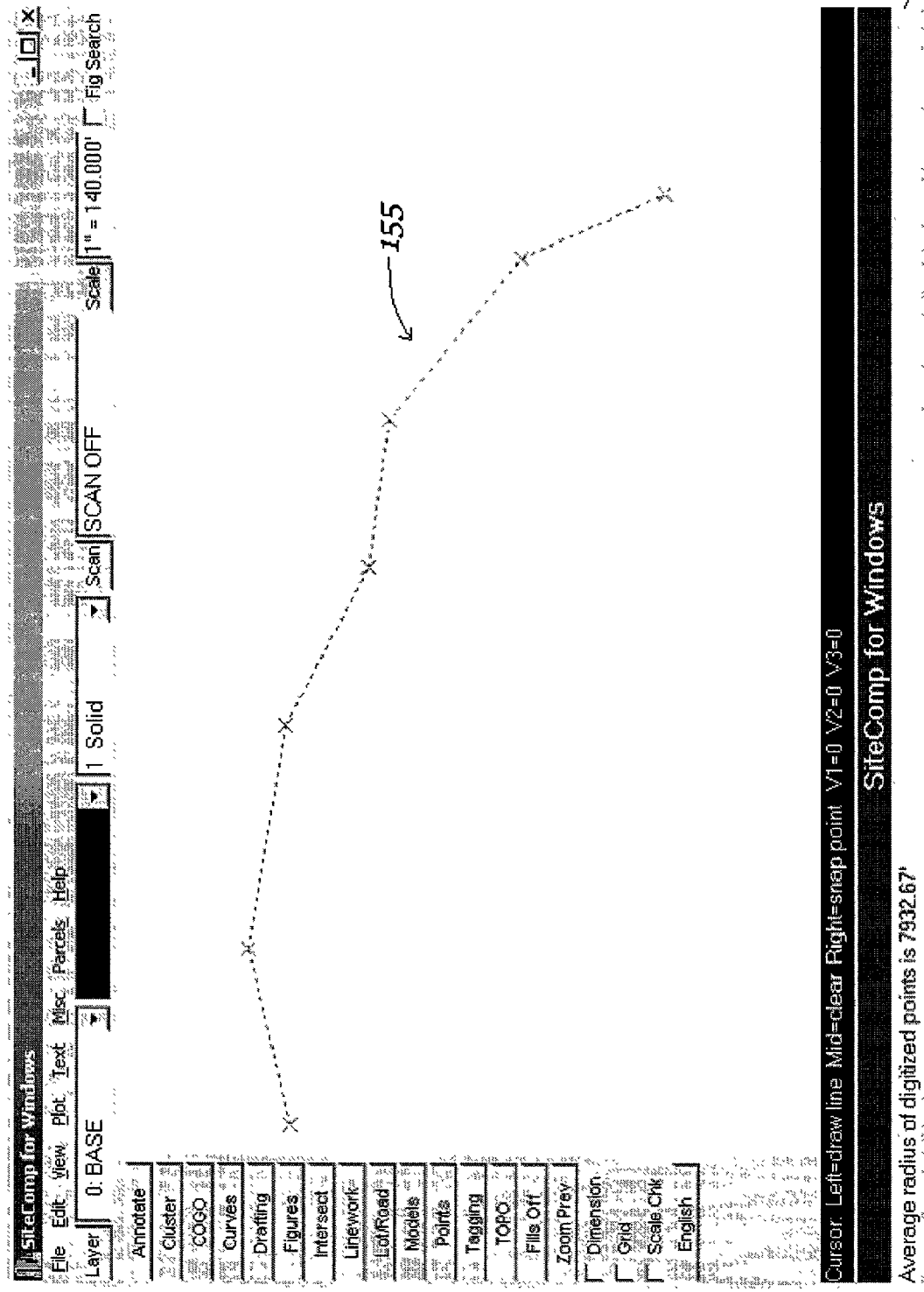

CDIS has the capability to compute the average radius of digitized points. From the "File" menu at the top of the screen, select "New". Press "Enter" for the default beginning point and press again for the default screen size. From "Drafting" in the side menu, one may select "Digitize [d]" 154, as in FIG. 112. With the left mouse button and various positions of the mouse pointer on the screen, one may place a series 155 of points on the screen as shown in FIG. 113. While still in the digitize mode, "Shift" and "r" may be pressed to calculate the average radius of the digitized points. The output line 28 at the bottom of the screen in FIG. 113 indicates, "Average radius of digitized points is 7932.67"".

Figure 113A:
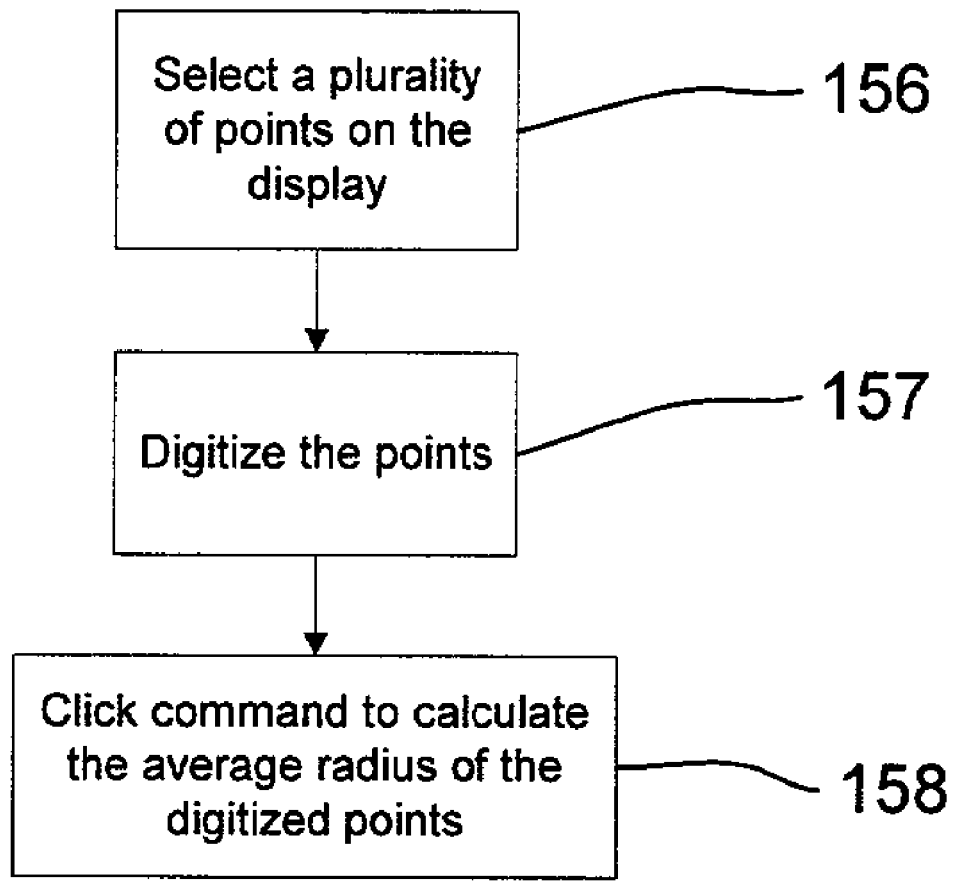
FIG. 113a is a block diagram for computing an average radius from digitized points.

FIG. 113a is a flow diagram of computing an average radius of digitized points. Block 156 is select a plurality of points on the display, followed by block 157 which is to digitize the points. Block 158 is to click a command to calculate the average radius of the digitized points.

Figure 115:
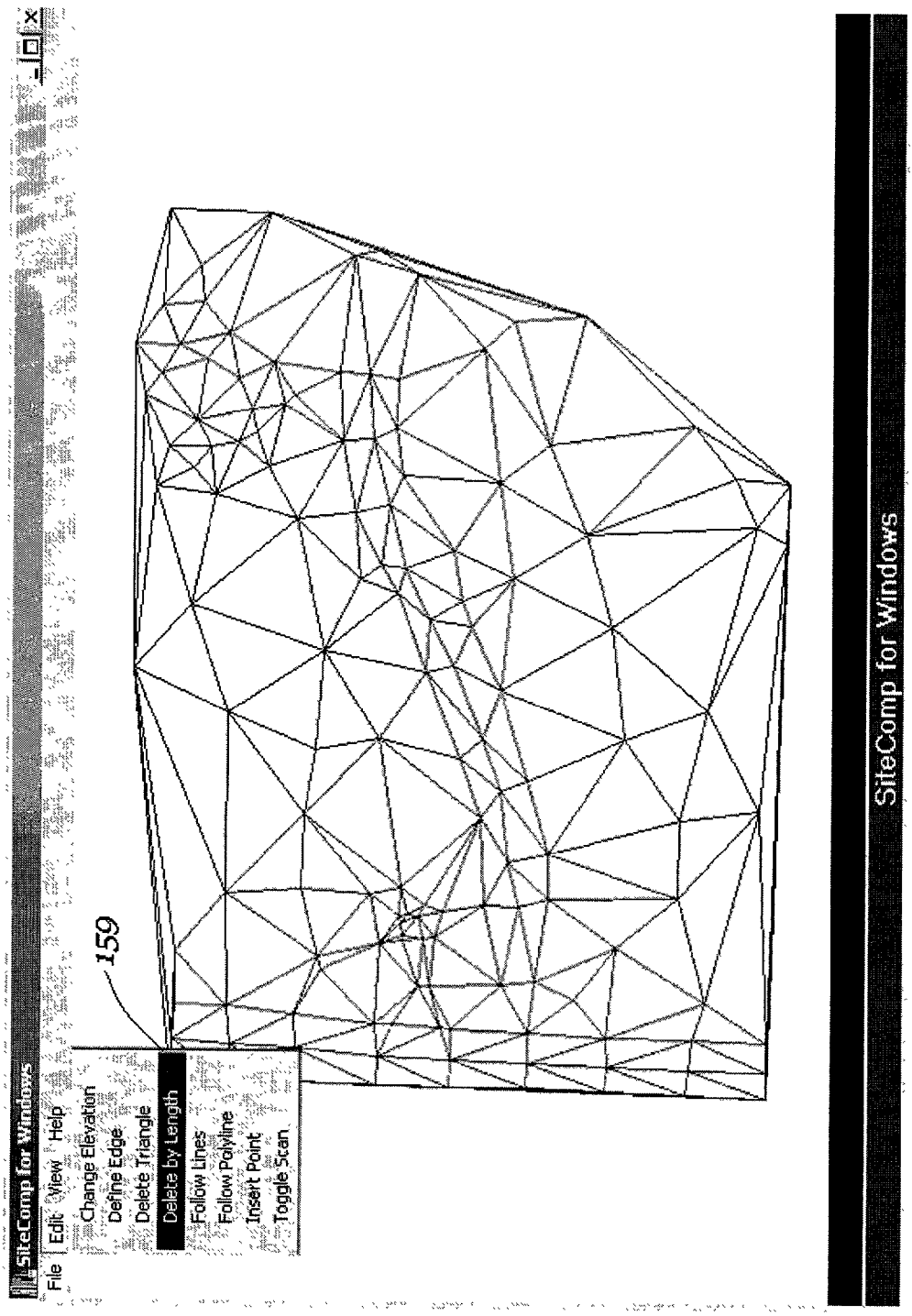
Figure 116:
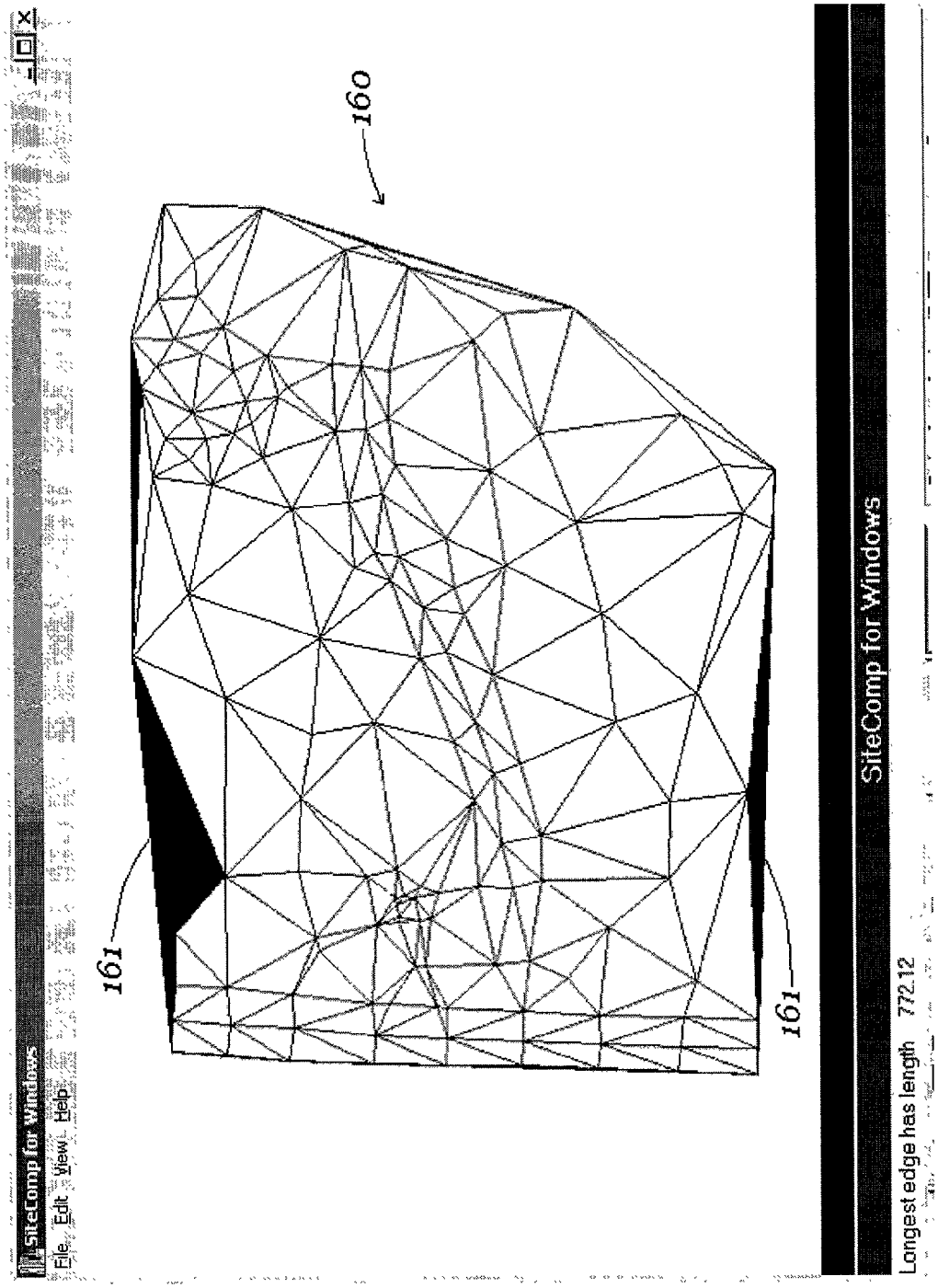

In CDIS, all triangles greater than a certain length may be eliminated. In the description, one may use the noted steps starting with FIG. 2 in getting to the screen 23 in FIG. 14 without the "View" menu pulled down as it is shown in FIG. 114. Adding a negative sign to a number representing certain length may be used to eliminate triangles having edges greater than that length. From the top menu, select "Edit" and "Delete by Length" 159, as in FIG. 115. The prompt line says, "Enter length of edges to erase". "–350" may be entered in the second or input line at the bottom of the screen. Then "Enter" may be pressed to get the screen 160 in FIG. 116 which shows the triangles 161 that are highlighted for deletion because they have edges greater than 350. None of these highlighted deleted areas 161 will be used in contour line generation, road design, earthwork, and the like.

Figure 117:
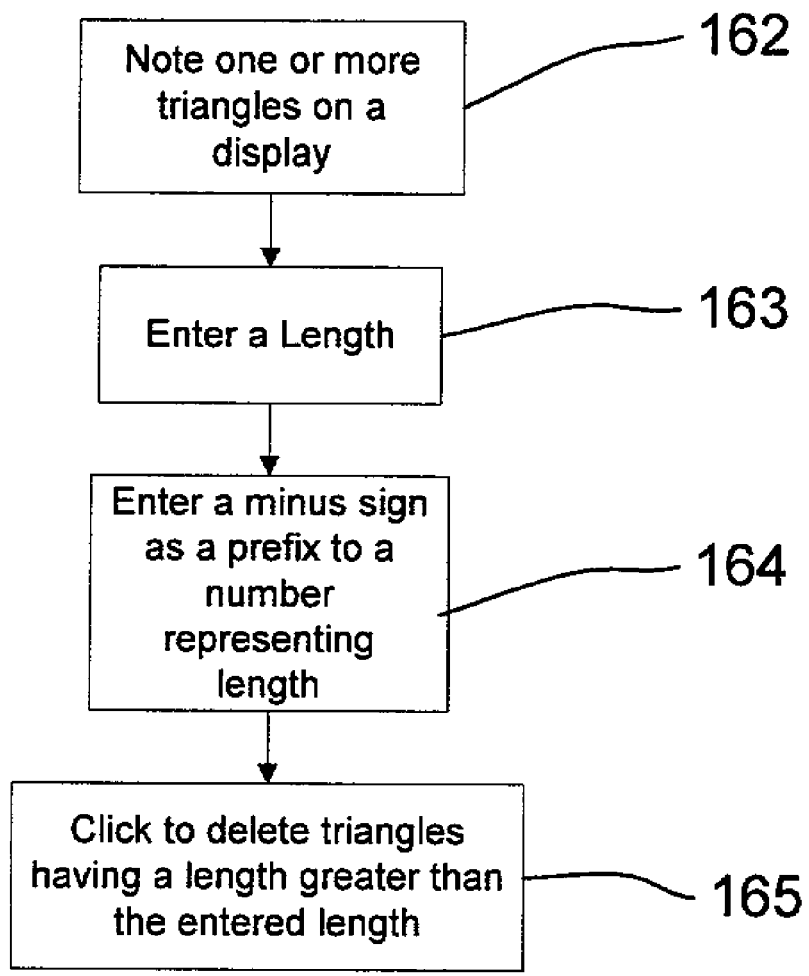
FIG. 117 is a block diagram for wiping out triangles greater than a certain length.

FIG. 117 is a flow diagram of eliminating triangles having a length that is greater than a selected length. Block 162 is to note one or more triangles on a display. Enter a length is block 163. Block 164 is to enter a minus sign as a prefix to the number representing the length. Click to delete triangles having a length greater than the entered length is block 165.

Figure 118:
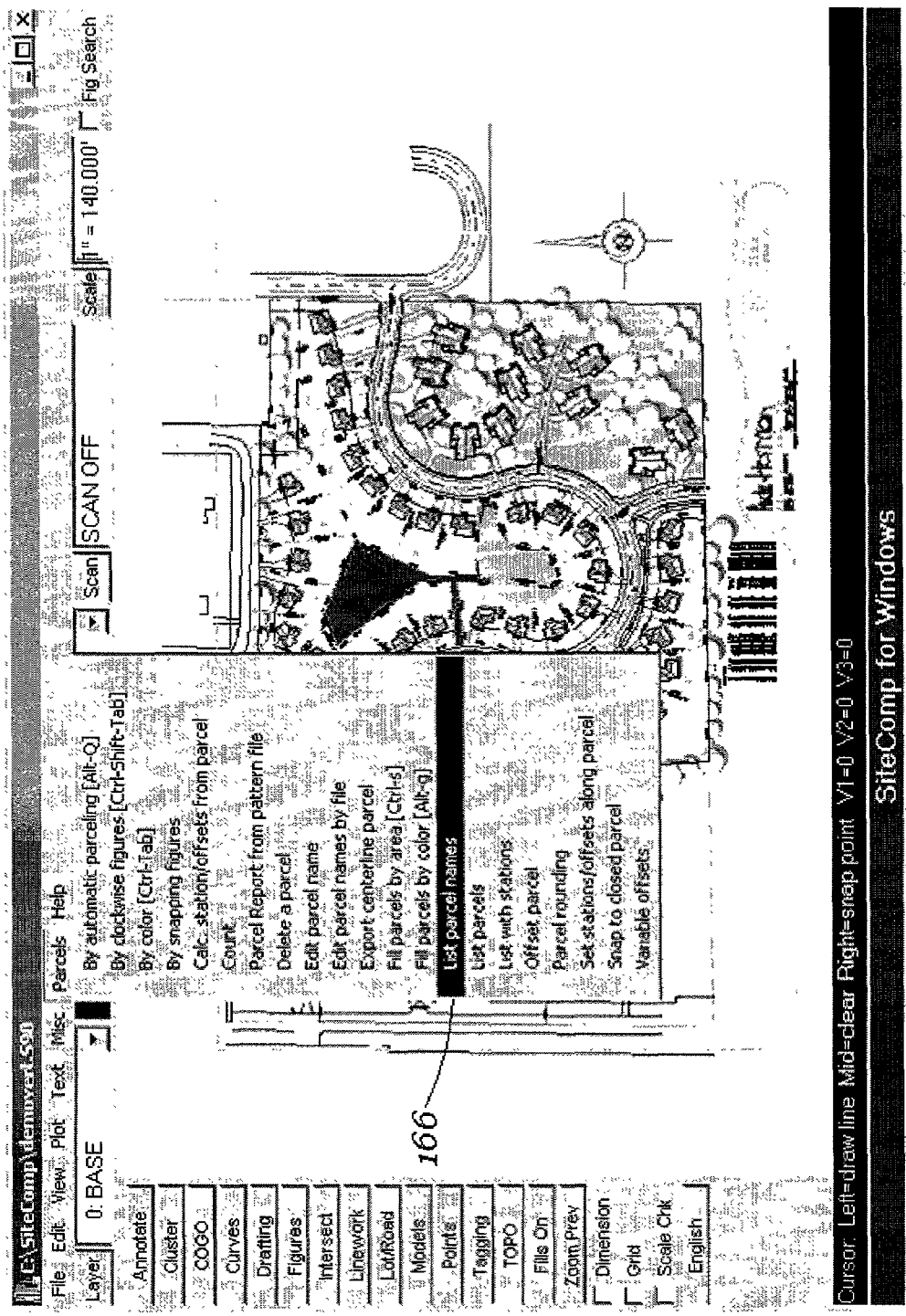
FIGS. 118 through 126 indicate a way to explode a text file inserted as multi-line text into individual lines of text.
Figure 119:
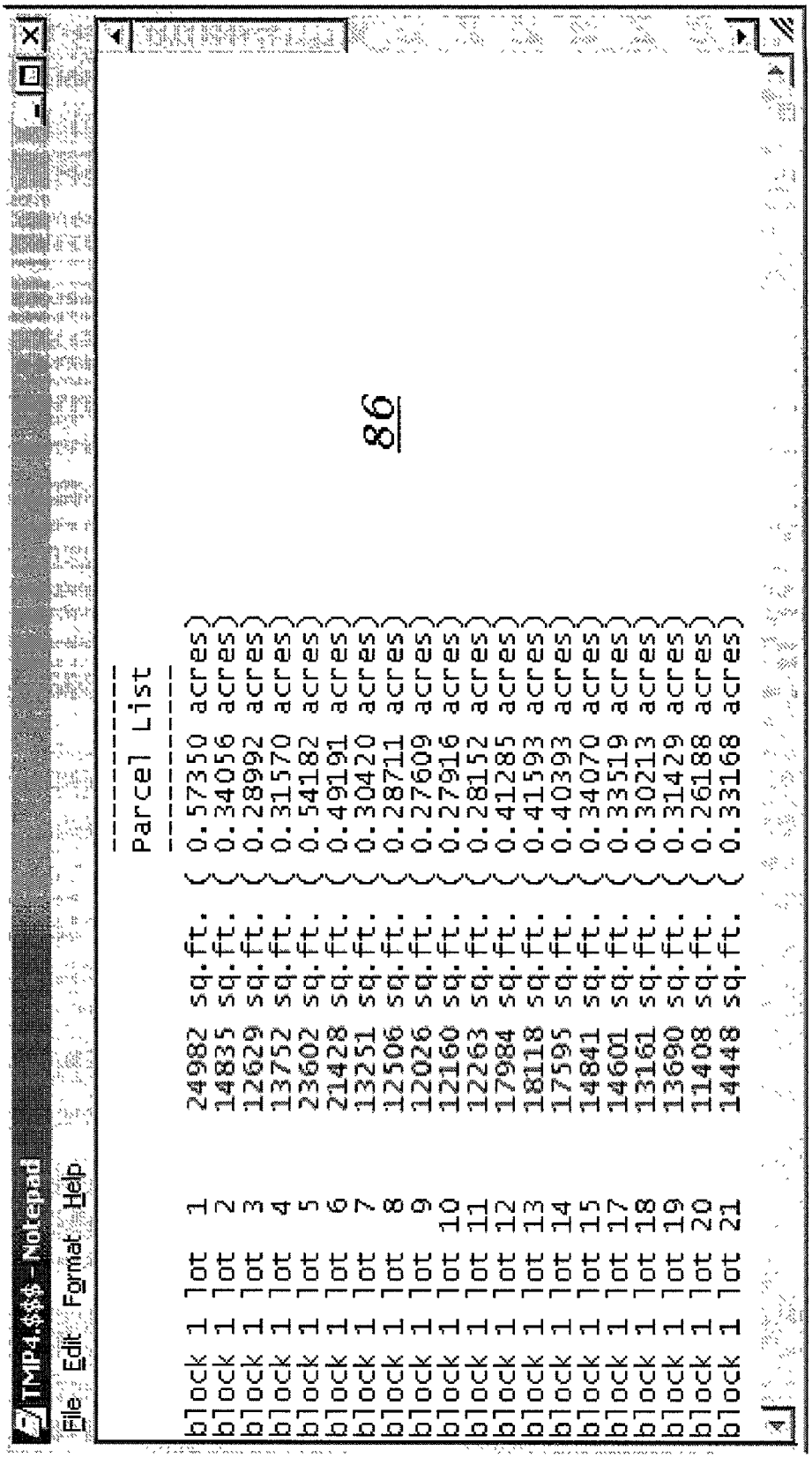
Figure 120:
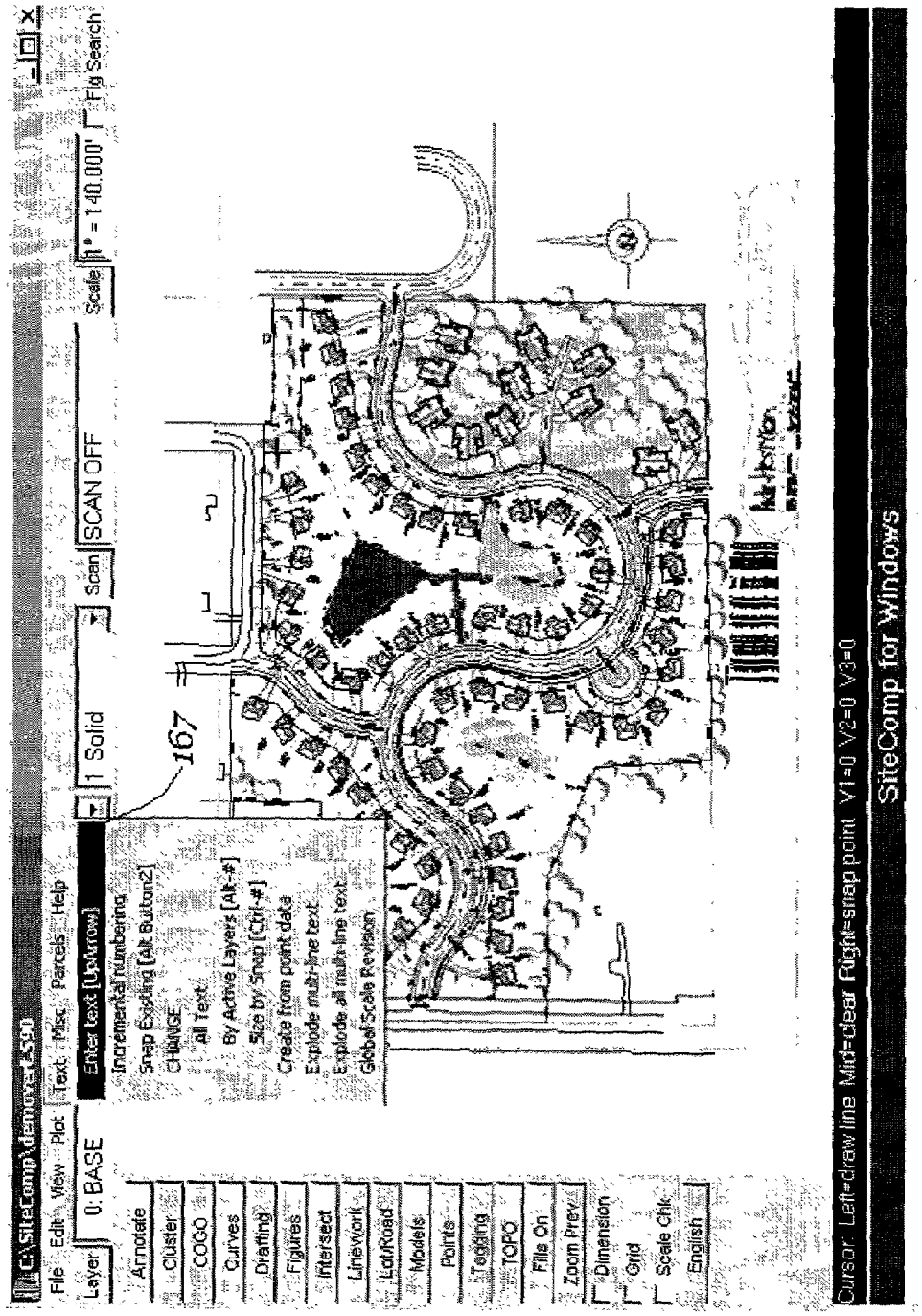
Figure 121:
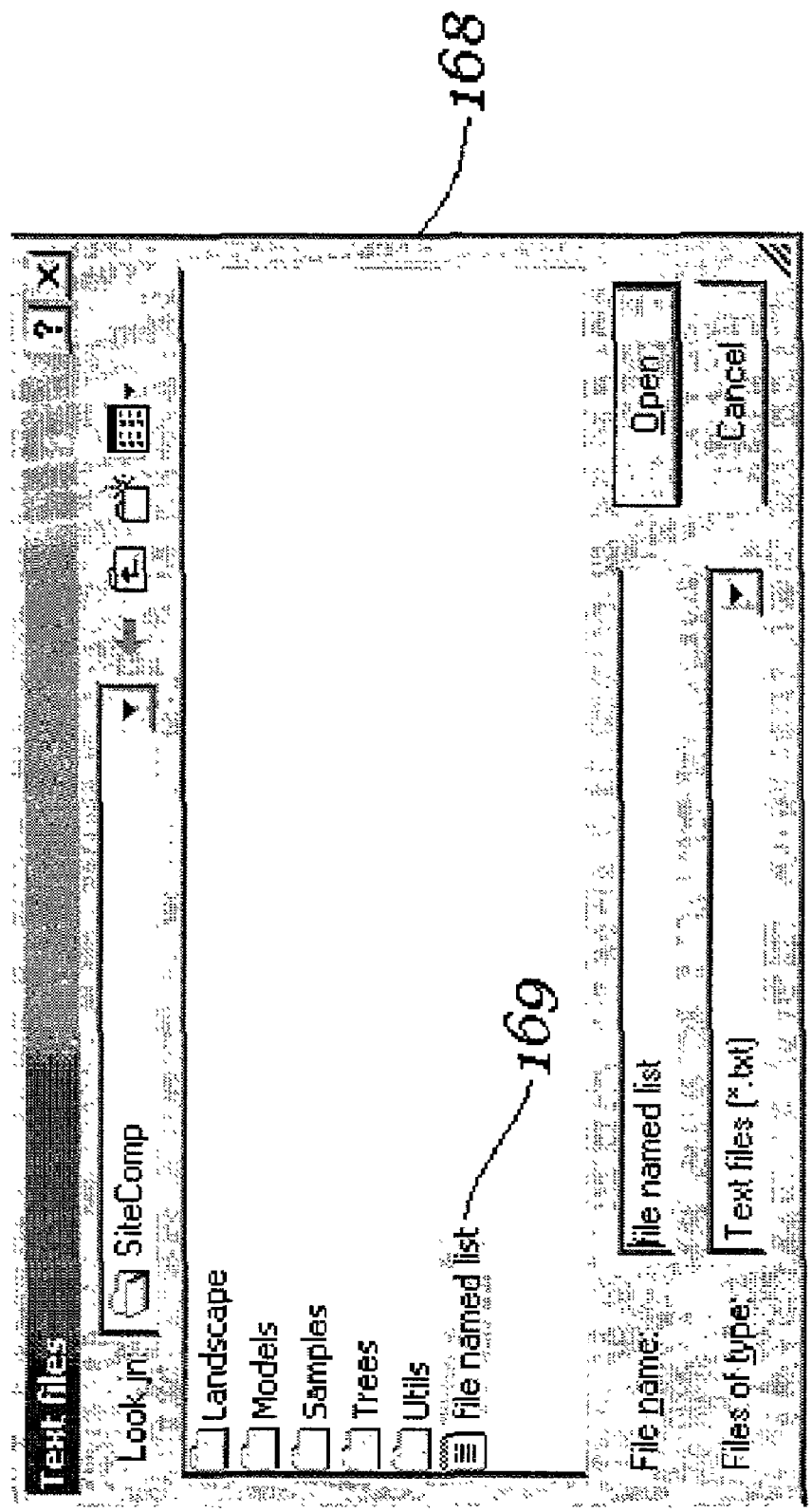
Figure 122:
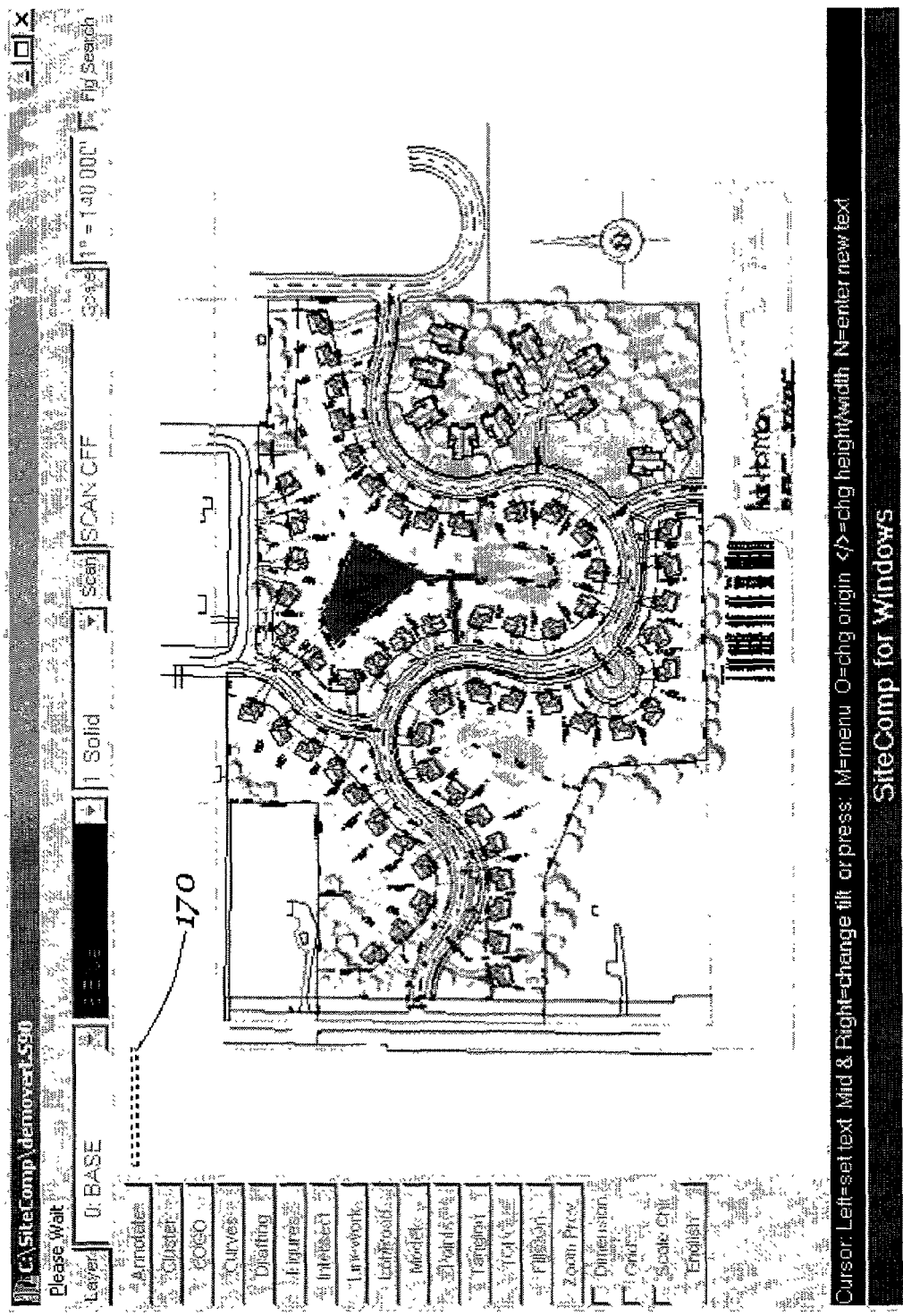
Figure 123:
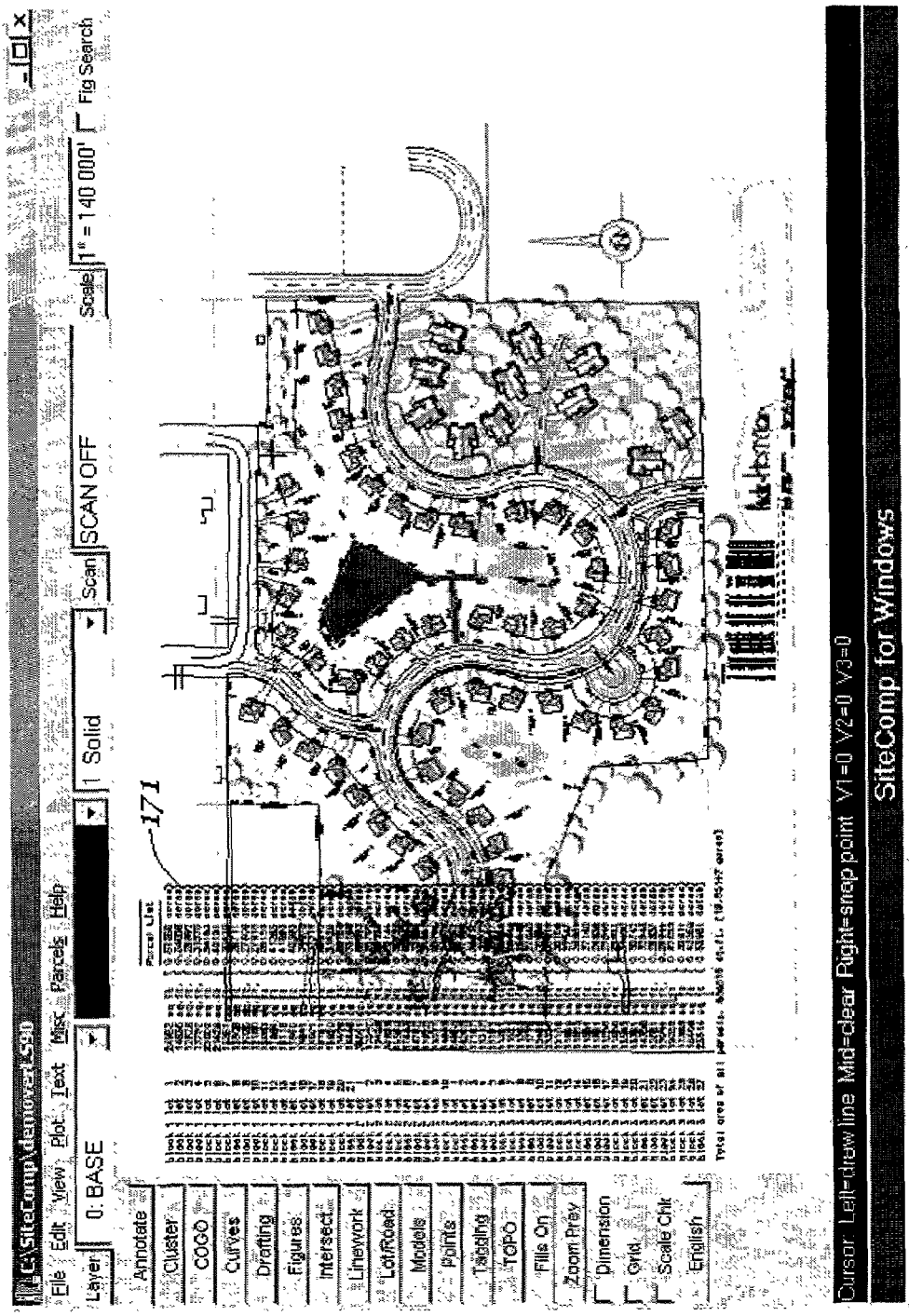
Figure 124:
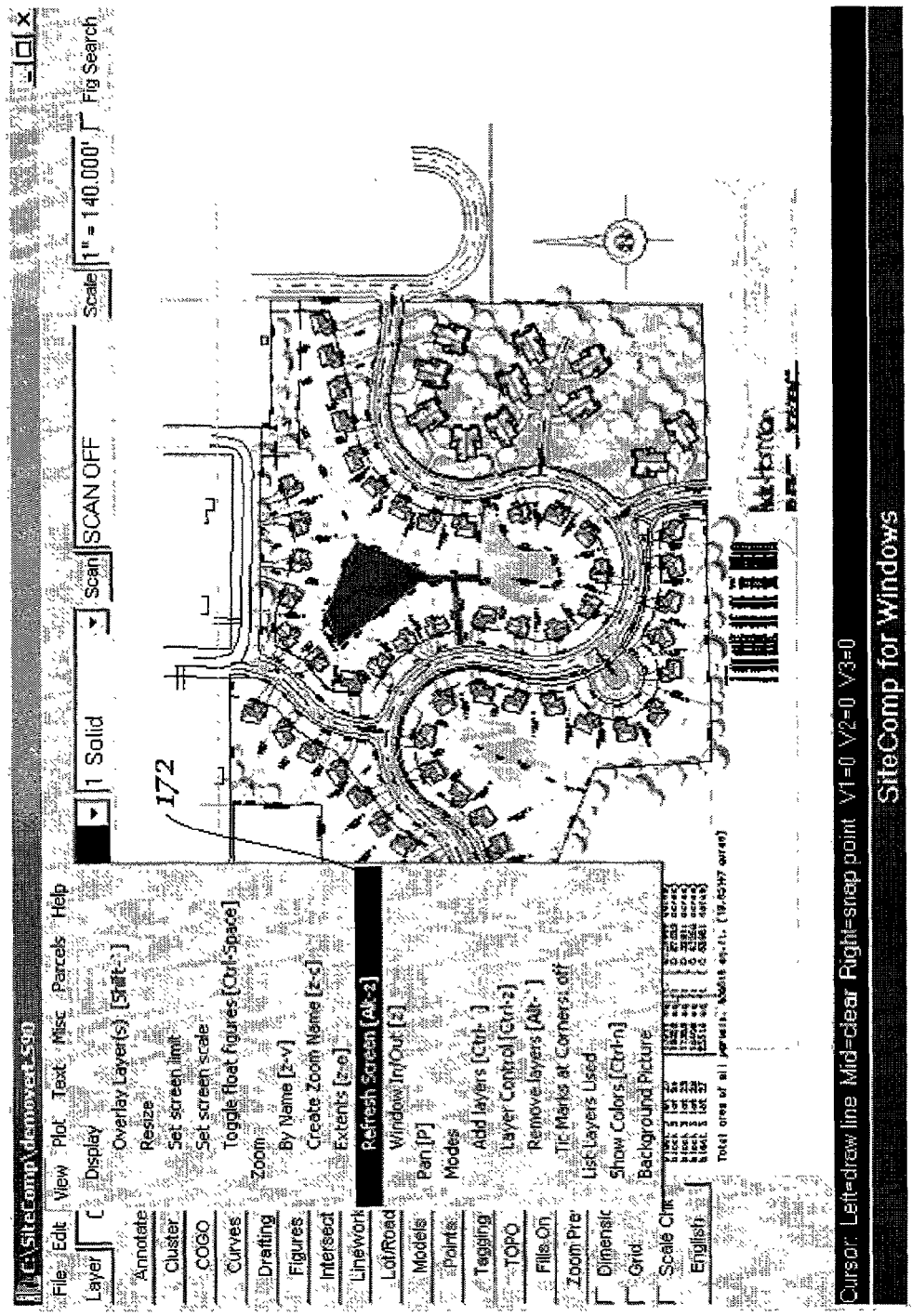
Figure 125:
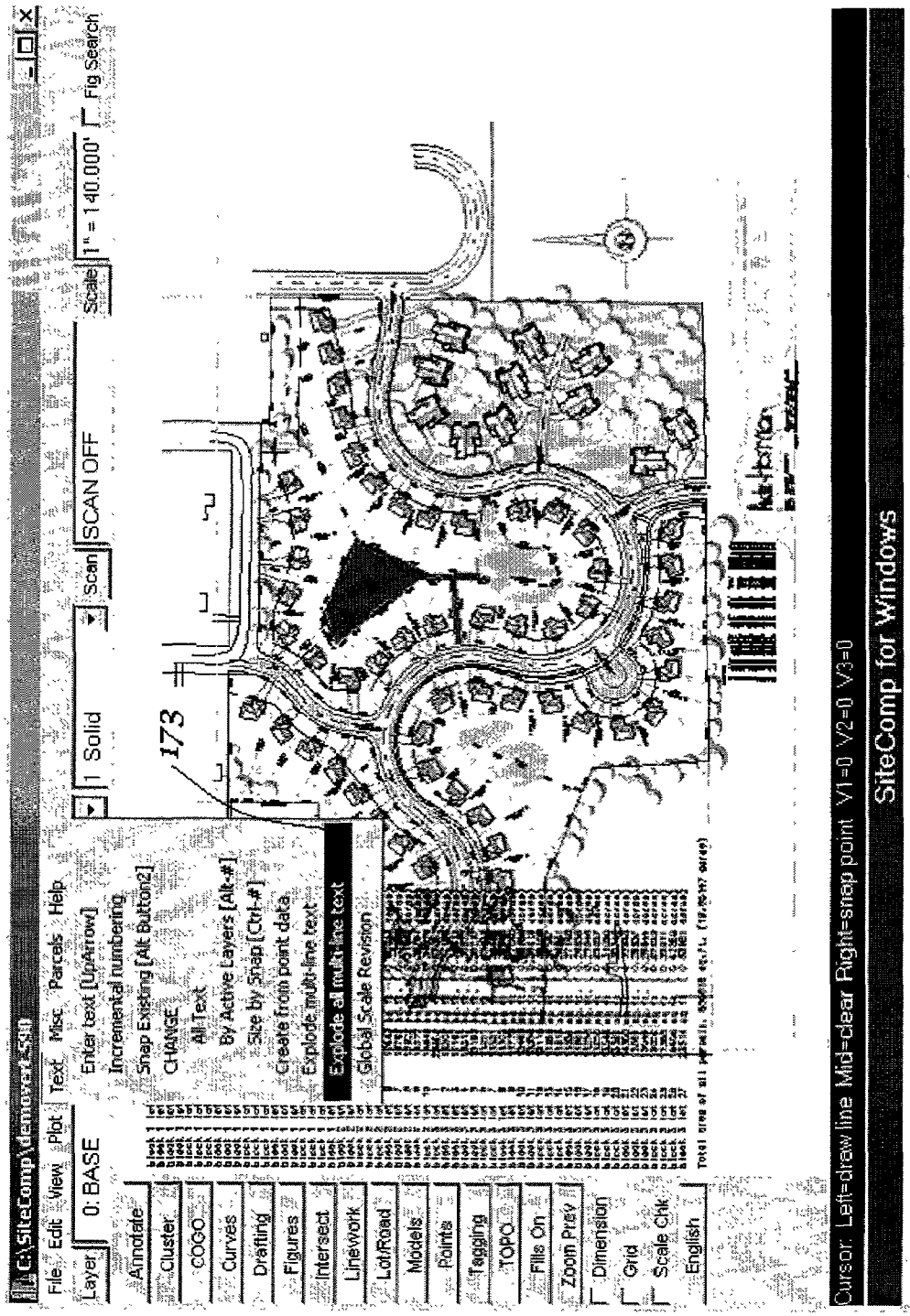
Figure 126:
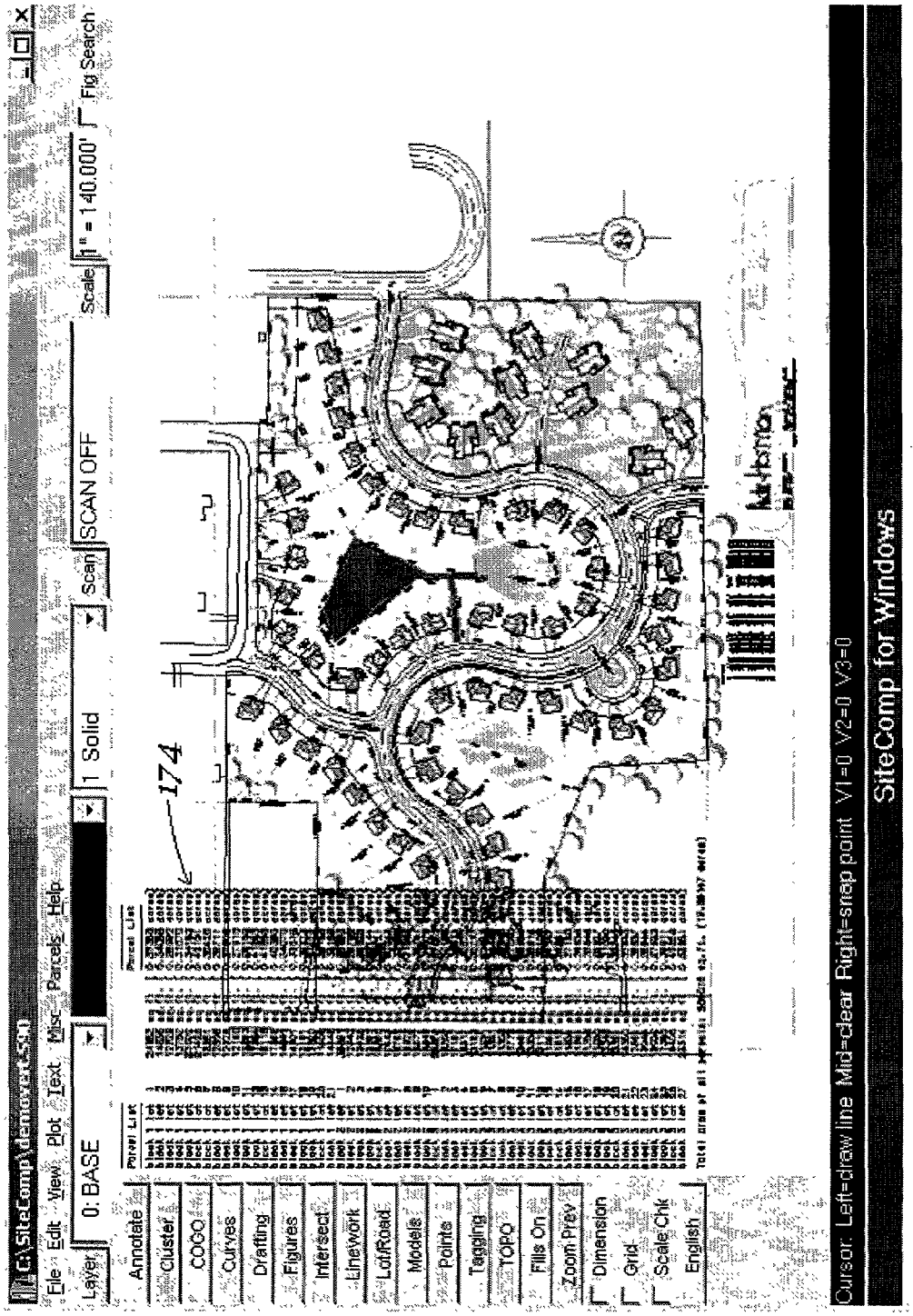

CDIS has the capability to explode a text file inserted as multi-line text into individual lines of text. One may go to the main menu and under file select "demovert" to read into the system. Then one may create a parcel list by selecting "Parcels" and "List parcel names" 166 from the top menu, as in FIG. 118. The prompt line asks, "Enter name to search for on parcel list [press ENTER for all]". "lot" may be entered in the input line as the name to search for. The text of the list may be saved as "file named list". A portion of the list 86 is shown in FIG. 119 but the whole list 86 is in FIGS. 72*a* and 72*b*. In CDIS, select "Text" from the top menu and "Enter text [UpArrow]" 167, as in FIG. 120. The prompt line says, "Enter text for a label". One may enter "f_" in the input line just below the prompt line and press "Enter". A pop-up 168 of files appears as in FIG. 121. "file named list" 169 may be selected for insertion into the drawing and opened. A dashed box 170, shown in FIG. 122, attached to and moveable by the mouse pointer may appear. The dashed box 170 may be situated in an open area of the drawing to where text is preferred to be placed. The left mouse button may be pressed to place the text file 171 in the drawing as in FIG. 123. One may select "View" and "Refresh Screen [Alt-z]" 172 from the top menu, as in FIG. 124, and note that the text file 171 is now inserted into the job file. The text 171 may be exploded into individual lines of text by selecting "Text" and "Explode all multi-line text" 173 from the top menu of the screen in FIG. 125. The prompt line appears with the question, "Do you want to insert the file 'C:\SiteComp\file named list.txt' into the plan? [Y/N]". "Y" or "yes" of the input line may be pressed to answer the question. The text is then exploded into individual lines of text 174, as shown in FIG. 126.

Figure 126A:
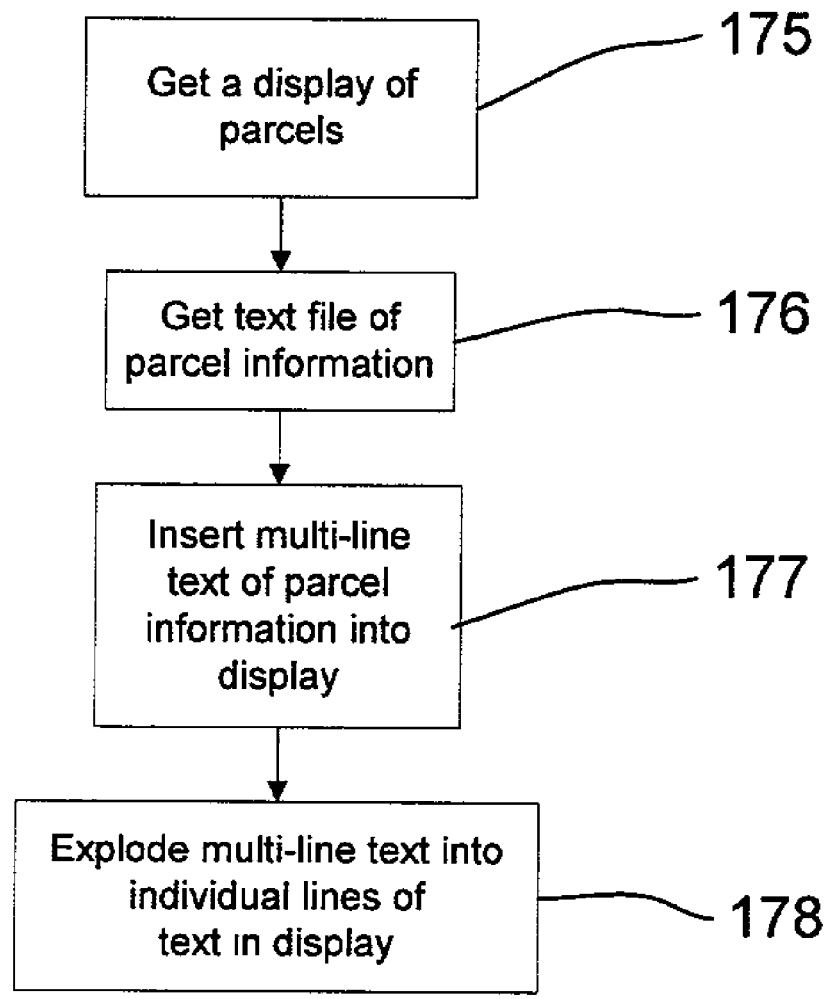
FIG. 126a is a block diagram for exploding a text file inserted as multi-line text into individual lines of text.

FIG. 126*a* is a flow diagram of exploding a text file inserted as a multi-line text into individual lines of text. Block 175 is to get a display of parcels. Get the text file of parcel information is block 176. Block 177 is to insert the multi-line text of parcel information into the display. Explode the multi-line text into individual lines of text in the display is block 178.

Figure 127:
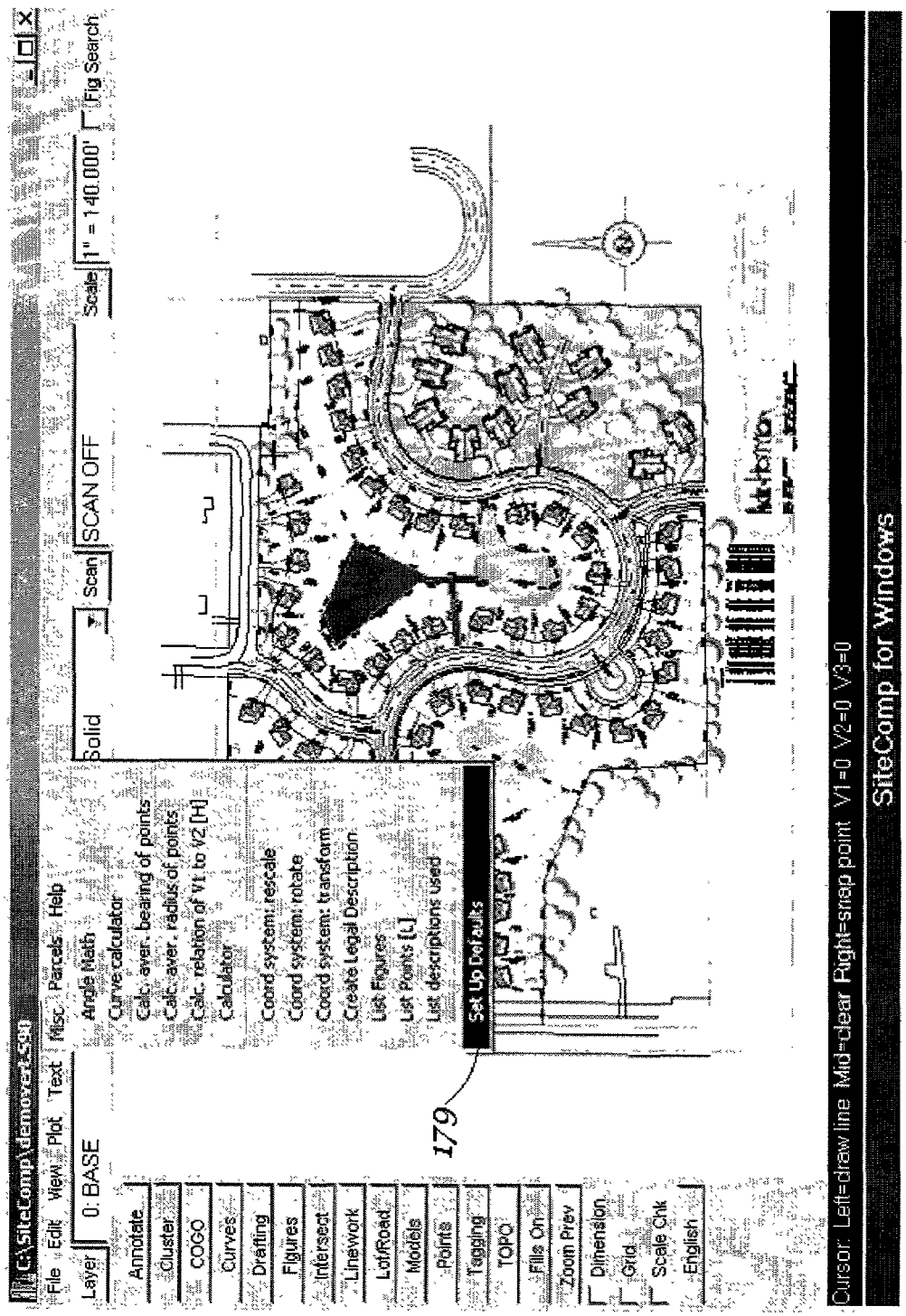
Figure 128:
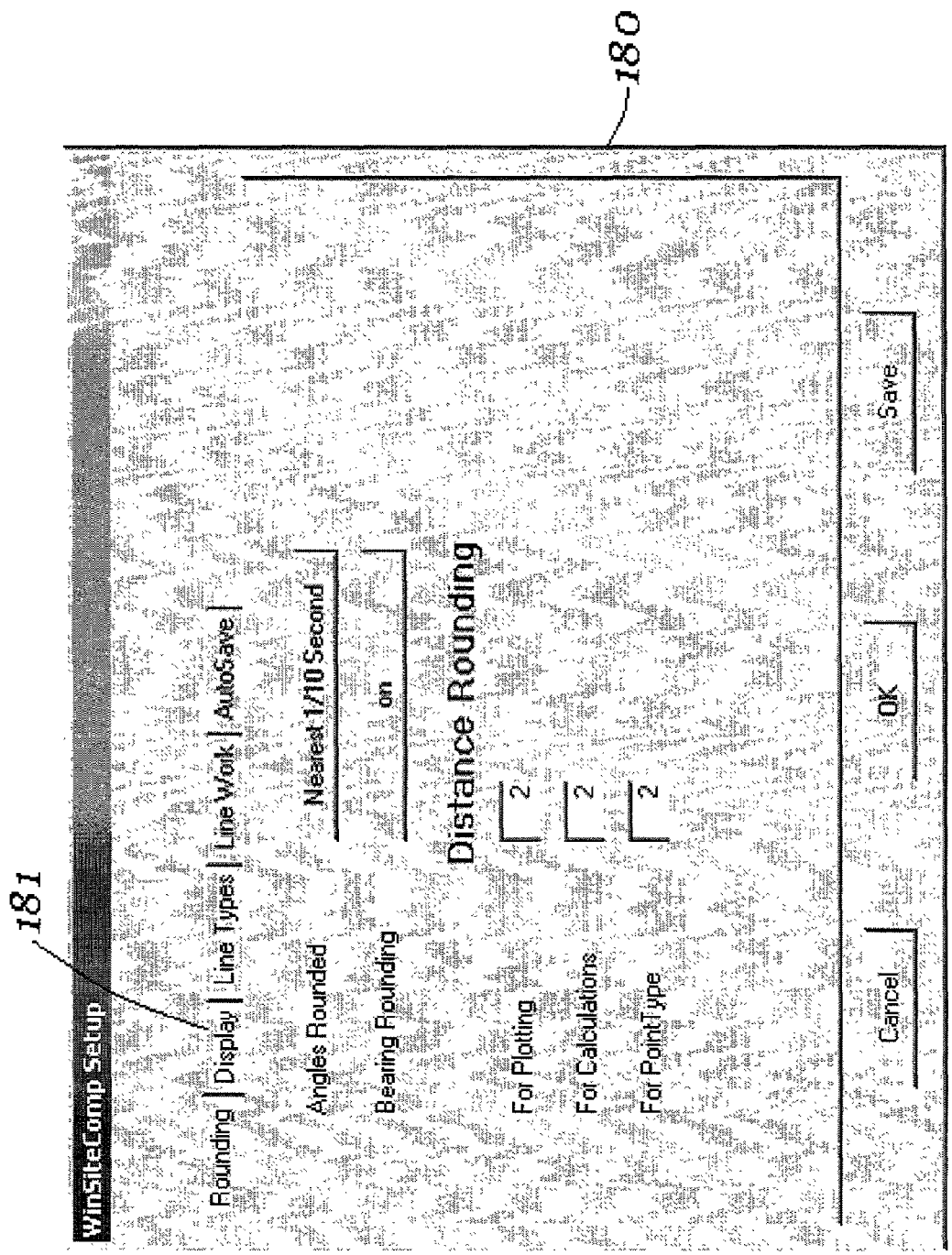
Figure 129:
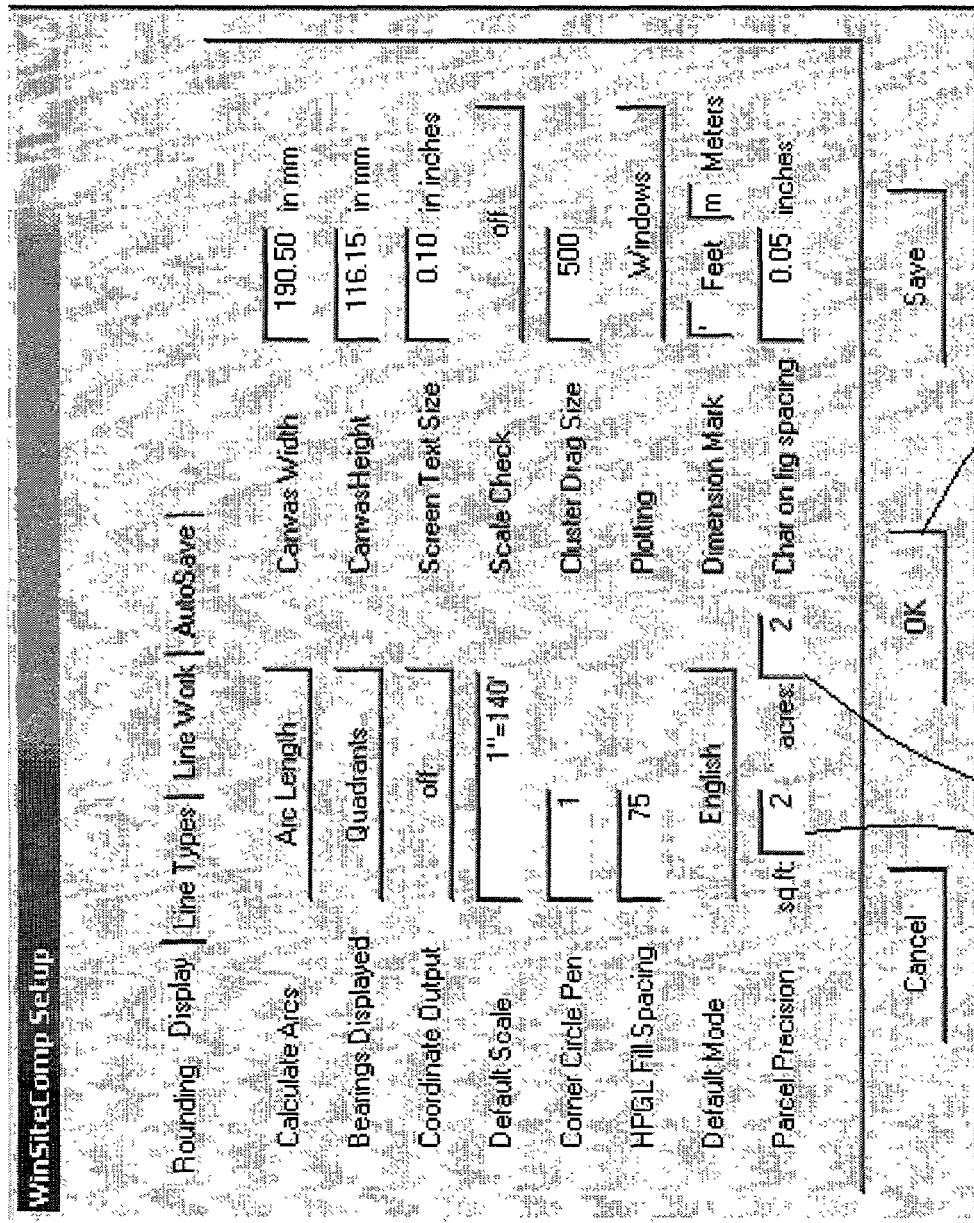
Figure 130:
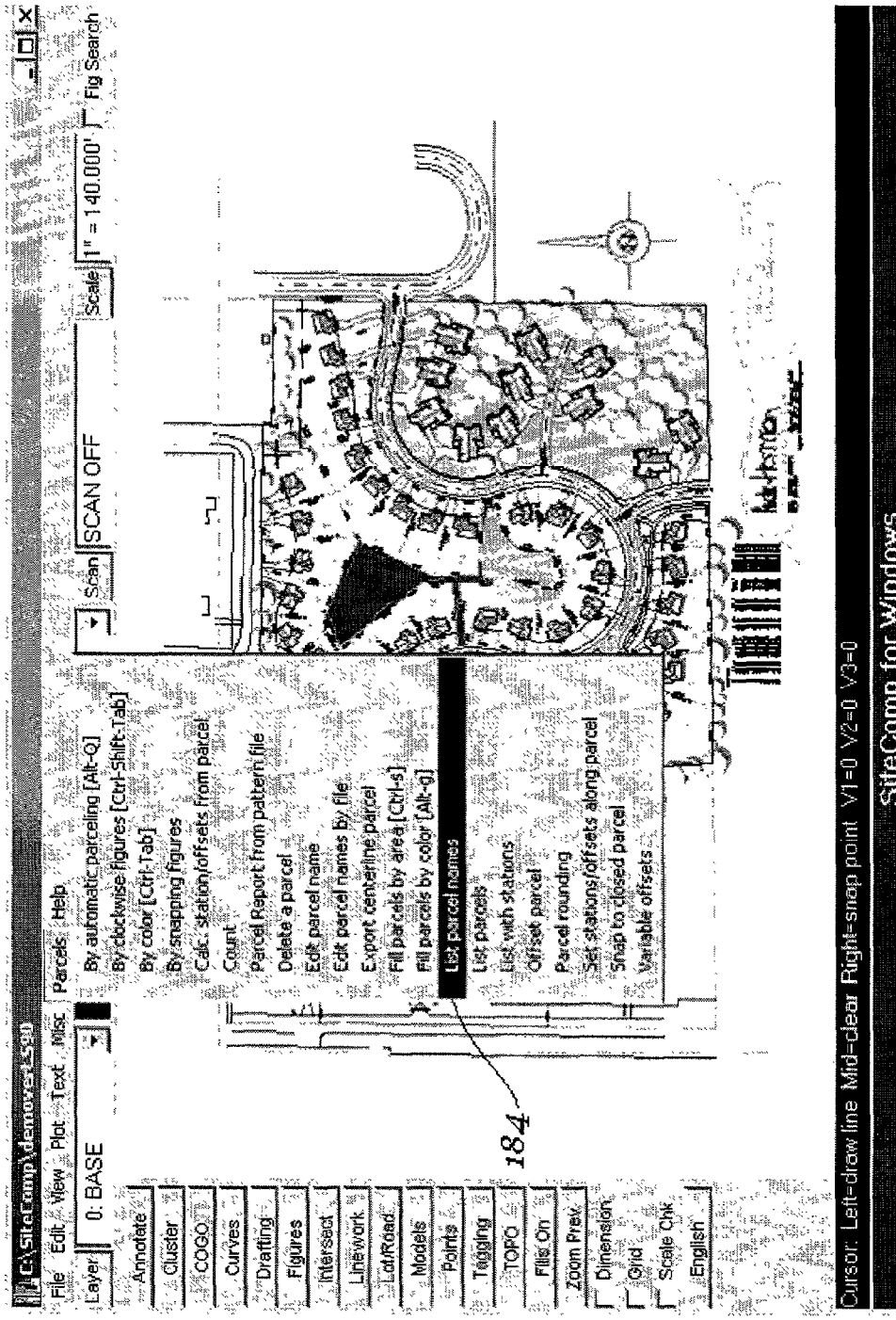

CDIS has the capability to specify parcel report precision. One may download "demovert" from "File" of the top menu. From the top menu, "Misc" and "Set Up Defaults" 179 may be selected as in FIG. 127. A SiteComp Setup 180 may display appear as shown in FIG. 128. The "Display" tab 181 may be selected. Of that display at the bottom of the first column, one may change the parcel precision numbers 182 to "2" for square feet and to "2" for acres as in FIG. 129. The "OK" button 183 may be pressed to effect the changes. A parcel list may be generated by selecting from the top menu "Parcels" and "List parcel names" 184 as in the screen of FIG. 130. The prompt line states, "Enter name to search for on parcel list [press ENTER for all]". "lot" may be entered in the input line just after the prompt line and "Enter" may be pressed. The "Parcel List" 185 may appear as in FIG. 131 and have a different decimal precision than the list 86 of FIGS. 72*a* and 72*b*. In FIG. 131, the square feet and acres are to two decimal places of precision 182 for list 185 as displayed in FIG. 129. In the list 86 of FIGS. 72*a* and 72*b*, the decimal precision for square feet is "0" and for acres it is "5".

Figure 131A:
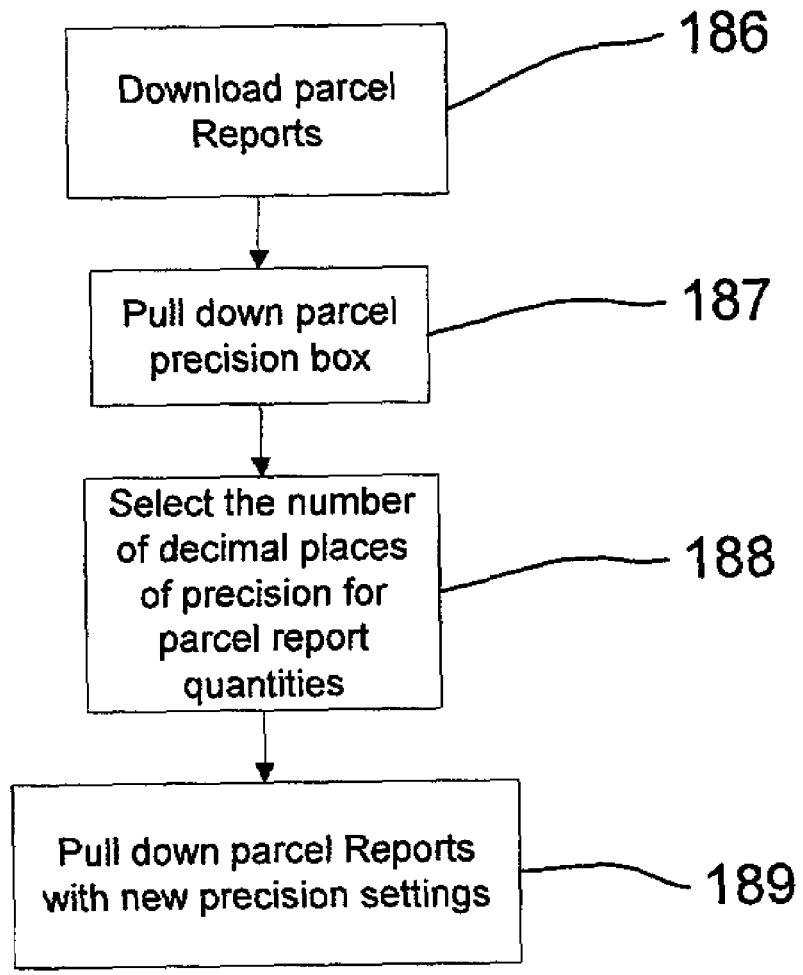
FIG. 131a is a block diagram for specifying parcel report precision.

FIG. 131*a* is a flow diagram of specifying parcel report precision. Block 186 is download parcel reports. Pull down parcel precision box is block 187. Select the numbers of decimal places of precision for parcel report quantities is block 188. Block 189 is pull down parcel reports with the new precision settings.

Although the invention has been described with respect to at least one illustrative embodiment, many variations and modifications will become apparent to those skilled in the art upon reading the present specification. It is therefore the intention that the appended claims be interpreted as broadly as possible in view of the prior art to include all such variations and modifications.

What is claimed is:

1. A coordinate design and information system comprising:
a processor; and
a designing mechanism for creating a design of a physical site including new physical geometry therefore, connected to said processor, having entities; and
wherein:
each of said entities is from the group including a simple figure, a basic figure, a standard figure, a specialization figure and a parcel;
each figure comprises at least a point;
a point has only an attribute of location;
a simple figure may be a line, an arc or a polyline;
a simple figure has only attributes of its points;
a basic figure has at least one more attribute than the simple figure;
a standard figure has at least one more attribute than a basic figure;
a specialization figure can draw itself; and
a parcel is a simple figure, a basic figure, a standard figure or specialization figure having a name.

2. The system of claim 1, further comprising:
a display comprising a view of a site having lots; and
wherein said lots may be labeled and automatically parceled.

3. The system of claim 1, further comprising:
a display comprising a view of a site having a cluster; and
wherein the cluster may be duplicated and placed in the site plan.

4. The system of claim 1, further comprising:
a display comprising a view of a site having a curve; and
wherein the curve may be snapped to place a line tangent to it at a selected point on the curve.

5. The system of claim 1, further comprising:
a display comprising a view of a site having figures; and
wherein the figures may be erased by type of figure.

6. The system of claim 1, further comprising:
a display comprising a view of a site having a plurality of figures that are lines; and
wherein the lines may be converted to a polyline that is one figure.

7. The system of claim 1, further comprising:
a display comprising a view of a site having a plurality of points; and
wherein an average radius of the points may be calculated.

8. The system of claim 1, further comprising:
a display comprising a view of a site having triangles; and
wherein triangles larger than a selected length may be deleted.

9. The system of claim 1, further comprising:
a display comprising a view of a site having a multi-line text file in the view; and
wherein the text file may be exploded into individual lines of text.

10. The system of claim 1, further comprising:
a display comprising a view of a site plan having parcels; and
wherein:
a parcel list having quantitative information may be generated of the parcels; and
the quantitative information has a precision that may be adjusted.

* * * * *